United States Patent
Ichikawa et al.

(10) Patent No.: US 11,043,033 B2
(45) Date of Patent: Jun. 22, 2021

(54) INFORMATION PROCESSING DEVICE AND INFORMATION PROCESSING METHOD CAPABLE OF DECIDING OBJECTS ARRANGED IN VIRTUAL SPACE GENERATED BASED ON REAL SPACE

(71) Applicant: SONY CORPORATION, Tokyo (JP)

(72) Inventors: Hirotake Ichikawa, Tokyo (JP); Naoyuki Sato, Tokyo (JP); Seiji Suzuki, Kanagawa (JP); Masato Shimakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/340,768

(22) PCT Filed: Aug. 30, 2017

(86) PCT No.: PCT/JP2017/031043
§ 371 (c)(1),
(2) Date: Apr. 10, 2019

(87) PCT Pub. No.: WO2018/092384
PCT Pub. Date: May 24, 2018

(65) Prior Publication Data
US 2020/0051336 A1 Feb. 13, 2020

(30) Foreign Application Priority Data
Nov. 21, 2016 (JP) .............................. JP2016-226211

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G06T 2219/004* (2013.01); *G06T 2219/024* (2013.01)

(58) Field of Classification Search
CPC .... G06F 3/011; G06F 3/04815; G06T 19/006; G06T 2219/024; G06T 2219/004; G06T 1/00; G06T 19/00
See application file for complete search history.

(56) References Cited

U.S. PATENT DOCUMENTS 7,840,568 B2 * 11/2010 Purang .................. G06F 16/435
707/748
2006/0170652 A1 8/2006 Bannai et al.
(Continued)

FOREIGN PATENT DOCUMENTS

| CN | 1815409 A | 8/2006 |
| CN | 1845064 A | 10/2006 |

(Continued)

OTHER PUBLICATIONS

J P-2005182331-A (Machine Translation on Sep. 27, 2020) (Year: 2005).*

(Continued)

*Primary Examiner* — Michael Le
(74) *Attorney, Agent, or Firm* — Chip Law Group

(57) ABSTRACT

An information processing device including a decision unit that determines, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

7 Claims, 71 Drawing Sheets

(56) References Cited

U.S. PATENT DOCUMENTS

| | | | |
|---|---|---|---|
| 2006/0224964 A1* | 10/2006 | Schwartz | G06F 16/4393 715/730 |
| 2006/0227151 A1 | 10/2006 | Bannai | |
| 2012/0212509 A1* | 8/2012 | Benko | G06F 3/033 345/633 |
| 2013/0162688 A1* | 6/2013 | Matsuoka | G06F 3/1415 345/682 |
| 2014/0218361 A1* | 8/2014 | Abe | A63F 13/42 345/424 |
| 2014/0351263 A1* | 11/2014 | McConnell | G06F 16/9535 707/748 |
| 2016/0212468 A1* | 7/2016 | Lee | H04N 21/6125 |

FOREIGN PATENT DOCUMENTS

| | | | |
|---|---|---|---|
| EP | 1686554 A2 | | 8/2006 |
| EP | 1710002 A1 | | 10/2006 |
| JP | 2002-305758 A | | 10/2002 |
| JP | 2003-223653 A | | 8/2003 |
| JP | 2005182331 A | * | 7/2005 |
| JP | 2006-209664 A | | 8/2006 |
| JP | 2006-293604 A | | 10/2006 |
| JP | 2014-149712 A | | 8/2014 |
| KR | 10-2013-0091541 A | | 8/2013 |

OTHER PUBLICATIONS

International Search Report and Written Opinion of PCT Application No. PCT/JP2017/031043, dated Sep. 26, 2017, 09 pages of ISRWO.

Office Action for KR Patent Application No. 10-2019-7013051, dated Apr. 20, 2021, 06 pages of English Translation and 05 pages of Office Action.

* cited by examiner

FIG. 5

| Object ID | Region | Meta Information | | | | |
|---|---|---|---|---|---|---|
| | | type | area | face | touched | neighborhood |
| 1 | (0.00, 0.00, 0.00) – (1.00, 2.00, 1.00) | human | A | Beth | 2 | – |
| 2 | (1.00, 0.00, 1.00) – (2.00, 2.00, 2.00) | Chair(L) | A | – | 1 | 1 |
| ... | ... | ... | ... | ... | ... | ... |

3060 — Object ID
3064 — Region
3066 — type
3062 — Meta Information
3068 — area
3070 — face
3072 — touched
3074 — neighborhood
306

FIG. 11

| Area | Object ID | Meta Information | | Priority |
|---|---|---|---|---|
| | | Region | ... | |
| A | 1 | (0.00, 0.00, 0.00) – (1.00, 2.00, 1.00) | ... | 1000 |
| A | 2 | (1.00, 0.00, 1.00) – (2.00, 2.00, 2.00) | ... | 500 |
| B | 1 | (2.00, 0.00, 0.00) – (3.00, 2.00, 1.00) | ... | 1000 |
| B | 2 | (0.00, 0.00, 0.00) – (1.00, 1.00, 1.00) | ... | 300 |
| ... | ... | ... | ... | ... |

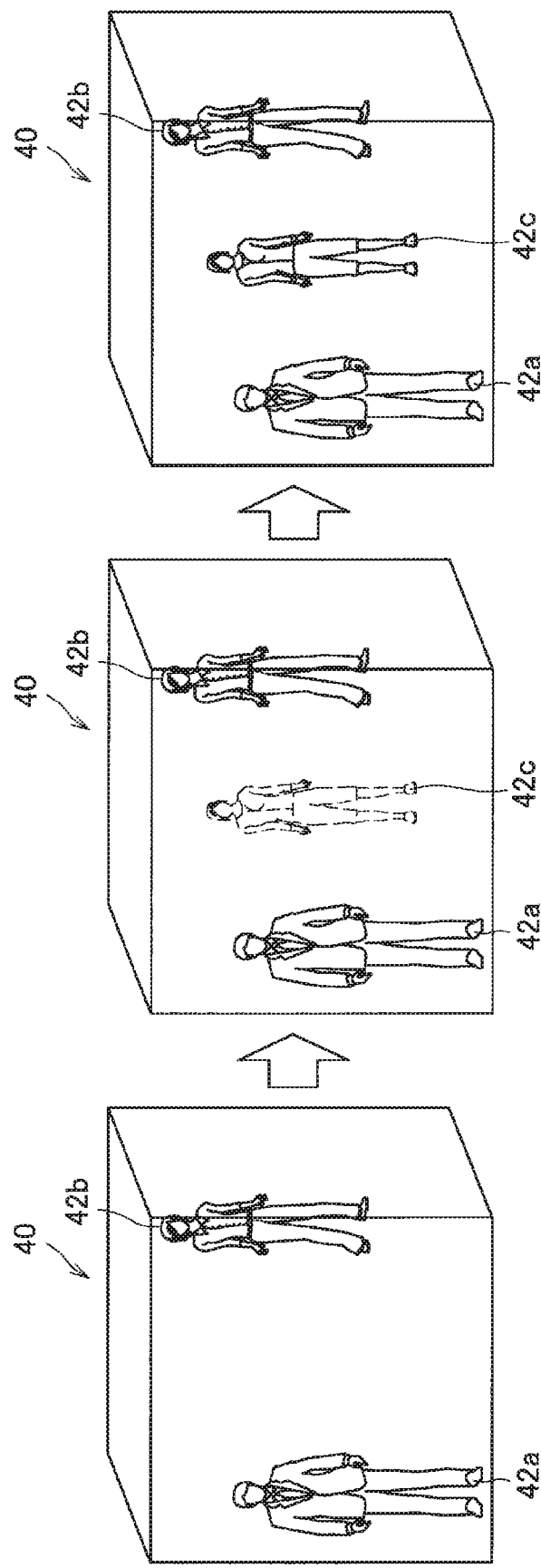

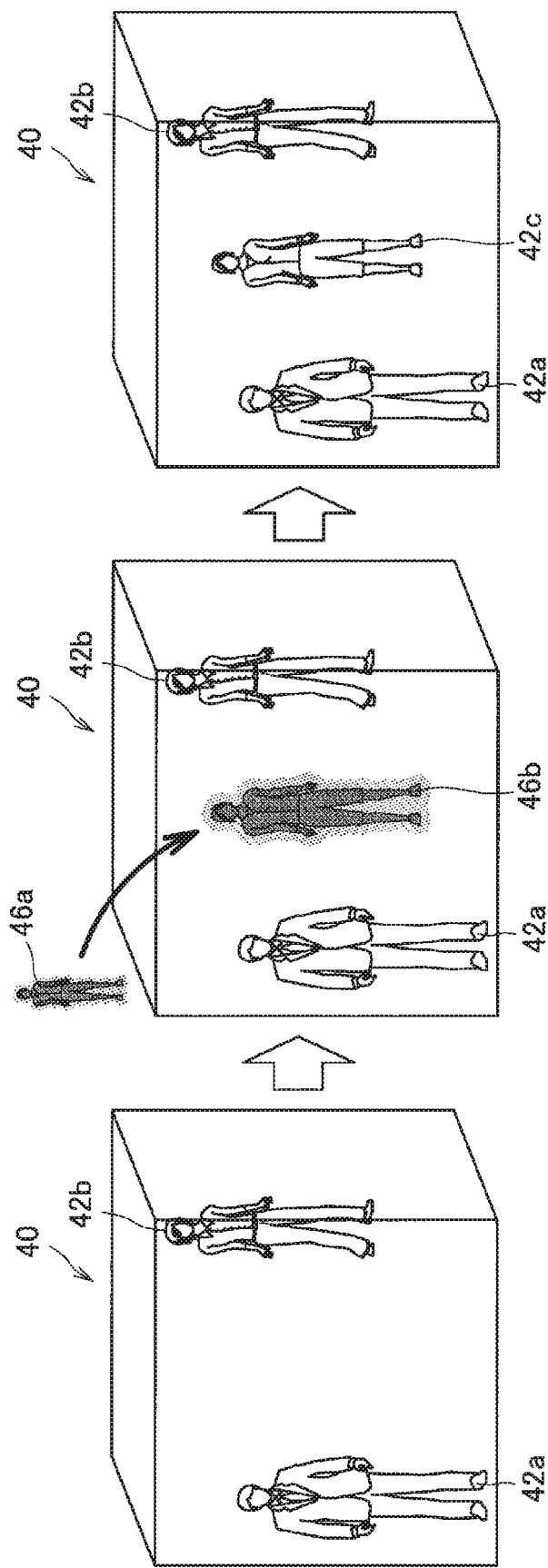

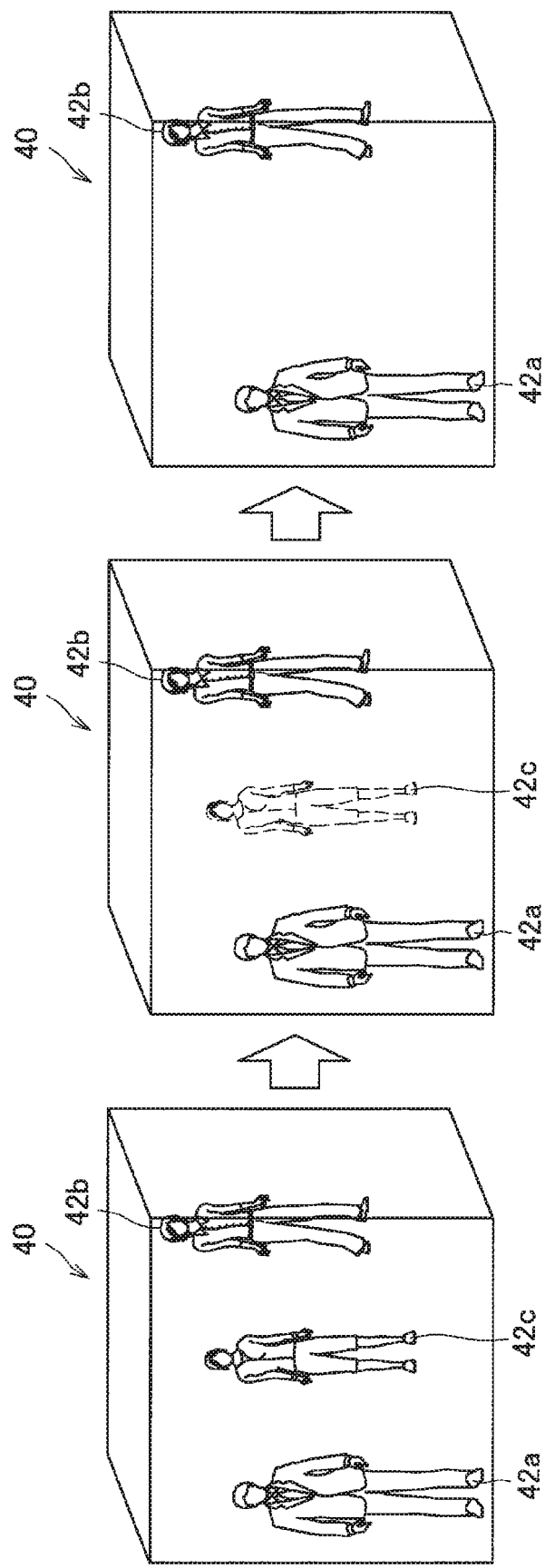

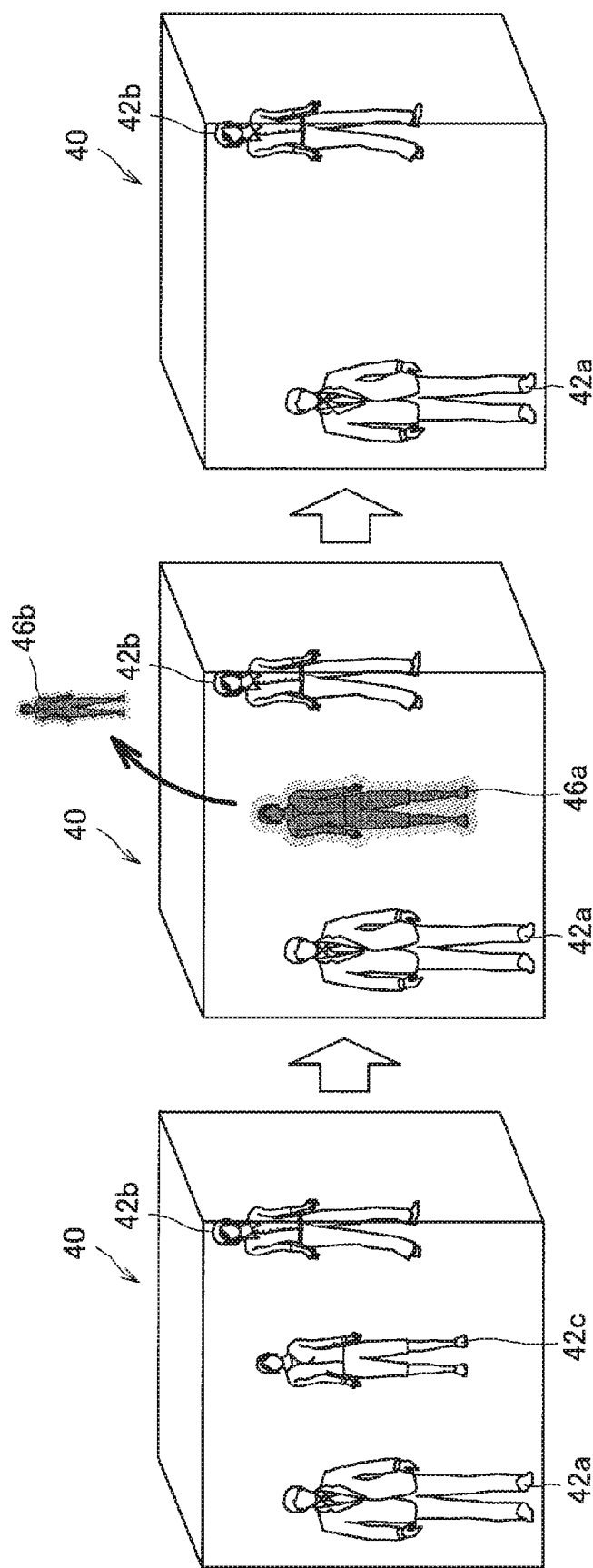

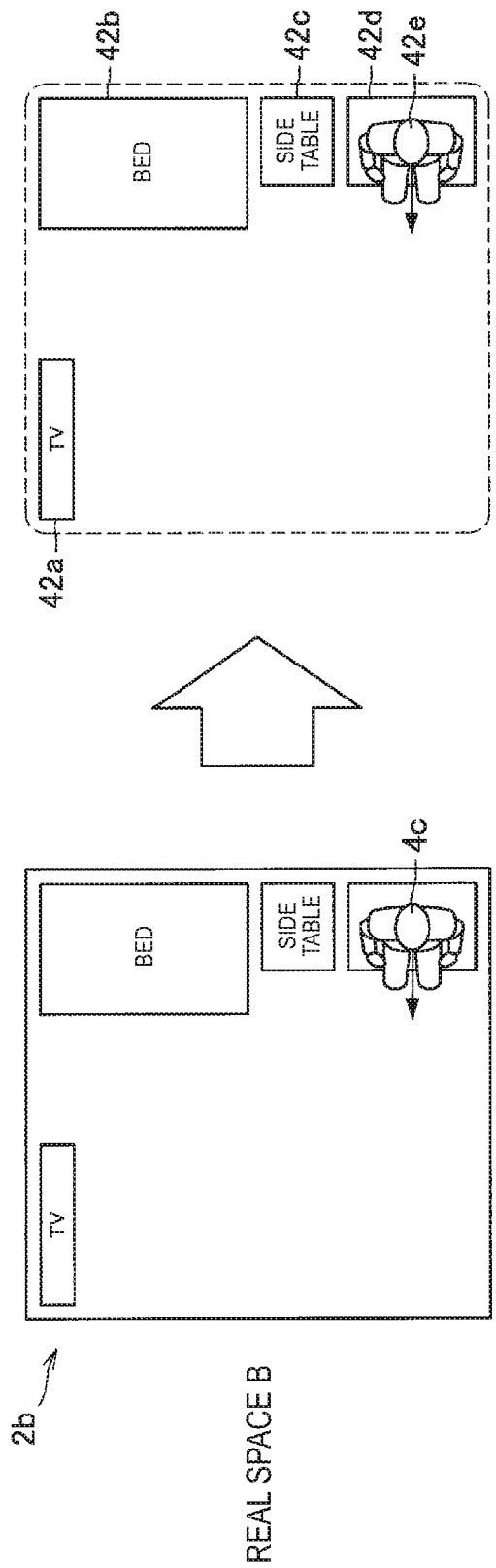

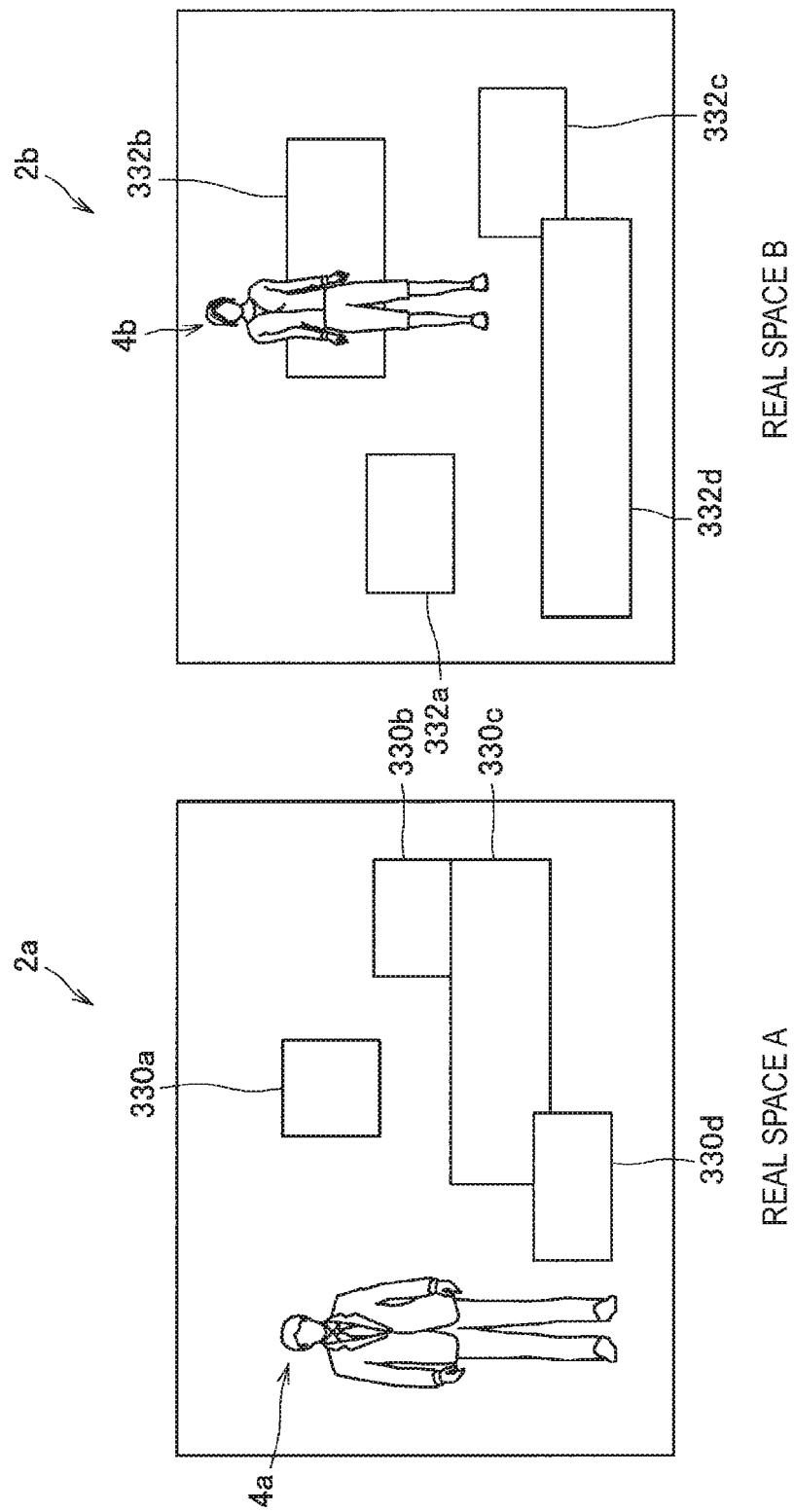

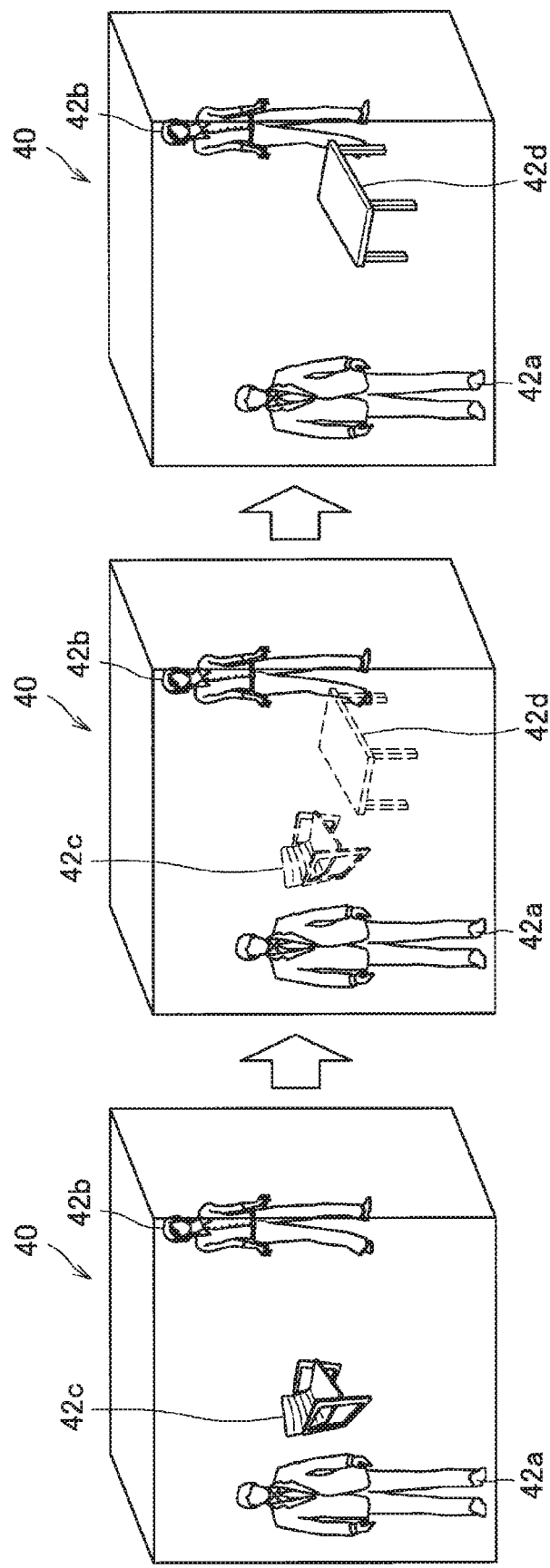

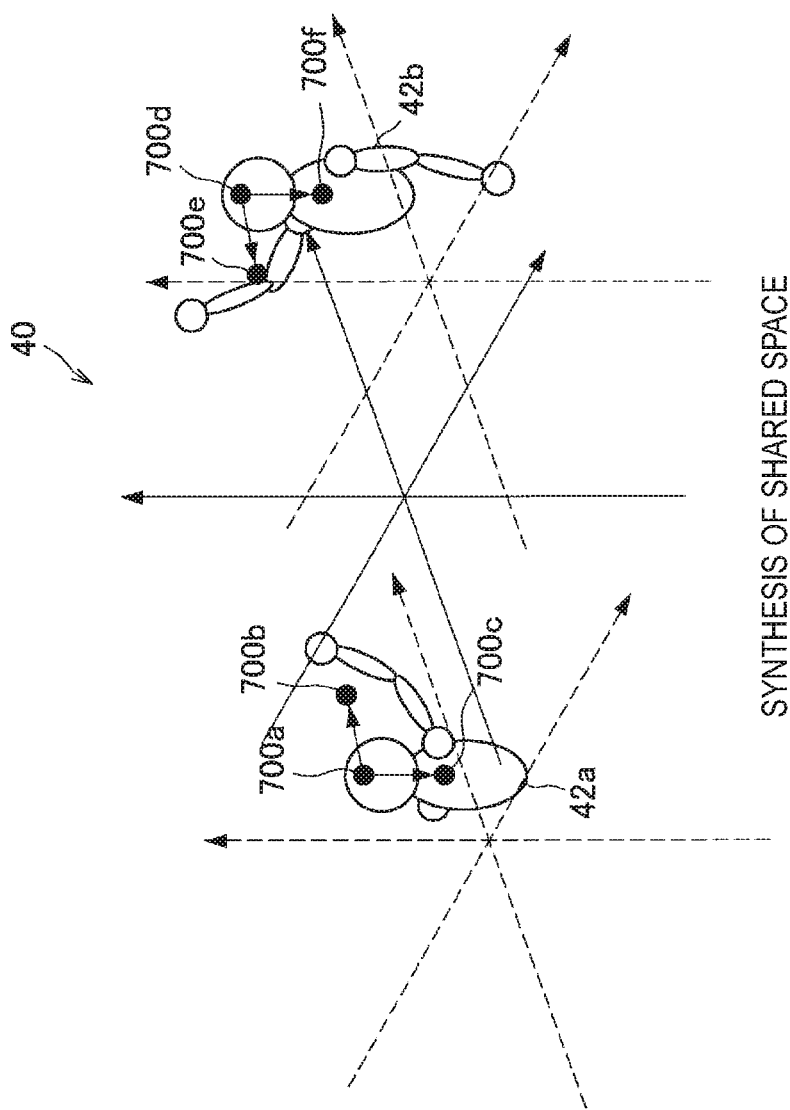

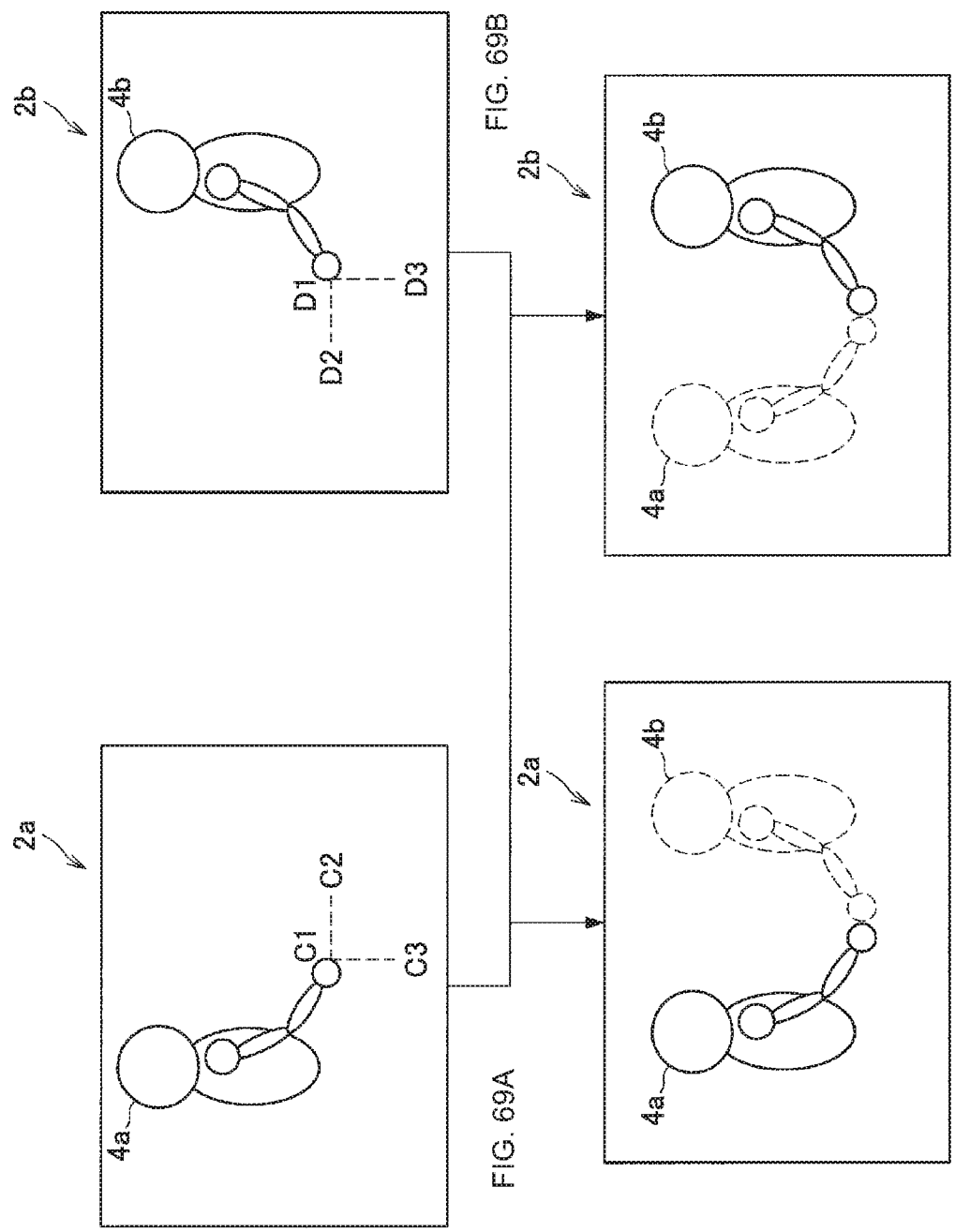

INFORMATION PROCESSING DEVICE AND INFORMATION PROCESSING METHOD CAPABLE OF DECIDING OBJECTS ARRANGED IN VIRTUAL SPACE GENERATED BASED ON REAL SPACE

CROSS REFERENCE TO RELATED APPLICATIONS

This application is a U.S. National Phase of International Patent Application No. PCT/JP2017/031043 filed on Aug. 30, 2017, which claims priority benefit of Japanese Patent Application No. JP 2016-226211 filed in the Japan Patent Office on Nov. 21, 2016. Each of the above-referenced applications is hereby incorporated herein by reference in its entirety.

TECHNICAL FIELD

The present disclosure relates to an information processing device, an information processing method, and a program.

BACKGROUND ART

In the past, various techniques for generating content on the basis of a result of sensing a real space, for example, for the purpose of generating highly realistic content have been proposed.

For example, Patent Literature 1 discloses a technique for generating a free viewpoint video on the basis of images captured by a plurality of cameras.

CITATION LIST

Patent Literature

Patent Literature 1: JP 2005-4487A

SUMMARY OF INVENTION

Technical Problem

However, according to the technology described in Patent Literature 1, all objects sensed in a real space are displayed in a video image of the free viewpoint. Therefore, objects that are undesirable for display are also displayed in the video image of the free viewpoint.

Thus, the present disclosure proposes a novel and improved information processing device, information processing method, and program capable of appropriately deciding objects arranged in a virtual space generated on the basis of sensing of a real space.

Solution to Problem

According to the present disclosure, there is provided an information processing device including: a decision unit that decides, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

In addition, according to the present disclosure, there is provided an information processing method including: deciding, by a processor, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

In addition, according to the present disclosure, there is provided a program that causes a computer to function as: a decision unit that decides, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

Advantageous Effects of Invention

According to the present disclosure, it is possible to appropriately decide objects to be arranged in a virtual space generated on the basis of sensing of a real space as described above. Further, the effect described here is not necessarily limiting, and any effect described in the present disclosure may be included.

BRIEF DESCRIPTION OF DRAWINGS

FIG. 5 is an explanatory diagram illustrating a configuration example of meta information 306 according to the first embodiment.

FIG. 11 is an explanatory diagram illustrating an example of priority calculated in relation to each object.

FIGS. 15A, 15B, and 15C are diagrams illustrating an example of an animation illustrating that display of a new object is started.

FIGS. 17A, 17B, and 17C are diagrams illustrating an example of an animation illustrating that display of a new object is started.

FIGS. 18A, 18B, and 18C are diagrams illustrating an example of an animation illustrating that display of a deletion target object is ended.

FIGS. 20A, 20B, and 20C are diagrams illustrating an example of an animation illustrating that display of a deletion target object is ended.

FIG. 28B is an explanatory diagram illustrating a part of a generation example of a shared space according to the second embodiment.

FIG. 39 is an explanatory diagram illustrating a real space A and a real space B that are participating in a shared space.

FIG. 40 is an explanatory diagram illustrating an example in which content of the free viewpoint is caused to be displayed using a blocked expression within a predetermined range from a user 4a and using a rewritten expression outside the predetermined range from the user 4a.

FIGS. 46A, 46B, and 46C are diagrams illustrating an example of an animation illustrating that a base space is switched according to the second application example.

FIG. 67 is an explanatory diagram illustrating a synthesis example of two spaces according to a seventh embodiment.

FIGS. 69A, 69B, 69C, and 69D are explanatory diagrams illustrating an example of designation of a positional relationship at the time of space synthesis using a hand shaking gesture.

DESCRIPTION OF EMBODIMENTS

Figure 1:
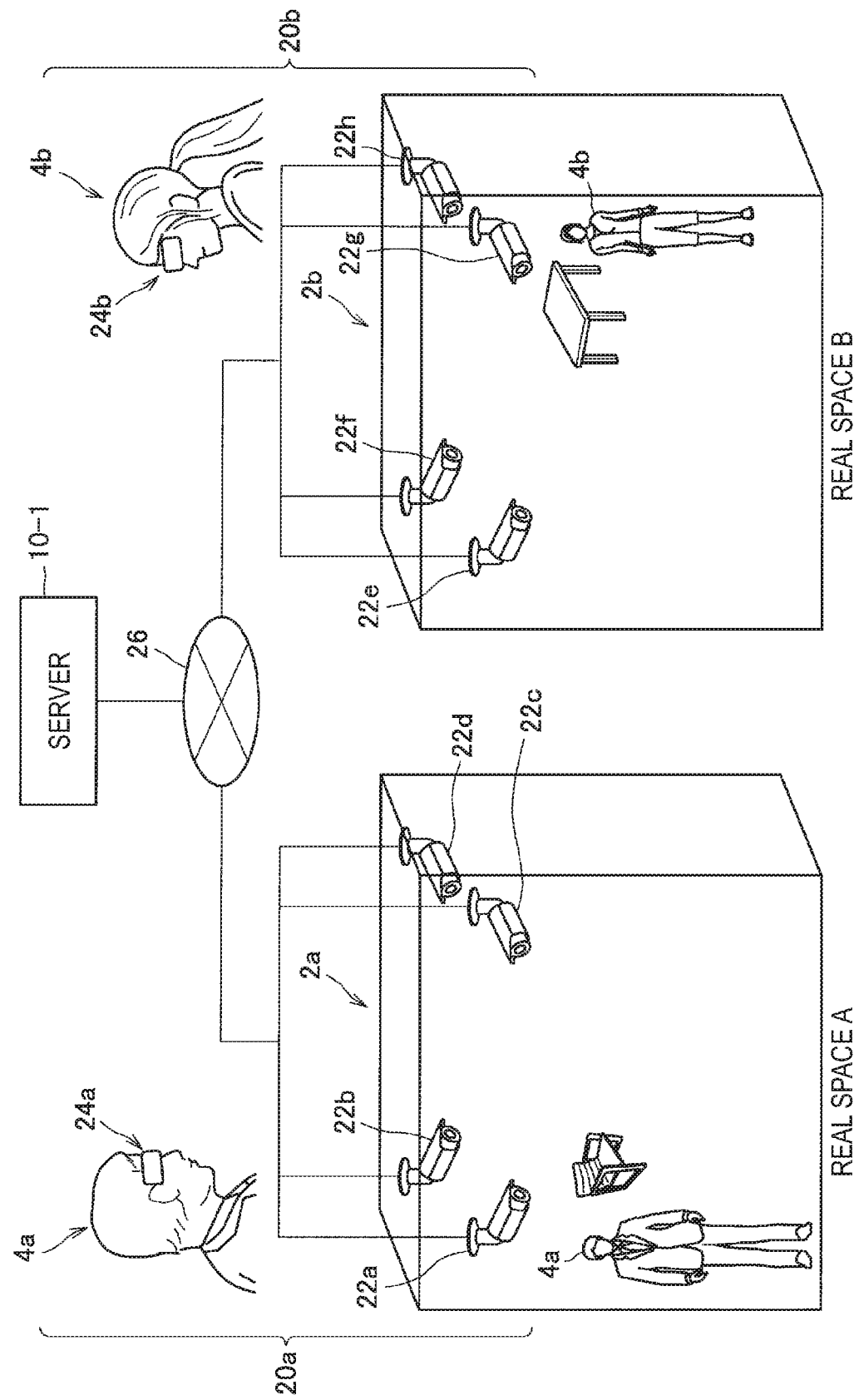
FIG. 1 is an explanatory diagram illustrating a configuration example of an information processing system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration is also distinguished by attaching different letters after the same reference numerals. For example, a plurality of components having substantially the same functional configuration is distinguished like an input unit 22a and an input unit 22b if necessary. Here, in a case in which it is not necessary to particularly distinguish each of a plurality of constituent elements having substantially the same functional configuration, only the same reference numerals is attached. For example, in a case in which it is not necessary to particularly distinguish the input unit 22a and the input unit 22b from each other, they are simply referred to as an input unit 22.

Further, "modes for carrying out the invention" will be described in accordance with the order of items below.
1. First Embodiment
2. Second Embodiment
3. Third Embodiment
4. Fourth Embodiment
5. Fifth Embodiment
6. Sixth Embodiment
7. Seventh Embodiment
8. Hardware configuration
9. Modified example Note that servers 10-1 to 10-7 according to the first to seventh embodiments may collectively be referred to as a server 10 in the specification and the drawings.

1. First Embodiment 1-1. Configuration of Information Processing System 1-1-1. Outline First, a first embodiment will be described. FIG. 1 is an explanatory diagram illustrating a configuration example of an information processing system according to a first embodiment. As illustrated in FIG. 1, the information processing system according to the first embodiment includes a server 10-1, a plurality of clients 20, and a communication network 26. Also, each client 20 has an input unit 22 and an output unit 24.

As illustrated in FIG. 1, in the first embodiment, it is assumed that a plurality of real spaces 2 are defined in advance, and a client 20 is arranged in each of the plurality of real spaces 2. Here, the real spaces 2 may be rooms (for example, a living room or a conference room) or corridors in a facility such as a house, a shop, an office building, a station, or a leisure facility. Further, although FIG. 1 illustrates an example in which two real spaces 2 are installed, the present disclosure is not limited to this example, and three or more real spaces may be installed. Here, each real space can include at least one actual object. Also, each real space can be associated with at least one mutually different user. For example, one or more users are present in each real space. However, the disclosure is not limited to such an example, and there may be a real space in which no user is present.

Further, the server 10-1 and each client 20 are connected via the communication network 26 and can perform transmission and reception of data.

Incidentally, in a situation in which the users located in the different real spaces 2 communicate, it is possible to realize smoother communication by showing real things to the other user while talking. For example, in a situation in which the user describes a product, if the user explains it while showing the product itself or a model of the product to the other user, it is easy for the other user to understand it.

Further, depending on a communication situation, it may be desirable to show the other user an object located away from the user (such as an object that becomes a topic between the users performing communication) in addition to an object located near the user. In this regard, the server 10-1 generates content of a free viewpoint by synthesizing 3D data of substantially all of each real space 2 in which each user performing communication is located. Further, the respective users can freely communicate while having an experience as if they were located within the same space by viewing the content of the free viewpoint at the same time. Hereinafter, details of the clients 20 and the server 10-1 will be more specifically described.

1-1-2. Input Unit 22

The input unit 22 senses a real space in which the input unit 22 is arranged. For example, the input unit 22 senses the real space, thereby acquiring 3D data of each object (body) in the real space as a sensing result. Then, the input unit 22 transmits the acquired sensing result to the server 10-1. Note that the sensing result can include sensed data or signals obtained through the sensing.

Figure 2:
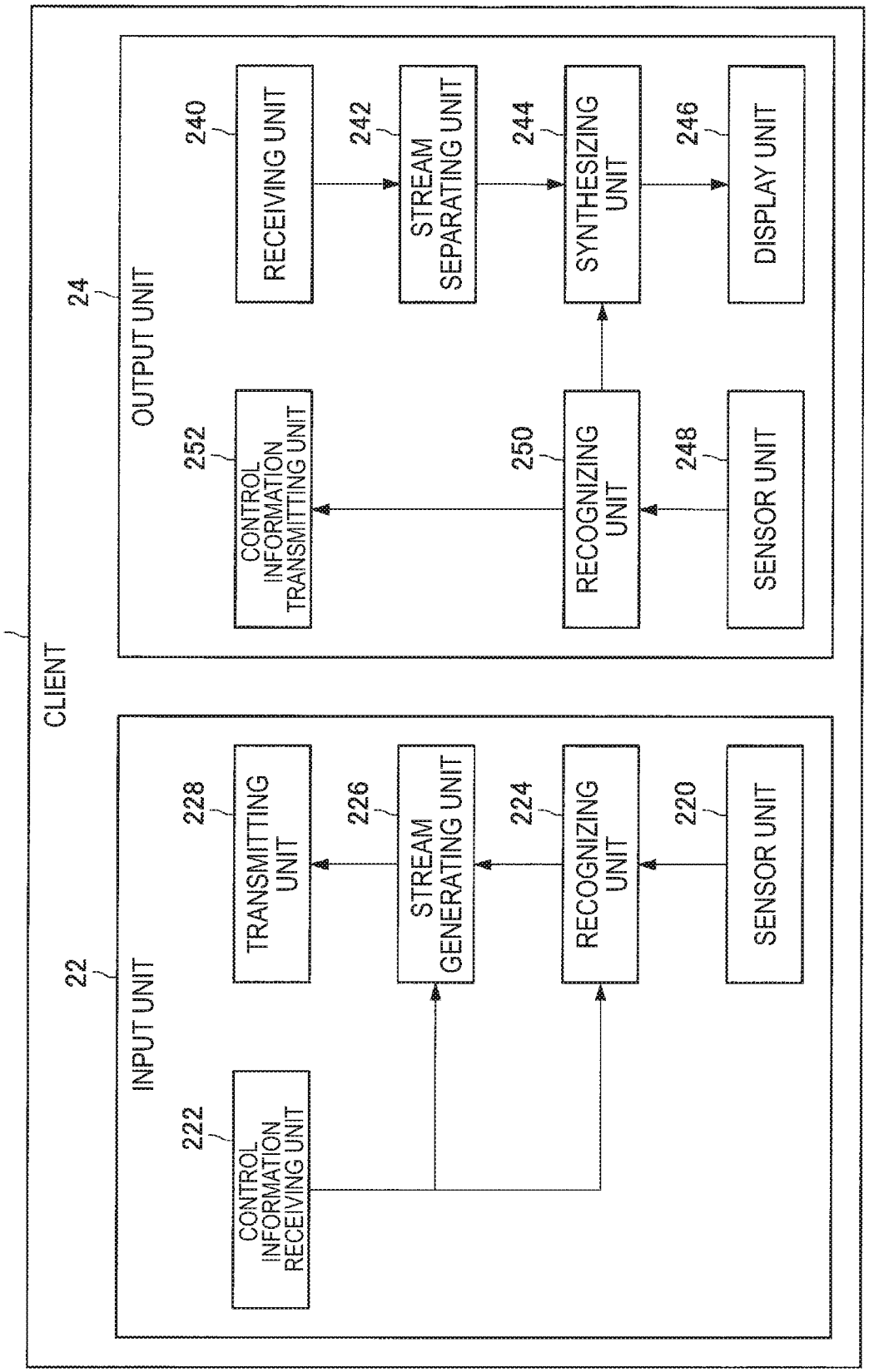
FIG. 2 is a functional block diagram illustrating a configuration example of a client 20 according to the first embodiment.

FIG. 2 is a functional block diagram illustrating a configuration example of the client 20 (the input unit 22 and the output unit 24). As illustrated in FIG. 2, the input unit 22 has a sensor unit 220, a control information receiving unit 222, a recognizing unit 224, a stream generating unit 226, and a transmitting unit 228.

1-1-2-1. Sensor Unit 220

The sensor unit 220 senses various kinds of information such as 3D data in the real space in which the sensor unit 220 is arranged. For example, the sensor unit 220 may include a plurality of depth cameras and a plurality of RGB cameras. Further, as each of a plurality of depth cameras detects distance information to an object located in front of the depth camera, the sensor unit 220 can acquire 3D data of substantially all of the real space. Further, each of the plurality of RGB cameras can acquire a 2D image by imaging. Here, a format of 3D data may be any format such as a point cloud or a 3D mesh (polygon), for example. Further, the plurality of cameras included in the sensor unit 220 are connected to each other, and frame synchronization can be performed.

Segmentation Process

For example, the sensor unit 220 first generates point cloud data in units of frames, and performs an object segmentation process on the basis of the generated point cloud data. In addition, the sensor unit 220 specifies, in relation to each separated object, information regarding a region that the object occupies in a real space 2 in which the sensor unit 220 is arranged. Further, the sensor unit 220 assigns an object ID to each object. Here, the object IDs are IDs uniquely identifying each object.

Figure 3:
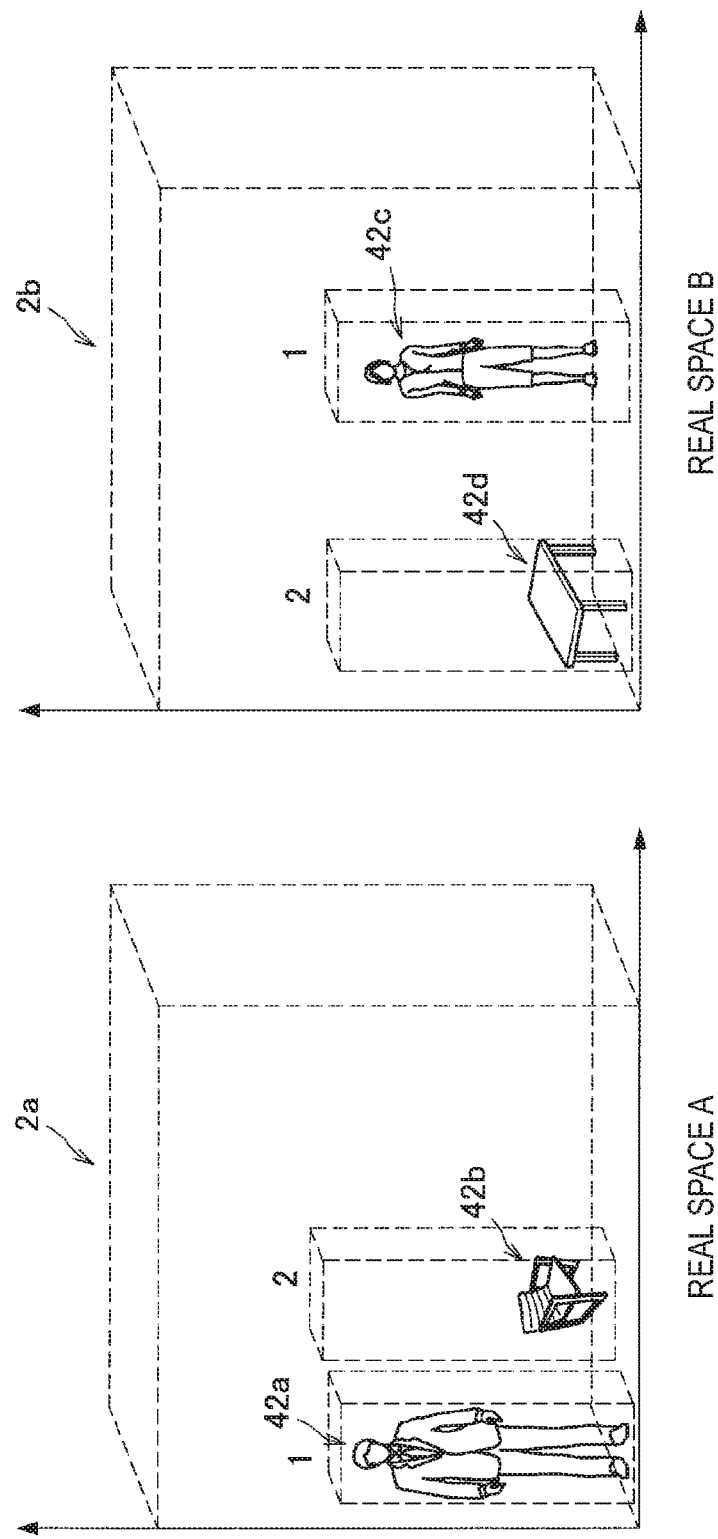
FIG. 3 is an explanatory diagram illustrating an example of segmentation of objects located in a space 2.

Here, the above content will be described in further detail with reference to FIG. 3. As illustrated in FIG. 3, for example, a sensor unit 220a in a real space 2a segments an object 42a and an object 42b, sets "1" as an object ID of the object 42a, and sets "2" as an object ID of the object 42b. Similarly, as illustrated in FIG. 3, a sensor unit 220b in a real space 2b segments an object 42c and an object 42d, sets "1" as an object ID of the object 42c, and sets "2" as an object ID of the object 42d.

Modeling Process

Further, the sensor unit 220 can perform a modeling process on each of the segmented objects and generate a 3D mesh.

Further, the sensor unit 220 further generates 2D image correlation information indicating a correspondence relation between each object and a 2D image captured by the sensor unit 220. Here, the 2D image correlation information is information indicating a position in the captured 2D image corresponding to each object.

Further, the sensor unit 220 can perform a tracking process of each object on the basis of a feature quantity of each segmented object or the like. Further, the sensor unit 220 does not change the object ID assigned to the object for the object determined to be identical between consecutive frames.

Further, the sensor unit 220 may further include one or more microphones. Further, the sensor unit 220 can collect sound in the real space.

Output

Also, the sensor unit 220 outputs a sensing result for each frame. For example, the sensor unit 220 outputs a captured 2D image, acquired 3D data of each object, and frame data including 2D image correlation information for each frame. Note that the frame data may further include collected sound data.

Further, the sensor unit 220 may be constituted by a single device (for example, a camera and the like) or may be constituted by a plurality of devices. Further, in a case in which it is constituted by a plurality of devices, data (3D data or the like) sensed by the plurality of devices can be synthesized, for example, with a high degree of accuracy by calibration, a frame synchronization process, or the like.

1-1-2-2. Control Information Receiving Unit 222

The control information receiving unit 222 receives the first control information from the server 10-1. Further, the control information receiving unit 222 transmits the received first control information to the recognizing unit 224 and the stream generating unit 226. Here, the first control information may include, for example, information of an instruction related to a recognition process by the recognizing unit 224 to be described later or information of an instruction related to stream generation by a stream generating unit 226 to be described later.

1-1-2-3. Recognizing Unit 224

Recognition

The recognizing unit 224 performs various types of recognition processes on the basis of the frame data transmitted from the sensor unit 220. For example, the recognizing unit 224 may perform the recognition process on the basis of the 3D data included in the frame data or may perform the recognition process on the basis of the 2D image included in the frame data.

For example, the recognizing unit 224 recognizes the type of the object on the basis of the frame data. Further, the recognizing unit 224 further performs face recognition, bone recognition, and finger recognition for an object determined as a person. Further, the recognizing unit 224 can recognize a manipulation performed by the user for starting the use of the content of the free viewpoint (generated by the server 10) or a manipulation performed by the user for ending the use of the content of the free viewpoint. Further, specific content of such manipulations will be described later.

Further, in a case in which the first control information is transmitted from the control information receiving unit 222, the recognizing unit 224 can also perform the recognition process in accordance with the first control information.

Output

Further, the recognizing unit 224 adds the result of the recognition process to the transmitted frame data, and transmits the resulting frame data to the stream generating unit 226. For example, the recognizing unit 224 first generates meta information, bone recognition information, and finger recognition information on the basis of, for example, the result of the recognition process for an object determined as a person. Then, the recognizing unit 224 adds this information to the transmitted frame data.

Figure 4:
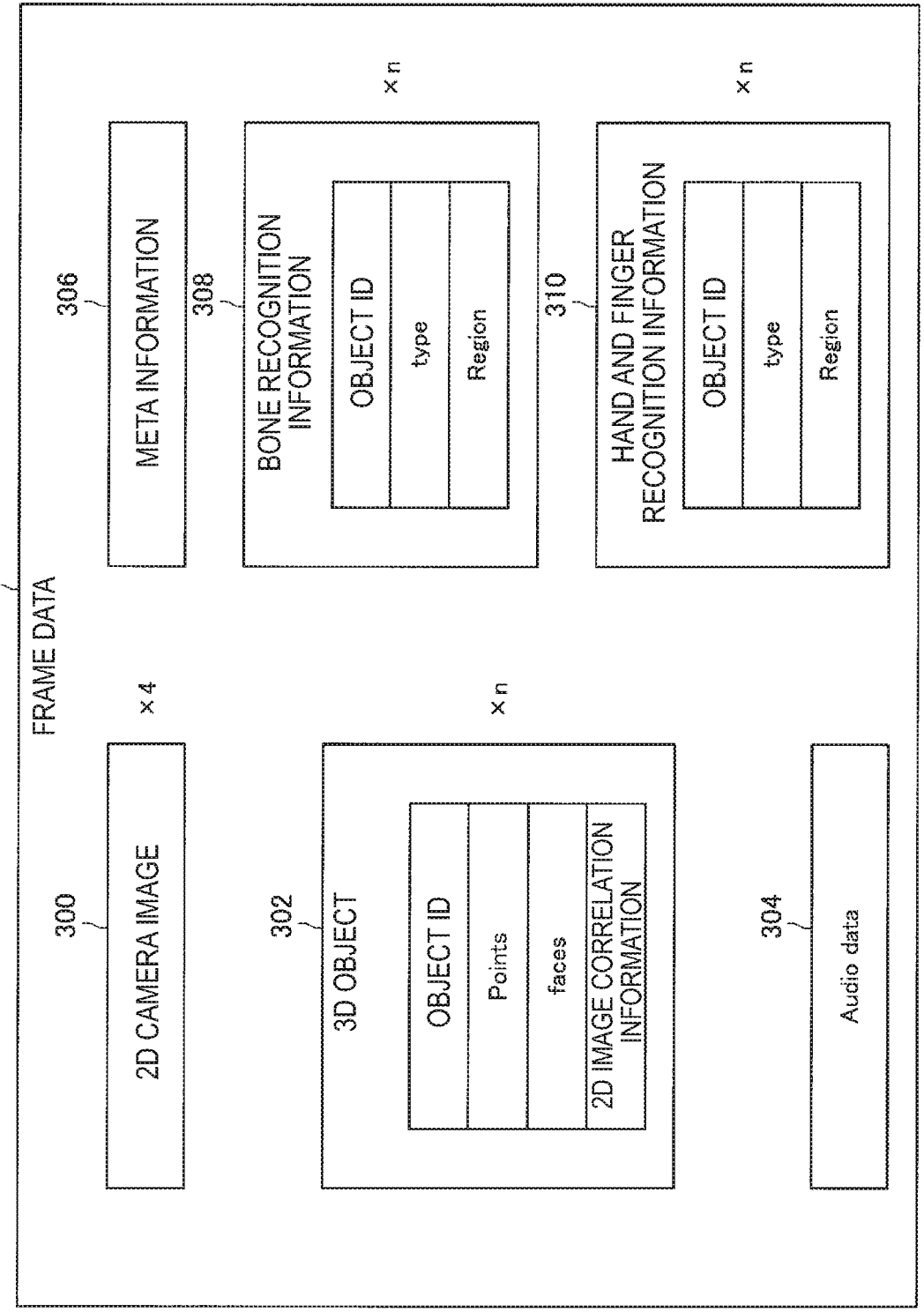
FIG. 4 is an explanatory diagram illustrating a configuration example of frame data according to a first embodiment.

FIG. 4 is an explanatory diagram illustrating a configuration example (frame data 30) of frame data. As illustrated in FIG. 4, the frame data 30 has a 2D camera image 300, a 3D object 302, an audio data 304, meta information 306, bone recognition information 308, and hand and finger recognition information 310, for example. Here, a 2D image of a corresponding frame captured by the sensor unit 220 is stored as the 2D camera image 300. Also, 3D data of each object specified in the corresponding frame is stored as the 3D object 302 on the basis of imaging using the sensor unit 220. For example, the 3D object 302 has an object ID, a point (a position and a color) of the object, and information regarding a plane of the object for each object. Further, the 3D object 302 has 2D image correlation information. Note that the 3D object described here may be considered as not including a planar object that cannot move from a real space, such as a floor or a wall.

Also, sound data at the time of the corresponding frame that is recorded by the sensor unit 220 is stored as the audio data 304. In addition, a result of bone recognition related to each object that has been recognized by a recognizing unit 224, for example, is stored as the bone recognition information 308. For example, an object ID of an object that has a bone, a type of the object, information regarding a region of the bone, and the like are stored as the bone recognition information 308 for each recognized bone. In addition, a result of recognizing a hand or a finger related to each object that has been recognized by the recognizing unit 224, for example, is stored as the hand and finger recognition information 310. For example, an object ID of an object (such as a person) that has the hand or the finger, a type of the object, information regarding a region of the hand or the finger, and the like are stored as the hand and finger recognition information 310 for each recognized hand or finger.

In addition, the meta information 306 is information (attributes, for example) related to each object stored in the 3D object 302. FIG. 5 is an explanatory diagram illustrating a configuration example of meta information 306. As illustrated in FIG. 5, the meta information 306 includes an object ID 3060, a region 3064, a type 3066, an original space 3068, a person 3070, contact information 3072, and neighbor information 3074, for example. Here, an object ID assigned to a corresponding object is stored as the object ID 3060. Also, information regarding a region in which the corresponding object is located is stored as the region 3064. Also, information regarding a type of the corresponding object recognized in advance is stored as the type 3066. In addition, identification information of the corresponding real space is recorded as the original space 3068. Also, identification information (such as a name) of a corresponding person specified through face recognition or the like in advance is stored as the person 3070 in a case in which the corresponding object is a person. Also, information (an object ID or the like, for example) of an object recognized as being in contact with a corresponding object in the corresponding real space is stored as the contact information 3072. Also, information (an object ID or the like, for example) of an object recognized as being located near a corresponding object in the corresponding real space is stored as the contact information 3074.

1-1-2-4. Stream Generating Unit 226

The stream generating unit 226 generates a stream on the basis of the frame data transmitted from the recognizing unit 224. Then, the stream generating unit 226 transmits the generated stream to the transmitting unit 228. For example, the stream generating unit 226 may first generate one stream by multiplexing various types of information transmitted from the recognizing unit 224, and transmit the one stream to the transmitting unit 228. Alternatively, the stream generating unit 226 may generate separate streams from various types of information transmitted from the recognizing unit 224 and transmit each generated stream to the transmitting unit 228.

Further, in a case in which the first control information is transmitted from the control information receiving unit 222, the stream generating unit 226 may extract some information designated by the first control information from the information transmitted from the recognizing unit 224 and generate a stream including only the extracted information. Further, the stream generating unit 226 may transmit the stream to the transmitting unit 228.

1-1-2-5. Transmitting Unit 228

The transmitting unit 228 transmits the stream transmitted from the stream generating unit 226 to the server 10-1.

1-1-3. Server 10-1

The server 10-1 is an example of the information processing device according to the present disclosure. The server 10-1 can generate a (virtual) shared space for communication between a user 4a and a user 4b on the basis of a sensing result of a real space 2a in which the user 4a is located and a sensing result of a real space 2b in which the user 4b is located. Here, the real space 2a is an example of the first real space according to the present disclosure, and the real space 2b is an example of the second real space according to the present disclosure. For example, the server 10-1 can generate the shared space on the basis of a stream (that is, the sensing results of the real spaces 2) received from each of input units 22 of the plurality of real spaces 2. In one example, the server 10-1 generates a shared space by synthesizing the stream received from each of the input units 22 in the real spaces 2.

Also, the server 10-1 can arrange at least one or more of a first virtual object corresponding to the first actual object in the real space 2a and a second virtual object corresponding to the second actual object in the real space 2b as shared objects in the shared space.

Figure 6:
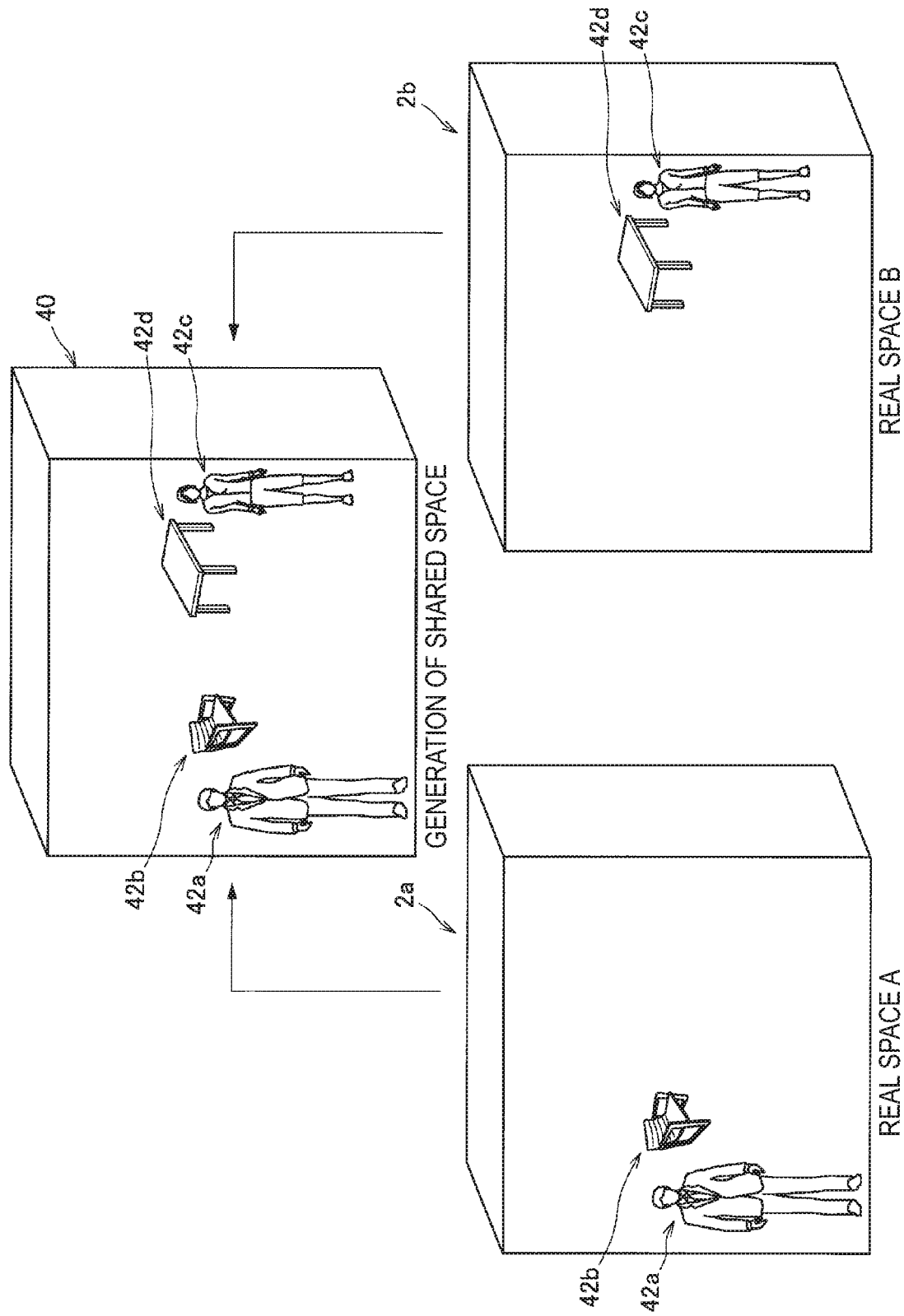
FIG. 6 is an explanatory diagram illustrating a generation example of a shared space according to the first embodiment.

FIG. 6 is an explanatory diagram illustrating a generation example of the shared space. As illustrated in FIG. 6, for example, a shared space generating unit 102 generates a shared space 40 by arranging the 3D data of the object 42a and the object 42b included in the stream received from the input unit 22 of the real space 2a and the real space 2b and the 3D data of the object 42c and the object 42d included in the stream received from the input unit 22 of the input unit 22 in the shared space 40 as shared objects.

Further, the server 10-1 generates the content of the free viewpoint on the basis of the generated shared space, and then transmits the content to the output unit 24 of each real space 2.

Figure 7:
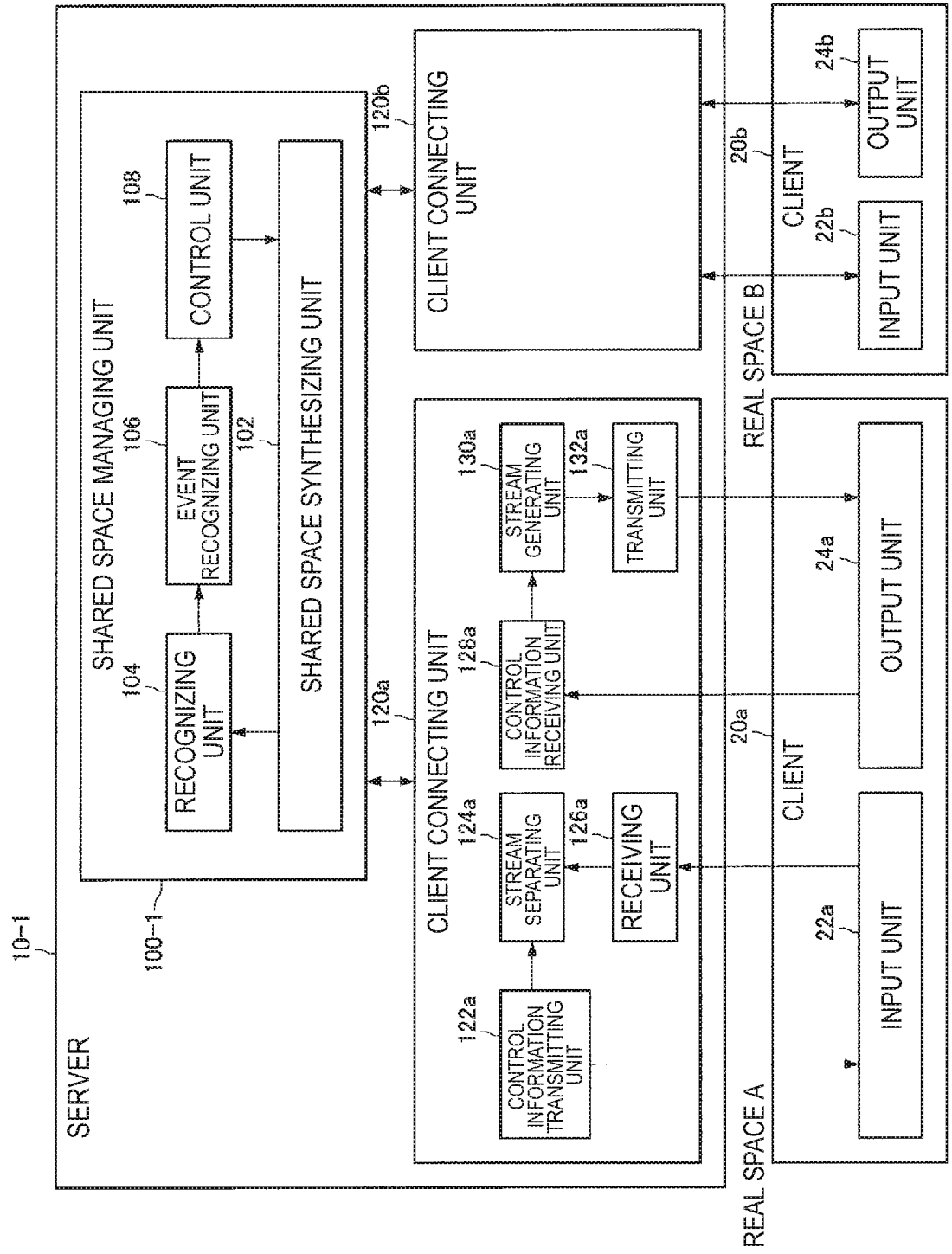
FIG. 7 is a functional block diagram illustrating a configuration example of a server 10-1 according to the first embodiment.

FIG. 7 is a functional block diagram illustrating a configuration example of the server 10-1. As illustrated in FIG. 7, the server 10-1 has a shared space managing unit 100-1 and a plurality of client connecting units 120. Further, one client connecting unit 120 may be installed for each client 20 that is placed. Further, a pair (client relation) of the client connecting unit 120 and the client 20 may be defined in advance.

1-1-3-1. Client Connecting Unit 120

The client connecting unit 120 transmits information transmitted from the shared space managing unit 100-1 to the client 20 of the connection destination. Further, the client connecting unit 120 transmits information received from the client 20 of the connection destination to the shared space managing unit 100-1.

Further, as illustrated in FIG. 7, each client connecting unit 120 includes a control information transmitting unit 122, a stream separating unit 124, a receiving unit 126, a control information receiving unit 128, a stream generating unit 130, and a transmitting unit 132.

1-1-3-2. Receiving Unit 126

A receiving unit 126 receives a stream from an input unit 22 as a connection destination. In addition, the receiving unit 126 delivers the received stream to a stream separating unit 124.

1-1-3-3. Stream Separating Unit 124

For example, the stream separating unit 124 demultiplexes the stream transmitted from the receiving unit 126 and separates the stream into 3D data and meta information in units of frames. Then, the stream separating unit 124 transmits the separated 3D data and meta information to the shared space generating unit 102 described later.

1-1-3-4. Control Information Transmitting Unit 122

The control information transmitting unit 122 transmits the first control information to the client 20 (the input unit 22) of the connection destination on the basis of an instruction of the shared space generating unit 102. For example, the control information transmitting unit 122 generates information related to desired 3D data or meta information decided by the shared space generating unit 102 as the first control information, and transmits the first control information to the input unit 22. Accordingly, it is possible to curtail use of the network band and to reduce the recognition process on the client 20 side.

For example, in a case in which it is decided that the shared space generating unit 102 does not use a part of 3D data of a specific real space, the control information transmitting unit 122 includes content of the decision in the first control information, generates the first control information, and transmits the first control information to the input unit 22 of the real space. Accordingly, the input unit 22 of the transmission destination can perform control such that the data is not transmitted to the server 10-1.

1-1-3-5. Control Information Receiving Unit 128

The control information receiving unit 128 receives the second control information from the output unit 24 of the connection destination. Further, the control information receiving unit 128 transmits the received second control information to the shared space generating unit 102 and the stream generating unit 130. Here, the second control information may include information such as a detection result of a position or a posture of a display unit 246 (of output unit 24) to be described later.

1-1-3-6. Stream Generating Unit 130

The stream generating unit 130 generates a stream for the client 20 of the connection destination on the basis of shared space frame data generated by the shared space generating unit 102. Here, the shared space frame data may be data of one frame of the content of the free viewpoint related to the shared space. For example, the shared space frame data includes 3D data and meta information of each object in the shared space.

For example, the stream generating unit 130 generates the stream by multiplexing the 3D data, the meta information, and the like of the generated shared space. Further, in a case in which the second control information is transmitted from the control information receiving unit 128, the stream generating unit 130 can also generate the stream on the basis of the second control information. For example, the stream generating unit 130 generates the stream by excluding 3D data unnecessary for display indicated by the second control information from a stream to be generated or performing a process of lowering image quality or the like.

Further, the stream generating unit 130 transmits the generated stream to the transmitting unit 132.

1-1-3-7. Transmitting Unit 132

The transmitting unit 132 transmits the stream transmitted from the stream generating unit 130 to the output unit 24 of the client 20 of the connection destination.

1-1-3-8. Shared Space Managing Unit 100-1

The shared space managing unit 100-1 comprehensively controls the operation of the server 10 by using a central processing unit (CPU) 900, a random access memory (RAM) 904, and the like to be described later which are installed in the server 10-1. Further, on the basis of the frame data received from the client 20 in each real space 2 and the second control information transferred from each client connecting unit 120, the shared space managing unit 100-1 generates the content of the free viewpoint (the shared space frame data). Further, the shared space managing unit 100-1 transmits the generated content of the free viewpoint to each client connecting unit 120.

Figure 8:
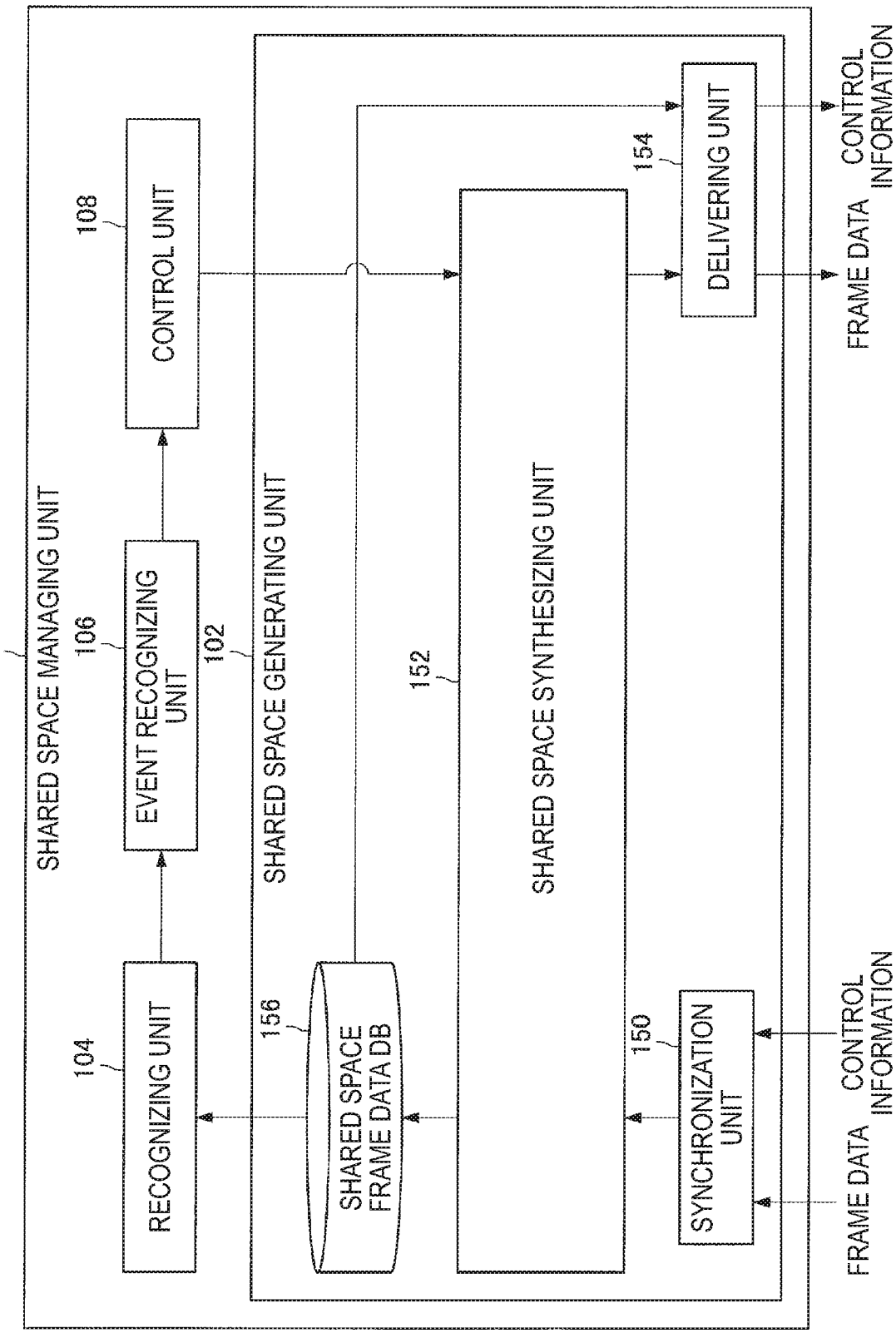
FIG. 8 is a functional block diagram illustrating a detailed configuration example of a shared space managing unit 100-1 according to the first embodiment.

FIG. 8 is a functional block diagram illustrating a further detailed configuration example of the shared space managing unit 100-1. As illustrated in FIG. 8, the shared space managing unit 100-1 includes a shared space generating unit 102, a recognizing unit 104, an event recognizing unit 106, and a control unit 108.

1-1-3-9. Recognizing Unit 104

The recognizing unit 104 performs various types of recognition processes such as face recognition, finger recognition, or bone recognition on the basis of the shared space frame data generated by the shared space generating unit 102. As will be described later in detail, for example, the recognizing unit 104 first acquires the shared space frame data from a shared space frame data DB 156 in a frame order. Then, the recognizing unit 104 performs various types of recognition processes on the basis of the acquired shared space frame data, and transmits the recognized result to the event recognizing unit 106.

Further, the recognizing unit 104 can reduce the recognition process (for example, omit a part of processing) using the meta information obtained from the stream received from each of a plurality of clients 20.

1-1-3-10. Event Recognizing Unit 106

The event recognizing unit 106 generates event information on the basis of chronological information transmitted from the recognizing unit 104. For example, in a case in which the user is participating in the generated shared space, and the user points at a desk located in the shared space, the event recognizing unit 106 generates information indicating that the desk is pointed at as the event information. Further, in a case in which it is recognized that the user lifts a laptop personal computer (PC) on a desk within a real space in which the user is located, the event recognizing unit 106 generates information indicating that the laptop PC is lifted as the event information.

Further, the event recognizing unit 106 transmits the generated event information to the control unit 108.

1-1-3-11. Control Unit 108

The control unit 108 generates third control information on the basis of the event information transmitted from the event recognizing unit 106. Then, the control unit 108 transmits the generated third control information to the shared space generating unit 102. Here, the third control information may be information used when the shared space is generated by the shared space generating unit 102.

1-1-3-12. Shared Space Generating Unit 102

The shared space generating unit 102 generates the shared space frame data on the basis of the frame data and the meta information obtained from the streams received from a plurality of clients 20. Further, as illustrated in FIG. 8, the shared space generating unit 102 has a synchronizing unit 150, a shared space synthesizing unit 152, a delivering unit 154, and a shared space frame data DB 156.

1-1-3-13. Synchronizing Unit 150

The synchronizing unit 150 sequentially transmits the frame data and the second control information received from each of a plurality of clients 20 to the shared space synthesizing unit 152 together for each piece of information (for example, each frame) having the same timing.

1-1-3-14. Shared Space Synthesizing Unit 152

The shared space synthesizing unit 152 generates the shared space frame data on the basis of the frame data of each of real spaces transmitted from the synchronizing unit 150. Further, the shared space synthesizing unit 152 stores the generated shared space frame data in the shared space frame data DB 156.

In a case in which content of the free viewpoint has not yet been generated, for example, the shared space synthesizing unit 152 decides whether or not to generate content of the free viewpoint on the basis of a predetermined start condition first. Then, in a case in which it is decided to generate content of the free viewpoint, the shared space synthesizing unit 152 generates content of the free viewpoint (shared space frame data). In one example, the shared space synthesizing unit 152 decides to generate content of the free viewpoint in a case in which a predetermined start condition is satisfied. In addition, the shared space synthesizing unit 152 decides not to generate content of the free viewpoint in a case in which the predetermined start condition is not satisfied.

Start Condition: Selection of User of Other Party

Here, the predetermined start condition can include a condition that an operation of selecting a counterpart user 4b with whom a certain user 4a desires to share a space (in order to start space sharing) is detected in a situation in which no shared space has been generated (hereinafter, also referred to as "space sharing has not been started"). Further, as a method of selecting the other user, for example, the other user 4b may be selected, for example, by a manipulation, a gesture, a line of sight manipulation, a speech, or the like to a predetermined input device from a user list displayed on the display unit 246 viewed by the user 4a. Alternatively, the user 4a may select the user 4b of the other party by speaking a user name of the other party directly.

Start Condition: Selection of Space

Further, a predetermined start condition may be satisfied when, in a situation in which the space is not shared, a manipulation of a certain user 4a to selects the real space serving as the basis of the shared space (in order to start the space sharing) is detected. Further, as a method of selecting the real space, for example, the real space may be selected by the user 4a, for example, by a manipulation, a gesture, a line of sight manipulation, a speech, or the like to a predetermined input device from a space list displayed on the display unit 246 viewed by the user 4a. Alternatively, the user 4a may select the real space by speaking a name of the desired real space directly.

1-1-3-15. Delivering Unit 154

On the basis of the shared space frame data generated by the shared space synthesizing unit 152, the delivering unit 154 generates frame data to be transmitted to the output unit 24 in the real space for each real space. Then, the delivering unit 154 transmits each piece of generated frame data to the client connecting unit 120 corresponding to the real space of the transmission destination of the frame data.

1-1-4. Output Unit 24

The output unit 24 outputs the stream (for example, the content of the free viewpoint) received from the server 10-1. Accordingly, the user in the real space can experience as if the user were located in the generated shared space by viewing the output content.

The output unit 24 may be a wearable device such as, for example, a head mounted display (HMD) or augmented reality (AR) glasses. Further, the HMD may be a shielding type or a video transmission type. Further, the output unit 24 is not limited to the example of the wearable device but may be, for example, a projector and project the stream received from the server 10 onto a projection target (for example, a wall) in the real space. Alternatively, the output unit 24 may be constituted by a combination of a plurality of devices (for example, a combination of AR glasses and a projector). Further, the following description will proceed focusing on an example in which the output unit 24 is a wearable device.

Here, a configuration of the output unit 24 will be described in detail with reference to FIG. 2 again. As illustrated in FIG. 2, the output unit 24 includes a receiving unit 240, a stream separating unit 242, a synthesizing unit 244, a display unit 246, a sensor unit 248, a recognizing unit 250, and a control information transmitting unit 252.

1-1-4-1. Receiving Unit 240

The receiving unit 240 receives the stream from the server 10-1. Further, the receiving unit 240 transmits the received stream to the stream separating unit 242.

1-1-4-2. Stream Separating Unit 242

For example, the stream separating unit 242 demultiplexes the stream transmitted from the receiving unit 240 and separates the stream. Further, the stream separating unit 242 transmits the separated data to the synthesizing unit 244. Alternatively, the stream separating unit 242 may transfer the separated data to the display unit 246.

1-1-4-3. Synthesizing Unit 244

On the basis of the data transmitted from the stream separating unit 242 and the recognition result (for example, the recognition result of the position, the posture, or the like of the display unit 246 or the like) transmitted from the recognizing unit 250, the synthesizing unit 244 generates (renders) a 3D video (a virtual reality (VR) video, an AR video, or the like). Further, the synthesizing unit 244 transmits the generated video to the display unit 246.

1-1-4-4. Display Unit 246

The display unit 246 displays the video generated by the synthesizing unit 244 or the video data transmitted from the stream separating unit 242.

The display unit 246 may be constituted by, for example, a liquid crystal display (LCD), an organic light emitting diode (OLED), or the like. Alternatively, the display unit 246 may display a video on a transmissive display. Alternatively, the display unit 246 may be a projector.

1-1-4-5. Sensor Unit 248

The sensor unit 248 may include various types of sensors such as an RGB cameras, a global positioning system (GPS) receiver, an acceleration sensor, a gyroscope, and a geomagnetic sensor. For example, the sensor unit 248 detects information related to the position, the posture, and the like of the display unit 246. Further, the sensor unit 248 transmits the detected information to the recognizing unit 250.

Further, the sensor unit 248 may be constituted by a single device or a plurality of devices. Further, in a case in which it is constituted by a plurality of devices, information (images or the like) sensed by the plurality of devices can be synthesized with a high degree of accuracy by calibration, a frame synchronization process, or the like.

1-1-4-6. Recognizing Unit 250

The recognizing unit 250 performs the recognition process of the position, the posture, and the like of the display unit 246 on the basis of the information transmitted from the sensor unit 248. Further, the recognizing unit 250 may further recognize a viewpoint position of the user.

Further, the recognizing unit 250 transmits the recognized result to the synthesizing unit 244 and the control information transmitting unit 252.

1-1-4-7. Control Information Transmitting Unit 252

The control information transmitting unit 252 transmits the recognition result (recognition result of the position and the posture of the display unit 246 or the like) transmitted from the recognizing unit 250 to the server 10-1 as the second control information.

1-1-5. Communication Network 26

The communication network 26 is a wired or wireless transmission path of information transmitted from a device connected to the communication network 26. Examples of the communication network 26 may include a public line network such as a telephone network, the Internet, and a satellite communication network, various local area networks (LANs) including Ethernet (a registered trademark), and a wide area network (WAN). Further, the communication network 26 may include a dedicated network such as an Internet protocol-virtual private network (IP-VPN).

1-1-6. Modification Examples

1-1-6-1. Modified Example 1

Further, a configuration of the information processing system according to the first embodiment is not limited to the above example. For example, in the above description, the example in which one input unit 22 and one output unit 24 are arranged in each real space has been described, but the present disclosure is not limited to this example as long as one or more units are arranged in information processing system as each of the input unit 22 and the output unit 24. Further, there may be a real space in which only the input unit 22 or only the output unit 24 is arranged.

1-1-6-2. Modified Example 2

Further, the server 10-1 may be configured as a server on the cloud or may be configured on an associated client 20.

Further, in the above description, the example in which the shared space managing unit 100-1 is included in one server (that is, the server 10-1) has been described, but the present disclosure is not limited to this example. For example, the function of the shared space managing unit 100-1 may be realized by cooperation of a plurality of computers (not illustrated). Alternatively, the functions of the shared space managing unit 100 described above may be distributed to the respective clients 20, and the respective clients 20 may be configured to operate in cooperation.

1-1-6-3. Modified Example 3

Further, the client 20 may be configured as a single device or may be configured with a plurality of devices.

Further, in the above description, the sensor unit 220 of the input unit 22 and the sensor unit 248 of the output unit 24 are separately provided, but the present disclosure is not limited thereto. For example, the sensor unit 220 and the sensor unit 248 may be integrally configured, and the sensor unit may be shared by the input unit 22 and the output unit 24. Similarly, the recognizing unit 224 of the input unit 22 and the recognizing unit 250 of the output unit 24 are integrally configured, and the recognizing unit may be shared by the input unit 22 and the output unit 24.

1-1-6-4. Modified Example 4

Further, in the above description, the example in which the recognizing unit 224 (of the input unit 22), the recognizing unit 250 (of the output unit 24), and the recognizing unit 104 (of the server 10) are installed has been described, but the present disclosure is not limited to this example, and any one or two of the recognizing unit 224, the recognizing unit 250, and the recognizing unit 104 may not be installed. Further, in this case, another recognizing unit may be configured to further perform a process corresponding to the recognizing unit which is not installed.

1-1-6-5. Modified Example 5

Further, in the above description, the example in which the stream generating unit 226 of the input unit 22 and the stream generating unit 130 of the server 10-1 perform the multiplexing process has been described, but the stream generating unit 226 and the stream generating unit 130 may not perform the multiplexing process. In other words, data may be transmitted between the server 10-1 and the client 20 without undergoing the multiplexing process.

1-1-7. Summary of Problems

Figure 9:
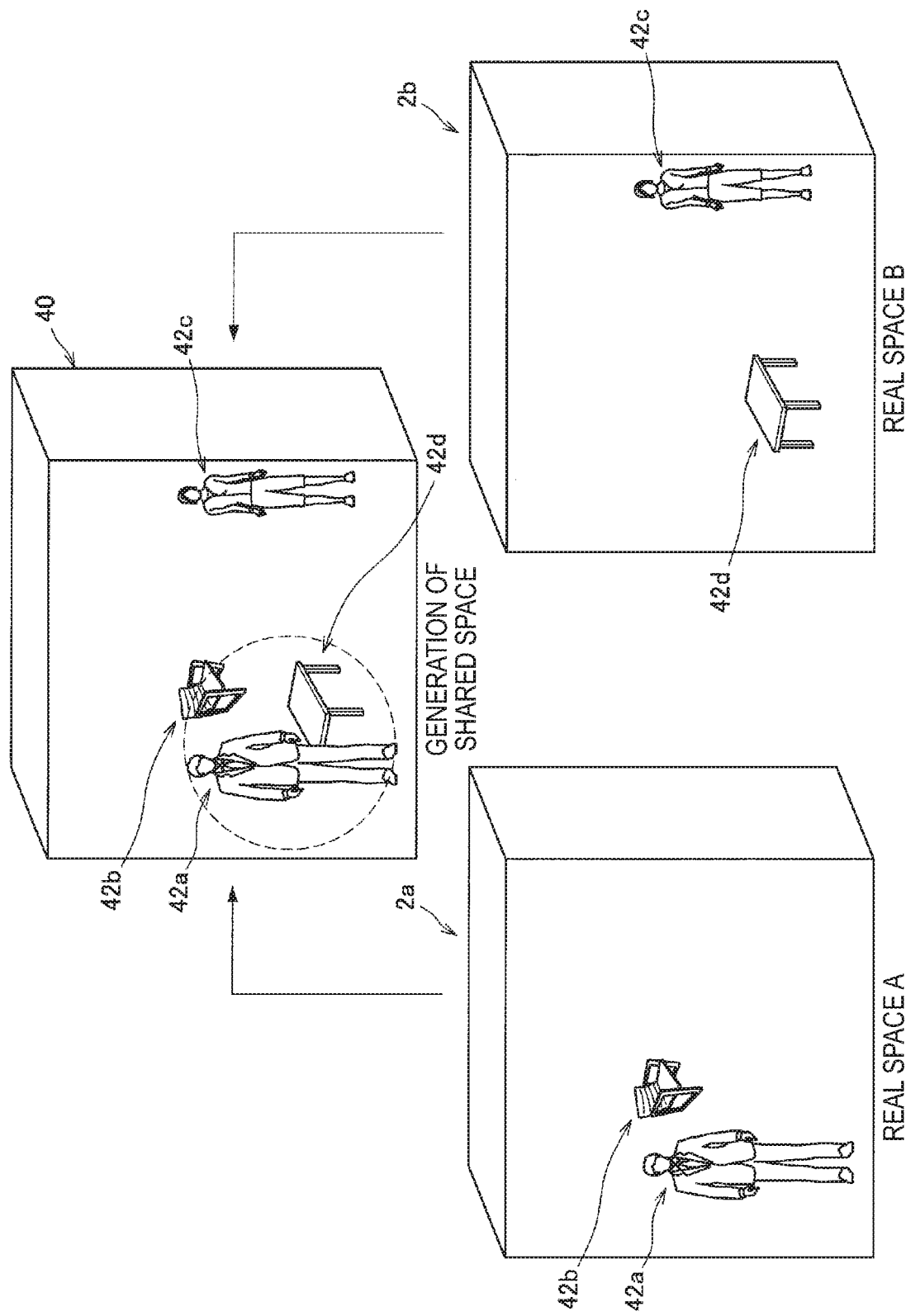
FIG. 9 is an explanatory diagram for describing problems of the first embodiment.

The configuration of the information processing system according to the first embodiment has been described above. Incidentally, objects in different real spaces can be overlaid on each other if 3D data is synthesized without any condition when the 3D data transmitted from the input units 22 in a plurality of real spaces is synthesized. As illustrated in FIG. 9, for example, an object 42a in a real space A and an object 42d in a real space B are overlaid on each other by being arranged at the same position in the shared space 40. As a result, a displayed video image may be unnaturally perceived by the user.

Thus, the server 10-1 according to the first embodiment was achieved by considering the aforementioned circumstance as a viewpoint. According to the first embodiment, the server 10-1 decides shared objects arranged in the shared space that is generated on the basis of the sensing result of the first real space and the sensing result of the second real space on the basis of a predetermined reference. For example, the server 10-1 calculates priority of the respective objects located in the respective real spaces and then decides shared objects arranged in the shared space on the basis of the calculated priority. In this manner, it is possible to prevent overlaid display of the objects.

1-2. Configuration

Figure 10:
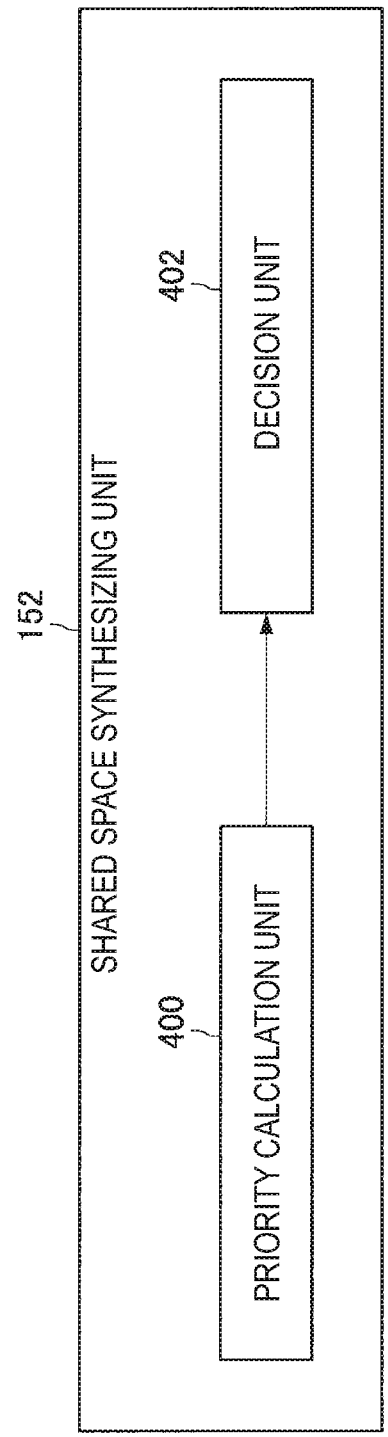
FIG. 10 is a functional block diagram illustrating a configuration example of a shared space synthesizing unit 152 according to the first embodiment.

Features of the configuration of the server 10-1 according to the first embodiment relate particularly to a configuration of the shared space synthesizing unit 152. Hereinafter, the configuration of the shared space synthesizing unit 152 will be described in further detail with reference to FIG. 10. As illustrated in FIG. 10, the shared space synthesizing unit 152 includes a priority calculation unit 400 and a decision unit 402.

{1-2-1. Priority Calculation Unit 400}

1-2-1-1. Overall Priority

The priority calculation unit 400 calculates priority of the respective objects in the respective real spaces on the basis of frame data received from the respective real spaces. For example, in relation to the respective objects in the respective real spaces, the priority calculation unit 400 calculates, as priority of the objects, values in accordance with priority related to attributes of the objects. In addition, the priority calculation unit 400 further calculates values in accordance with priority of the objects in relation to relationships with other objects as priority of the objects. Also, the priority calculation unit 400 further calculates values in accordance with priority of the objects related to contexts in the shared space as priority of the objects.

For example, in relation to the respective objects in the respective real spaces, the priority calculation unit 400 calculates final priority of the objects by calculating a weighted sum of priority of the aforementioned three types (that is, "the priority related to attributes of the objects" (hereinafter, also referred to as priority A in some cases), "the priority related to relationships with other objects" (hereinafter, also referred to as priority B in some cases), and "the priority related to contexts in the shared space" (hereinafter, also referred to as priority C in some cases). In one example, a predetermined weight may be registered in advance in relation to the priority of each of the three types. Then, in relation to the respective objects in the respective real spaces, the priority calculation unit 400 calculates weighted sums on the basis of the three types of priority calculated in relation to the objects and the weights corresponding to the priority as represented by Formula 1 described below and then regards the calculated values as final priority of the objects.

[Math. 1]

$$\mathrm{Priority}(i) = K_A \cdot \mathrm{Priority}A(i) + K_B \cdot \mathrm{Priority}B(i) + K_C \cdot \mathrm{Priority}C(i) \qquad \text{(Formula 1)}$$

Here, Priority (i) represents final priority of an i-th object. Also, Priority A(i), Priority B(i), and Priority C(i) are the priority A, the priority B, and the priority C of the i-th object, respectively. Also, KA, KB, and KC are a weight (constant) corresponding to the priority A, a weight (constant) corresponding to the priority B, and a weight (constant) corresponding to the priority C, respectively.

1-2-1-2. Priority Related to Attributes of Objects

Hereinafter, specific methods of calculating each of the three types of priority will be described. For example, in relation to the respective objects in the respective real spaces, the priority calculation unit 400 calculates the priority A of the objects on the basis of criteria related to the attributes of the objects.

Size

Here, "the criteria related to attributes of objects" may include sizes of the objects. For example, in relation to the respective objects in the respective real spaces, the priority calculation unit 400 calculates the priority A of the objects on the basis of the sizes (volumes or the like) of the objects. In one example, the priority calculation unit 400 calculates the priority A of the objects such that the priority is higher as the size of the object increases. According to this calculation example, objects with larger sizes are arranged in the shared space with higher priority. Therefore, it is possible to prevent visibility (when the content is displayed) from being degraded due to multiple objects with small sizes arranged in the shared space.

Alternatively, priority may be registered in a table in advance in accordance with the sizes of the objects. In addition, in relation to the respective objects in the respective real spaces, the priority calculation unit 400 may calculate the priority A of the objects on the basis of the results of recognizing the sizes of the objects and registered content in the table.

Note that the recognition of the sizes of the objects may be performed on the basis of 3D data or may be performed on the basis of 2D images, and recognition results may be mapped in corresponding 3D data.

Types

In addition, "the criteria related to attributes of objects" may include types of objects. For example, in relation to the respective objects in the respective real spaces, the priority calculation unit 400 calculates the priority A of the objects on the basis of results of recognizing the types of the objects. For example, priority may be registered in a table in advance in accordance with the types of the objects. In addition, in relation to the respective objects in the respective real spaces, the priority calculation unit 400 may calculate the priority A of the objects on the basis of the results of recognizing the types of the objects and registered content in the table. Note that the recognition of the types of the objects may be performed on the basis of 3D data or may be performed on 2D images, and recognition results may be mapped in corresponding 3D data.

Spaces

In addition, "the criteria related to attributes of objects" may include real spaces (original spaces) in which objects are located. For example, in relation to the respective objects in the respective real spaces, the priority calculation unit 400 calculates the priority A of the objects on the basis of the real spaces in which the objects are located. For example, priority may be registered in a table in advance in accordance with the spaces. In addition, in relation to the respective objects in the respective real spaces, the priority calculation unit 400 may calculate the priority A of the objects on the basis of the real spaces in which the objects are located and registered content in the table.

Persons

In addition, in a case in which the objects are persons, "the criteria related to attributes of objects" may include identification information of the persons. For example, in relation to the respective objects in the respective real spaces, the priority calculation unit 400 calculates the priority A of the objects on the basis of the persons (objects). For example, priority may be registered in a table in advance in accordance with the persons. In addition, in the case in which the objects are persons, the priority calculation unit 400 calculates the priority A of the objects on the basis of the persons and the registered content in the table. Note that in a case in which the objects are not persons, the priority calculation unit 400 may calculate the priority A of the objects as "0".

Note that the identification of the persons may be performed on the basis of 3D data, or the identification of the persons may be performed on the basis of a 2D image, and an identification result may be mapped in corresponding 3D data.

Combinations

Alternatively, the priority calculation unit 400 may calculate priority of each of the plurality of "criteria related to attributes of objects" for the respective objects, thereby calculating the priority A of the objects. For example, in relation to the objects, the priority calculation unit 400 first calculates priority of the plurality of respective "criteria related to attributes of objects" for the respective objects. Then, the priority calculation unit 400 may calculate weighted sums of the respective objects on the basis of the priority of the plurality of criteria calculated in relation to the objects and predetermined weights related to the plurality of respective criteria and regard the calculated values as the priority A of the objects.

1-2-1-3. Priority Related to Relationships with Other Objects

In addition, in relation to the respective objects in the respective real spaces, the priority calculation unit 400 can calculate the priority B of the objects on the basis of the criteria related to relationships between the objects and other objects located in the vicinity of the objects.

Whether or not there is Contact with Persons

Here, "the criteria related to relationships with other objects" may include whether or not there is contact with persons in original spaces. For example, in relation to the respective objects in the respective real spaces, the priority calculation unit 400 calculates the priority B of the objects on the basis of whether or not the objects are in contact with persons in the original spaces in which the objects are located. Here, as examples of the case in which the objects are in contact with persons, it is possible to exemplify a case in which persons are holding the objects, a case in which persons are sitting on the objects, and the like.

For example, priority may be registered in a table in advance in accordance with the persons. Then, in relation to the respective objects in the respective real spaces (original spaces), the priority calculation unit 400 calculates the priority B of the objects on the basis of the persons and the registered content in the table in a case in which the objects are in contact with the persons in the original spaces. Note that in a case in which the objects are not in contact with persons in the original spaces, the priority calculation unit 400 may calculate the priority B of the objects as "0".

Typically, in a situation in which users in different original spaces have conversation in a shared space and in a case in which at least any of the users is in contact with some object in the original space (for example, in a case in which the user is holding the object), there is a high probability that a subject of the conversation is the object. According to the calculation example, it is possible to cause the object with the high probability of being the subject of the conversation to be displayed with higher priority.

Distances from Persons

Here, "the criteria related to relationships with other objects" may include distances from persons in original spaces. For example, in relation to the respective objects in the respective real spaces, the priority calculation unit 400 calculates the priority B of the objects on the basis of the distances between the objects and the persons in the original spaces in which the objects are located. In one example, in relation to the respective objects in the respective real spaces, the priority calculation unit 400 calculates the priority B of the objects on the basis of the distances between the persons located at the positions closest to the objects in the original spaces and the objects and identification information of the persons.

For example, priority may be registered in a table in advance in accordance with the persons. Then, in relation to the respective objects in the respective real spaces, the priority calculation unit 400 calculates the priority B of the objects on the basis of content registered in association with the persons in the table in a case in which the distances between the persons located at the positions closest to the objects and the objects in the original spaces are equal to or less than a predetermined threshold value. Note that in a case in which the distances between the persons located at the positions closest to the objects and the objects in the original spaces are greater than the predetermined threshold value, the priority calculation unit 400 may calculate the priority B of the objects as "0".

Combinations

Alternatively, the priority calculation unit 400 may calculate priority of each of the plurality of "criteria related to relationships with other objects" for the respective objects, thereby calculating the priority B of the objects. For example, the priority calculation unit 400 first calculates priority of the objects in relation to each of the plurality of "criteria related to relationships with other objects" for the respective objects. Then, the priority calculation unit 400 may calculate weighted sums of the respective objects on the basis of the priority of the plurality of criteria and predetermined weights in relation to the plurality of respective criteria and regard the calculated values as the priority B of the objects.

1-2-1-4. Priority Related to Contexts in Shared Space

Incidentally, if display of an object that is now a subject of conversation between users in different original spaces suddenly disappears, the users may perceive this situation as being unnatural, which is undesirable. Also, if display of an object in a dependency relationship with another object suddenly disappears from a shared space, users may still perceive this situation as being unnatural. Here, as an example of the dependency relationship, a case in which objects in different original spaces are arranged on a target object in a shared space (for example, a case in which a computer in a real space 2a is arranged on a desk in a real space 2b in a shared space) is exemplified.

Thus, in relation to the respective objects in the respective real spaces, the priority calculation unit 400 can calculate the priority C of the objects on the basis of information indicating contexts in the shared space (hereinafter, referred to as context information). For example, in relation to the respective objects in the respective real spaces, the priority calculation unit 400 calculates the priority C of the objects on the basis of the context information and the criteria related to the contexts in the shared space.

Subject of Conversation Between Users

Here, the context information may include information indicating subjects of conversation between a plurality of users in the shared space, and "the criteria related to contexts in the shared space" may include the subject of the conversation between the plurality of users in the shared space. In this case, in relation to the respective objects in the respective real spaces, the priority calculation unit 400 calculates the priority C of the objects on the basis of the subject of the conversation between the plurality of users in the shared space. In one example, in relation to each object in a real space, the priority calculation unit 400 calculates the priority C of the object as a predetermined value that is greater than "0" in a case in which any of words uttered in the conversation indicates the object. Note that in a case in which any of the words uttered in the conversation between the users indicates the object, the priority calculation unit 400 may calculate the priority C of the object as "0". In addition, the words uttered in the conversation between the users may be specified on the basis of a result of recognizing sound collected by the input unit 22 (sensor unit 220), for example.

User's Pointing on Shared Space

In addition, the context information includes information indicating whether or not user's pointing on the shared space has been detected, and "the criteria related to contexts in the shared space" may include whether or not the user's pointing on the shared space has been detected. In this case, in relation to the respective objects in the respective real spaces, the priority calculation unit 400 calculates the priority C of the objects on the basis of whether or not the objects have been pointed by the users in the shared space. In a case in which the objects have been pointed by the users, for example, the priority calculation unit 400 calculates the priority C of the objects as a predetermined value that is greater than "0". Note that in a case in which the objects have not been pointed by the users, for example, the priority calculation unit 400 may calculate the priority C of the objects as "0". In addition, whether or not the objects have been pointed by the users may be specified on the basis of a result of recognizing gestures of the users, a result of recognizing hand and fingers of the users, and the like.

Dependency Relationships Between Objects in Shared Space

In addition, the context information may include information indicating dependency relationships between objects in a shared object, and "the criteria related to contexts in the shared space" may include dependency relationships between the objects in the shared space. In this case, in relation to the respective objects in the respective real spaces, the priority calculation unit 400 calculates the priority C of the objects on the basis of the dependency relationships between the objects in the shared space. In one example, in relation to each object in a real space, the priority calculation unit 400 calculates the priority C of the object as a predetermined value that is greater than "0" in a case in which the objects are in dependency relationships with other objects in the shared space. Note that in a case in which the objects are not in the dependency relationships with other objects in the shared space, the priority calculation unit 400 may calculate the priority C of the objects as "0".

Other Examples

In addition, the context information may include information indicating face expressions of the users (angry, smiling, and the like), time zones (daytime, nighttime, and the like), and dates (weekdays, holidays, and the like), and the like, and "the criteria related to contexts in the shared space" may include the face expressions of the users, the time zones, the dates, and the like.

In addition, the context information may include information indicating profiles of users who are participating in the shared space or users who are having conversation in the shared space, and "the criteria related to contexts in the shared space" may include profiles of the users who are participating in the shared space or the users who are having conversation in the shared space. In this case, in relation to the respective objects in the respective real spaces, the priority calculation unit 400 calculates the priority C of the objects on the basis of profile information registered in advance in relation to the users (or the users who are having conversation in the shared space) who are located in the shared space. Here, the profile information may include information such as ages, sexes, nationalities, hobbies, and preferences, for example, of the corresponding users.

Combinations

Alternatively, the priority calculation unit 400 may calculate priority of each of the plurality of "criteria related to contexts in the shared space" for each object, thereby calculating the priority C of the objects. For example, the priority calculation unit 400 calculates priority of the objects in relation to each of the plurality of "criteria related to contexts in the shared space" for the respective objects, first. Then, the priority calculation unit 400 may calculate weighted sums of the respective objects on the basis of the priority of the plurality of criteria and predetermined weights related to the plurality of respective criteria and regard the calculated values as the priority C of the objects.

1-2-2. Decision Unit 402

The decision unit 402 decides shared objects to be arranged in the shared space (hereinafter, also referred to as "objects as targets of display") on the basis of the priority of the respective objects calculated by the priority calculation unit 400. In relation to each object, the decision unit 402 decides the object as an object of a target of display only in a case in which the object is not overlaid on an arrangement position of another object with higher priority than that of the object in the shared space, for example. Note that in relation to each object, the object can basically be arranged at a position in the shared space corresponding to the position of the object in the original space in the first embodiment.

Figure 12:
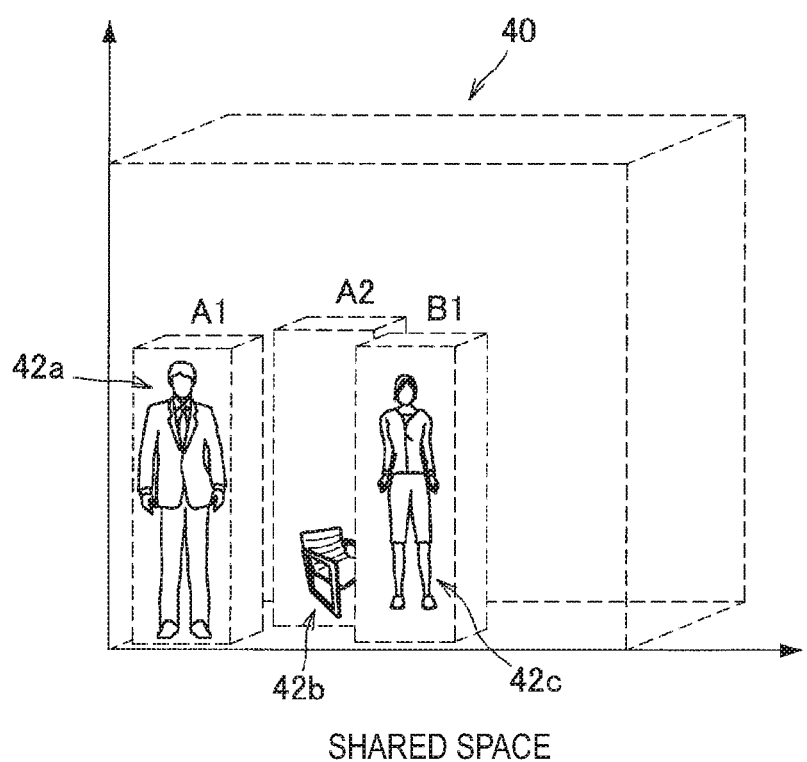
FIG. 12 is an explanatory diagram illustrating an arrangement example of an object 42 in a shared space.

FIG. 11 is an explanatory diagram illustrating an example of priority of each object calculated by the priority calculation unit 400. In the example illustrated in FIG. 11, an order of objects with high priority is as follows: (1) an object 42a (priority of 1000) with an object ID of "1" in a real space A; (2) an object 42c (priority of 1000) with an object ID of "1" in a real space B; (3) an object 42b (priority of 500) with an object ID of "2" in the real space A; and (4) an object 42d (priority 300) with an object ID of "2" in the real space B. Also, a region in which the object 42a is to be arranged in the shared space (that is, a region in the shared space corresponding to a region in which the object 42a is located in the real space A) and a region in which the object 42d is arranged in the shared space (that is, a region in the shared space corresponding to a region in which the object 42d is to be located in the real space B) are overlaid on each other as illustrated in FIG. 11. Thus, the shared space synthesizing unit 152 arranges the objects 42 with an order from higher priority, that is, in the order of the object 42a, the object 42c, and the object 42b in the shared space as illustrated in FIG. 12. In addition, the shared space synthesizing unit 152 decides not to arrange the object 42d (since the position thereof is overlaid on the object 42a). In this manner, it is possible to prevent a plurality of objects from being arranged in an overlaid manner in the shared space.

1-3. Advantages

As described above, the server 10-1 calculates priority related to the respective objects in the respective real spaces and then decides objects as targets of display on the basis of the calculated priority in the first embodiment. In this manner, it is possible to uniquely order the respective objects in the respective real spaces. Then, the server 10-1 can arrange the respective objects in the shared space in the order from the higher priority, for example. Therefore, it is possible to prevent a plurality of objects to be arranged in an overlaid manner in the shared space and thereby to prevent the objects from being displayed in an overlaid manner.

1-4. First Application Example

1-4-1. Outline

In the above description, the example in which the priority calculation unit 400 calculates the priority of the respective objects in units of frames has been described. Incidentally, even if the objects themselves are the same, results of recognizing the objects may differ from each other in the respective frames. In particular, results of recognition may significantly vary in face recognition if direction of human faces change. Therefore, calculated priority of the same object may differ in the respective frames. As a result, since objects selected as targets of display may frequently change between continuous frames, and flickering may occur.

Figure 13:
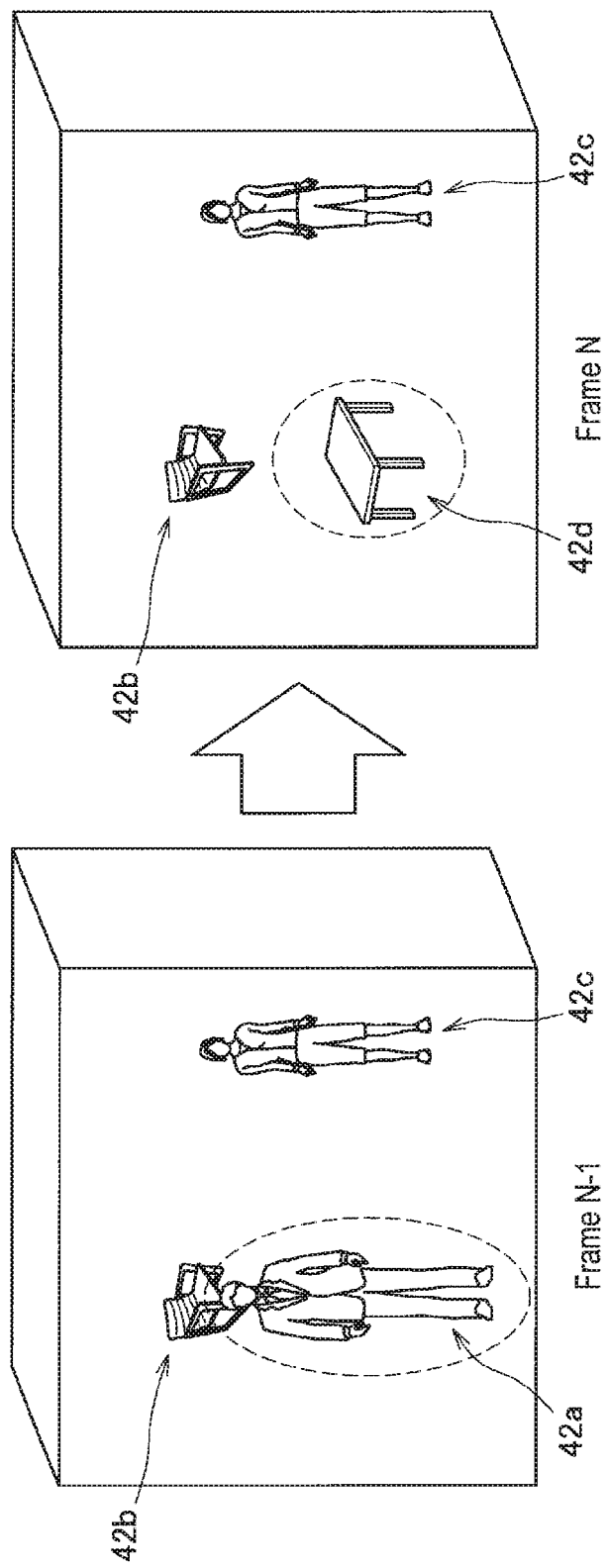
FIG. 13 is an explanatory diagram for describing problems of an application example of the first embodiment.

Here, further details of the above description will be given with reference to FIG. 13. As illustrated in FIG. 13, high priority is calculated for the object 42a in an N−1-th frame, and the object 42a is thus displayed. Meanwhile, higher priority than that of the object 42a is calculated for the object 42d in an N-th frame, the object 42d is thus displayed with priority, and the object 42a is not displayed. As a result, a video image displayed on the display unit 246 may flicker.

Next, a first application of the first embodiment will be described. A server 10-1 according to the first application example further decides objects as targets of display in a target frame on the basis of information related to objects that are targets of display in a previous frame. In this manner, it is possible to inhibit variation of the objects to be decided as targets of display in the continuous frames.

Note that components included in clients 20 and the server 10-1 according to the first application are similar to those in the above description. Hereinafter, only components with functions that are different from those in the above description will be described.

1-4-2. Decision Unit 402

A decision unit 402 according to the first application example decides objects as targets of display on the basis of results of tracking the respective objects in the respective real spaces in continuous frames. For example, the decision unit 402 decides objects that are targets of display in the previous frame as objects as targets of display in a target frame with higher priority than that of objects that are not targets of display in the previous frame as follows.

First, the decision unit 402 tracks the respective objects in the respective real spaces for each frame. Then, in a case in which the same objects are estimated to be present in the previous frame (on the basis of results of tracking) in relation to the respective objects included in the target frame, the decision unit 402 assigns object IDs that are the same as those of the corresponding objects in the previous frame to the objects (in the target frame).

Then, the decision unit 402 sets the objects that are targets of display in the previous frame as candidates of the objects as the targets of display. Then, the decision unit 402 arranges the candidates of the objects as the targets of display in the shared space in the order from the higher priority calculated by the priority calculation unit 400. Note that in a case in which the candidates are overlaid on the positions of objects that have already been arranged at this time, the decision unit 402 does not set the objects as targets of display.

Then, the decision unit 402 sets the objects that are not targets of display in the previous frame as candidates of the objects as the targets of display. Then, the decision unit 402 arranges the candidates of the objects as the targets of display in the shared space in the order from the higher priority calculated by the priority calculation unit 400. Note that in a case in which the candidates are overlaid on the positions of objects that have already been arranged at this time, the decision unit 402 does not set the objects as targets of display.

1-4-3. Advantages

As described above, the server 10-1 according to the first application example decides the objects that are targets of display in the previous frame as objects as targets of display in the target frame with higher priority than that of objects that are not targets of display in the previous frame. In this manner, it is possible to inhibit variation of the objects to be decided as targets of display in the continuous frames. In addition, it is possible to prevent visibility from being degraded.

1-4-4. First Modification Example

Note that the first application example is not limited to the aforementioned example, and a plurality of modification examples can be applied. For example, in a case in which precision of results of recognizing objects is low in relation to the respective objects, the server 10-1 may use results of recognizing the objects in the previous frame instead as the results of recognizing the objects in the target frame.

1-4-4-1. Recognizing Unit 224 and Recognizing Unit 104

A recognizing unit 224 of the input unit 22 and/or a recognizing unit 104 of the server 10-1 according to the first modification example does not assign (store) recognition result to meta information in a case in which reliability of the recognition result is lower than a predetermined threshold value when recognition is performed in relation to each object.

1-4-4-2. Shared Space Synthesizing Unit 152

In relation to the respective objects in the respective real spaces, a shared space synthesizing unit 152 according to the first modification example uses corresponding recognition results of the objects in meta information in the previous frame as corresponding recognition results of the objects in the target frame in a case in which one or more recognition results are not stored in the meta information. For example, the decision unit 402 checks whether or not results of recognizing the objects have been assigned to the meta information in the previous frame first in this case. Then, in a case in which recognition results have been assigned, the decision unit 402 uses the recognition results as recognition results of the objects in the target frame.

Figure 14:
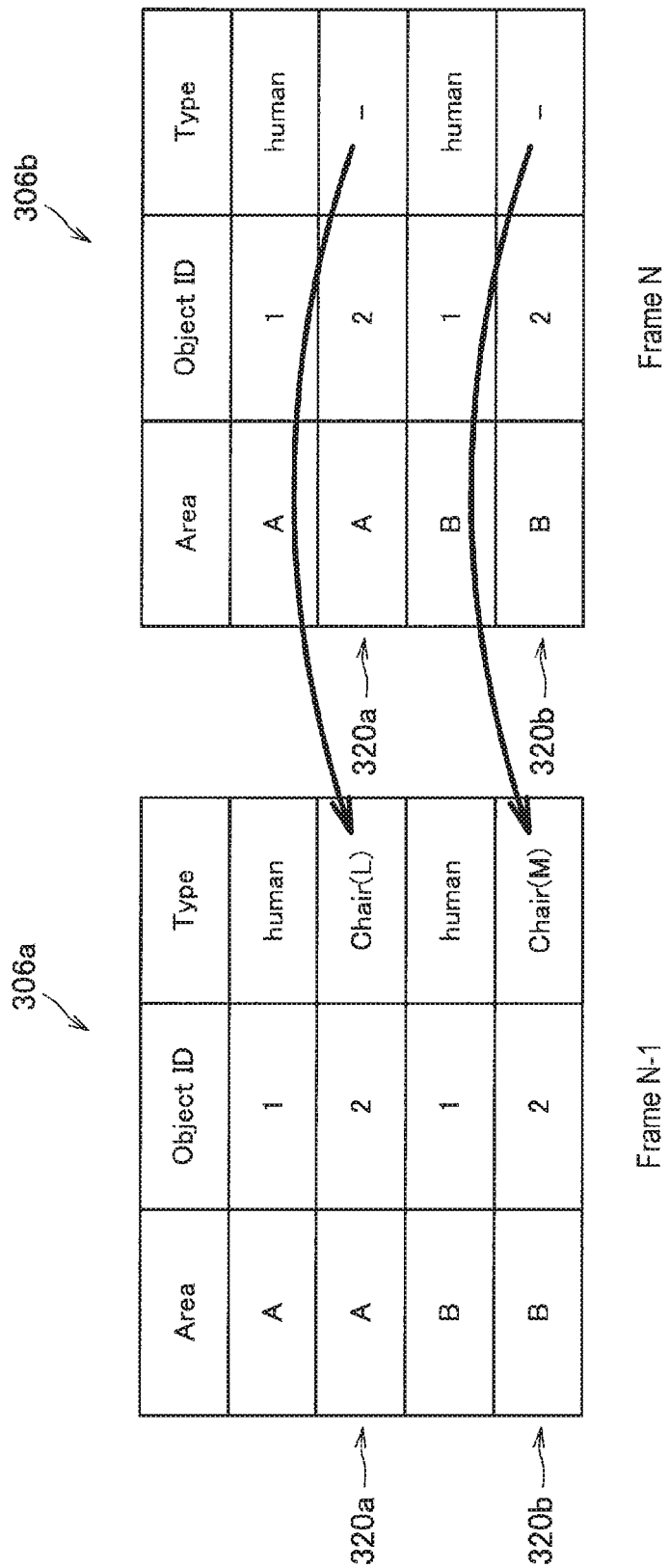
FIG. 14 is an explanatory diagram illustrating an example in which meta information of a preceding frame is used.

FIG. 14 is an explanatory diagram illustrating an example of meta information 306 in the N−1-th frame and the N-th frame. As illustrated in FIG. 14, it is assumed that "the types of the objects" have not been stored in the meta information 306 (that is, prevision of the recognition results is lower than predetermined precision) in relation to the object 42a with an object ID of "2" in the real space A and the object with the object ID of "2" in the real space B in the N-the frame. In this case, the decision unit 402 uses the result of recognizing the "type" of the object 42a ("Chair (L)") and the result of recognizing the "type" of the object 42b ("Chair (M)") in the meta information in the N−1-th frame as the "type" of the object 42a and the "type" of the object 42b in the N-th frame, respectively, as represented with the arrows in FIG. 14.

1-4-5. Second Modification Example

In addition, although the example in which the decision unit 402 decides the objects as the targets of display on the basis of the results of tracking the respective objects between continuous frames has been described above, the present disclosure is not limited to such an example. In another modification example, the server 10-1 may further calculate priority related to how the objects are displayed (hereinafter, also referred to as priority D in some cases) in relation to the respective objects in the respective real spaces and may decide objects as the targets of display in the target frame on the basis of the priority D.
(Priority Calculation Unit 400)

In relation to the respective objects in the respective real spaces, the priority calculation unit 400 according to the second modification example further calculates the priority D of the objects. For example, in relation to the respective objects in the respective real spaces, the priority calculation unit 400 calculates the priority D of the objects as predetermined values that are greater than "0" in a case in which the objects are displayed in the immediately previous display frame. In addition, in a case in which the objects are not displayed in the immediately previous display frame, the priority calculation unit 400 calculates the priority D of the objects as "0".

In addition, in relation to the respective objects in the respective real spaces, the priority calculation unit 400 can calculate final priority of the objects by calculating weighted sums of the priority D of the objects and the three types of priority described in Section 1-2-1 (that is, a total of four types of priority). For example, predetermined weights may be registered in advance for the types of priority. Then, in relation to the respective objects in the respective real spaces, the priority calculation unit 400 calculates weighted sums on the basis of the four types of priority and the weights corresponding to the types of priority and may regard the calculated values as final priority of the objects.

According to the modification example, (final) priority is higher in the case in which the objects are displayed in the immediately previous display frame than in the case in which the objects are not displayed in the immediately previous display frame. Therefore, the objects that are displayed in the immediately previous display frame may be (continuously) decided as targets of display with priority.

1-4-6. Third Modification Example

Incidentally, it is typically difficult to consider that objects suddenly disappear from real spaces. Thus, in another modification example in which a single object that is present in a previous frame disappears in a target frame, and a plurality of objects are located at the same position as that of the object, the server 10-1 (shared space synthesizing unit 152) can regard the object in the previous frame as having been divided into the plurality of objects. For example, the shared space synthesizing unit 152 may regard all the plurality of objects located at the same position in the target frame as being the same as the corresponding one object in the previous frame.

In addition, it is typically difficult to consider that objects suddenly appear in real spaces. Thus, in a case in which a plurality of objects that is present in a previous frame disappear in a target frame, and only one object is located at the same position as that of the plurality of objects, the server 10-1 (shared space synthesizing unit 152) can regard the plurality of objects in the previous frame as having been merged into the one object. For example, the shared space synthesizing unit 152 may regard the one object located at the same position in the target frame as being the same as the plurality of corresponding objects in the previous frame.

According to the third modification example, it is possible to improve stability of display from the previous frame in the case in which objects are estimated to have disappeared or combined.

1-4-7. Fourth Modification Example

In addition, although the example in which the decision unit 402 decides objects as targets of display for each frame has been described in the above description, the present disclosure is not limited to such examples. In another modification example, the server 10-1 (shared space synthesizing unit 152) can also perform a process of deciding objects as targets of display (display determination processing) only in a case in which a predetermined condition is satisfied.

Here, the predetermined condition may be a start of space sharing (that is, generation of a shared space) based on a user's instruction or the like, for example. Alternatively, the predetermined condition may be addition of a new real space as a target of synthesis to a shared space that has already been generated or deletion of any of a plurality of real spaces that has been used to generate the shared space. Alternatively, the predetermined condition may be detection of a user's predetermined instruction (for example, an instruction for updating display of content or the like). Alternatively, the predetermined condition may be new appearance of an object or deletion of an object that has been present in a previous frame. Alternatively, the predetermined condition may be continuous presence of a certain object for a specific period after appearance of the object (for example, a case in which the object has continuously been present in three frames or the like) or may be continuous disappearance of a certain object for a specific period after disappearance of the object (for example, a case in which the object has continuously disappeared in "three frames" or the like). Alternatively, the predetermined condition may be an increase in size of a certain object to a predetermined size or greater from an immediately previous frame or a decrease in size to a predetermined size or smaller.

According to the fourth modification example, it is possible to further improve stability of display of objects between continuous frames.

1-5. Second Application Example

The first application example has been described above. Incidentally, user may have an unpleasant feeling if a new object is suddenly displayed or display of an object is suddenly stopped. Next, a second application will be described.

The shared space synthesizing unit 152 according to the second application processes content of the free viewpoint such that a user can perceive a change in the content of the free viewpoint in a case in which an object is newly displayed from a previous frame or an object deletes from a precious frame.

1-5-1. When Object is Added

In a case in which an object (including a user 4) is newly displayed, for example, the shared space synthesizing unit 152 processes the content of the free viewpoint such that users who are participating in the shared space can perceive the display of the new object. In one example, the shared space synthesizing unit 152 processes the content of the free viewpoint such that an animation for a predetermined time (for example, 1 minute or the like) indicating start of the display of the new object.

Figure 16C:
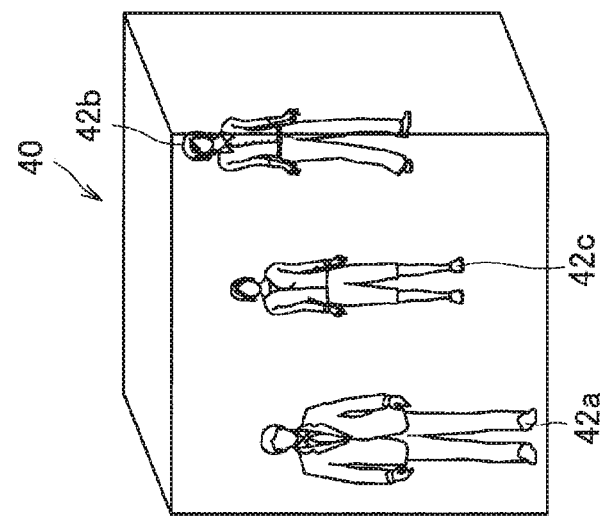
FIGS. 16A, 16B, and 16C are diagrams illustrating an example of an animation illustrating that display of a new object is started.
Figure 16B:
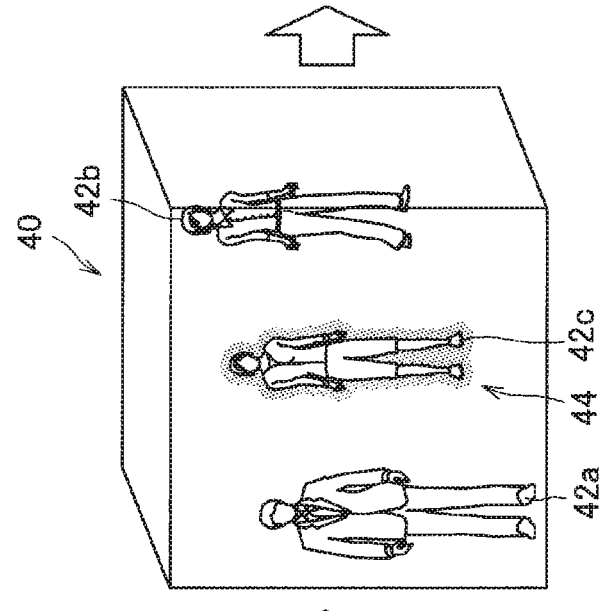
Figure 16A:
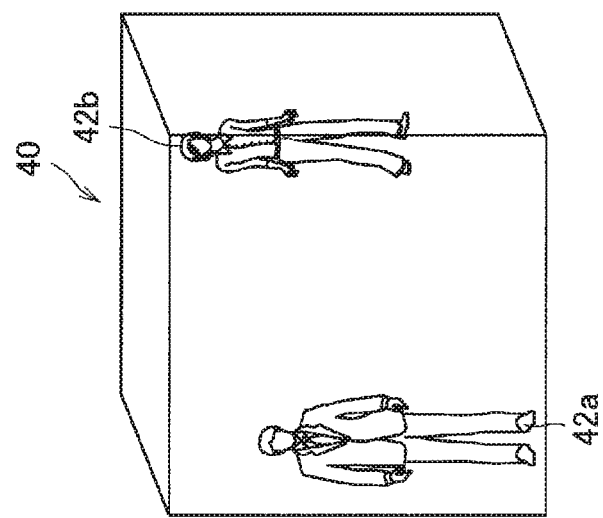

For example, in a case in which the display of the new object 42c is started, the shared space synthesizing unit 152 first performs a process of causing a new object 42c whose transparency is set to an initial value (for example, 100%) to be displayed and gradually decrease the transparency of the new object 42c from the initial value to 0% during a predetermined period of time as illustrated in FIGS. 15A, 15B, and 15C. Alternatively, as illustrated in FIGS. 16A, 16B, and 16C, the shared space synthesizing unit 152 may process the content of the free viewpoint so that a particle 44 is displayed in the periphery of the new object 42c for a predetermined period of time after the display of the new object 42c is started. Alternatively, as illustrated in FIGS. 17A, 17B, and 17C, the shared space synthesizing unit 152 processes the content of the free viewpoint so that an animation in which a small particle group 46 fly from the outside of the shared space 40, the particle group 46 gradually increases in the shared space 40, and then the particle group 46 is switched to video of the object 42c is displayed. According to such process examples, for example, in a case in which a new object is placed in the shared space, the object is not suddenly displayed. Therefore, each user who is already participating in the shared space can be prevented from feeling uncomfortable and surprised.

Further, the shared space synthesizing unit 152 may process the content of the free viewpoint so that a predetermined effect sound (for example, effect sound or the like corresponding to the display of the new object) is output at a timing at which a new object is displayed.

1-5-2. When Object is Deleted

Further, in a case in which it is decided that one or more objects (including the user 4) in the shared space are deleted from the shared space (for example, in a case in which the user participating in the shared space leaves the shared space or the like), the shared space synthesizing unit 152 processes the content of the free viewpoint so that the user participating in the shared space can notice that the object is deleted. For example, the shared space synthesizing unit 152 processes the content of the free viewpoint so that an animation of a predetermined period of time (for example, one minute) indicating that the display of the object is ended is displayed.

Figure 19A:
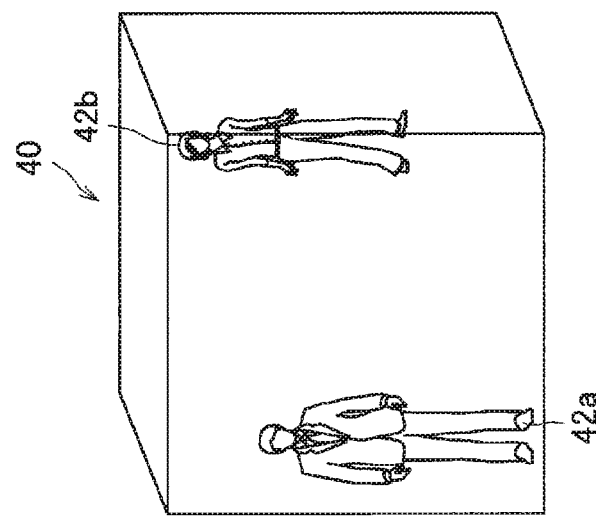
FIGS. 19A, 19B, and 19C are diagrams illustrating an example of an animation illustrating that display of a deletion target object is ended.
Figure 19B:
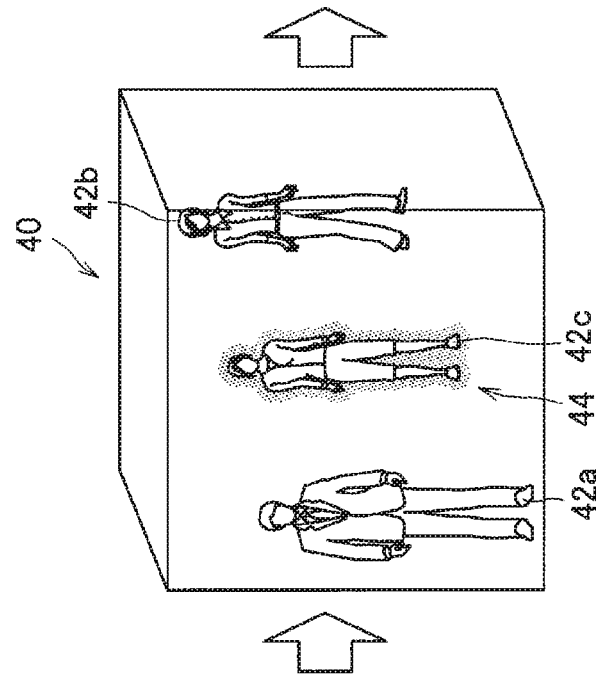
Figure 19C:
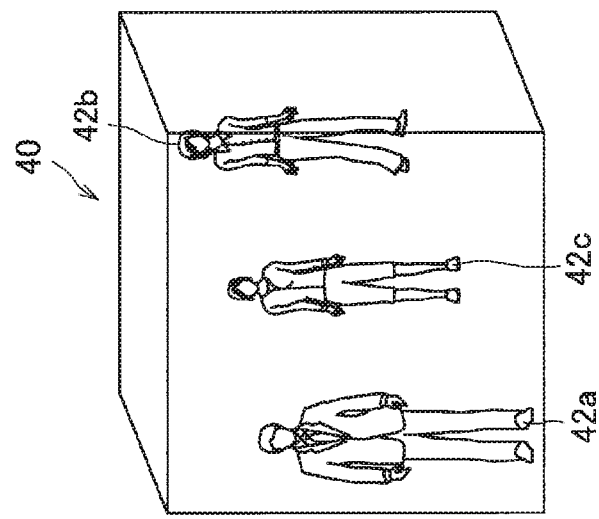

As an example, in a case in which it is decided that the object 42c is deleted, the shared space synthesizing unit 152 processes the content of the free viewpoint so that an animation in which the transparency of the object 42c gradually increases from 0% to 100%, and the object 42c is not displayed is displayed as illustrated in FIGS. 18A, 18B, and 18C. Alternatively, as illustrated in FIGS. 19A, 19B, and 19C. 19, the shared space synthesizing unit 152 may process the content of the free viewpoint so that an animation in which a particle 44 is displayed near the object 42c of the deletion target for a predetermined period of time, and then the object 42c is not displayed is displayed. Alternatively, as illustrated in FIGS. 20A, 20B, and 20C, the shared space synthesizing unit 152 may process the content of the free viewpoint so that an animation in which the object 42c of the deletion target is transformed into a particle group 46, the particle group 46 flies to the outside of the shared space 40 while decreasing the size gradually, and then the particle group 46 disappears is displayed. With such process examples, the deletion target object (the leaving user 4 or the like) located in the shared space does not suddenly disappear. Therefore, each user who is already participating in the shared space can be prevented from feeling uncomfortable and surprised.

Further, the shared space synthesizing unit 152 may process the content of the free viewpoint so that a predetermined effect sound (for example, effect sound or the like corresponding to the deletion of the object) is output at a timing at which the deletion target object is not displayed.

1-6. Third Application Example

The second application example has been described above. Incidentally, when a user 4a located in a real space 2a and a user 4b located in a real space 2b are communicating in a shared space, a situation in which a user 4c located in another real space 2c desires to participate in the shared space is also conceivable. In such a situation, it is desirable to regenerate the shared space by 3D data of the three real spaces (the real space 2a, the real space 2b, and the real space 2c) being synthesized. Meanwhile, it is not desirable that the space shared until now suddenly significantly changes, and for example, it is not desirable that display of multiple objects in the original spaces of the two users who have already participate in the space be stopped.

Next, a third application example of the second embodiment will be described. The shared space synthesizing unit 152 according to the third application example changes registered content in priority table for each space (priority table "area") in an object priority policy 1624 in a case in which an operation of a user who has not participated in the shared space for participating in the shared space is detected. In a case in which a user who will newly participate in the shared space is detected, and the original space 2a of all the users who have already participated in the shared space is different from the original space 2b of the user who will newly participate in the shared space, for example, the shared space synthesizing unit 152 changes the registered content in the priority table "area" such that priority of the original space 2b of the user who will newly participate in the shared space is lower than that of the original space 2a of all the users who have already participated in the shared space.

As described above, in the case in which a new user participates in a shared space, objects in original spaces of users who have already participated in the shared space may be arranged in the shared space with higher priority than that of objects in the original space of the new user according to the third application example. Therefore, it is possible to prevent the shared space from suddenly significantly changing and to appropriately arrange a part of the objects in the original space of the new user in the shared space.

2. Second Embodiment

2-1. Outline

The first embodiment has been described above. Incidentally, a case in which different display devices (for example, the display unit 246 and the like) are used for the respective participating users is conceivable. For example, a case in which a user 4a who is located in a real space 2a is using a wearable device of a shielding type (hereinafter, also referred to as a VR device in some cases) and a user 4b who is located in a real space 2b is using an AR device is conceivable. In this case, it is possible to control display on the VR device such that an arbitrary object in the real space 2a (in which the user 4a is located) is not shown to the user 4a while it is significantly difficult to control display on the AR device such that an object in the real space 2b (in which the user 4b is located) is not shown to the user 4b. Thus, satisfaction of both the user 4a and the user 4b may be further improved in a case in which the object in the real space 2b is displayed with higher priority than that of the object in the real space 2a.

Next, the second embodiment will be described. As will be described later, a server 10-2 according to the second embodiment can decide any of a plurality of real spaces as a base space and then arrange objects located in the base space in a shared space with priority. Here, the base space is a space that serves as a basis of the generated shared space. For example, any of a plurality of real spaces in which the respective users who are participating in the shared space are located may be decided as a base space. In addition, a part of objects in all the real spaces that have not been selected as the base space from among the plurality of real spaces may be arranged in the base space (for example, a vacant region in the base space). Note that although the base space is basically a space that is actually present, the base space is not limited to such an example and may be a virtual space (for example, a completely vacant region or the like).

2-2. Configuration

First, a configuration of the server 10-2 according to the second embodiment will be described. Note that only details that are different from those in the first embodiment will be described below.

2-2-1. Shared Space Managing Unit 100-2

Figure 21:
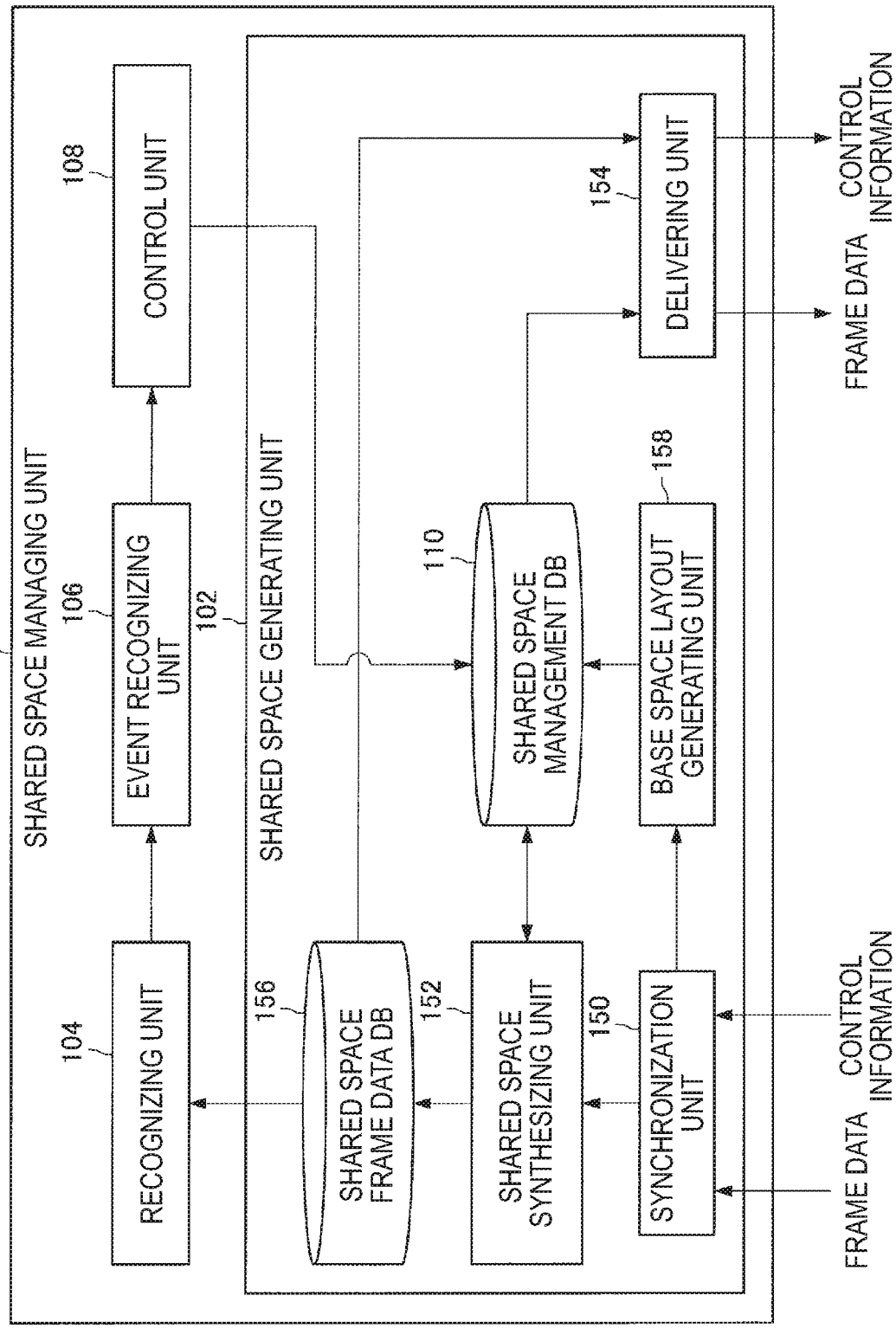
FIG. 21 is a functional block diagram illustrating a configuration example of a shared space managing unit 100-2 according to the second embodiment.

FIG. 21 is a functional block diagram illustrating a configuration example of a shared space managing unit 100-2 according to the second embodiment. As illustrated in FIG. 21, the shared space managing unit 100-2 further includes a base space layout generating unit 158 and a shared space management DB 110 as compared with the shared space managing unit 100-1 illustrated in FIG. 8.

Figure 22:
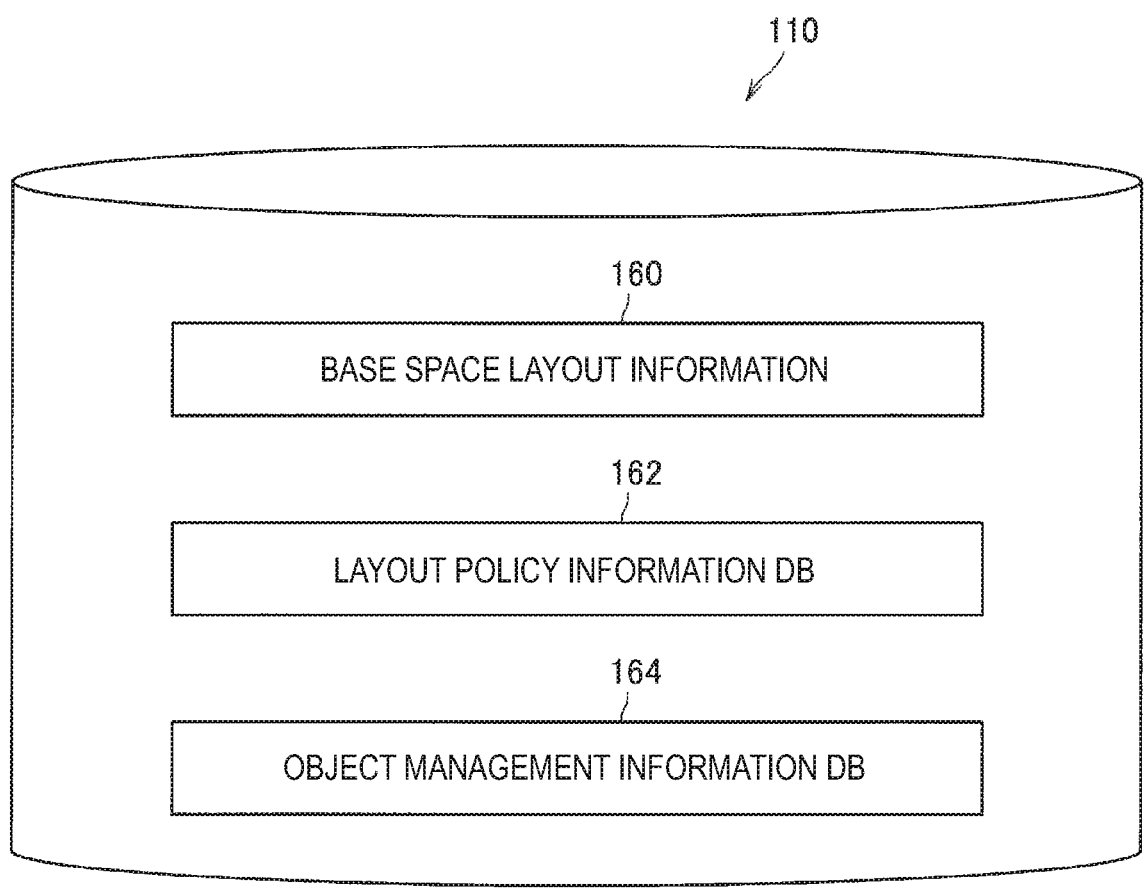
FIG. 22 is an explanatory diagram illustrating a configuration example of a shared space management DB 110.

The shared space management DB 110 is a database that is used for management, such as generation and update, of the shared space. FIG. 22 is a diagram illustrating a configuration example of the shared space management DB 110. As illustrated in FIG. 22, the shared space management DB 110 includes, for example, a base space layout information 160, layout policy information DB 162, and an object management information DB 164. Note that specific details in these databases will be described later.

2-2-2. Base Space Layout Generating Unit 158

2-2-2-1. Decision of Base Space

First Decision Example

The base space layout generating unit 158 (automatically) decides a base space on the basis of a predetermined condition. For example, a base space is decided in accordance with display devices that the respective users who desire to participate in a shared space use when space sharing is started. In one example, in a case in which all users (who desire to participate in the shared space) are wearing VR devices, the base space layout generating unit 158 decides any of original spaces of all the users or an arbitrary virtual space as a base space. In addition, in a case in which only one user 4a is wearing an AR device and all the rest users 4b are wearing VR devices, the base space layout generating unit 158 decides an original space of the user 4a as a base space. Also, in a case in which a plurality of users who is located in mutually different real spaces 2 is wearing AR devices, the base space layout generating unit 158 decides any of the original spaces of the plurality of users as a base space. According to the decision example, the original space of the corresponding user is decided as a base space in a case in which at least any of the users are using AR devices.

Second Decision Example

Alternatively, the base space layout generating unit 158 can decide a base space on the basis of base space selection policy 1620 stored in the layout policy information DB 162. Here, (data indicating) a reference for selecting a base space is stored in advance in the base space selection policy 1620. For example, a plurality of evaluation criteria is registered and the evaluation criteria and coefficients of the evaluation criteria are associated for the respective evaluation criteria, in the base space selection policy 1620. Here, the types of the evaluation criteria are, for example, a total of bottom areas of vacant regions (in target real spaces), a maximum bottom area of continuing vacant regions (in the target real spaces), and the like.

For example, the base space layout generating unit 158 calculates the respective values of the plurality of evaluation criteria stored in the base space selection policy 1620 for each of the original spaces in which the respective users who desire to participate in the shared space are located first. Then, the base space layout generating unit 158 calculates weighted sums of the respective values of the plurality of evaluation criteria calculated in relation to the original spaces and the respective coefficients of the plurality of evaluation criteria for each original space, thereby deciding a base space. For example, the base space layout generating unit 158 decides an original space with the maximum weighted sum calculated as a base space.

Modification Example

Note that in a modification example, the base space layout generating unit 158 can also decide a base space in accordance with a result of recognizing actions of the respective users as targets who participate in a shared space. In a case in which there is a user who is doing a predetermined action (cleaning, cooking, or the like) from among a plurality of users who is a target of participating in the shared space, for example, the base space layout generating unit 158 may decide a real space in which the user is located as a base space. In this manner, in a case in which content of the free viewpoint is presented to the user, it is possible to prevent inconvenience of the user or an increase in risk of the user.

Also, in another modification example, the base space layout generating unit 158 may decide a base space only in a case in which no layout is stored (that is, vacant) in the base space layout information 160, for example.

2-2-2-2. Generation of Base Space

In addition, the base space layout generating unit 158 generates layout information of the base space on the basis of the decided base space. Then, the base space layout generating unit 158 stores the generated layout information in the base space layout information 160.

2-2-3. Base Space Layout Information 160

Figure 23:
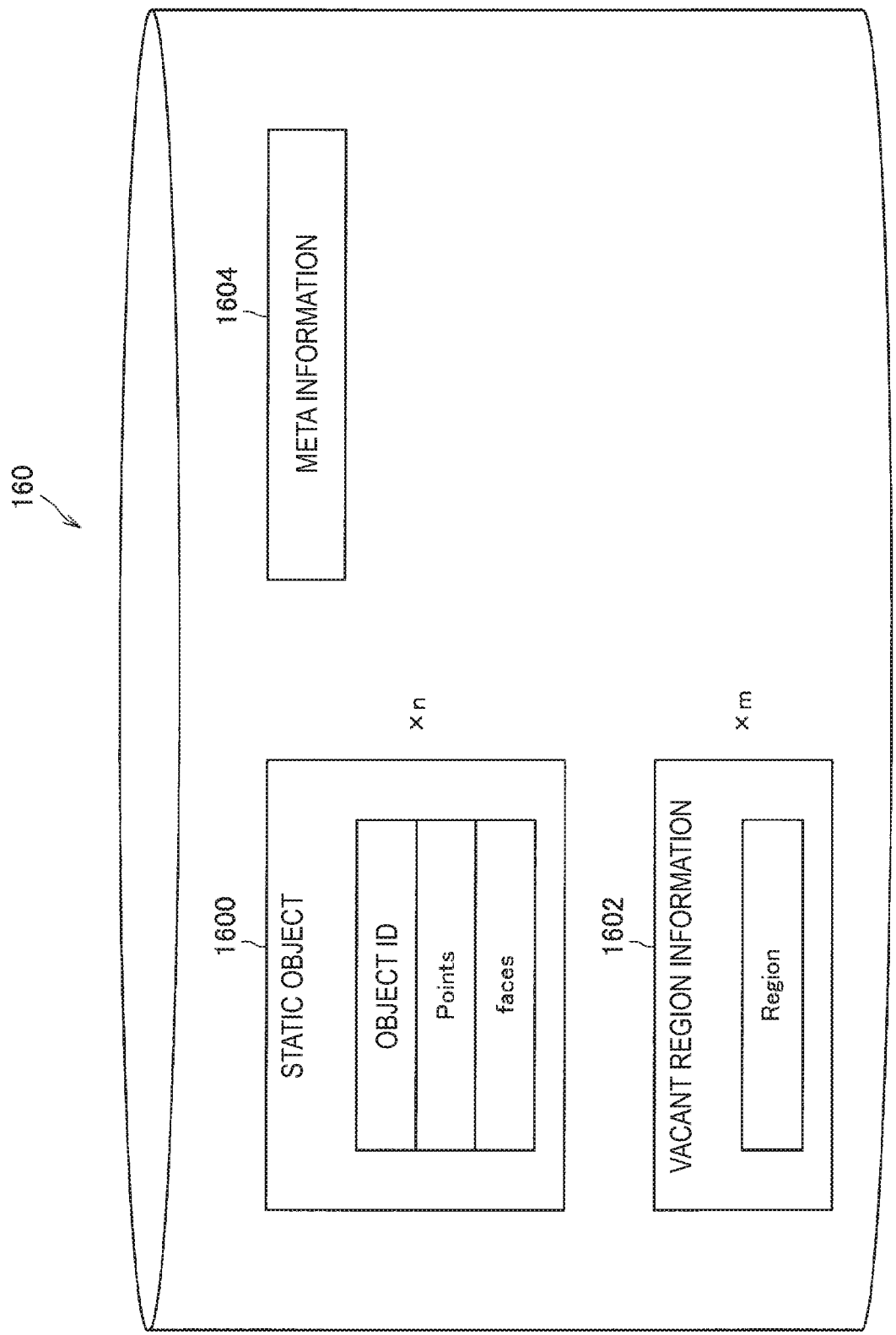
FIG. 23 is an explanatory diagram illustrating a configuration example of base space layout information 160.

The base space layout information 160 stores the layout information generated by the base space layout generating unit 158. FIG. 23 is an explanatory diagram illustrating a configuration example of the base space layout information 160. As illustrated in FIG. 23, a static object 1600, vacant region information 1602, and meta information 1604 are stored in the base space layout information 160. Here, information regarding objects located in advance in the base space is stored in the static object 1600. For example, an object ID, information regarding a point of the object (coordinates, color information, and the like), and information regarding planes of the object are stored in the static object 1600 for each object. In addition, information regarding a vacant region in the base space is stored in the vacant region information 1602. In addition, meta information related to all the objects stored in the static object 1600 is stored in the meta information 1604. Note that specific details of the meta information 1604 may be substantially similar to those of the meta information 306 illustrated in FIG. 5.

2-2-4. Layout Policy Information DB 162

Figure 24:
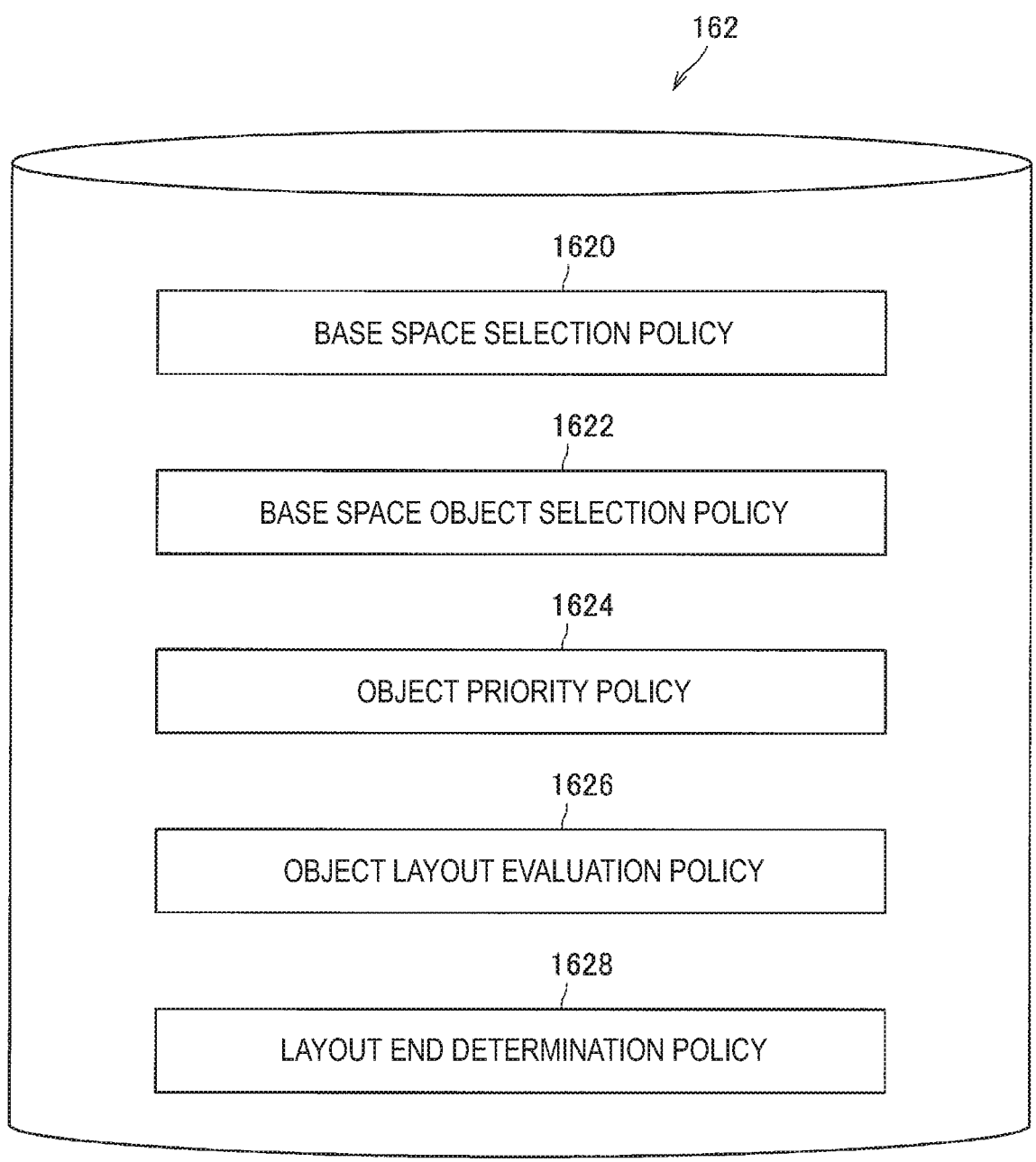
FIG. 24 is an explanatory diagram illustrating a configuration example of a layout policy information DB 162.

The layout policy information DB 162 is a database that stores a policy (reference) for layout of objects in the shared space. FIG. 24 is an explanatory diagram illustrating a configuration example of the layout policy information DB 162. As illustrated in FIG. 24, the layout policy information DB 162 includes a base space selection policy 1620, a base space object selection policy 1622, an object priority policy 1624, an object layout evaluation policy 1626, and a layout end determination policy 1628.

Here, the base space object selection policy 1622 stores a policy (condition) for selecting objects to be arranged in the base space. For example, the base space object selection policy 1622 may stores types of the objects and conditions regarding whether or not (the objects) can be arranged in the base space in an associated manner.

Also, the object priority policy 1624 stores values of the criteria related to the three types of priority described in Section 1-2-1 ("the criteria related to attributes of objects", "the criteria related to relationships with other objects", and "the criteria related to contexts in the shared space") and predefined priority in an associated manner in relation to each of the three types of priority. For example, the object priority policy 1624 stores a "priority table 'type'" that stores priority of each type of objects, a "priority table 'face'" that stores priority of each person, and the like. Here, in the priority table "type", types of objects and priority may be associated, and for example, priority is stored as "1000" in a case in which the type of an object is a "person" or priority is stored as "500" in a case in which the type of an object is a "chair (L)". Also, in the priority table "face", a person and priority may be associated, and for example, priority is stored as "1000" in a case in which a (target) person is "Becky" or priority is stored as "800" in a case in which a person is "Beth".

In addition, the object layout evaluation policy 1626 stores a policy (reference) for evaluating a layout of objects. For example, a plurality of evaluation criteria is registered, and the evaluation criteria and coefficients of the evaluation criteria are associated for each of the evaluation criteria in the object layout evaluation policy 1626. Here, the types of the evaluation criteria are, for example, a total of bottom areas of vacant regions, direction of persons, and the like.

In addition, the layout end determination policy 1628 stores a policy (determination condition) for determining an end of arrangement (layout) of objects in the base space. For example, ending of the arrangement of the objects in the base space in a case in which a proportion of the bottom area of the vacant region (in the base space) becomes "less than 30%", in a case in which a proportion of a volume of the vacant region (in the base space) becomes "less than 50%", or the like may be registered in the layout end determination policy 1628.

Note that each of the aforementioned policies may store (not only one type of reference but also) a plurality of types of reference. In addition, only a reference selected by a user may be stored among a plurality of types of references (in relation to a policy) for each policy. Alternatively, the server 10-2 (shared space generating unit 102) may automatically decide which of the plurality of types of reference (in relation to a policy) is to be used for each policy. For example, the shared space generating unit 102 may decide which of the plurality of types of reference (in relation to the policy) is to be used for each policy on the basis of a context in the shared space or may be decide to use a reference that is associated with a user who is participating in the shared space in advance.

2-2-5. Control Unit 108

The control unit 108 according to the second embodiment updates registered content in the shared object-related information 182 in the object management information DB 164, which will be described later, on the basis of third control information when the third control information is generated. In a case in which an event in which a user has lifted a laptop PC in an original space is delivered from an event recognizing unit 106, for example, the control unit 108 generates third control information for providing an instruction for calculating priority of the laptop PC to be high and also updates details of the shared object-related information on the basis of the third control information. In this manner, the priority calculation unit 400 may calculate the priority B related to the laptop PC to be higher on the basis of the third control information next time priority is calculated. Therefore, it is possible to cause the object corresponding to the recognized event to be displayed with priority.

2-2-6. Object Management Information DB 164

Figure 25:
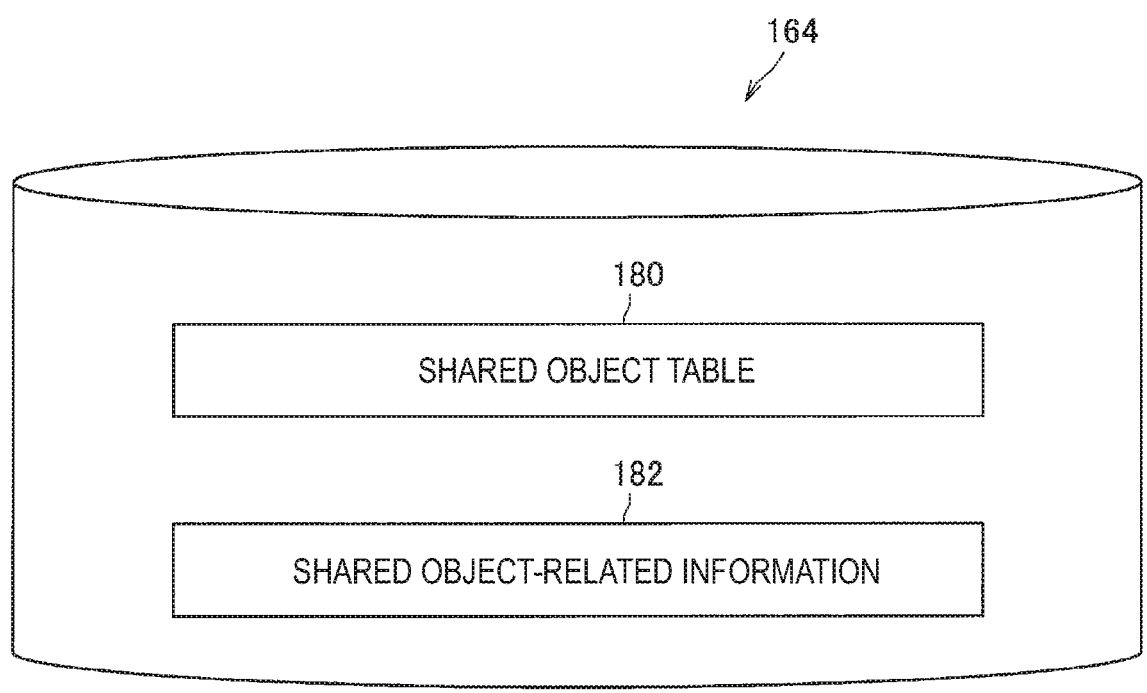
FIG. 25 is an explanatory diagram illustrating a configuration example of an object management information DB 164.

The object management information DB 164 is a database for storing information related to shared objects arranged in the shared space. FIG. 25 is an explanatory diagram illustrating a configuration example of the object management information DB 164. As illustrated in FIG. 25, the object management information DB 164 includes a shared object table 180 and shared object-related information 182.

2-2-6-1. Shared Object Table 180

Figure 26:
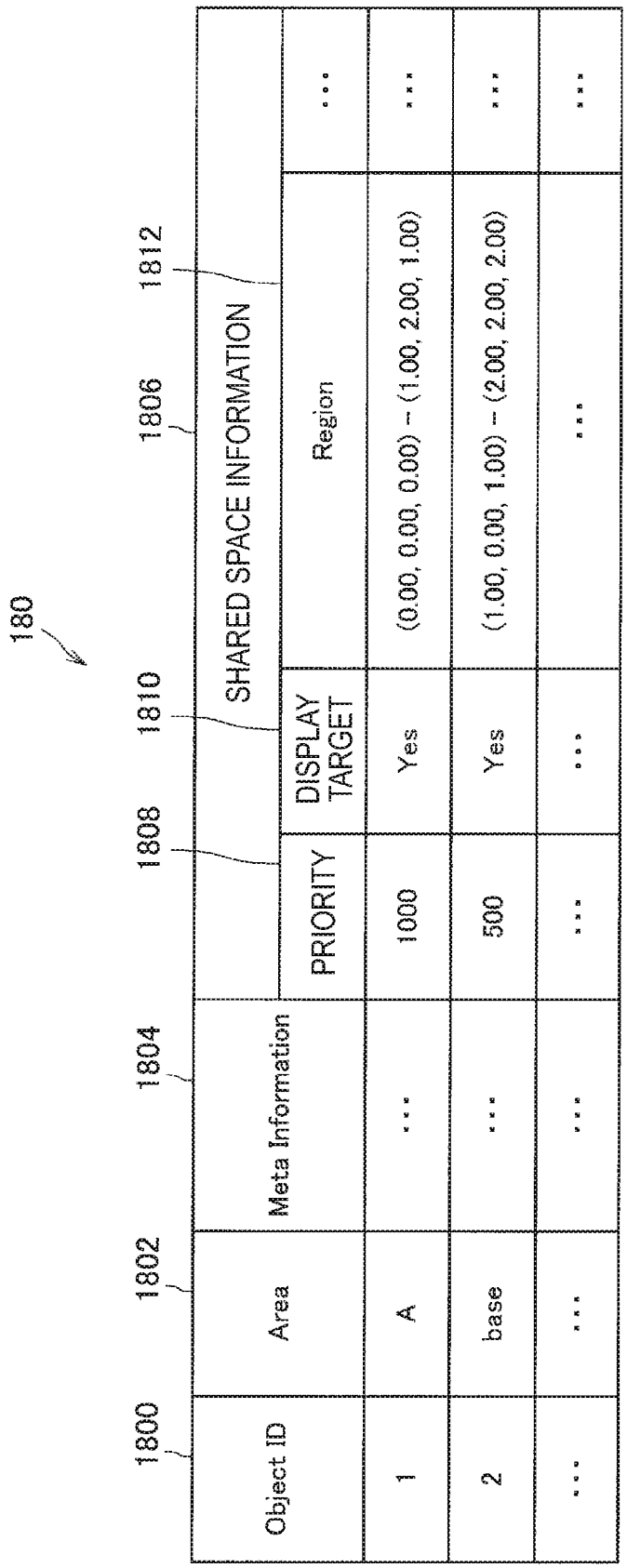
FIG. 26 is an explanatory diagram illustrating a configuration example of a shared object table 180.

The shared object table 180 is a table for storing information related to each object arranged in the shared space. FIG. 26 is an explanatory diagram illustrating a configuration example of the shared object table 180. As illustrated in FIG. 26, object IDs 1800, original spaces 1902, meta information 1804, and shared space information 1806 are associated in the shared object table 180. Here, the shared space information 1806 includes priority 1808, display determination results 1810, region information 1812, and the like. Priority calculated in relation to corresponding objects is recorded in the priority 1808. In addition, whether or not it has been determined that the corresponding objects are targets of display is recorded in the display determination results 1810. Also, information regarding regions (spaces) in which the corresponding objects are arranged in the shared space is recorded in the region information 1812.

2-2-6-2. Shared Object-Related Information 182

The shared object-related information 182 stores information indicating relationships between the shared objects arranged in the shared space and other objects.

Figure 27:
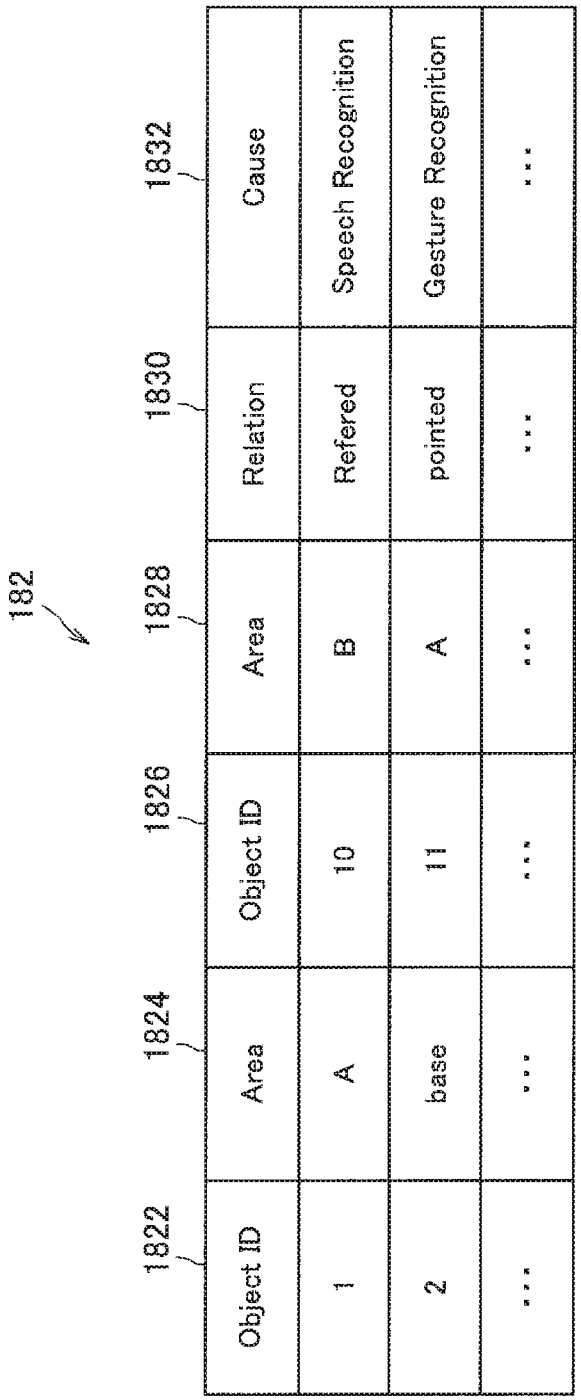
FIG. 27 is an explanatory diagram illustrating a configuration example of shared object-related information 182.

FIG. 27 is an explanatory diagram illustrating a configuration example of the shared object-related information 182. As illustrated in FIG. 27, object IDs 1822, original spaces 1824, object IDs 1826, original spaces 1828, relationships 1830, and reasons 1832 are associated in the shared object-related information 182. Here, object IDs of the respective objects are recorded in the object IDs 1822. In addition, original spaces of the corresponding objects are recorded in the original spaces 1824. In addition, object IDs and original spaces of other object with some relationships with the corresponding objects in the shared space are recorded in the object IDs 1826 and the original spaces 1828, respectively. In addition, information indicating relationships between the corresponding objects and other objects is recorded in the relationships 1830. For example, relationships in which the corresponding objects are referred by other objects (for example, persons), relationships in which the corresponding objects are pointed by other objects (for example, persons), relationships in which the corresponding objects are in dependency relationships with other objects, and the like in the shared space are recorded in the relationships 1830. In addition, methods by which the relationships recorded in the relationships 1830 are specified, reasons for which the relationships have occurred, and the like are recorded in the reasons 1832. For example, sound recognition, gesture recognition, and the like are recorded in the reasons 1832.

2-2-7. Shared Space Synthesizing Unit 152

2-2-7-1. Generation of Shared Space

The shared space synthesizing unit 152 according to the second embodiment generates shared space frame data (content of the free viewpoint) on the basis of frame data of a plurality of real spaces delivered from a synchronizing unit 150 and registered content in the shared space management DB 110. For example, the shared space synthesizing unit 152 extracts layout information of the base space from the base space layout information 160 first. Next, the shared space synthesizing unit 152 decides objects as targets of display from among a plurality of objects in real spaces (original spaces) other than the base space on the basis of registered content in the layout policy information DB 162 and then arrange the objects as the targets of display in the base space, thereby generating a shared space. Then, the shared space synthesizing unit 152 generates shared space frame data on the basis of the shared space.

Figure 28A:
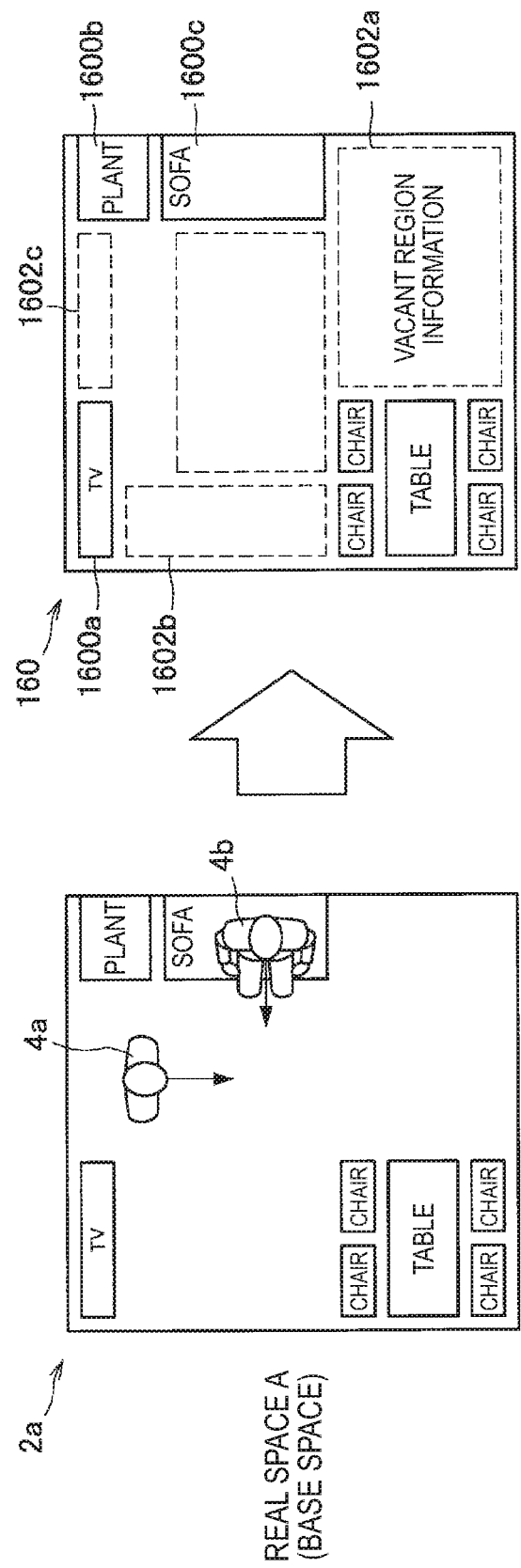
FIG. 28A is an explanatory diagram illustrating a part of a generation example of a shared space according to the second embodiment.
Figure 29:
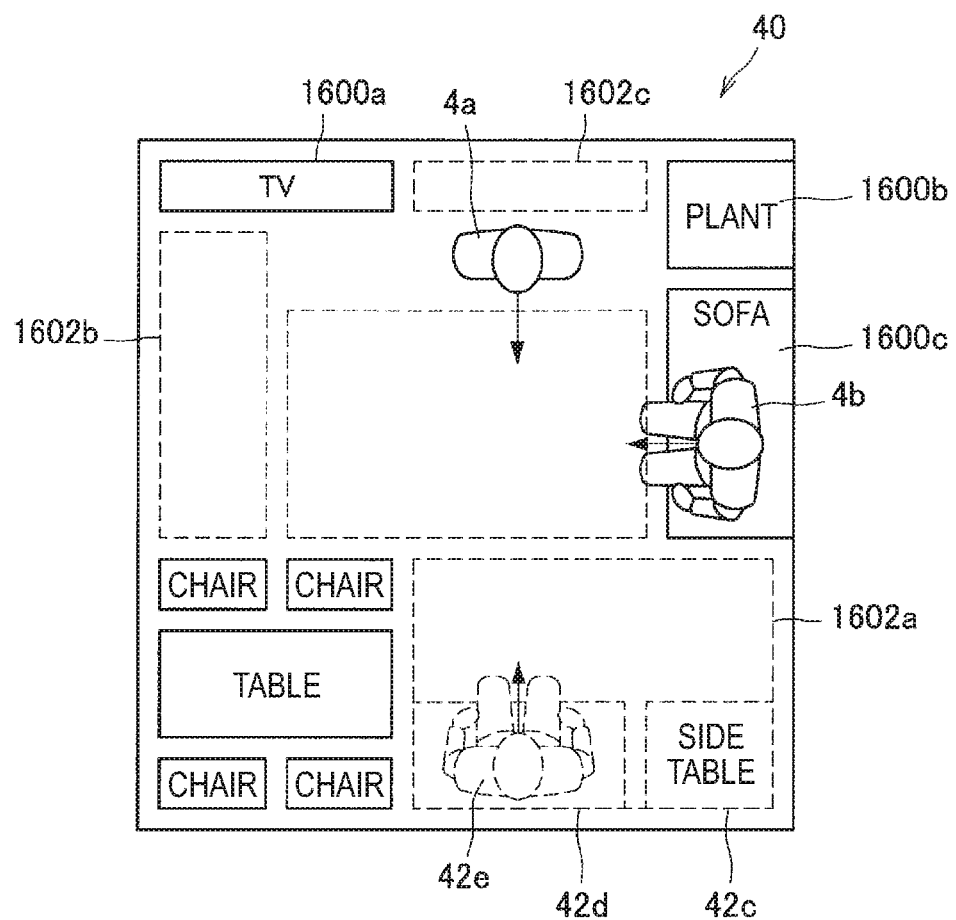
FIG. 29 is an explanatory diagram illustrating a part of a generation example of a shared space according to the second embodiment.

Here, further details of an example in which the shared space is generated will be described with reference to FIGS. 28A, 28B, and 29. Note that FIGS. 28A, 28B, and 29 are on the assumption that a real space 2a has been decided as the base space. Also, FIGS. 28A, 28B, and 29 illustrate an example in which the shared space is generated by objects in the real space 2b being arranged in the base space. Note that FIGS. 28A, 28B, and 29 illustrate top views of the real space 2a and the real space 2b.

As illustrated in FIG. 28A, for example, the base space layout generating unit 158 generates layout information as illustrated in the right diagram of FIG. 28A on the basis of results of recognizing the respective objects (by the input unit 22) in relation to the real space 2a (decided as the base space) first and then stores the layout information in the base space layout information 160. At this time, the base space layout generating unit 158 specifies information 1602 (such as positions, bottom areas, and the like) regarding the vacant region in the base space as illustrated in the right diagram of FIG. 28A and then generates the layout information including the specified results. Note that in a modification example, the base space layout generating unit 158 may regard not only a region in which no objects are arranged but also a part of or all regions in which objects are arranged as vacant regions in the corresponding real space 2a (decided as the base space) and generate layout information.

In addition, as illustrated in FIG. 28B, the respective objects 42 in the real space 2b may be specified as illustrated in the right diagram of FIG. 28B on the basis of the results of recognizing the objects (by the input unit 22) in relation to the real space 2b.

Thereafter, the priority calculation unit 400 calculates priority of the respective objects 42 in the real space 2b on the basis of detains registered in the object priority policy 1624. Then, the shared space synthesizing unit 152 arranges the respective objects 42 in layout (that the base space layout information 160 indicates) in the order from the objects 42 with higher priority calculated, on the basis of registered content in the object layout evaluation policy 1626. For example, the shared space synthesizing unit 152 arranges the objects 42 in the real space 2b in the layout one by one until any of determination conditions (for ending the arrangement of the objects) stored in the layout end determination policy 1628 is satisfied. FIG. 29 is a diagram (top view) illustrating an example of a shared space 40 after generation. FIG. 29 illustrates an example in which a chair 42d, a side table 42c, and a user 42e in the real space 2b are arranged in a vacant region 1602a and the other objects are not arranged in the shared space 40.

According to the generation example, the shared space can be generated by the objects in the base space and the objects in the real space 2 other than the base space being appropriately arranged in the base space.

2-2-7-2. Granting of Authority to User

When Space Sharing is Started

Further, the shared space synthesizing unit 152 can grant authority to access the object in the base space to the user 4b located in the real space other than the base space among one or more the user 4 participates in the shared space. For example, the shared space synthesizing unit 152 grants (unconditionally) authority to access a device in the base space to the user 4b. Here, the device may include a home network device, an Internet of things (IoT) device, or the like. For example, the device includes an audio-visual (AV) device, a lighting device, an air conditioner, or the like.

Further, in a case in which reproduction of certain content is started in the base space after the content of the free viewpoint is generated, the shared space synthesizing unit 152 can provide (share) information for enabling the content in the real space other than the base space to be reproduced (hereinafter referred to as "reproduction information") to (with) the user 4b located in the real space. Here, the reproduction information may include, for example, channel information of a program displayed by a television receiver in the shared space and a uniform resource locator (URL) of a web page displayed on a web browser being activated on a predetermined terminal in the shared space. Further, the reproduction information may include a URL of network streaming content (such as video streaming content), information of a current reproduction time, authority information of the user 4a located in (the same place as) the base space related to the network streaming content, and the like. According to the processing example, it is also possible for the user 4b who is located in a real space that is different from the base space to freely access devices in the base space and shared content in the base space. For example, the user 4b can reproduce the content in the real space 2b at the same timing as the reproduction timing of the shared content being reproduced in the base space. Therefore, it is possible to give the user 4b a sensation as if they were together in the same space.

Granting of Authority to New User

Also, in a case in which an operation for the user 4a who has not participated in the shared space joining the shared space is detected, the shared space synthesizing unit 152 can grant an authority to access the objects in the base space to the user 4a and to provide the aforementioned information for reproduction to the user 4a.

2-3. Flow of Process 2-3-1. Overall Flow of Process

Figure 30:
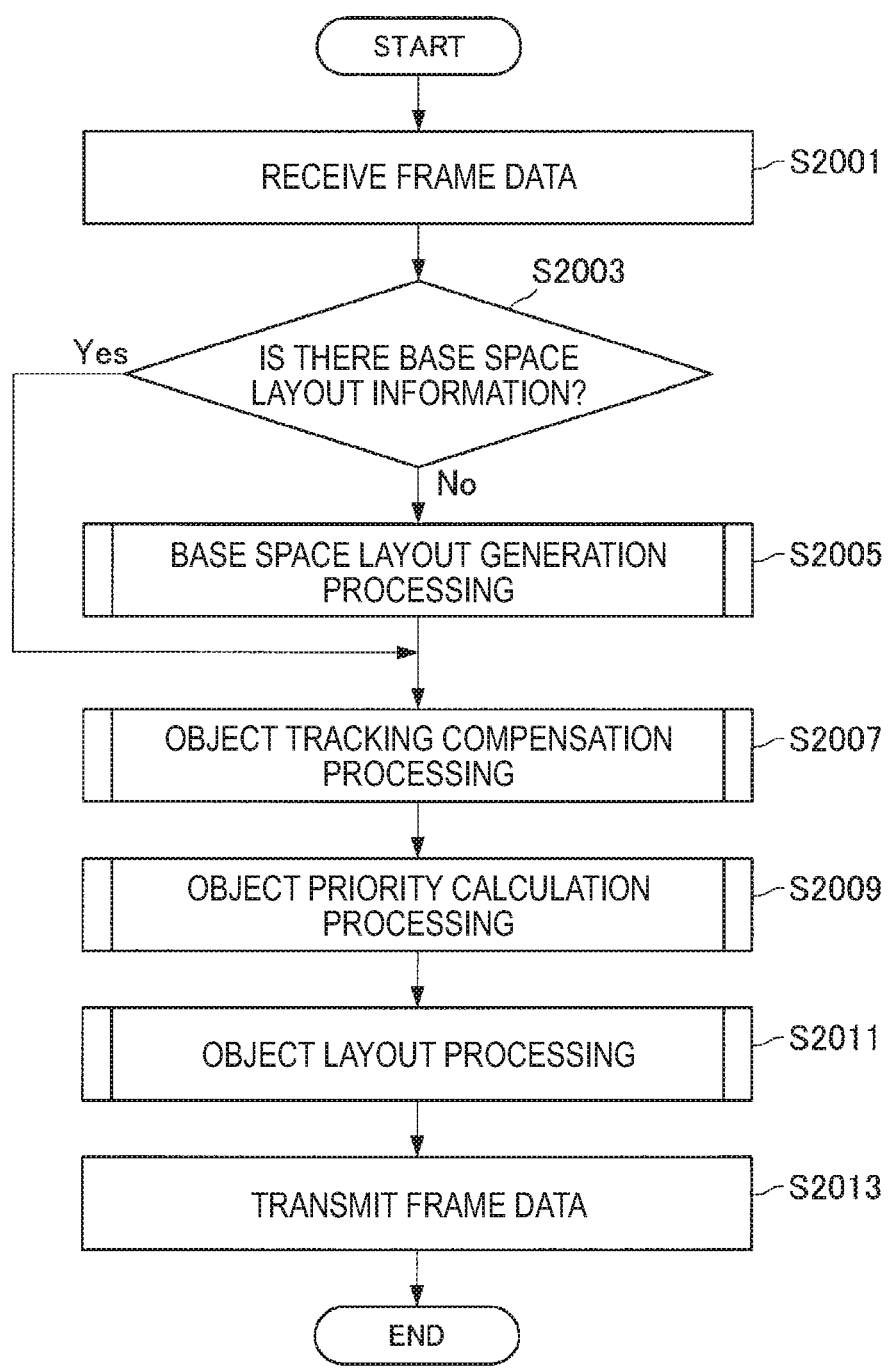
FIG. 30 is a flowchart illustrating a flow of a process according to a second embodiment.

The configuration according to the second embodiment has been configured as described above. Next, a flow of a process according to the second embodiment will be described with reference to FIGS. 30 to 36. FIG. 30 is a flowchart illustrating an overall flow of the processing according to the second embodiment. As illustrated in FIG. 30, the server 10-2 first receives frame data from the respective input units 22 in original spaces of the respective users who participate in a shared space (S2001). Next, in a case in which base space layout information 160 has already been created (S2003: Yes), the shared space managing unit 100-2 performs processing in S2007, which will be described later.

Meanwhile, in a case in which the base space layout information 160 has not been created (S2003: No), the base space layout generating unit 158 performs a "base space layout generation process", which will be described later (S2005).

Thereafter, the shared space synthesizing unit 152 performs an "object tracking compensation process", which will be described later (S2007). Then, the shared space synthesizing unit 152 performs an "object priority calculation process", which will be described later (S2009). Thereafter, the shared space synthesizing unit 152 performs "object layout processing", which will be described later (S2011).

Thereafter, a delivering unit 154 generates frame data to be transmitted to output units 24 in the real spaces for the respective real spaces (original spaces) on the basis of the shared space frame data generated in S2011. Then, the server 10-2 transmits frame data corresponding to the real spaces to the output units 24 of the real spaces for the respective real spaces (S2013).

2-3-2. Base Space Layout Generation Process

Figure 31:
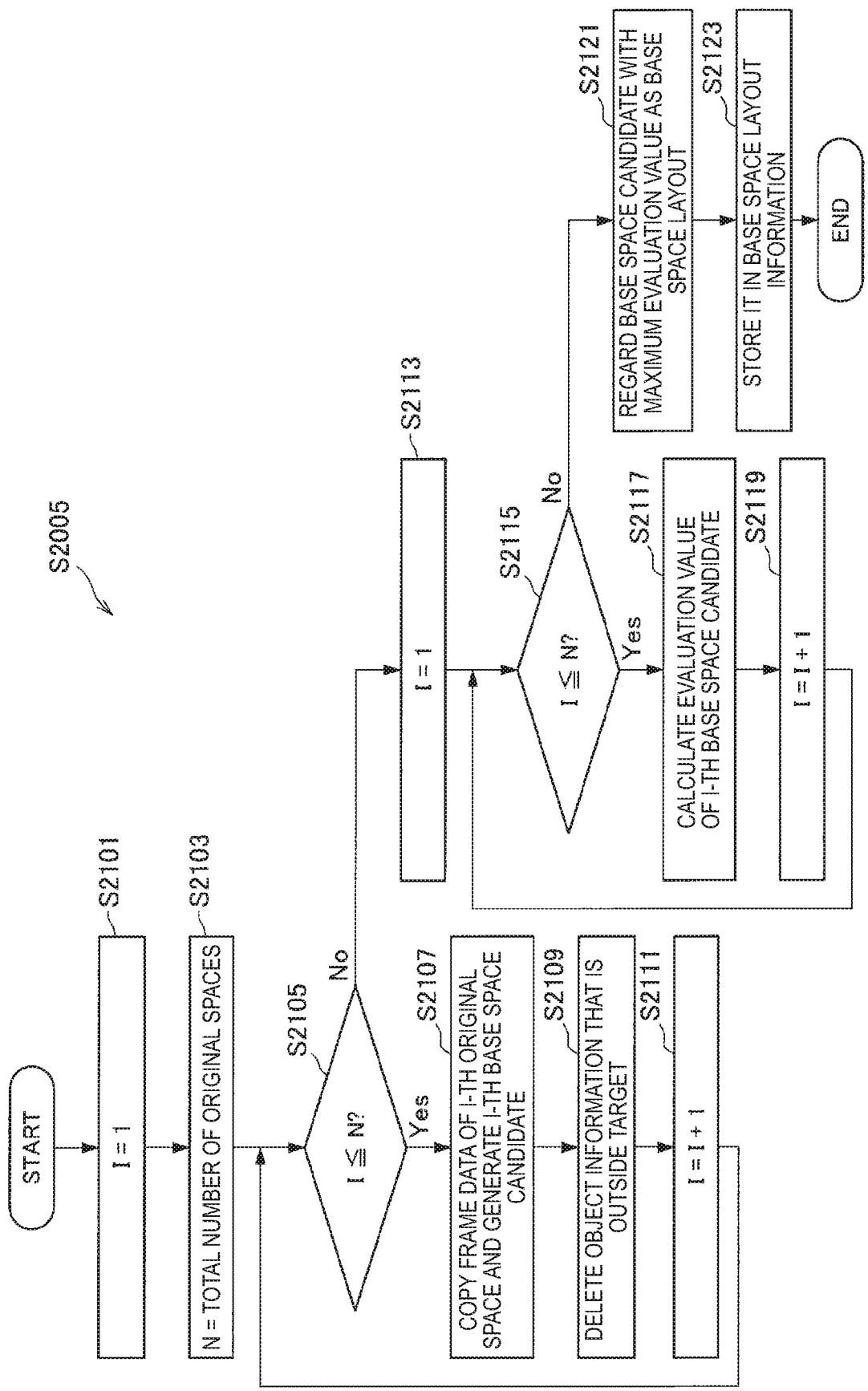
FIG. 31 is a flowchart illustrating a flow of a "base space layout generation process" according to the second embodiment.

Next, details of the "base space layout generation process" in S2005 will be described in detail with reference to FIG. 31. As illustrated in FIG. 31, the base space layout generating unit 158 first sets "1" as a variable I indicating the numbers of the original spaces of targets of processing (S2101). Then, the base space layout generating unit 158 sets the total number of the original spaces to N (S2103).

Then, as long as I is equal to or less than N (S2105: Yes), the base space layout generating unit 158 repeats the following processing in S2107 to S2111. Specifically, the base space layout generating unit 158 first generates I-th base space candidates by copying an I-th original space (S2107). Next, the base space layout generating unit 158 determines whether or not the respective objects included in the I-th base space candidates are targets of display on the basis of the base space object selection policy 1622 and then deletes objects that are determined not to be targets of display from the I-th base space candidate (S2109). Then, the base space layout generating unit 158 adds "1" to I (S2111). Thereafter, the base space layout generating unit 158 performs the processing in S2105 again.

In a case in which I becomes greater than N in S2105 (S2105: No), the base space layout generating unit 158 resets I to "1" (S2113).

Then, as long as I is equal to or less than N (S2115: Yes), the base space layout generating unit 158 repeats the following processing in S2117 to S2119. Specifically, the base space layout generating unit 158 first calculates evaluation values of the I-th base space candidates on the basis of the base space selection policy 1620 (S2117). Then, the base space layout generating unit 158 adds "1" to I (S2119). Thereafter, the base space layout generating unit 158 repeats the processing in S2115 again.

In a case in which I becomes greater than N in S2115 (S2115: No), the base space layout generating unit 158 specifies a base space candidate with the maximum evaluation value from among the evaluation values of the respective base space candidates calculated in S2117. Then, the base space layout generating unit 158 decides the specified base space candidate as a base space (S2121).

Thereafter, the base space layout generating unit 158 stores layout in the decided base space in the base space layout information 160 (S2123).

2-3-3. Object Tracking Compensation Process

Figure 32:
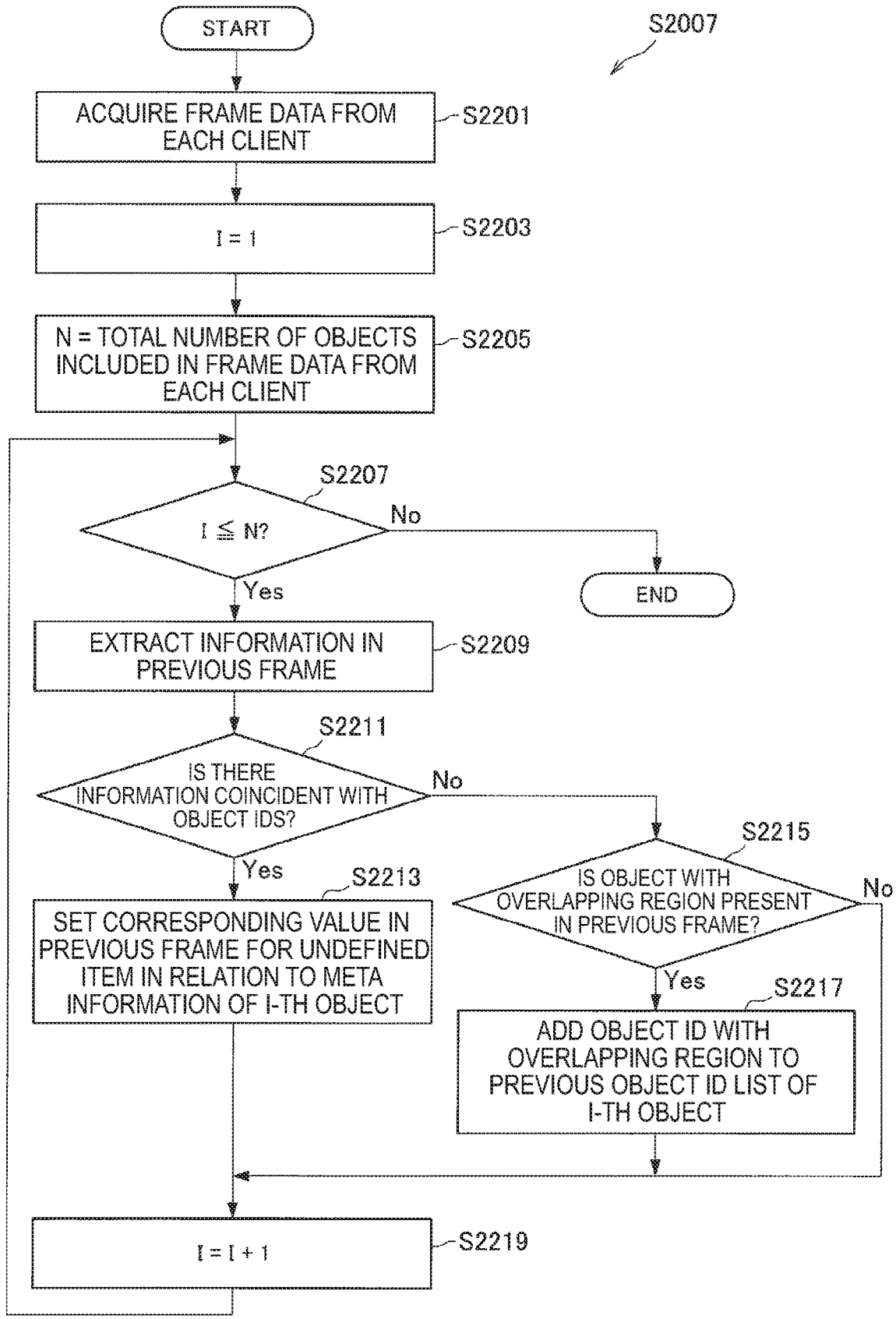
FIG. 32 is a flowchart illustrating a flow of an "object tracking compensation process" according to the second embodiment.

Next, details of the "object tracking compensation process" in S2007 will be described in detail with reference to FIG. 32. As illustrated in FIG. 32, the synchronizing unit 150 first delivers frame data received from the input units 22 in the respective original spaces to the shared space synthesizing unit 152 (S2201).

Next, the shared space synthesizing unit 152 sets "1" to a variable I indicating numbers of objects as targets of processing (S2203). Then, the shared space synthesizing unit 152 sets the total number of objects included in all pieces of the frame data acquired in S2201 to N (S2205).

Then, as long as I is equal to or less than N (S2207: Yes), the shared space synthesizing unit 152 repeats the following processing in S2209 to S2219. Note that in a case in which I is greater than N (S2207: No), this "object tracking compensation process" ends.

Specifically, the shared space synthesizing unit 152 first extracts information in a previous frame from the object management information DB 164 (S2209). Then, the shared space synthesizing unit 152 determines whether or not information with the same object ID as that of the I-th object is present in the information extracted in S2209 (S2211).

In a case in which the information with the coincident object ID is present (S2211: Yes), the shared space synthesizing unit 152 determines whether nor not there is an item with a non-defined (blank) value among the respective items included in meta information of the I-th object first. Then, in a case in which an item with a non-defined value is present, the shared space synthesizing unit 152 extracts a value of the corresponding item included in the information extracted in S2209 and then sets the extracted value to the corresponding item in the meta information (S2213). Then, the shared space synthesizing unit 152 performs processing in S2219, which will be described later.

Meanwhile, in a case in which the information with a coincident object ID is not present in S2211 (S2211: No), then the shared space synthesizing unit 152 determines whether or not an object with a region overlaid with that of the I-th object is present in the previous frame extracted in S2209 (S2215). In a case in which the object with the overlaid region is not present in the previous frame (SS2215: No), the shared space synthesizing unit 152 performs processing in S2219, which will be described later.

Meanwhile, in a case in which the object with the overlaid region is present in the previous frame (S2215: Yes), the shared space synthesizing unit 152 adds an object ID of the object with the overlaid region to a preceding object ID list of the I-th object (S2217).

Then, the shared space synthesizing unit 152 adds "1" to I (S2219). Thereafter, the shared space synthesizing unit 152 performs the processing in S2207 again.

2-3-4. Object Priority Calculation Process

Figure 33:
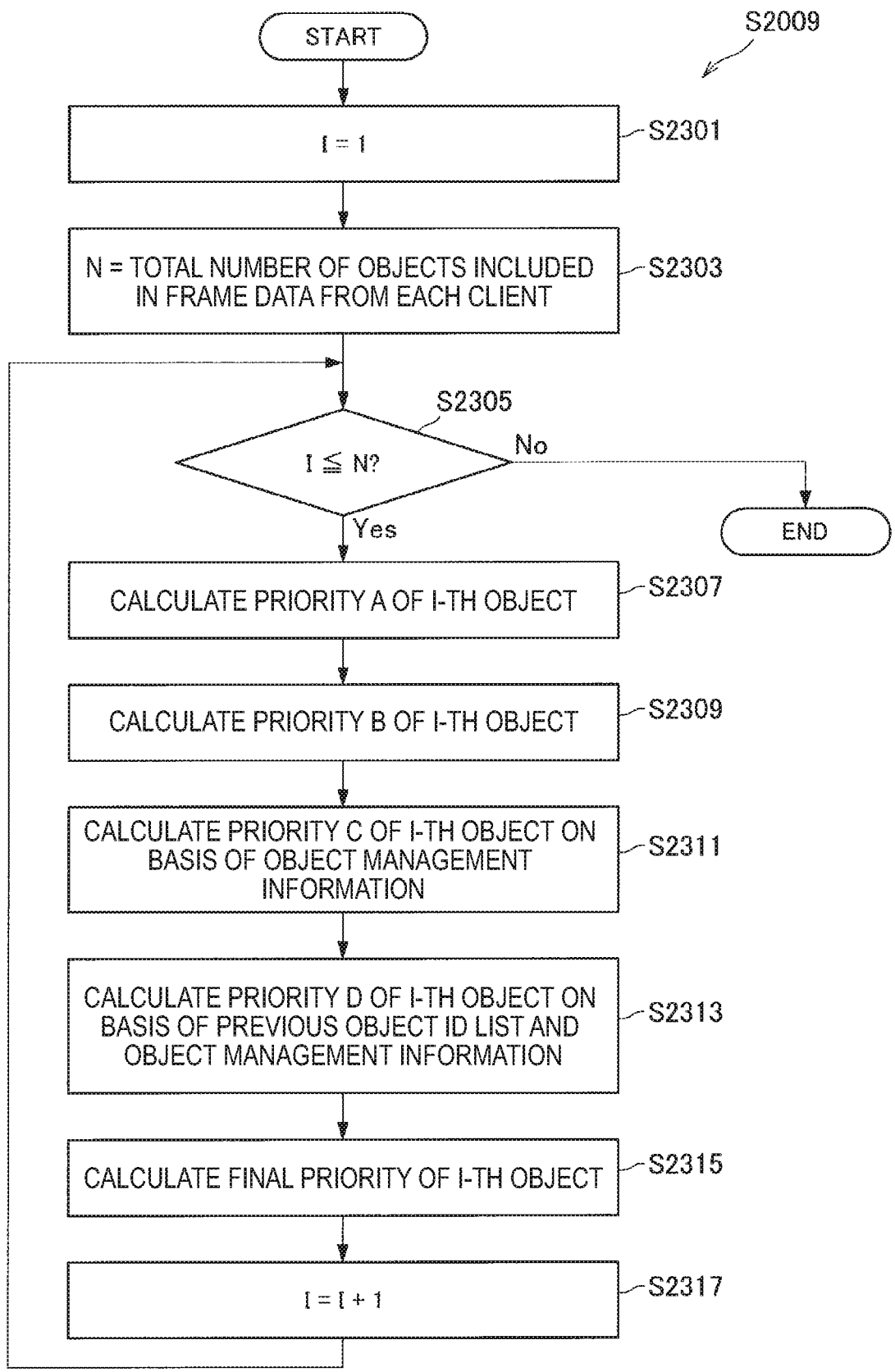
FIG. 33 is a flowchart illustrating a flow of an "object priority calculation process" according to the second embodiment.

Next, details of the "object priority calculation process" in S2009 will be described in detail with reference to FIG. 33. As illustrated in FIG. 33, the shared space synthesizing unit 152 first sets "1" to the variable I indicating the number of objects as targets of processing (S2301). Then, the shared space synthesizing unit 152 sets the total number of objects included in the frame data received from the input units 22 in the respective original spaces to N (S2303).

Then, as long as I is equal to or less than N (S2305: Yes), the shared space synthesizing unit 152 repeats the following processing in S2307 to S2317. Note that in a case in which I is greater than N (S2305: No), this "object priority calculation process" ends.

Specifically, the priority calculation unit 400 extracts the I-th object from the frame data acquired from the respective original spaces first. Then, the priority calculation unit 400 calculates priority related to attributes of the I-th object (hereinafter, also referred to as priority A of the I-th object in some cases) on the basis of the object priority policy 1624 (S2307).

Next, the priority calculation unit 400 calculates priority of the I-th object related to relationships with other objects (hereinafter, also referred to as priority B of the I-th object) on the basis of the object priority policy 1624 (S2309).

Then, the priority calculation unit 400 calculates priority of the I-th object related to context in the shared space (hereinafter, also referred to as priority C of the I-th object in some cases) on the basis of the object priority policy 1624 and the object management information DB 164 (S2311).

Then, the priority calculation unit 400 calculates priority related to a display status of the I-th object (hereinafter, also referred to as priority D of the I-th object in some cases) on the basis of the preceding object ID list of the I-th object and the object management information DB 164 (S2313). For example, if the I-th object is displayed in the previous frame, the priority calculation unit 400 calculates the priority D of the I-th object as a predetermined value (that is greater than "0"). In addition, if the I-th object is not displayed in the previous frame, the priority calculation unit 400 calculates the priority D of the I-th object as "0".

Next, the priority calculation unit 400 calculates final priority of the I-th object on the basis of the priority A, the priority B, the priority C, and the priority D of the I-th object calculated in S2307 to S2313 (S2315).

Then, the priority calculation unit 400 adds "1" to I (S2317). Thereafter, the priority calculation unit 400 performs the processing in S2305 again.

2-3-5. Object Layout Processing

Figure 34:
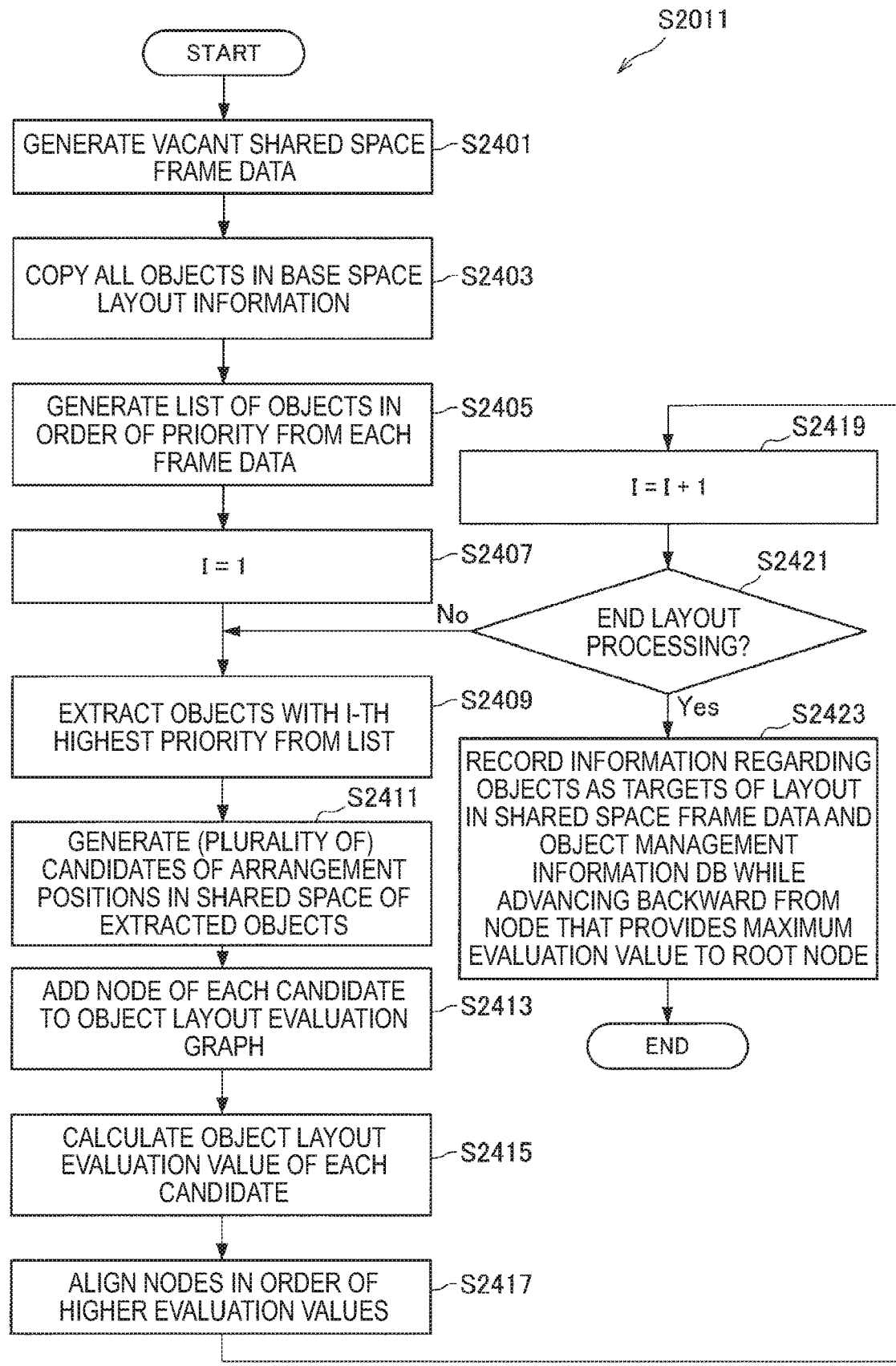
FIG. 34 is a flowchart illustrating a flow of "object layout processing" according to the second embodiment.
Figure 35:
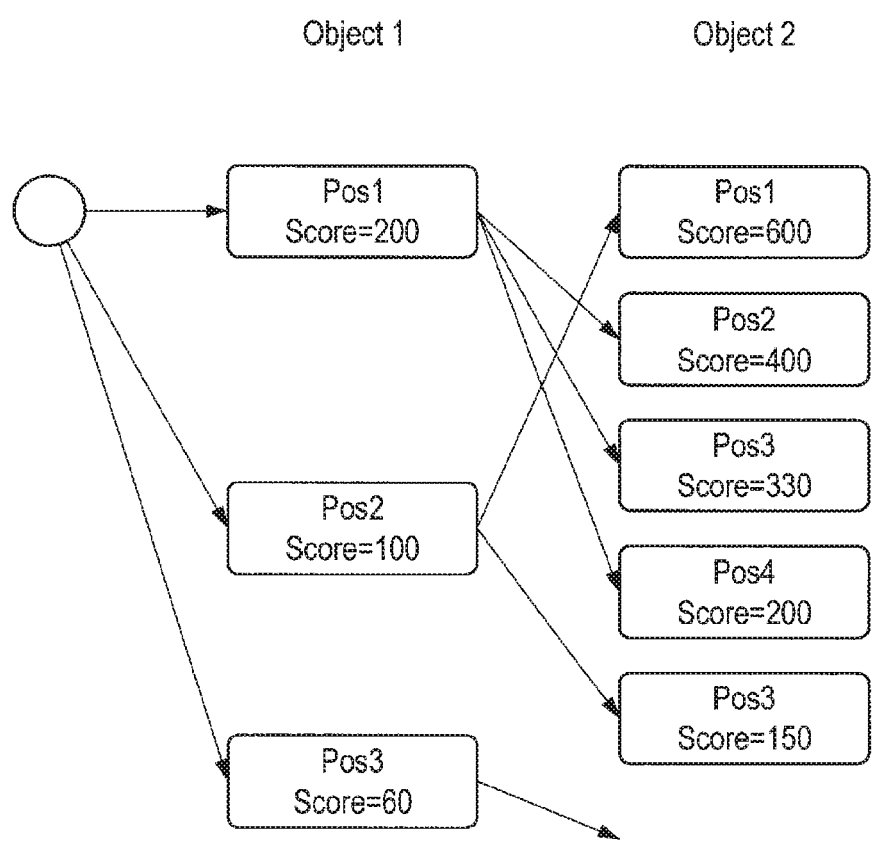
FIG. 35 is an explanatory diagram illustrating a generation example of an object layout evaluation graph.

Next, details of the "object layout processing" in S2011 will be described in detail with reference to FIGS. 34 to 36. As illustrated in FIG. 34, the shared space synthesizing unit 152 first generates vacant shared space frame data (S2401).

Next, the shared space synthesizing unit 152 copies all the objects stored in the base space layout information 160 to the generated shared space frame data (S2403).

Next, the shared space synthesizing unit 152 generates a list indicating an order of objects with high priority calculated in S2009 in relation to the objects included in the frame data acquired from each of all the original spaces other than the base space (S2405).

Next, the shared space synthesizing unit 152 sets "1" to a variable I indicating numbers of objects as targets of processing (S2407).

Next, the shared space synthesizing unit 152 extracts an object with the I-th highest priority from the list generated in S2405 (S2409). Then, the shared space synthesizing unit 152 generates a plurality of candidates of an arrangement position in relation to the extracted object in the shared space (S2411). Then, the shared space synthesizing unit 152 adds a node to an object layout evaluation graph as illustrated in FIG. 35, for example, in relation to the respective generated candidates (S2413). For example, FIG. 35 illustrates an example in which three candidates (Pos1, Pos2, and Pos3) of the position at which an "object 1" can be arranged are generated in a case in which I is "1" ("object 1"). In this case, the shared space synthesizing unit 152 adds nodes that respectively correspond to the three candidates in the object layout evaluation graph as illustrated in FIG. 35.

Next, the shared space synthesizing unit 152 calculates object layout evaluation values of the candidates on the basis of the object layout evaluation policy 1626 in relation to the respective generated candidates and then records the calculated object layout evaluation value in the nodes corresponding to the candidates (S2415).

Thereafter, the shared space synthesizing unit 152 aligns the nodes in an order from the candidates with the higher object layout evaluation values (S2417). In the example illustrated in FIG. 35, for example, the shared space synthesizing unit 152 aligns the nodes corresponding to the respective candidates in the order from the higher object layout evaluation values (that is, the order of Pos1, Pos2, and Pos3) in relation to the three candidates related to the "object 1".

Then, the shared space synthesizing unit 152 adds "1" to I (S2419). Then, the shared space synthesizing unit 152 determines whether or not to end the layout processing on the basis of the layout end determination policy 1628 (S2421). In a case in which it is determined not to end the layout processing (S2421: No), the shared space synthesizing unit 152 performs the processing in and after S2409 again.

Meanwhile, in a case in which it is determined to end the layout processing (S2421: Yes), the shared space synthesizing unit 152 specifies an arrangement position at which the evaluation value in the object layout evaluation graph is the maximum in relation to the final node first. FIG. 36 is an explanatory diagram illustrating an example of the object layout evaluation graph at a timing when the layout processing ends. In the example illustrated in FIG. 36, the shared space synthesizing unit 152 specifies that the arrangement position with the maximum evaluation value is "Pos14" in relation to an "object X" that is the last object at the timing at which the layout processing ends.

Figure 36:
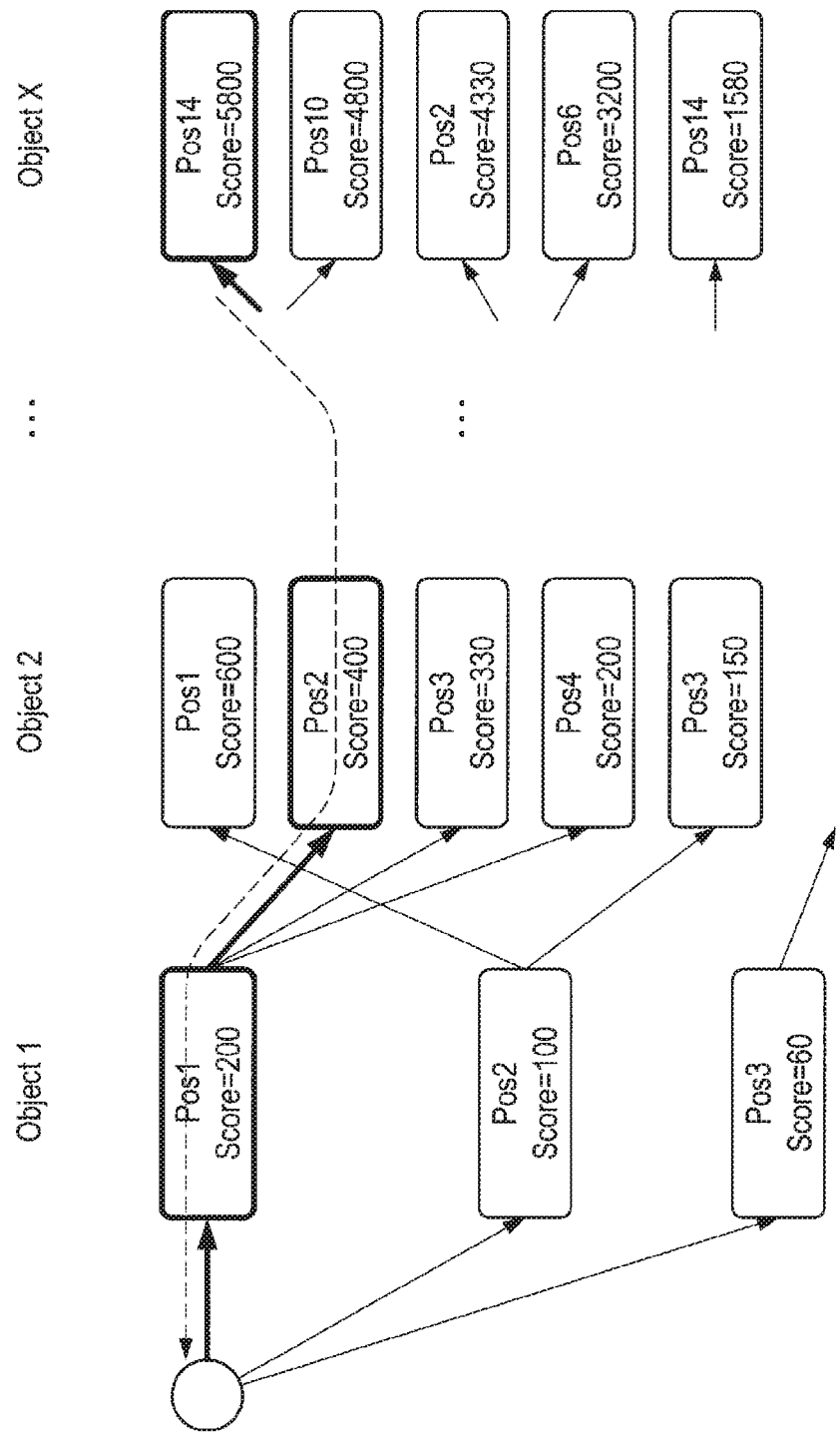
FIG. 36 is an explanatory diagram illustrating an example of an object layout evaluation graph at a timing when layout processing ends.

Thereafter, the shared space synthesizing unit 152 successively specifies arrangement positions of the respective objects as targets of layout while advancing backward from the last node to a root node as represented by the arrow of the broken line in FIG. 36, for example. Then, the shared space synthesizing unit 152 successively records information regarding the respective specified objects (such as arrangement positions) in the shared space frame data and the object management information DB 164 (S2423).

2-4. Advantages

According to the second embodiment, the server 10-2 decides a base space on the basis of the layout policy information DB 162 and arranges objects in the base space and objects in other original spaces in a shared space while placing priority on the objects located in the base space as described above. In a case in which the user 4a in the space 2a is wearing an AR device and the user 4b in the space 2b is wearing a VR device, for example, the server 10-2 decides the space 2a as a base space and then arranges objects in the space 2a with higher priority (than that of objects in the space 2b) in the shared space. In this manner, it is possible to generate a shared space that provide high satisfaction to both the user 4a and the user 4b.

2-5. First Application Example 2-5-1. Display Control for Objects when AR Device is Used The second embodiment has been described above. Next, a first application example of the second embodiment will be described. According to the first application example, it is possible to perform control such that video images that are more suitable for AR devices are displayed on the display units 246 in a case in which the display units 246 are the AR devices.

In relation to real spaces in which the display units 246 are AR devices, for example, the sensor units 220 of the input units 22 set all objects in the real spaces as "AR objects" and record the objects in meta information when frame data is generated. Then, the shared space synthesizing unit 152 of the server 10-2 arranges the objects set as the "AR objects" with higher priority (than that of objects that have not been set as the "AR objects").

Note that the server 10-2 may perform control such that content of the free viewpoint that does not include video images of the objects that have been set as the "AR objects" is transmitted to the original spaces of the objects. In a case in which objects included in the generated shared space frame data are set as "AR objects" and real spaces as transmission destinations are original spaces of the objects, for example, the server 10-2 generate a stream by excluding the objects and then transmits the generated stream to the real spaces. In this manner, the video images of the objects that have been set as the "AR objects" are not displayed in the original spaces of the objects.

Alternatively, it is also possible to perform control such that the output units 24 do not display the corresponding "AR objects". In a case in which the display units 246 is AR devices, for example, the output units 24 specify objects that have been set as the "AR objects" and that are in real spaces in which the output units 24 are located, from among the plurality of objects included in the stream (shared space frame data) received from the server 10-2 first. Then, the output units 24 performs control such that the display units 246 are not caused to display the specified objects.

2-5-2. Shielded Expression/Rewritten Expression

Also, in a case in which the display unit 246 is an AR device, the server 10 (such as a control information transmitting unit 122) or the output units 24 including the display units 246 can cause the display units 246 to display the content of the free viewpoint using a rewritten expression or a shielded expression. Here, the rewritten expression is principally a display method of causing the display units 246 to display the content of the free viewpoint such that only the content of the free viewpoint is visually recognized. That is, in a case in which a rewritten expression is used, actual objects in real spaces in which users are located are principally not visually recognized by the users as long as the actual objects have not been selected as targets of display. Also, the shielded expression is a display method of causing the display units 246 to display the content of the free viewpoint such that a part of virtual objects in the content of the free viewpoint are shielded by actual objects in the real spaces on the basis of relationships of positions of the users in the real spaces, positions of the actual objects in the real spaces, and the virtual objects in the content of the free viewpoint.

2-5-2-1 Rewritten Expression

Figure 37:
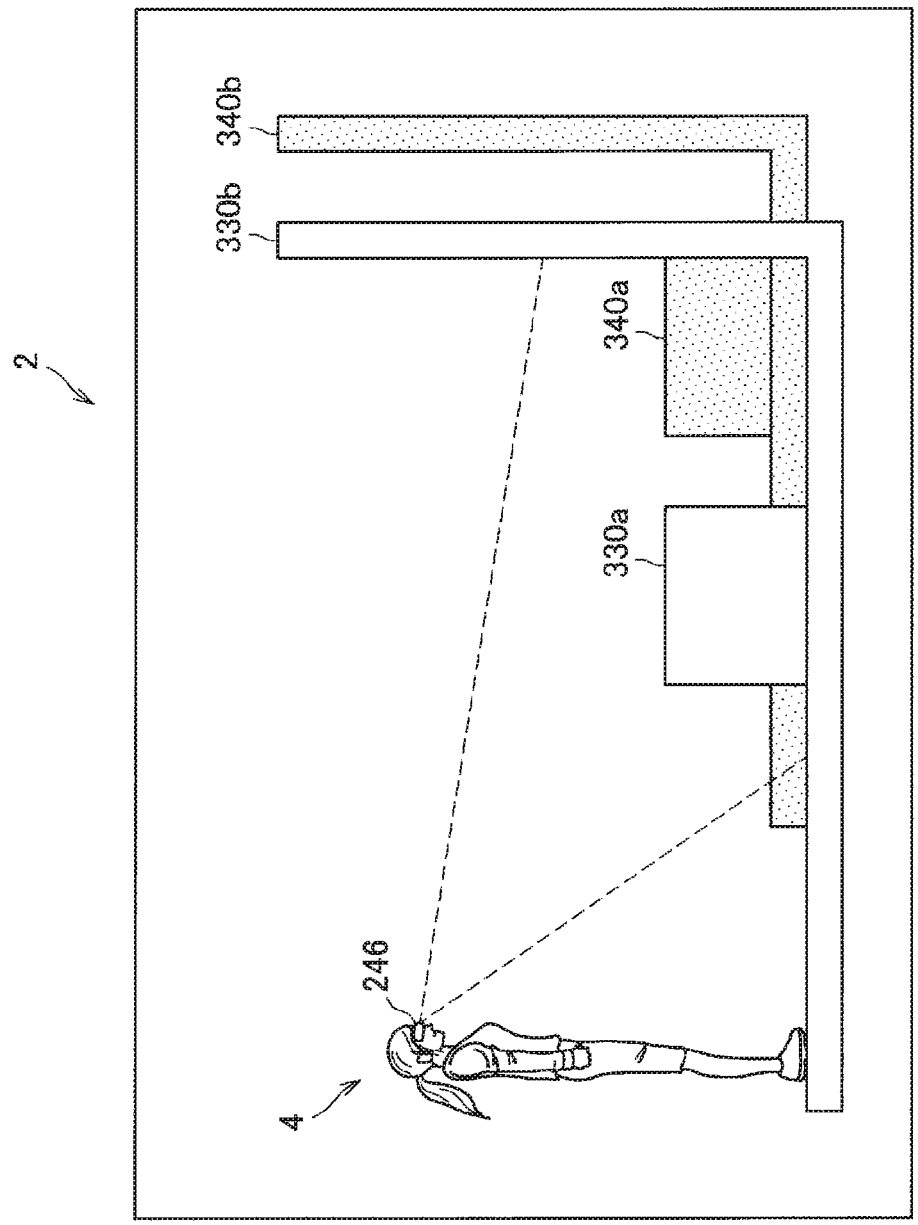
FIG. 37 is an explanatory diagram illustrating an example of positional relationships among a user 4 in a real space 2, a plurality of actual objects 330, and a plurality of virtual objects 340.
Figure 38A:
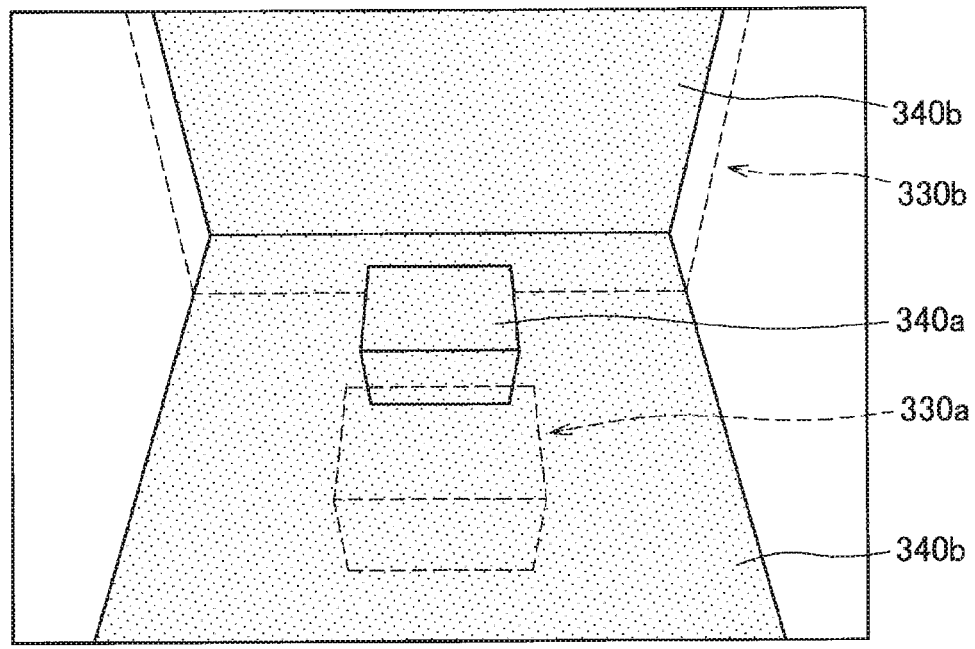
FIG. 38A is an explanatory diagram illustrating an example in which content of the free viewpoint is displayed using a rewritten expression in the situation illustrated in FIG. 37.

Here, further details of the "rewritten expression" and the "shielded expression" will be described in further detail with reference to FIGS. 37, 38A, and 38B. FIG. 37 is an explanatory diagram illustrating an example of a positional relationships among a user 4 in a real space 2, a plurality of actual objects 330 in the real space, and a plurality of virtual objects 340 in content of the free viewpoint (that the user 4 is viewing). In a case in which the content of the free viewpoint is expressed using a rewritten expression in a situation illustrated in FIG. 37, for example, the user 4 visually recognizes a scenery as illustrated in FIG. 38A via a display unit 246. Here, as represented by the broken line, video images of an actual object 330a and an actual object 330b in the real space 2 may be displayed on the display unit 246 as if the actual object 330a and the actual object 33b were rewritten by the content of the free viewpoint. Therefore, the actual object 330a and the actual object 330b are not visually recognized by the user 4. Therefore, the user 4 may strongly feel as if the user 4 were in the shared space.

2-5-2-2. Shielded Expression

Figure 38B:
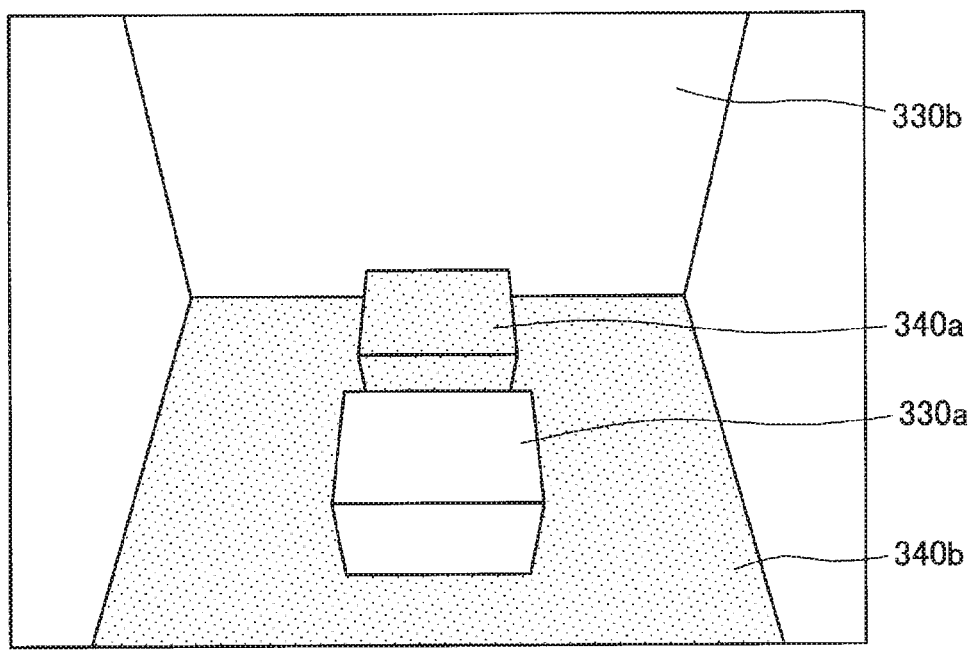
FIG. 38B is an explanatory diagram illustrating an example in which content of the free viewpoint is displayed using a blocked expression in the situation illustrated in FIG. 37.

In a case in which the content of the free viewpoint is expressed using a shielded expression in a situation illustrated in FIG. 37, for example, the user 4 visually recognizes a scenery as illustrated in FIG. 38B via the display unit 246. As illustrated in FIG. 38B, an object located on a closer side can be visually recognized by the user 4 via the display unit 246 on the basis of results of detecting a point-of-view position and a visual line direction of the user 4, for example, from among the plurality of actual objects 330 and the plurality of virtual objects 340 illustrated in FIG. 37. In this manner, the user 4 can check actual objects in the surroundings while visually recognizing the content of the free viewpoint, for example. Therefore, a risk that the user 4 erroneously collides against the actual objects in the surrounding is reduced.

2-5-2-3. Utilization of Both Rewritten Expression and Shielded Expression

Alternatively, the server 10 (control information transmitting unit 122 or the like) or an output unit 24 including the display unit 246 can also cause the display unit 246 to display the content of the free viewpoint using both a rewritten expression and a shielded expression.

Here, further details of the aforementioned functions will be described with reference to FIGS. 39 to 41. Note that it is assumed that the real space 2b illustrated in FIG. 39 is set as a base space and a shared space and content of the free viewpoint are generated on the basis of a plurality of objects 330 in the real space 2a and a plurality of objects 332 in the real space 2b here. Also, it is assumed that a display unit 246a in the real space 2a is an AR device.

Figure 40:
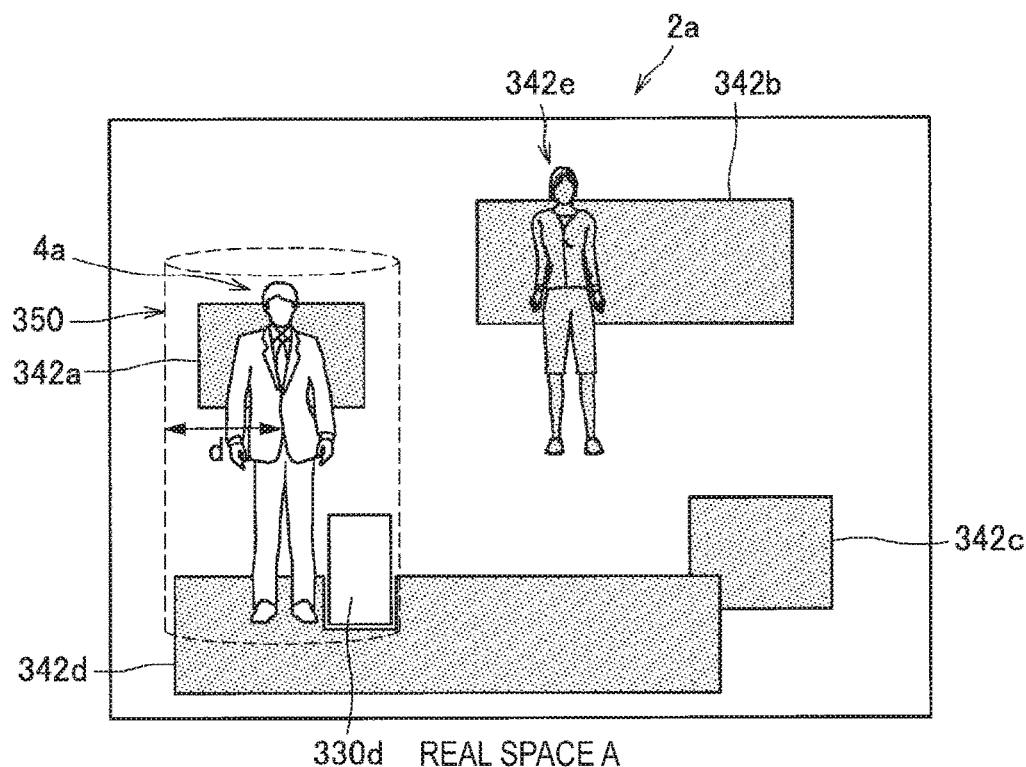

In this case, as illustrated in FIG. 40, the server 10 or the output unit 24a in the real space 2a may cause the display unit 246a to display the content of the free viewpoint by using the shielded expression in a predetermined range (the distance "d" in the example illustrated in FIG. 40) from the position of the user 4a in the real space 2 and using the rewritten expression outside the predetermined range from the position of the user 4a. Note that FIG. 40 illustrates the respective virtual objects 342 in the content of the free viewpoint with hatching and illustrates the actual objects in the real space 2a without hatching. As illustrated in FIG. 40, only a part within the predetermined range, for example, of the actual object 330d located in the predetermined range from the position of the user 4a may be visually recognized by the user 4a (without being rewritten by the virtual object 342d in the content of the free viewpoint). In this manner, it is possible to provide an experience as if the user 4a were in the shared space to the user 4a and to secure safety of the user 4a. Here, the predetermined range may be automatically set or may be designated by the user through an operation performed on a UI displayed on the display unit 246, for example.

Figure 41:
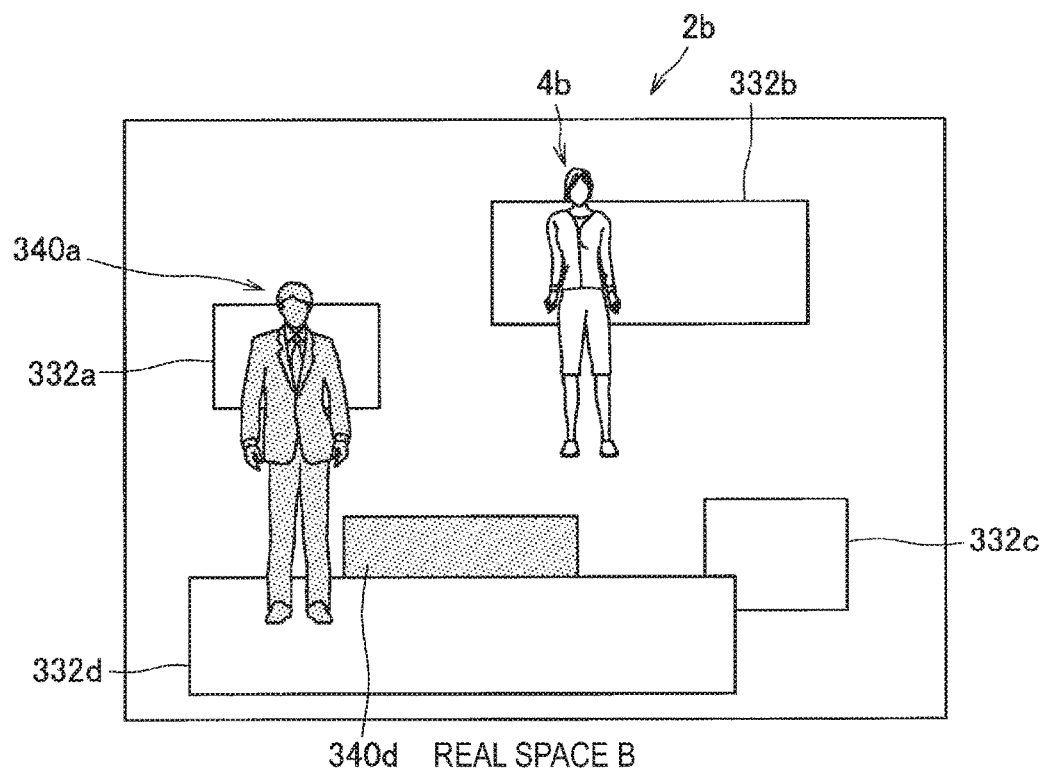
FIG. 41 is an explanatory diagram illustrating an example in which display indicating an actual object as a target of a blocked expression is caused to be displayed in a superimposed manner on content of the free viewpoint.

Note that in this case, the server 10 (the control information transmitting unit 122 or the like) or the output unit 24b in the real space 2b may cause display indicating actual objects as targets of the shielded expression in the corresponding real space 2a to be displayed such that the display is superimposed on the content of the free viewpoint as illustrated in FIG. 41, for example. For example, the server 10 or the output unit 24b in the real space 2b may cause the virtual object 340d corresponding to the actual object 330d as a target of the shielded expression such that the virtual object 340d is superimposed on the content of the free viewpoint as illustrated in FIG. 41. According to the display example, the user 4b can know (share) a video image that the counterpart user 4a is actually visually recognizing. As a result, in a case in which the user 4a has conversation with the user 4b, for example, it is possible to prevent the user 4a and the user 4b from not understanding what the counterparts say even if the user 4a talks about the actual object 330d.

2-5-3. Adjustment of Luminance

Note that in a modification example in which the display unit 246 is an AR device, the output unit 24 including the display unit 246 can also adjust display luminance of the respective objects in the received stream (that is, the content of the free viewpoint) on the basis of luminance of the real space 2a specified on the basis of a sensing result obtained by the sensor unit 220 in the real space (referred to as the real space 2a here) in which the output unit 24 is located. For example, the output unit 24 increases the display luminance of the respective objects in the received content of the free viewpoint as specified luminance of the real space 2a is higher. In this manner, it is possible to cause visibility of the actual objects in the real space 2a to substantially coincide with visibility of the respective objects in the content of the free viewpoint during display.

Also, in a case in which luminance (of the real space 2a) at the position at which the respective objects are displayed in the real space 2a in the content of the free viewpoint is specified through image recognition or the like performed on an image captured by the sensor unit 220, for example, the output unit 24 may adjust display luminance of the respective objects in the content of the free viewpoint such that the display luminance of the respective objects conforms to the specified luminance at the respective positions. In this manner, in a case in which a certain object is arranged behind something else in the real space 2a in the content of the free viewpoint, for example, display luminance of the object may be set to be relatively low. Therefore, it is possible to satisfactorily adjust visibility (conformity) when the content of the free viewpoint is displayed in the real space 2a.

2-6. Second Application Example

Next, a second application example of the second embodiment will be described.

According to the second application example, the server 10-2 can decide a base space on the basis of information set in advance for the respective users, for example.

Figure 42:
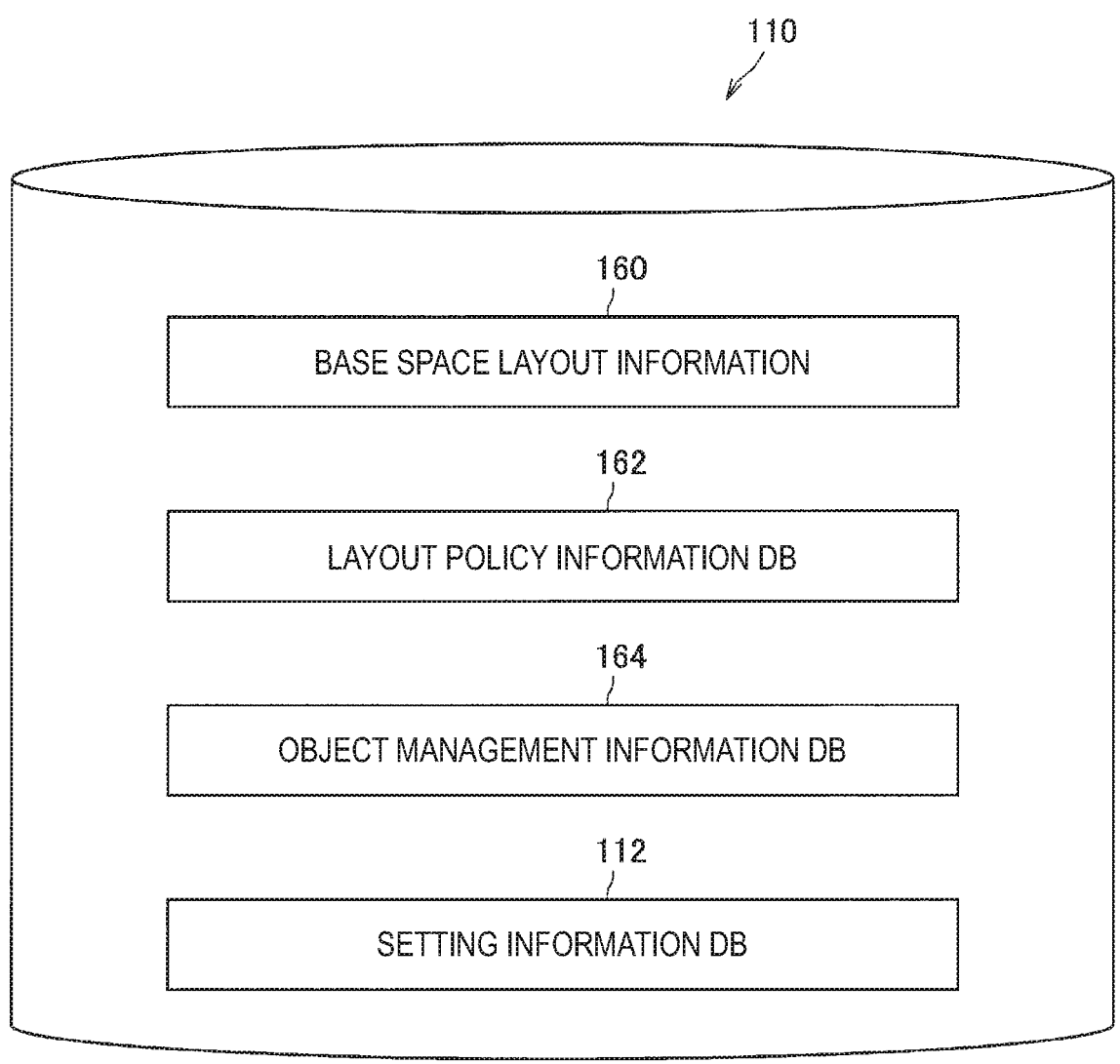
FIG. 42 is a diagram illustrating a configuration example of a shared space management DB 110 according to a second application example of the second embodiment.

FIG. 42 is a diagram illustrating a configuration example of the shared space management DB 110 according to a second application example. As illustrated in FIG. 42, the shared space management DB 110 according to the second application example further includes setting information DB 112.

2-6-1. Setting Information DB 112

Figure 43:
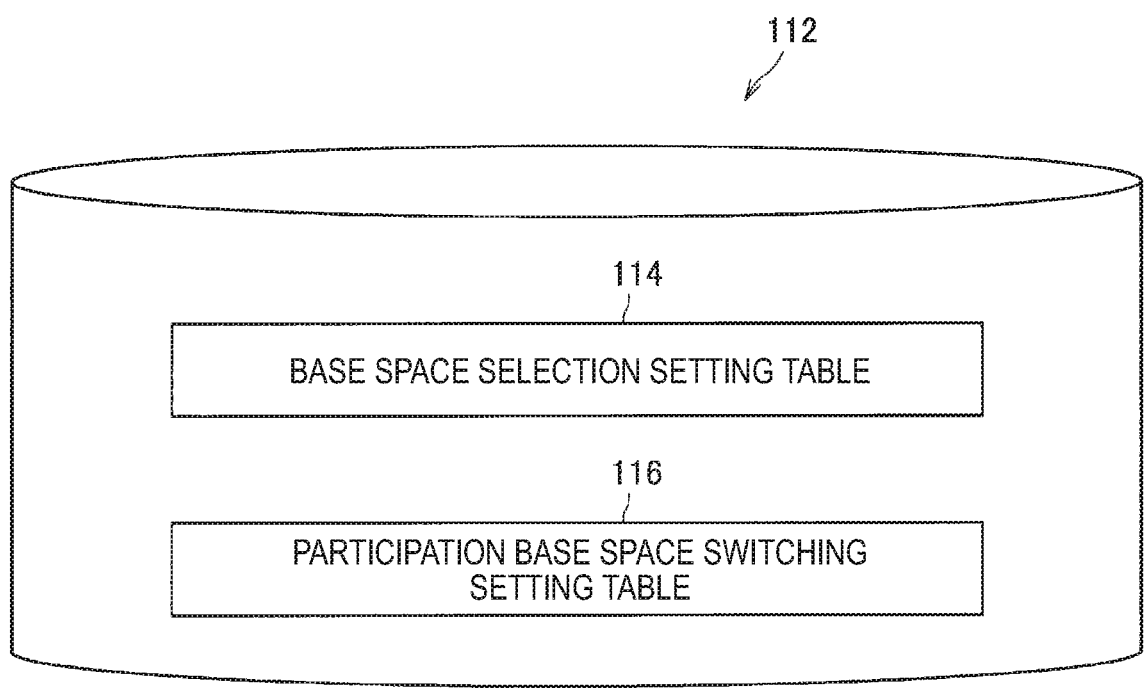
FIG. 43 is an explanatory diagram illustrating a configuration example of a setting information DB 112 according to the second application example.

The setting information DB 112 is a database that stores setting information related to generation and modification of a shared space corresponding to content of the free viewpoint when a user starts or ends to use the content of the free viewpoint, for example. FIG. 43 is a diagram illustrating a configuration example of setting information DB 112. As illustrated in FIG. 43, the setting information DB 112 includes a base space selection setting table 114 and a base space switching setting table for participation 116. Note that specific details in the respective tables will be described later.

Further, the registered content of the setting information DB 112 can be referred to or changed via the client 20 by the user in each real space 2. For example, in a case in which the output unit 24 in each real space 2 is displaying a setting screen, the user in each real space 2 may be able to refer to or change the registered content of the setting information DB 112 by a predetermined input method (for example, a manipulation, a gesture, a line of sight manipulation, a speech, or the like to a predetermined input device). Alternatively, in a case in which the user is participating in the shared space, the user may be able to refers to or change the registered content of the setting information DB 112 through recognition of a gesture or a voice of the user in the shared space. Further, in the setting information DB 112, each user may be able to change only a setting value associated with the user or the original space of the user.

2-6-2. Shared Space Synthesizing Unit 152

2-6-2-1. Example of Decision of Base Space: When Space Sharing is Started

The shared space synthesizing unit 152 according to the second application example decides a base space on the basis of registered content in the setting information DB 112 when space sharing is started, for example.

Setting Information when Space Sharing is Started: Selection of User

For example, when an operation of a certain user 4a to select a counterpart user 4b and to start space sharing is detected, the shared space synthesizing unit 152 decides a base space on the basis of registered content in the base space selection setting table 114 in the setting information DB 112.

In one example, the shared space synthesizing unit 152 decides the base space on the basis of comparison between a setting value associated with the user 4a and a setting value associated with the user 4b in the base space selection setting table 114. In a case in which at least one of candidates of desired base spaces that are associated with the user 4a coincide with at least one of candidates of desired base spaces that are associated with the user 4b in the base space selection setting table 114, for example, the shared space synthesizing unit 152 decides the coincident candidate of the base space as a base space and decides to generate content of the free viewpoint.

More specifically, in a case in which there is only one matching base space candidate, the shared space synthesizing unit 152 decides the base space candidate as the base space. Further, in a case in which there is a plurality of matching base space candidates, the shared space synthesizing unit 152 presents a plurality of base space candidates to one of the user 4a and the user 4b, and decides the base space candidate selected by the user as the base space. Here, the user of the presentation target may be, for example, the user 4 who performs a manipulation to start the space sharing or may be a user who is highest in a predetermined priority. Alternatively, the shared space synthesizing unit 152 may present a plurality of base space candidates for the two users 4 (the user 4a and the user 4b) and decide a base space candidate agreed by the two users 4 as the base space.

In addition, in a case in which the candidates of the desired base space that are associated with the user 4a do not coincide with the candidates of the desired base space that are associated with the user 4b in the base space selection setting table 114, the shared space synthesizing unit 152 decides not to generate content of the free viewpoint and does not decide a base space. Note that at this time, the shared space synthesizing unit 152 may cause the output unit 24a in the real space 2a in which the user 4a is located and the output unit 24b in the real space 2b in which the user 4b is located to output information indicating an error.

Setting Information when Space Sharing is Started: Selection of Real Space

Alternatively, when an operation of a certain user 4 to select a real space and to start space sharing is detected, the shared space synthesizing unit 152 can also decide a base space on the basis of registered content in the base space selection setting table 114 in the setting information DB 112.

For example, the shared space synthesizing unit 152 decides a base space on the basis of comparison between a setting value associated with the user 4a and a setting value associated with the user 4b who is located in the selected real space or with the actual real in the base space selection setting table 114, which will be described later. In a case in which the setting value associated with the user 4a is "to use a real space of another user as a base space" and the setting value associated with the user 4b located in the selected real space is "any real space is allowable" in the base space selection setting table 114, the shared space synthesizing unit 152 decides the selected real space as a base space and decides to generate content of the free viewpoint.

Base Space Selection Setting Table 114

The base space selection setting table 114 is a table in which setting information related to the selection of the base space is stored. For example, in the base space selection setting table 114, the user ID and the setting value may be associated with each other, or the real space and the setting value may be associated with each other. Further, in the latter case, regardless of the user who is located in the real space, even in a case in which there is no user in the real space, the same setting value applies to the selection of the base space. Alternatively, the user ID, the real space, and the setting value may be associated in the base space selection setting table 114.

Here, for example, "my real space is used as base space," "real space of other user is used as base space," "any space is okay," or the like is registered as the setting value. For example, in a case in which the setting value associated with the user 4a is "my real space is used as base space" and the setting value associated with the user 4b is "any space is okay" in the base space selection setting table 114, the shared space synthesizing unit 152 decides the real space 2a (in which the user 4a is located) as the base space.

Alternatively, identification information of the real space such as, for example, "real space A," "real space B," or "real space C" can be registered as the setting value. In this case, in a case in which the setting value associated with the user 4a is "real space A, real space C, and real space D," and the setting value associated with the user 4b is "real space B and real space C" in the base space selection setting table 114, only "real space C" coincides between both setting values. Then, the shared space synthesizing unit 152 decides the "real space C" as the base space.

Invitation UI

Note that in a modification example, the user 4a who is located in the real space 2a can issue an invitation message to the user 4b who is located in another real space 2b, and the shared space synthesizing unit 152 can decide a base space on the basis of a response of the user 4b to the invitation message.

Figure 44:
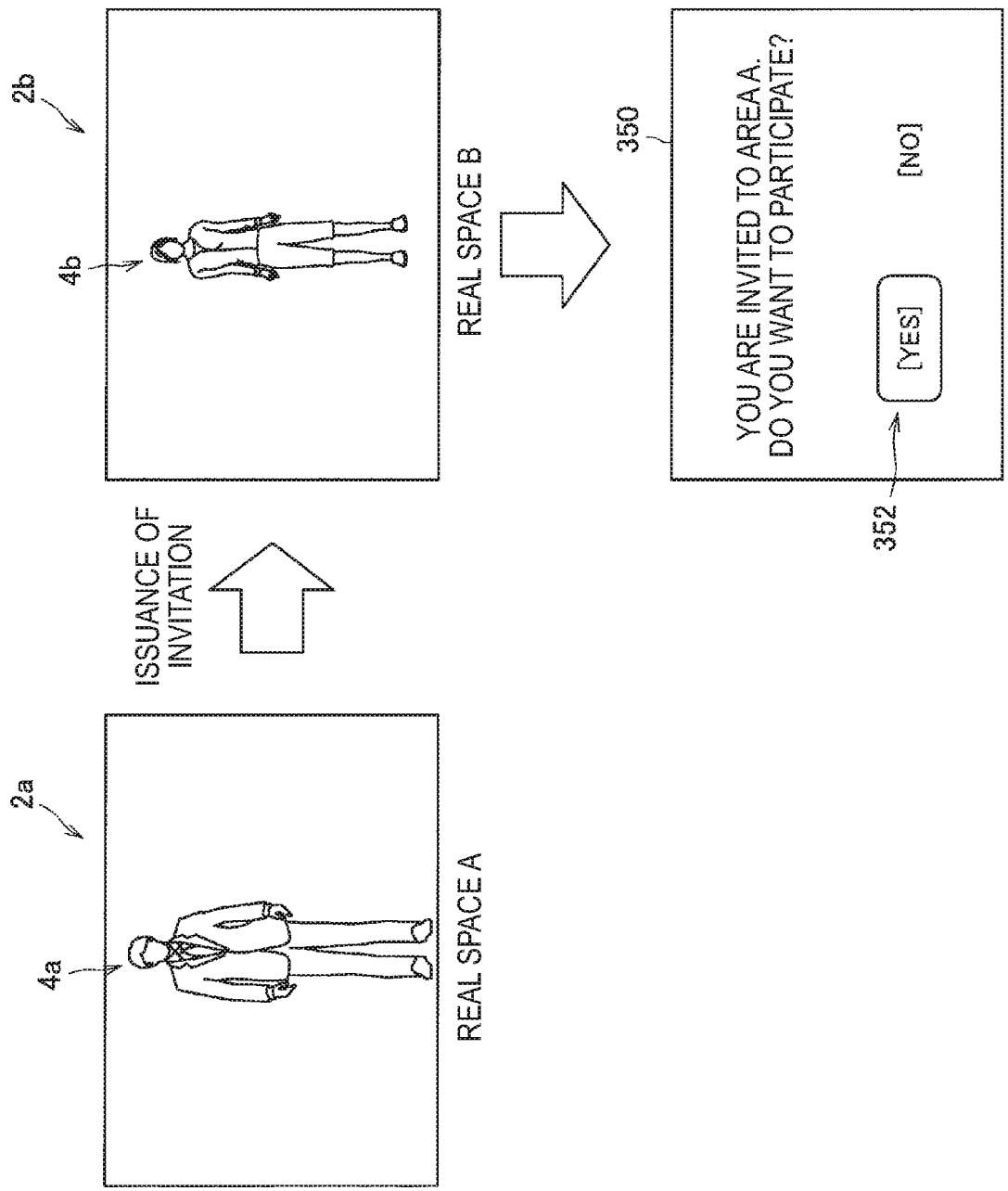
FIG. 44 is an explanatory diagram illustrating an example in which a user 4a in a real space 2a issues an invitation message for promoting space sharing to a user 4b in a real space 2b.

As illustrated in FIG. 44, for example, it is assumed that the user 4a in the real space 2a issues an invitation message to encourage the user 4b to perform space sharing together by setting the real space 2a as a base space to the user 4b in the real space 2b first. In this case, an invitation UI 350 as illustrated in FIG. 44, for example, may be displayed on the display unit 246 that the user 4b views. Then, in a case in which the user 4b inputs a response indicating acceptance ("Yes" in the example illustrated in FIG. 44) to the invitation UI 350, the server 10 (shared space synthesizing unit 152) decides the real space 2a as a base space.

Note that in a case in which a plurality of users is present in another real space 2b, the user in the real space 2a can issue the same invitation messages to all the users in another real space 2b. In this manner, it is possible to prevent the types of video images displayed from becoming different for the respective users located in corresponding another real space 2b.

Note that the example in which the user 4a issues the invitation message to the counterpart user 4b before the base space is decided has been described above, the disclosure is not limited to such an example. For example, the user 4a may issue an invitation message for encouraging the user 4b to participate in a shared space corresponding to a base space to the counterpart user 4b after the base space is decided (or after the shared space is generated). In this case, if the counterpart user 4b provides a reply indicating acceptance in response to the invitation message, the server 10 can permit the counterpart user 4b to participate in the shared space.

Management of Gathering State

Figure 45:
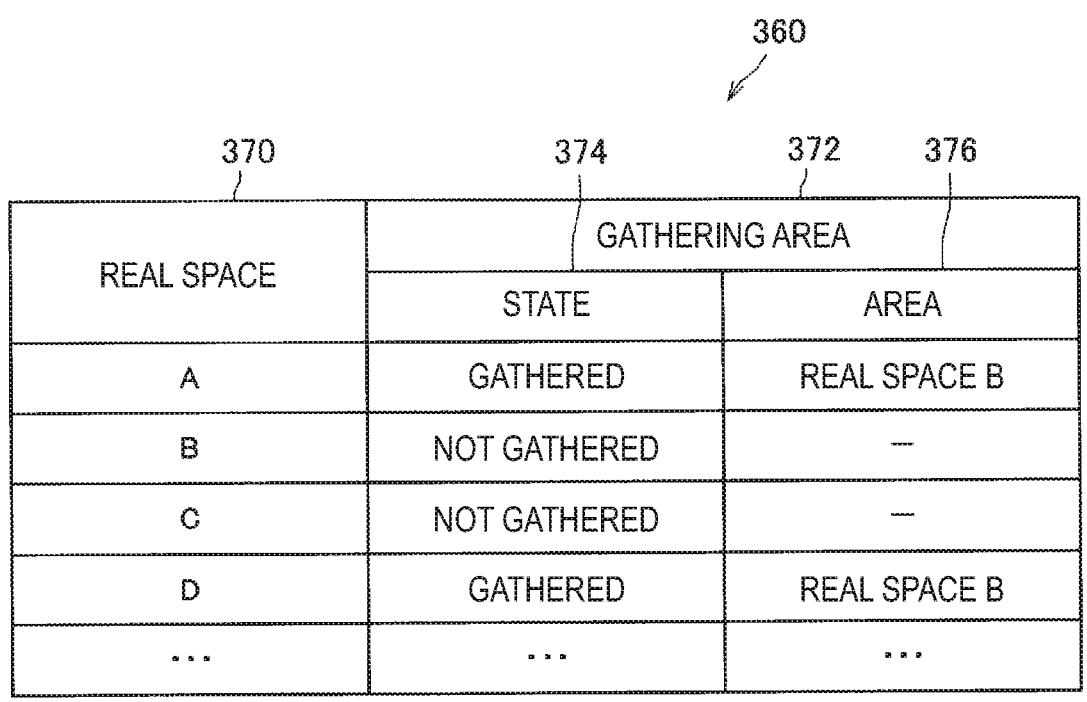
FIG. 45 is an explanatory diagram illustrating a configuration example of a table 360 for managing a state in which users in a real space have gathered in a base space, for each real space.

Note that the server 10 may manage a status of whether or not each of a plurality of real spaces has participated in a shared space. For example, the server 10 manages a state in which users in real spaces have gathered in a base space, for the respective real spaces. FIG. 45 is an explanatory diagram illustrating a configuration example of a table 360 for managing a state in which users in real spaces have gathered in a base space, for the respective real spaces. As illustrated in FIG. 45, a real space 370 and a gathering area 372 may be associated in the table 360. Also, the gathering area 372 includes a state 374 and an area 376. Here, whether or not users in the corresponding real spaces have gathered in the base space ("gathered" or "not gathered") may be recorded in the state 374. Also, in a case in which the corresponding real spaces are "gathered", identification information (that is, identification information (of the original spaces) in the base space) of "gathered spaces" may be recorded in the area 376. Note that in a case in which the corresponding real spaces are "not gathered", blank may be set in the area 376.

For example, the example illustrated in FIG. 45 illustrates that a "real space B" is set as a base space and the respective users in a "real space A" and a "real space D" have gathered in the base space. Also, the example illustrates that the respective users in a "real space C" have not gathered at the base space (that is, the users have not participated in the shared space corresponding to the base space). Note that as illustrated in FIG. 45, "not gathered" may be set in the state 374 for the "real space B" that is an original space of the base space.

2-6-2-2. Example of Decision of Base Space: When User Additionally Participate in Shared Space In addition, the shared space synthesizing unit 152 according to the second application example can decide a base space on the basis of registered content in the setting information DB 112 when a new user participates in a shared space that has already been generated. After content of the free viewpoint is generated and in a case in which an operation of a new user 4a to participate in a shared space corresponding to the content of the free viewpoint has been detected, the shared space synthesizing unit 152 decides whether or not to change the base space corresponding to the shared space on the basis of a predetermined condition.

Here, the operation of the new user 4a to participate in the shared space may be selection of a shared space that the new user 4a desires to participate in by the user 4a through an operation performed on a predetermined input device, a gesture, a sight line operation, or utterance, for example, in the shared space list displayed on the display unit 246 that the new user 4a views, for example. Alternatively, the operation may be direct utterance of a name of a desired shared space (or a base space corresponding to the shared space) by the new user 4a. Note that identification information of the base space corresponding to the shared space, identification information of users who are participating in the shared space, and the like may be displayed on the display unit 246 that the new user 4a views before the user 4a participates in the shared space.

First Decision Example

Hereinafter, an example of a decision of changing a base space made by the shared space synthesizing unit 152 will be described in more detail. For example, the shared space synthesizing unit 152 decides whether or not the current base space is changed on the basis of the setting value associated with the new user 4a in the base space selection setting table 114. For example, in a case in which the setting value associated with the new user 4a in the base space selection setting table 114 indicates "real space of other user is used as base space" or "any space is okay," the shared space synthesizing unit 152 decides that the current base space is not changed. Alternatively, in a case in which a desired base space candidate is registered in the base space selection setting table 114 in association with the new user 4a, and there is a base space corresponds to the shared space among candidates of the desired base space, the shared space synthesizing unit 152 decides that the current base space is not changed. In other words, a priority is given to the current base space. Accordingly, since frequent switching of the base space is prevented, it is possible to suppress the influence on the activity of the user participating in the shared space. Further, at this time, the participation of the new user 4a in the shared space may be permitted.

Further, in a case in which there is no base space corresponding to the shared space among the candidates of the desired base space associated with the new user 4a in the base space selection setting table 114, the shared space synthesizing unit 152 may decide whether or not the current base space is changed on the basis of responses to an inquiry about the switching of the base space from all the users 4b participating in the shared space. For example, the shared space synthesizing unit 152 first presents one or more desired base space candidates associated with the new user 4a in the base space selection setting table 114 to all the users 4b participating in the shared space. Then, only in a case in which all the user 4b agrees to switch the base space to one of the one or more base space candidates, the shared space synthesizing unit 152 decides that the current base space is switched to the base space candidate.

Second Decision Example

Also, the shared space synthesizing unit 152 can also decide whether or not to change a current base space on the basis of setting values associated with all the users 4b who are participating in the shared space in the base space switching setting table for participation 116. Here, the joining-time base space switching setting table 116 is a table that stores setting information related to whether or not the switching of the base space is permitted in a case in which other users desire to newly join the shared space. For example, in the joining-time base space switching setting table 116, the user ID and the setting value may be associated, the real space and the setting value may be associated, or the user ID, the real space, and the setting value may be associated. Here, "switching of base space is permitted," "switching of base space is not permitted," and the like can be registered as the setting value.

For example, in a case in which at least one or more of the setting values associated with the users 4b participating in the shared space in the joining-time base space switching setting table 116 indicate "switching of base spaces is not permitted," the shared space synthesizing unit 152 decides that the current base space is not changed. Further, in a case in which all the setting values associated with the users 4b participating in the shared space in the joining-time base space switching setting table 116 indicate "switching of base spaces is permitted," the shared space synthesizing unit 152 may decide whether or not the current base space is not changed on the basis of the responses to the inquiry about the switching of the base space from all the users 4b participating in the shared space. According to the decision example 2, in a case in which other users desire to join the shared space, it is possible to present each of the users who are already participating in the shared space from being required to answer about whether or not the base space is switched each time. For this reason, the burden on each user is reduced.

Invitation UI

Note that in a modification example, the server 10 may allow the user 4b who has not yet participated to participate in the shared space in a case in which at least one user 4a who is participating in the shared space has issued an invitation message for encouraging the user 4b who has not yet participated in the shared space to participate in the shared space and the user 4b who has not yet participated has provided a response indicating acceptance in response to the invitation message. Note that in this case, the shared space synthesizing unit 152 decides not to change the current base space.

2-6-2-3. Processing Content on Basis of Switching of Base Space

Further, in a case in which it is decided that the base space is switched, the shared space synthesizing unit 152 processes the content of the free viewpoint so that the user participating in the shared space can notice the switching of the base space. For example, the shared space synthesizing unit 152 processes the content of the free viewpoint so that an animation of a predetermined period of time (for example, 10 seconds) indicating that the base space is to be switched is displayed.

As an example, in a case in which it is decided that the base space is switched, the shared space synthesizing unit 152 first causes the base space after change whose transparency is set to an initial value (for example, 100% and the like) to be displayed superimposed on the base space before change as illustrated in FIGS. 46A, 46B, and 46C. Then, the shared space synthesizing unit 152 performs a process of gradually increasing the transparency of the base space before the change from 0% to 100% during a predetermined period of time and gradually decreasing the transparency of the base space after the change from the initial value to 0%. Further, FIGS. 46A, 46B, and 46C illustrate an example in which the object 42c is located in the base space before the change, and the object 42d is located in the base space after the change.

Figures 47A, 47B:
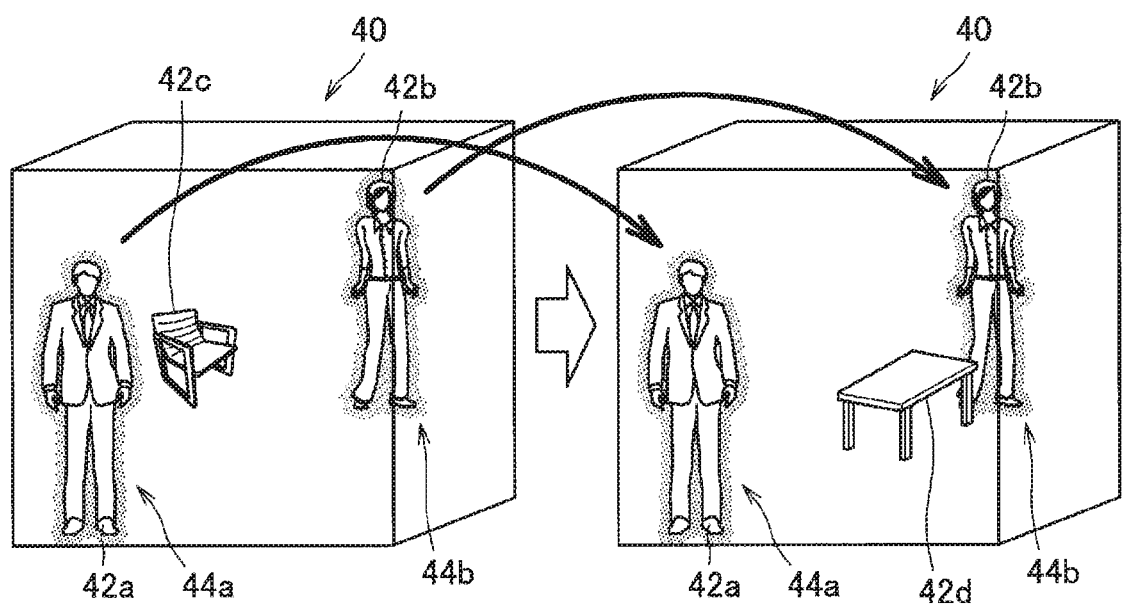
FIGS. 47A and 47B are diagrams illustrating an example of an animation illustrating that a base space is switched according to the second application example.

Further, as illustrated in FIGS. 47A and 47B, the shared space synthesizing unit 152 may process the content of the free viewpoint so that an animation in which all the objects displayed together before and after the base space is changed (for example, the user remaining in the shared space after the base space is changed or the like) fly and move from the base space before the change to the base space after the change is displayed. With such process examples, in a case in which the base space is switched, a video of the content of the free viewpoint is displayed to be seamlessly noticed. Therefore, each user who is already participating in the shared space can be prevented from feeling uncomfortable and surprised.

Further, the shared space synthesizing unit 152 may process the content of the free viewpoint so that a predetermined effect sound is output at a timing at which the base space is switched.

2-6-2-4. Others

Display of User Who has not Yet Participated

Note that in a modification example, the shared space synthesizing unit 152 may process content of the free viewpoint such that information indicating a user 4 in a real space who has not participated in a shared space (for example, a video image, a name, and the like of the user 4 in the real space) is included in the content of the free viewpoint in a case in which a predetermined condition is satisfied, for example.

For example, the shared space synthesizing unit 152 may arrange the shared object corresponding to the user 4 in the real space who has not participated in the shared space in the shared space and raise transmittance of the shared object, thereby generating content of the free viewpoint. In this manner, the user who is participating in the shared space can know the user 4 who has not participated in the shared space while viewing the content of the free viewpoint.

Also, in this case, the server 10 may further cause the output unit 24 in the real space that has not participated in the shared space to display a video image of the user 4 in the real space who has participated in the shared space. In this manner, the user in the real space who has not participated in the shared space can know that the user is currently not participating in the shared space or users (in the real spaces) who are participating in the shared space.

2-6-3. Flow of Process

The configuration according to the second application example has been described above. Next, a flow of a process according to the second application example will be described in "2-6-3-1. Flow of a process when space sharing is started" and "2-6-3-2. Flow of a process at time of additional participation in shared space".

2-6-3-1. Flow of Process when Space Sharing is Started (a) Example in which Setting Information when Space Sharing is Started is Used First, two examples ("(a) Example in which setting information when space sharing is started is used" and "(b) Example in which invitation UI is used") will be described in relation to "Flow of a process when space sharing is started.

Figure 48:
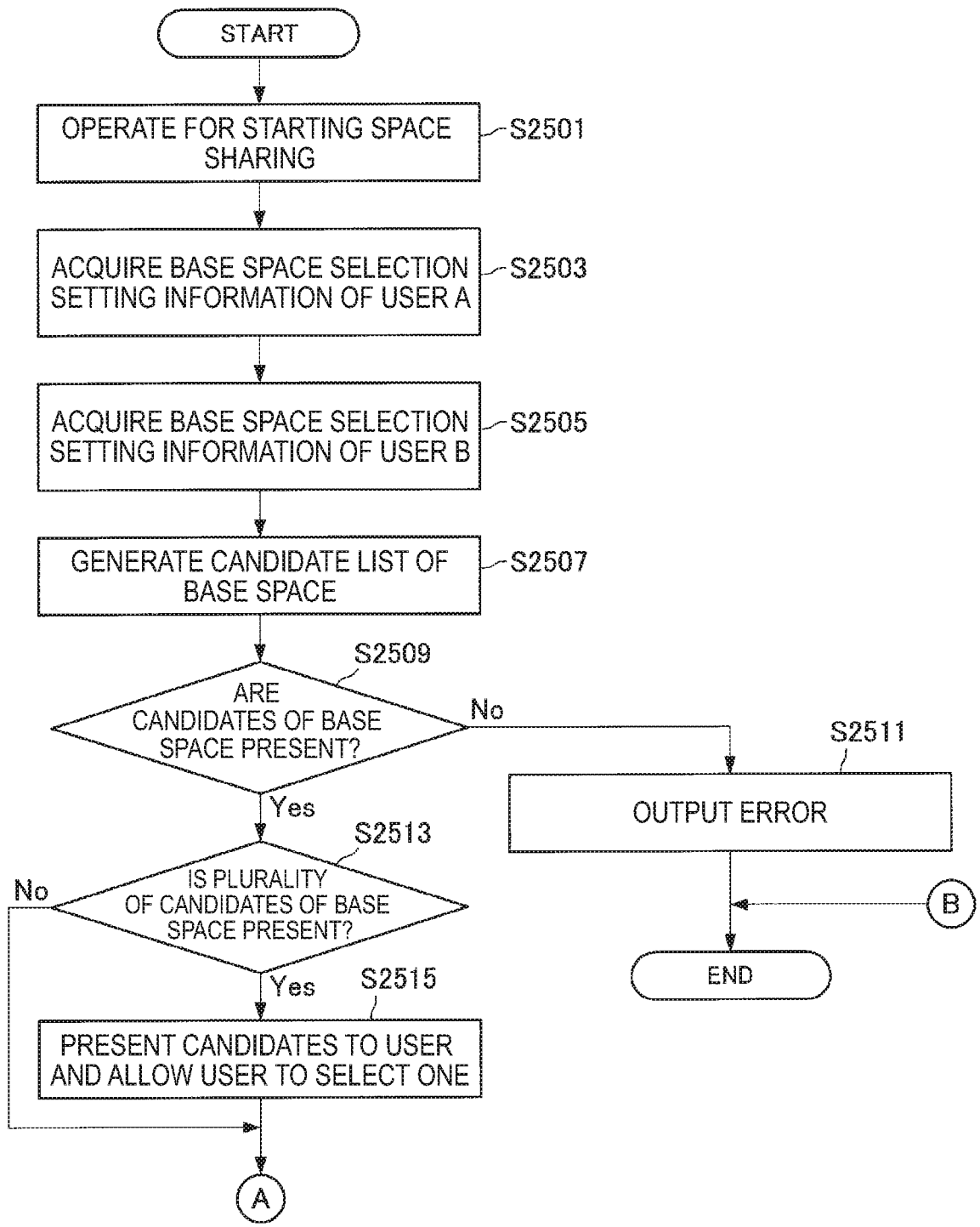
FIG. 48 is a flowchart illustrating a part of a flow of a process when the space sharing is started (an example in which setting information when the space sharing is started is used) according to the second application example.

First, a flow of a process related to "(a) Example in which setting information when space sharing is started is used" will be described with reference to FIGS. 48 and 49. As illustrated in FIG. 48, first, the user 4a located in the real space 2a performs a manipulation to start the space sharing, for example, by designating the user 4b located in the real space 2b. Then, the input unit 22a in the real space 2a detects that the manipulation is performed, and transmits a detection result to the server 10-2 (S2501).

Thereafter, in a case in which the detection result is received, the shared space synthesizing unit 152 of the server 10-2 extracts the setting value associated with the user 4a in the base space selection setting table 114 from the base space selection setting table 114 (S2503). Further, the shared space synthesizing unit 152 extracts the setting value associated with the user 4b of the other party in the base space selection setting table 114 from the base space selection setting table 114 (S2505).

Then, the shared space synthesizing unit 152 specifies selectable base space candidates on the basis of the setting value extracted in S2503 and the setting value extracted in S2505, and then generates a list of specified base space candidates (S2507).

In a case in which there is any one base space candidate which is not specified in S2507 at all (No in S2509), the shared space synthesizing unit 152 decides that the content of the free viewpoint is not generated. Then, the server 10-2 causes the output unit 24a in the real space 2a to output information indicating an error (S2511). Further, the server 10-2 may further cause the output unit 24b in the real space 2b to output the information indicating an error. Thereafter, the "process when space sharing is started" ends.

On the other hand, in a case in which only one base space candidate is specified (Yes in S2509 and No in S2513), the shared space synthesizing unit 152 performs the process of S2521 to be described later.

On the other hand, in a case in which a plurality of base space candidates is specified (Yes in S2509 and Yes in S2513), the shared space synthesizing unit 152 causes the output unit 24a to present the list of base space candidates generated in S2507, for example, to the user 4a, and causes the user 4a to select a desired base space candidate (S2515). Further, as a modified example, the shared space synthesizing unit 152 causes the list to be presented to the user 4a and the user 4b, and causes each of the two users to select a desired base space candidate.

Here, a process after S2515 will be described with reference to FIG. 49. After S2515, the shared space synthesizing unit 152 decides the base space candidate selected in S2515 or the base space candidate specified in S2507 as the base space (S2521).

Then, the shared space synthesizing unit 152 generates the shared space on the basis of the real space different from the base space out of the real space 2a and the real space 2b and the base space decided in S2521 (S2523). Then, the shared space synthesizing unit 152 generates the content of the free viewpoint on the basis of the generated shared space (S2525).

Then, the shared space synthesizing unit 152 grants the authority to access the device in the base space decided in S2521 to the user 4 located in the real space different from the base space (S2527).

Then, the shared space synthesizing unit 152 grants the authority to access the shared content which can be reproduced in the base space decided in S2521 to the user 4 located in the real space different from the base space (S2529). Thereafter, the "process when space sharing is started" ends.

(b) Example in which Invitation UI is Used

Next, a flow of a process related to "(b) Example in which invitation UI is used" will be described with reference to FIG. 50. Note that an example in which a user 4a who is located in a real space 2a issues an invitation message for sharing a space together to a user 4b located in a real space 2b, for example, will be described here.

Figure 50:
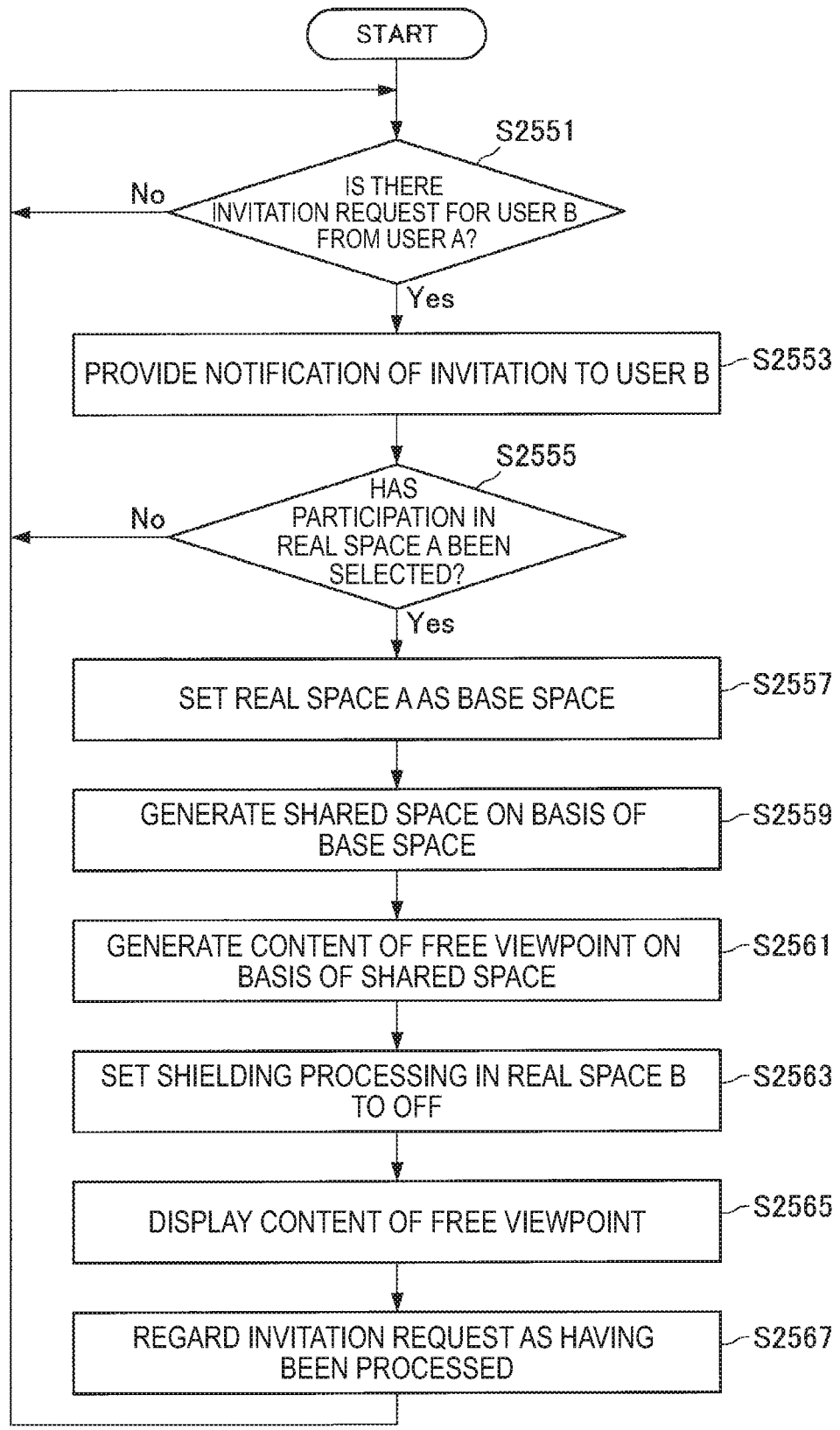
FIG. 50 is a flowchart illustrating a part of a flow of a process when the space sharing is started (an example in which an invitation UI is used) according to the second application example.

As illustrated in FIG. 50, in a case in which the user 4a in the real space 2a has perform an input for inviting the user 4b in the real space 2b to start space sharing together by setting the real space 2a as a base space, for example (S2551: Yes), the server 10 first provides a notification of the input invitation message to the user 4b (S2553).

Thereafter, in a case in which the user 4b does not accept the invitation message (that is, in a case in which the user 4b does not accept to share a space with the user 4a) (S2555: No), the processing in S2551 is executed again.

Meanwhile, in a case in which the 4b accepts the invitation message (S2555: Yes), the shared space synthesizing unit 152 of the server 10 decides the real space 2a as a base space (S2557).

Figure 49:
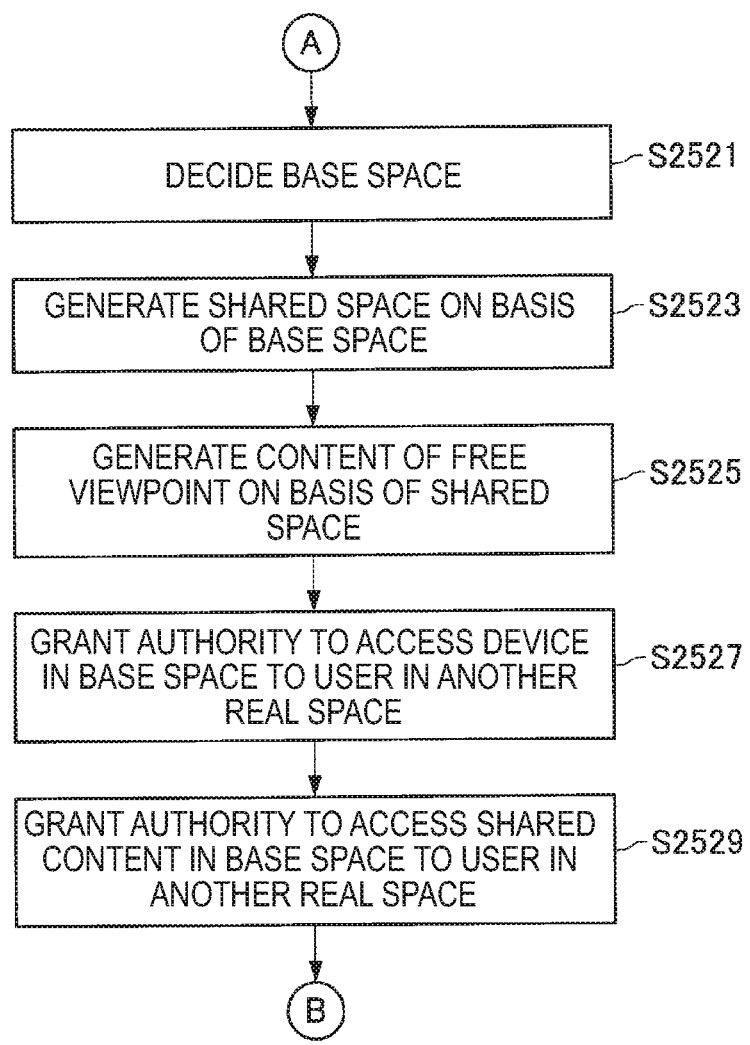
FIG. 49 is a flowchart illustrating a part of a flow of a process when the space sharing is started (an example in which setting information when the space sharing is started is used) according to the second application example.

Note that S2559 to S2561 in FIG. 50 are similar to S2523 to S2525 in FIG. 49. Thereafter, the transmitting unit 132 of the server 10 transmits generated content of the free viewpoint (stream) to the respective output units 24 in the real space 2a and the real space 2b.

Then, in a case in which setting of utilization of a shielded expression that is associated with the real space 2b is "ON", the server 10 or the output unit 24 in the real space 2b switches the setting to "OFF" (S2563).

Thereafter, (the display units 246 of) the respective output unit 24 in the real space 2a and the real space 2b respectively display received content of the free viewpoint (S2565).

Thereafter, the server 10 regards the invitation request input in S2551 as having already been processed and discards the invitation request (S2567). Then, the processing in S2551 is executed again.

2-6-3-2. Flow of Process at Time of Additionally Joining in Shared

Next, a "flow of process at time of additionally joining shared space" will be described with reference to FIG. 51. Further, here, an example of a flow of process in a situation in which a user 4c who is located in the real space 2c and not participating in the shared space desires to join the shared space will be described.

Figure 51:
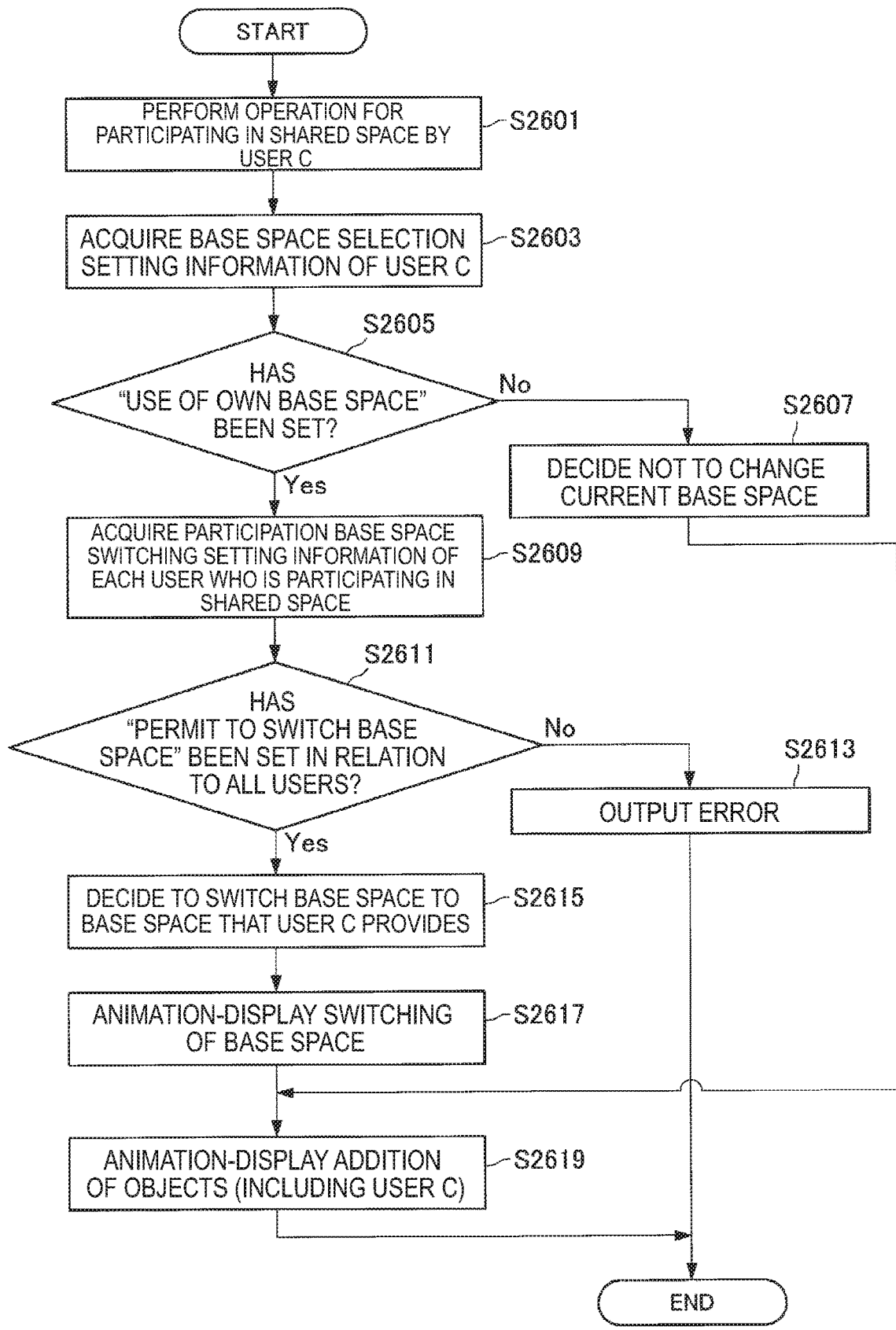
FIG. 51 is a flowchart illustrating a flow of "a process at the time of additional participation in a shared space" according to the second application example.

As illustrated in FIG. 51, first, the user 4c performs a manipulation to join the shared space which the user 4c desires to participate in. Then, the input unit 22c in the real space 2c detects that the manipulation is performed, and transmits a detection result to the server 10-2 (S2601).

Thereafter, in a case in which the detection result is received, the shared space synthesizing unit 152 of the server 10-2 extracts the setting value associated with the user 4c in the base space selection setting table 114 from the base space selection setting table 114 (S2603).

Then, the shared space synthesizing unit 152 decides whether or not the setting value extracted in S2603 indicates "my real space is used as base space" (S2605). In a case in which the setting value is not "my real space is used as base space" (No in S2605), the shared space synthesizing unit 152 decides that the base space corresponding to the shared space is not changed (S2607). Thereafter, the shared space synthesizing unit 152 performs processing in S2619, which will be described later.

On the other hand, in a case in which the setting value indicates "my real space is used as base space" (Yes in S2605), the shared space synthesizing unit 152 extracts the setting value associated with each user participating in the shared space in the joining-time base space switching setting table 116 from the joining-time base space switching setting table 116 (S2609).

Then, the shared space synthesizing unit 152 decides whether or not the setting values related to all the users extracted in S2609 indicate "switching of base space is permitted" (S2611). In a case in which the setting value related to at least one or more of the users does not indicate "switching of base space is permitted" (No in S2611), the shared space synthesizing unit 152 decides that the current base space is not switched and that the user 4c is not permitted to join the shared space. Then, the server 10-2 causes the output unit 24c in the real space 2c to output information indicating an error (S2613). Thereafter, the "process at time of additionally joining shared space" ends.

On the other hand, in a case in which the setting values related to all the users indicate "switching of base space is permitted" (Yes in S2611), the shared space synthesizing unit 152 decides that the current base space is switched to the real space 2c (in which the user 4c is located) (S2615).

Then, the shared space synthesizing unit 152 processes the content of the free viewpoint so that an animation of a predetermined period of time indicating that the base space is switched is displayed. Accordingly, the output unit 24 in the real space 2 in which each user 4 participating in the shared space is located displays the animation (S2617).

Thereafter, the shared space synthesizing unit 152 processes the content of the free viewpoint so that an animation of a predetermined period of time indicating that display of all the objects (including the user 4c) decided to be newly placed in the shared space is started is displayed. Accordingly, the output unit 24 in the real space 2 in which each user 4 participating in the shared space is located displays the animation (S2619). Thereafter, the "process at time of additionally joining shared space" ends.

3. Third Embodiment 3-1. Outline

The second embodiment has been described above. Incidentally, it is possible to use a wide network band in a case in which 3D data of substantially entire real spaces is transmitted and received between the respective real spaces and the server 10 as in the aforementioned respective embodiments. Also, as another objective, it is desirable to omit recognition processing in a case in which the recognition processing is not necessary, such as an object that has determined to be outside targets of display, for example.

Next, a third embodiment will be described. As will be described later, a server 10-3 according to the third embodiment controls such that data transmission is not performed between a client 20 and the server 10-3 or controls such that the client 20 is not allowed to perform recognition processing in relation to the object outside targets of display. Note that components included in the server 10-3 according to the third embodiment are similar to those according to the second embodiment. Only details that are different from those in the second embodiment will be described below.

3-2. Configuration

3-2-1. Server 10-3

3-2-1-1. Object Management Information DB 164

First, a configuration of the server 10-3 according to the third embodiment will be described. In the object management information DB 164 according to the third embodiment, information regarding a band necessary to transmit the respective objects, which is received from input units 22 (transmitting units 228) of the respective real spaces, is further stored as will be described later.

3-2-1. Shared Space Managing Unit 100-3

A shared space managing unit 100-3 according to the third embodiment further determines whether or not to set the respective objects to be objects as targets of display on the basis of information regarding a band necessary to transmit the respective objects (as compared with the shared space managing unit 100-2 according to the second embodiment). Then, the shared space managing unit 100-3 delivers a list of object IDs of the respective objects that have determined to be targets of display to the control information transmitting unit 122.

Also, in a case in which a process of determining objects as targets of display is newly performed when recognition processing is stopped by the recognizing unit 224 of the input unit 22 (as will be described later), the shared space managing unit 100-3 generates first control information for providing an instruction for restarting the stopped recognition processing and causes the control information transmitting unit 122 to transmit the first control information to the corresponding input unit 22 (recognizing unit 224). Then, the shared space managing unit 100-3 performs the process of determining targets of display again at timing at which the recognition processing is restarted and a result of recognition processing is received.

3-2-1-3. Stream Generating Unit 130

The stream generating unit 130 according to the third embodiment generates a stream by deleting the objects that have determined to be outside targets of display from shared space frame data. In addition, the stream generating unit 130 delivers the generated stream to the transmitting unit 132.

Also, the stream generating unit 130 can perform a process of simplifying objects in the shared space frame data in accordance with a position and a posture of the display unit 246 that second control information received from (the control information transmitting unit 252 of) the output unit 24 indicates and generate a stream on the basis of the shared space frame data after the processing. Note that the control information transmitting unit 122 may further transmit the first control information for providing an instruction for simplifying the objects to the input unit 22 in the original space of the objects. In this manner, the input unit 22 can cause a processing load to decrease by causing the received first control information to be reflected to processing performed by the recognizing unit 224 and the stream generating unit 226, for example.

Flow of Process

Figure 52:
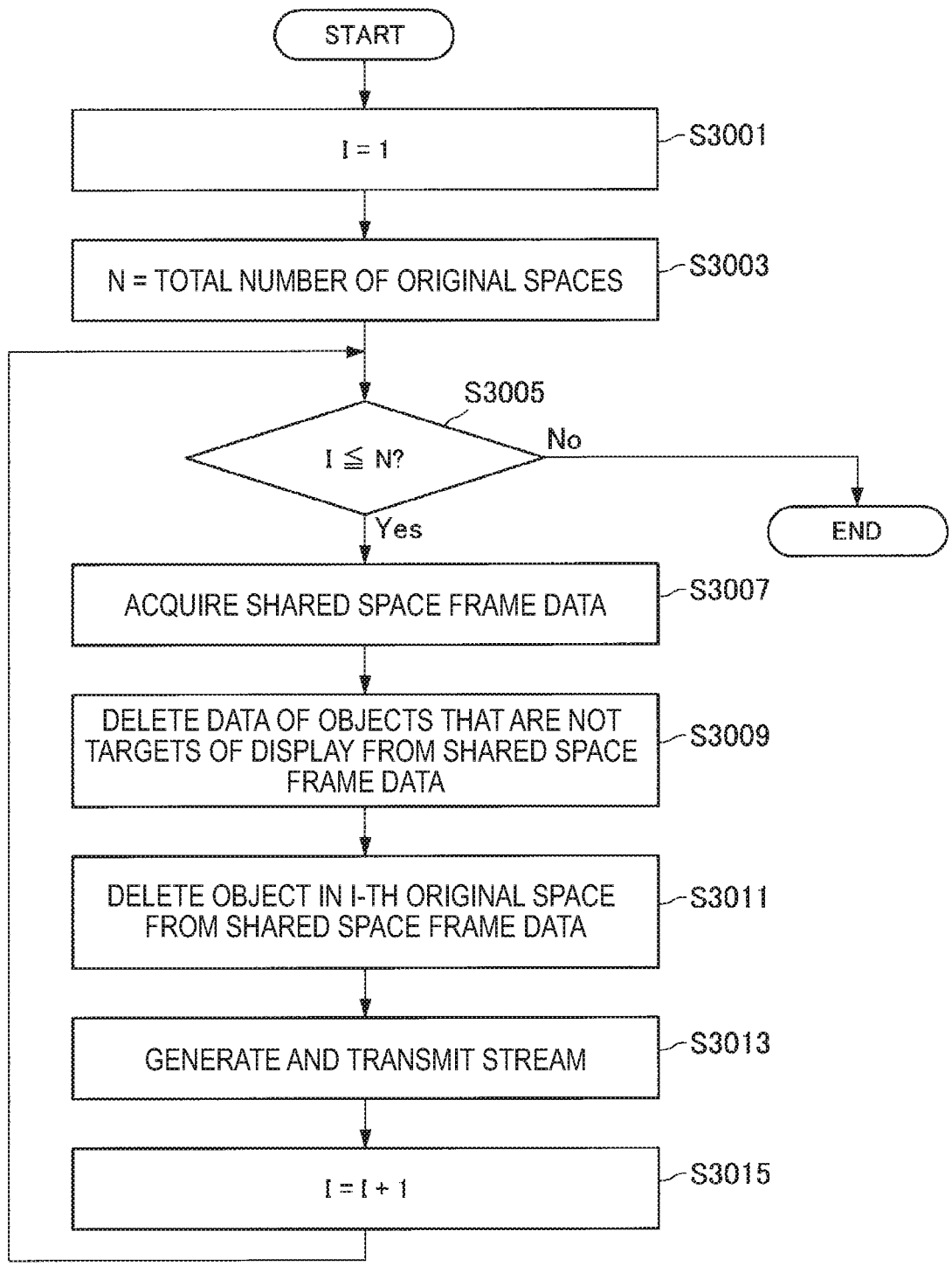
FIG. 52 is a flowchart illustrating an example of processing performed by a stream generating unit 130 according to a third embodiment.

Here, an example of a flow of a process performed by the stream generating unit 130 according to the third embodiment will be described with reference to FIG. 52. As illustrated in FIG. 52, the stream generating unit 130 first sets "1" to a variable I indicating the number of the original spaces as the targets of processing (S3001). Then, the stream generating unit 130 sets the total number of the original spaces to N (S3003).

Then, as long as I is equal to or less than N (S3005: Yes), the stream generating unit 130 repeats the following processing in S3007 to S3015. Note that in a case in which I is greater than N (S3005: No), the stream generating unit 130 ends the processing.

Specifically, the stream generating unit 130 first acquires the generated shared space frame data from the shared space generating unit 102 (S3007).

Next, the stream generating unit 130 specifies objects that have determined to be outside targets of display by referring to the object management information DB 164. Then, the stream generating unit 130 deletes data of specified objects from the acquired shared space frame data (S3009).

Next, the stream generating unit 130 specifies objects in the I-th original space by referring to the object management information DB 164. Then, the stream generating unit 130 further deletes the data of the specified objects from the shared space frame data (S3011).

Then, the stream generating unit 130 generates a stream (to be transmitted to the I-th original space) on the basis of the shared space frame data changed in S3011. Then, the transmitting unit 132 transmits the generated stream to the output unit 24 in the I-th original space (S3013).

Then, the stream generating unit 130 adds "1" to I (S3015). Thereafter, the stream generating unit 130 performs the processing in S3005 again.

3-2-1-4. Control Information Transmitting Unit 122

The control information transmitting unit 122 according to the third embodiment transmits a list of object IDs of the objects as targets of display, which is delivered from the shared space managing unit 100-3, as first control information to the output units 24 in the respective real spaces. When an object that has determined to be a target of display is newly determined to be outside targets of display, for example, the control information transmitting unit 122 transmits first control information indicating that the object has newly been determined to be outside the targets of display to the output unit 24 in the original space of the object. In this manner, the input unit 22 in the original space may then stop the process of recognizing the object without transmitting 3D data of the object to the server 10-3.

Flow of Process

Figure 53:
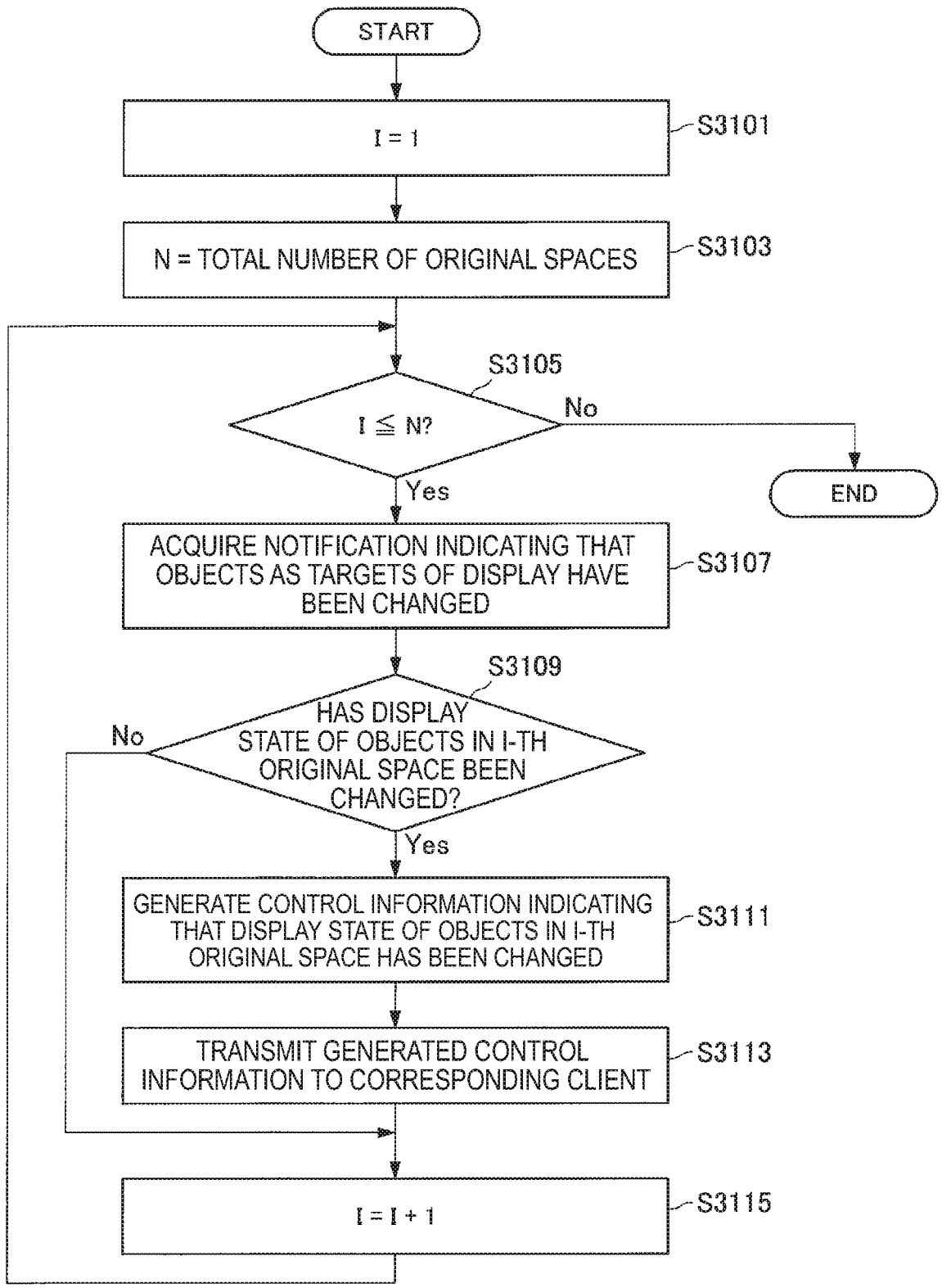
FIG. 53 is a flowchart illustrating an example of processing performed by a control information transmitting unit 122 according to the third embodiment.

Here, an example of a flow of a process performed by the control information transmitting unit 122 according to the third embodiment will be described with reference to FIG. 53. As illustrated in FIG. 53, the control information transmitting unit 122 first sets "1" to a variable I indicating the number of the original spaces as the targets of processing (S3101). Then, the control information transmitting unit 122 sets the total number of the original spaces to N (S3103).

Then, as long as I is equal to or less than N (S3105: Yes), the control information transmitting unit 122 repeats the following processing in S3107 to S3115. Note that in a case in which I is greater than N (S3105: No), the control information transmitting unit 122 ends the processing.

Specifically, in a case in which objects as target of display are changed in the object management information DB 164, the control information transmitting unit 122 first acquires a notification indicating that the objects as targets of display have been changed from the shared space generating unit 102 (S3107).

Then, the control information transmitting unit 122 checks whether or not a result of determining whether or not the respective objects in the I-th original space are targets of display has been changed, on the basis of the acquired notification (S3109). In a case in which the result of determination has not been changed (S3109: No), the control information transmitting unit 122 performs processing in S3115, which will be described later.

Meanwhile, in a case in which the result of determination has been changed (S3109: Yes), the control information transmitting unit 122 generates first control information indicating that the result of determination has been changed (S3111).

Then, the control information transmitting unit 122 transmits the generated first control information to the output unit 24 in the I-th original space (S3113).

Then, the control information transmitting unit 122 adds "1" to I (S3115). Thereafter, the control information transmitting unit 122 performs the processing in S3105 again.

3-2-2. Input Unit 22

3-2-2-1. Sensor Unit 220

Next, a configuration of the input unit 22 according to the third embodiment will be described. The sensor unit 220 according to the third embodiment acquires (or calculates) information regarding a band necessary to transmit the respective segmented objects in relation to the objects and then record the acquired information in meta information. In this manner, the information regarding the band necessary to transmit the respective objects is transmitted (along with frame data and the like) to the server 10-3.

3-2-2-2. Stream Generating Unit 226

The stream generating unit 226 according to the third embodiment generates a stream such that the stream does not include objects that are outside the targets of display on the basis of the first control information received from the server 10-3. In this manner, 3D data of the objects that are outside the targets of display is not transmitted to the server 10-3.

Flow of Process

Figure 54:
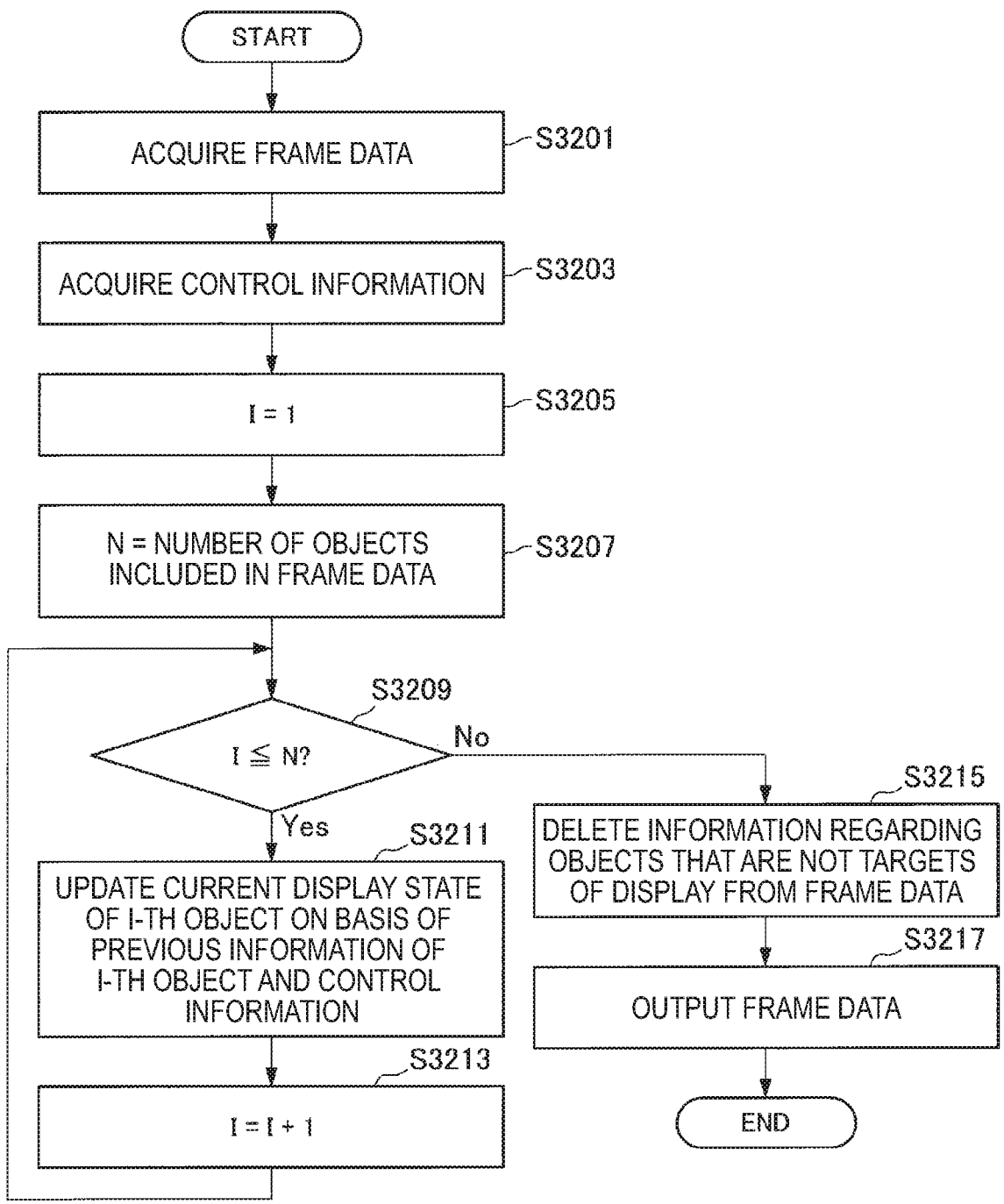
FIG. 54 is a flowchart illustrating an example of processing performed by a stream generating unit 226 according to the third embodiment.

Here, an example of a flow of a process performed by the stream generating unit 226 according to the third embodiment will be described with reference to FIG. 54. As illustrated in FIG. 54, the stream generating unit 226 acquires, from the recognizing unit 224, frame data, which has been sensed (acquired) by the sensor unit 220, on which recognition processing has been performed by the recognizing unit 224 (S3201).

Next, the stream generating unit 226 first acquires the first control information received from the server 10-3 via a control information receiving unit 222 (S3203).

Next, the stream generating unit 226 sets "1" to the variable I indicating the number of objects that are targets of processing (S3205). Then, the stream generating unit 226 sets the number of objects included in the frame data acquired in S3201 to N (S3207).

Then, as long as I is equal to or less than N (S3209: Yes), the stream generating unit 226 repeats the following processing in S3211 to S3213. Specifically, the stream generating unit 226 first updates information regarding whether or not the I-th object is a target of display on the basis of information regarding the I-th object in the previous frame and the list of object IDs of the objects as targets of display that the first control information acquired in S3203 indicates (S3211). Then, the stream generating unit 226 adds "1" to I (S3213).

Meanwhile, in a case in which I becomes greater than N (S3209: No), the stream generating unit 226 deletes the information regarding the object that is outside the targets of display on the basis of information after updating in S3211 from the frame data acquired in S3201 (S3215).

Thereafter, the stream generating unit 226 generates a stream on the basis of the frame data after the changing and then outputs the generated stream to the transmitting unit 228 (S3217).

3-2-2-3. Recognizing Unit 224

The recognizing unit 224 according to the third embodiment can perform a process of recognizing only objects as targets of display on the basis of the list of the IDs of the objects as the targets of display that the first control information received from the server 10-3 indicates.

Alternatively, the recognizing unit 224 can also execute or stop the recognition processing on the basis of the first control information received from the server 10-3. In a case in which the first control information indicating that it is not necessary to perform the recognition processing is received, for example, the recognizing unit 224 stops the recognizing unit. Thereafter, in the first control information for providing an instruction for restarting the recognition processing is received from the server 10-3, the recognizing unit 224 restarts the recognition processing.

Flow of Process

Figure 55:
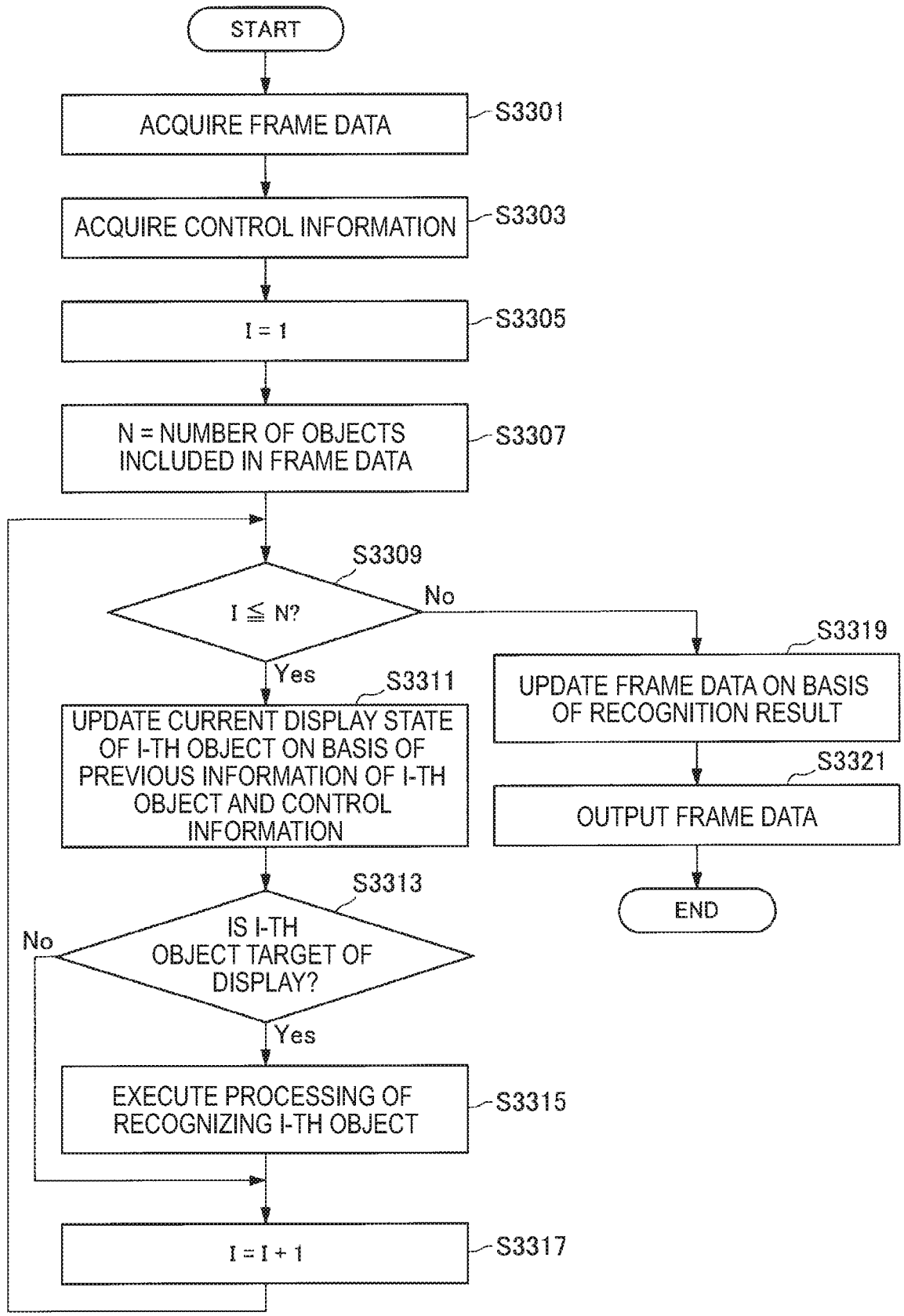
FIG. 55 is a flowchart illustrating an example of processing performed by a recognizing unit 224 according to a third embodiment.

Here, an example of a flow of a process performed by the recognizing unit 224 according to the third embodiment will be described with reference to FIG. 55. As illustrated in FIG. 55, the recognizing unit 224 first acquires frame data sensed (acquired) by the sensor unit 220 from the sensor unit 220 (S3301).

Next, the recognizing unit 224 acquires the first control information received from the server 10-3 via the control information receiving unit 222 (S3303).

Next, the recognizing unit 224 sets "1" to the variable I indicating the number of the objects as targets of display (S3305). Then, the recognizing unit 224 sets the number of objects included in the frame data acquired in S3301 to N (S3307).

Then, as long as I is equal to or less than N (S3309: Yes), the recognizing unit 224 repeats the following processing in S3311 to S3317. Specifically, the recognizing unit 224 first updates information regarding whether or not the I-th object is a target of display on the basis of information regarding the I-th object in the previous frame and the list of object IDs of the objects as targets of display that the control information acquired in S3303 indicates (S3311). In a case in which the i-th object is currently not a target of display (S3313: No), the recognizing unit 224 performs processing in S3317, which will be described later. Meanwhile, in a case in which the i-th object is currently a target of display (S3313: Yes), the recognizing unit 224 executes the recognition processing on the I-th object (S3315). Then, the recognizing unit 224 adds "1" to I (S3317).

Meanwhile, in a case in which I becomes greater than N (S3309: No), the recognizing unit 224 updates the frame data acquired in S3301 on the basis of the recognition result in S3315 (S3319). Thereafter, the recognizing unit 224 outputs the frame data after the updating to the stream generating unit 226 (S3321).

3-3. Advantages

According to the third embodiment, the server 10-3 performs control such that data is not transmitted between the client 20 and the server 10-3 in relation to the objects that are outside the targets of display and performs control such that the client 20 is not allowed to perform the recognition processing as described above. In this manner, it is possible to reduce a communication band, a communication amount, and a calculation load.

3-4. Application Example

Incidentally, if a network band varies, it may become impossible to transmit data of objects that has been able to be transmitted until now. As a result, delay of display and a decrease in a frame rate may occur. Next, an application example of the third embodiment will be described. As will be described later, it is possible to perform control such that data is transmitted between the server 10-3 and the client 20 within a range of the network band in the application example.

3-4-1. Configuration

The recognizing unit 224 of the input unit 22 according to the application example further records a data amount necessary to transmit objects in meta information for the respective objects.

Also, each client connecting unit 120 according to the application example further includes a measurement unit (not illustrated) that measures an upper limit value of the network band related to the client 20 as a connection destination as needed.

In addition, the shared space synthesizing unit 152 according to the application example performs a process of selecting objects as targets of display every time variation in the network band is measured by the measurement unit in relation to at least any of original spaces.

Here, details of the "process of selecting objects as targets of display" will be described. For example, the shared space synthesizing unit 152 selects, as an object as a target of display, an object with the highest priority among objects that have not been selected as the targets of display first. Next, the shared space synthesizing unit 152 calculates a total data size of all the objects as the targets of display that have already been selected until now on the basis of the data size of the object recorded in meta information. Then, the shared space synthesizing unit 152 repeats the selection processing until the total data size reaches a threshold value in accordance with the upper limit of the measured network band.

Also, the control information transmitting unit 122 according to the application example transmits the list of the object IDs of the objects that are outside the targets of display as the first control information to the input units 22 in the original spaces of the objects every time the process of selecting the objects as the targets of display (performed by the shared space synthesizing unit 152) ends. In this manner, the input units 22 do not transmit the objects that are outside the targets of selection to the server 10-3 thereafter.

3-4-2. Advantages

As described above, control is performed such that data is transmitted between the server 10-3 and the client 20 within the range of the network band in the application example. Therefore, it is possible to prevent occurrence of display delay and a decrease in a frame rate even in a case in which the network band varies.

4. Fourth Embodiment

The third embodiment has been described above. As described above, the server 10 according to each embodiment arranges objects in a plurality of real spaces in a shared space. Incidentally, the respective objects may be arranged in the shared space in positional relationships that are not desirable for users without special consideration. For example, two users who are located in different real spaces may be arranged in the shared space such that the users do not face each other. Also, another object may be arranged between the two users even if the two users are arranged such that the users face each other. As a result, a problem may occur when the two users have conversation.

Also, multiple objects may be arranged in the shared space as if spaces are filled with the objects as long as there are vacant spaces. As a result, a shared space in which the users feel uncomfortable may be generated.

Next, a fourth embodiment will be described. As will be described later, according to the fourth embodiment, any of a plurality of base space layouts registered in advance can be selected, and a server 10-4 can generate a shared space by arranging objects as targets of display in accordance with the selected base space layout.

4-1. Outline

First, an outline of a layout of objects in a base space according to the fourth embodiment will be described. According to the fourth embodiment, it is possible to arrange more types of object in the base space (as compared with the second embodiment, for example). For example, it is possible to arrange a video image object of the free viewpoint (as a base space object) in the base space. Here, the video image object of the free viewpoint may be live video image content of the free viewpoint, for example. Also, the video image object of the free viewpoint may be displayed as a background.

Also, in the fourth embodiment, it is also possible to arrange a 2D video image object (as a base space object) in the base space. In a case in which a display floating in a shared space is arranged in the base space, for example, the 2D video image may be displayed on the display. Here, the 2D video image object is, for example, television broadcasting, video distribution content, a web page, or the like. Note that (display information of) the 2D video image object may be acquired from an external server (not illustrated), a device (not illustrated) located near each client 20, or the like.

Also, according to the fourth embodiment, information related to a vacant region in which arrangement of an object is recommended (hereinafter, referred to as arrangement recommendation information) may further be stored in the base space layout information 160. Here, the arrangement recommendation information includes, for example, information regarding an arrangement recommendation position of the object in the base space, a condition of the object that is recommended to be arranged (the type of object and the like), and the like. Further, conditions of the object that can be arranged in the base space (hereinafter, also referred to as an arrangement allowable object condition in some cases) such as the number of persons being equal to or less than three, for example.

Base Space Layout Information 160

Figure 56:
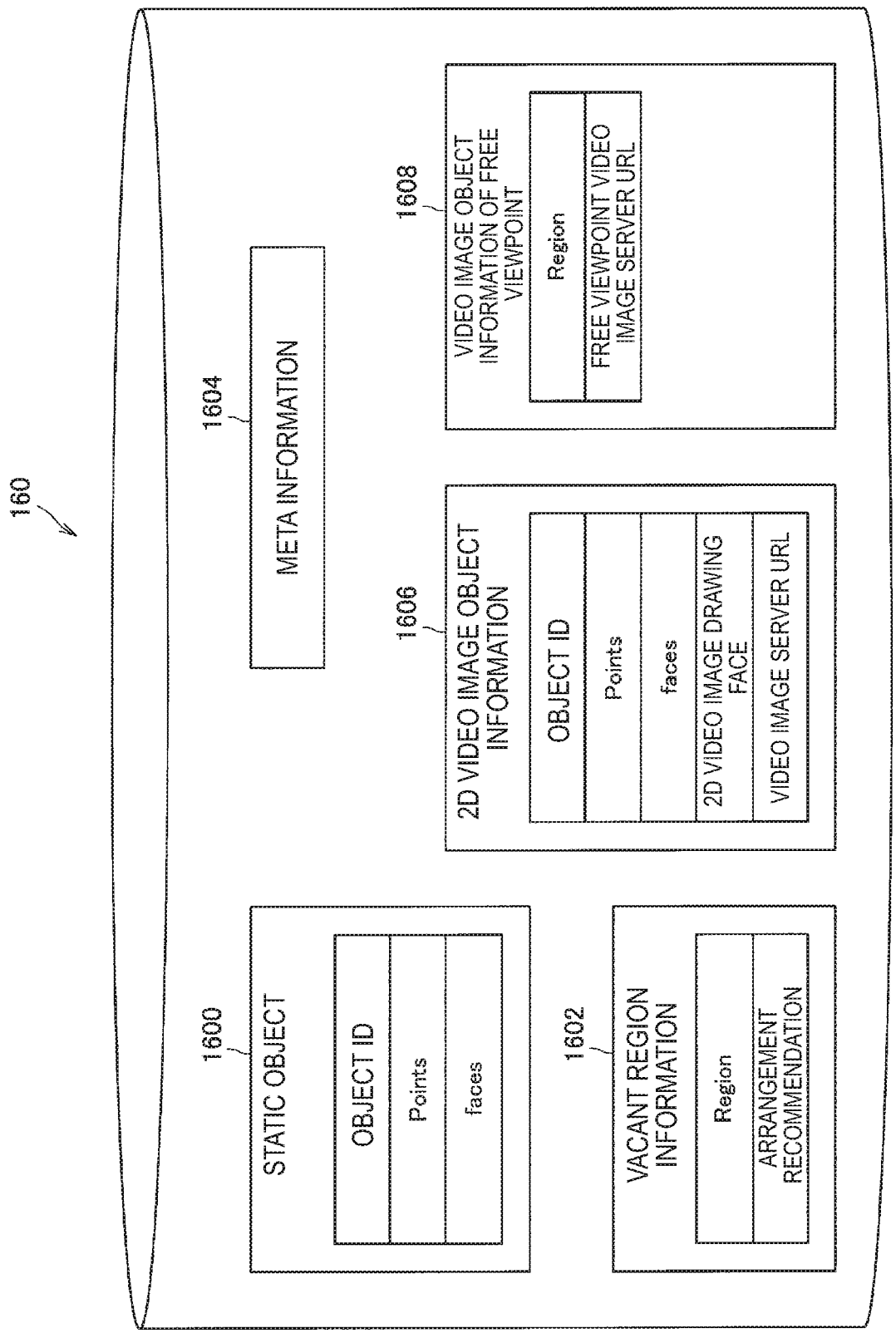
FIG. 56 is an explanatory diagram illustrating a configuration example of base space layout information 160 according to a fourth embodiment.

FIG. 56 is an explanatory diagram illustrating a configuration example of the base space layout information 160 according to a fourth embodiment. As illustrated in FIG. 56, the base space layout information 160 according to the fourth embodiment further includes 2D video image object information 1606 and video image object information of the free viewpoint 1608 as compared with the base space layout information 160 according to the second embodiment (illustrated in FIG. 23). Here, information related to all 2D video image objects arranged in the corresponding base space is recorded in the 2D video image object information 1606. For example, information regarding shared objects, as which the 2D video image objects are arranged, (object IDs, coordinates of points and planes that form the objects, and the like), coordinates of planes in which the 2D video image objects are drawn, a URL of a server (not illustrated) in which the 2D video image objects are stored, are recorded in the 2D video image object information 1606 for the respective 2D video image objects. In addition, information related to the video image objects of the free viewpoint arranged in the corresponding base space is recorded in the video image object information of the free viewpoint 1608. For example, regions in the base space in which the corresponding video image objects of the free viewpoint are arranged, a URL of a server (not illustrated) in which the corresponding video image objects of the free viewpoint are stored, and the like are recorded in the video image object information of the free viewpoint 1608.

Figure 57:
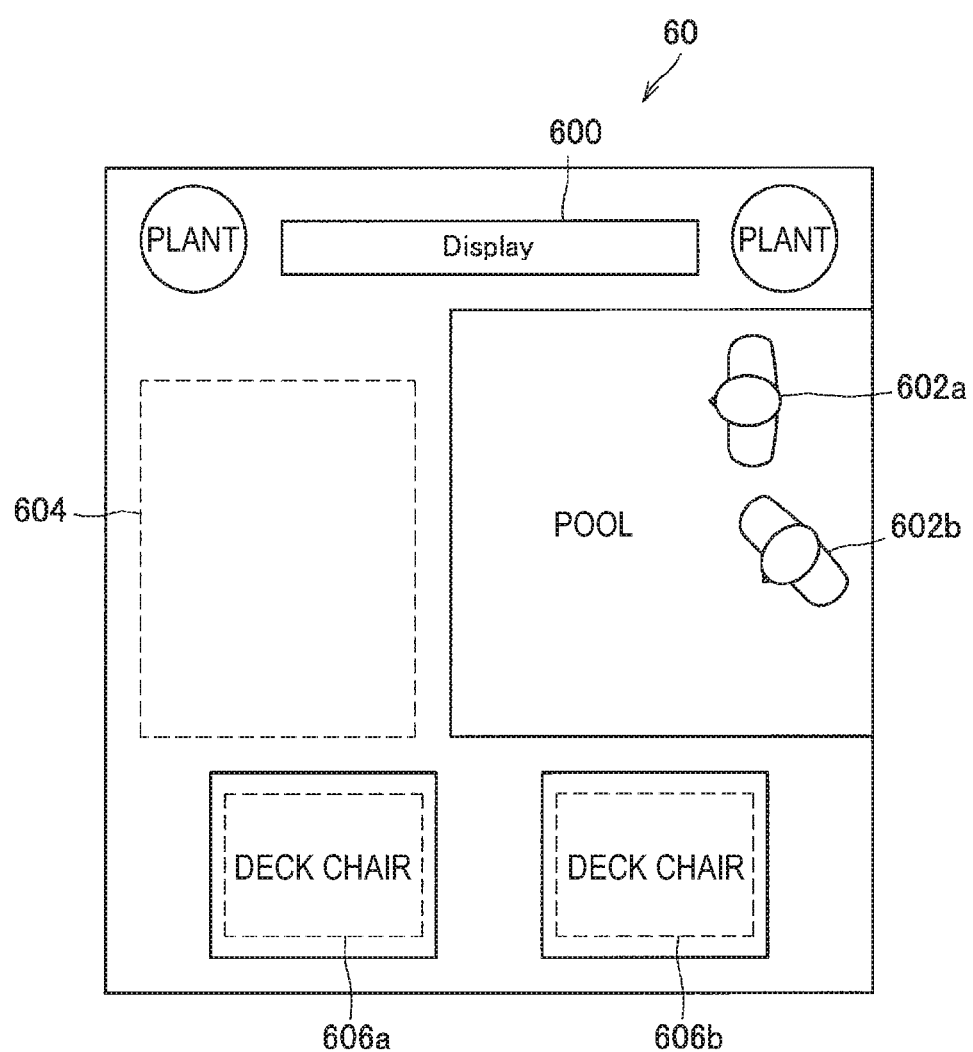
FIG. 57 is an explanatory diagram illustrating an example of a base space layout according to the fourth embodiment.

FIG. 57 is an explanatory diagram illustrating an example of a base space layout (layout 60) according to the fourth embodiment. As illustrated in FIG. 57, two plant objects, a display object 600, a pool object, and two deck chair objects are arranged in a base space according to the layout 60. Here, the display object 600 may be arranged as if the object 600 floated in the air. Also, the display object 600 is configured to be able to display 2D video image objects received from an external server, for example. Also, in the example illustrated in FIG. 57, a person video image object of the free viewpoint 602 is arranged on the pool object. Here, the video image object of the free viewpoint 602 may be, for example, a video image object of the free viewpoint received from a free viewpoint video image content server 50, a free viewpoint live content server 52, or the like, which will be described later.

Also, an object arrangement allowable region 604 and an object arrangement recommendation region 606 are set in the layout 60. Here, the object arrangement allowable region 604 is a region in which an arbitrary type of 3D object can be arranged, for example. In addition, the object arrangement recommendation region 606 is a region in which arrangement of a specific type of 3D object (for example, a person or the like) is recommended.

4-2. Configuration of Information Processing System

Figure 58:
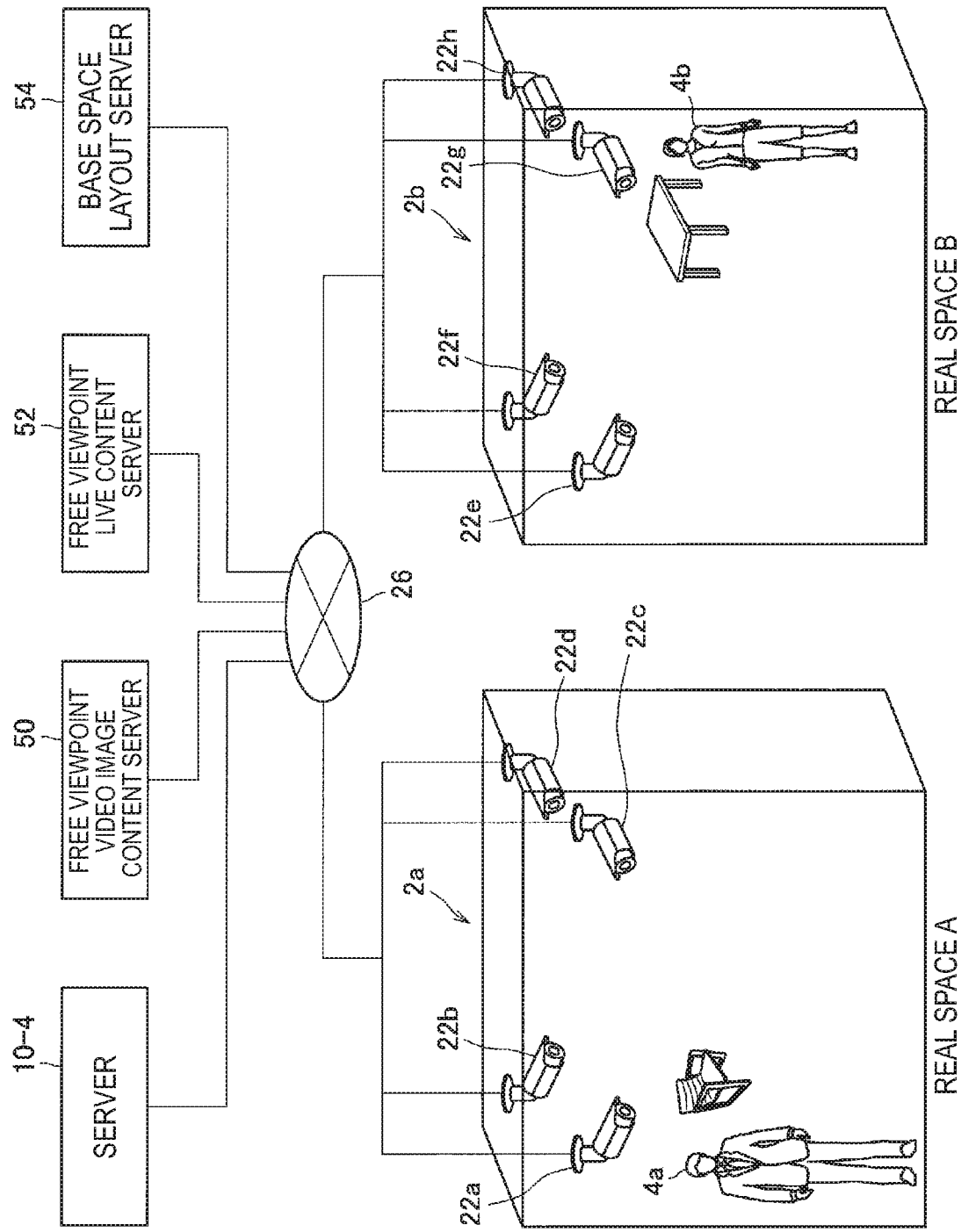
FIG. 58 is an explanatory diagram illustrating a configuration example of an information processing system according to a fourth embodiment.
Figure 59:
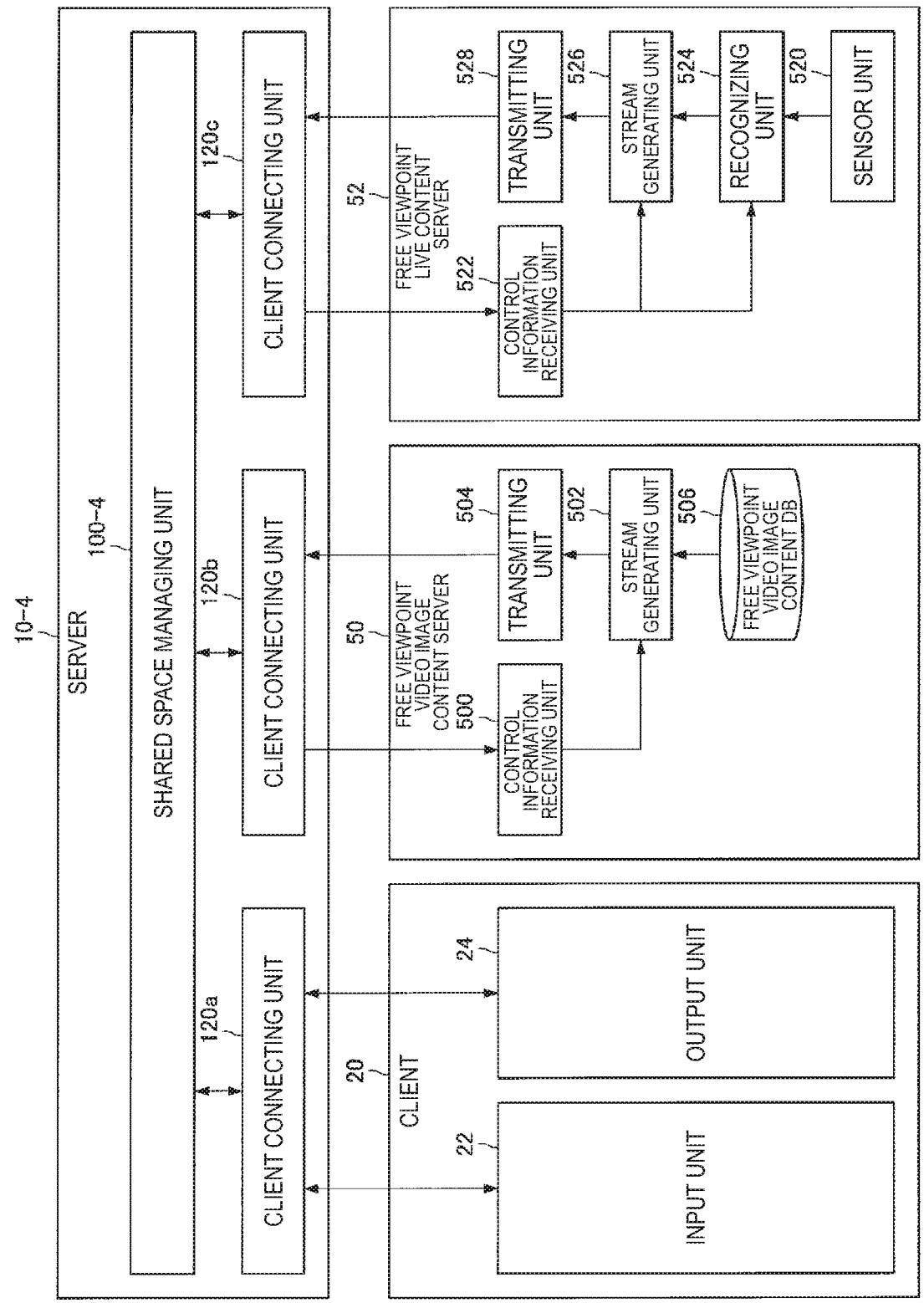
FIG. 59 is a functional block diagram illustrating configuration examples of a free viewpoint video image content server 50 and a free viewpoint live content server 52.
Figure 60:
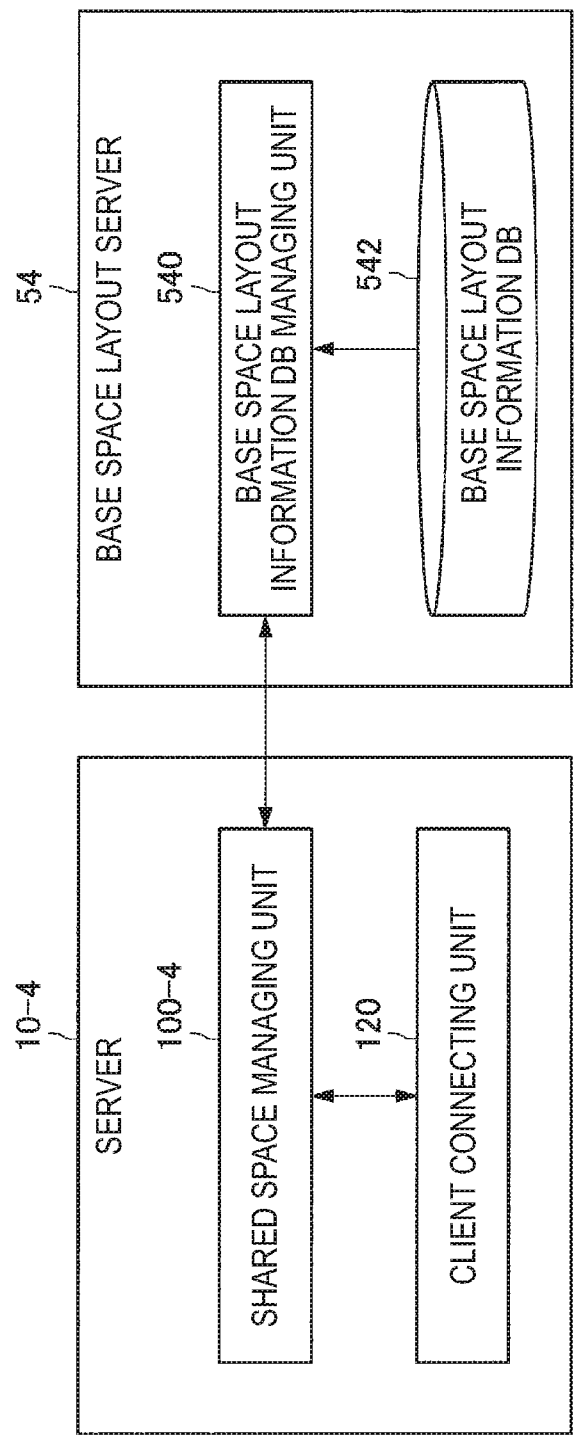
FIG. 60 is a functional block diagram illustrating a configuration example of a base space layout server 54.

Next, a configuration example of an information processing system according to the fourth embodiment will be described with reference to FIGS. 58 to 60. As illustrated in FIG. 58, the information processing system according to the fourth embodiment further includes a free viewpoint video image content server 50, a free viewpoint live content server 52, and a base space layout server 54 as compared with the first embodiment illustrated in FIG. 1.

4-2-1. Free Viewpoint Video Image Content Server 50

The free viewpoint video image content server 50 is a device that distributes video image content of the free viewpoint to, for example, the server 10-4 or the like. Here, a configuration example of the free viewpoint video image content server 50 will be described with reference to FIG. 59. As illustrated in FIG. 59, the free viewpoint video image content server 50 has a control information receiving unit 500, a stream generating unit 502, a transmitting unit 504, and a free viewpoint video image content DB 506.

4-2-1-1. Control Information Receiving Unit 500

The control information receiving unit 500 receives fourth control information from the server 10-4. In addition, the control information receiving unit 500 delivers the received fourth control information to the stream generating unit 502.

4-2-1-2. Stream Generating Unit 502

The stream generating unit 502 generates video image objects of the automatic viewpoint (stream) on the basis of content stored in the free viewpoint video image content DB 506 and the fourth control information delivered from the control information receiving unit 500. For example, the stream generating unit 502 generates video image objects of the automatic viewpoint by extracting content of a type designated by the fourth control information from the free viewpoint video image content DB 506.

4-2-1-3. Free Viewpoint Video Image Content DB 506

The free viewpoint video image content DB 506 is a database that stores a plurality of pieces of video image content of the free viewpoint. For example, video images of the free viewpoint generated on the basis of sensing of real spaces such as concert halls, event halls, sport venues, or downtown, video images of the free viewpoint generated on the basis of imaging during traveling of users, and the like may be stored in the free viewpoint video image content DB 506.

4-2-1-4. Transmitting Unit 504

The transmitting unit 504 transmits the automatic point-of-view video image object generated by the stream generating unit 502 to the server 10-4 (client connecting unit 120).

4-2-2. Free Viewpoint Live Content Server 52

The free viewpoint live content server 52 is a device that distributes free viewpoint live content to the server 10-4 or the like, for example. Here, the live content of the free viewpoint is content of the free viewpoint generated on the basis of sensing performed by a sensor unit 520, which will be described later, at various locations such as concert halls, event halls, sport venues, downtown, libraries, sports clubs, and restaurants, for example. Alternatively, the live content of the free viewpoint may be content of the free viewpoint that is generated in real time on the basis of imaging during traveling of a certain person.

Here, a configuration example of the free viewpoint live content server 52 will be described with reference to FIG. 59. As illustrated in FIG. 59, the free viewpoint live content server 52 has a sensor unit 520, a control information receiving unit 522, a recognizing unit 524, a stream generating unit 526, and a transmitting unit 528.

4-2-2-1. Sensor Unit 520

The sensor unit 520 detects various kinds of data such as 3D data in a real space in which the sensor unit 520 is arranged through reception or reading processing or the like. For example, the sensor unit 520 may have a plurality of depth cameras and a plurality of RGB cameras. In addition, the plurality of depths cameras capture 3D data in the real space in which the sensor unit 520 is arranged. Also, the sensor unit 520 delivers the acquired data to the recognizing unit 524. Note that functions of the sensor unit 520 may be substantially similar to those of the sensor unit 220 (of the input unit 22).

4-2-2-2. Control Information Receiving Unit 522

The control information receiving unit 522 receives the fourth control information from the server 10-4. In addition, the control information receiving unit 500 delivers the received fourth control information to the recognizing unit 524 and the stream generating unit 526.

4-2-2-3. Recognizing Unit 524

The recognizing unit 524 performs various kinds of recognition processing such as recognition of types of objects, for example, on the basis of data delivered from the sensor unit 520 and the fourth control information delivered from the control information receiving unit 522. Also, the recognizing unit 524 delivers the data delivered from the sensor unit 520 and results of the recognition processing to the stream generating unit 526. Note that functions of the recognizing unit 524 may be substantially the same as those of the recognizing unit 224 (of the input unit 22).

4-2-2-4. Stream Generating Unit 526

The stream generating unit 526 generates video image objects of the automatic viewpoint (stream) on the basis of the information delivered from the recognizing unit 524 and the fourth control information delivered from the control information receiving unit 522. In addition, the stream generating unit 526 delivers the generated video image objects of the automatic viewpoint to the transmitting unit 528. Note that functions of the stream generating unit 526 may be substantially similar to those of the stream generating unit 226 (of the input unit 22).

4-2-2-5. Transmitting Unit 528

The transmitting unit 528 transmits the video image objects of the automatic viewpoint delivered from the stream generating unit 526 to the server 10-4 (client connecting unit 120).

4-2-3. Base Space Layout Server 54

The base space layout server 54 is a device that manages the base space layout information DB 542. Here, a configuration example of the base space layout server 54 will be described with reference to FIG. 60. As illustrated in FIG. 60, the base space layout server 54 has a base space layout information DB managing unit 540 and a base space layout information DB 542.

4-2-3-1. Base Space Layout Information DB 542

The base space layout information DB 542 is a database that stores information regarding a plurality of layouts registered in advance. For example, the base space layout information DB 542 stores layout identification information (such as names) and layouts in an associated manner.

4-2-3-2. Base Space Layout Information DB Managing Unit 540

The base space layout information DB managing unit 540 performs various kinds of processing such as extraction, registration, updating, and the like of data on the base space layout information DB 542. In a case in which a layout acquisition request is received from the server 10-4, for example, the base space layout information DB managing unit 540 extracts a layout of the type indicated by the acquisition request from the base space layout information DB 542 first. Then, the base space layout information DB managing unit 540 transmits the extracted layout to the server 10-4.

4-3. Configuration

Figure 61:
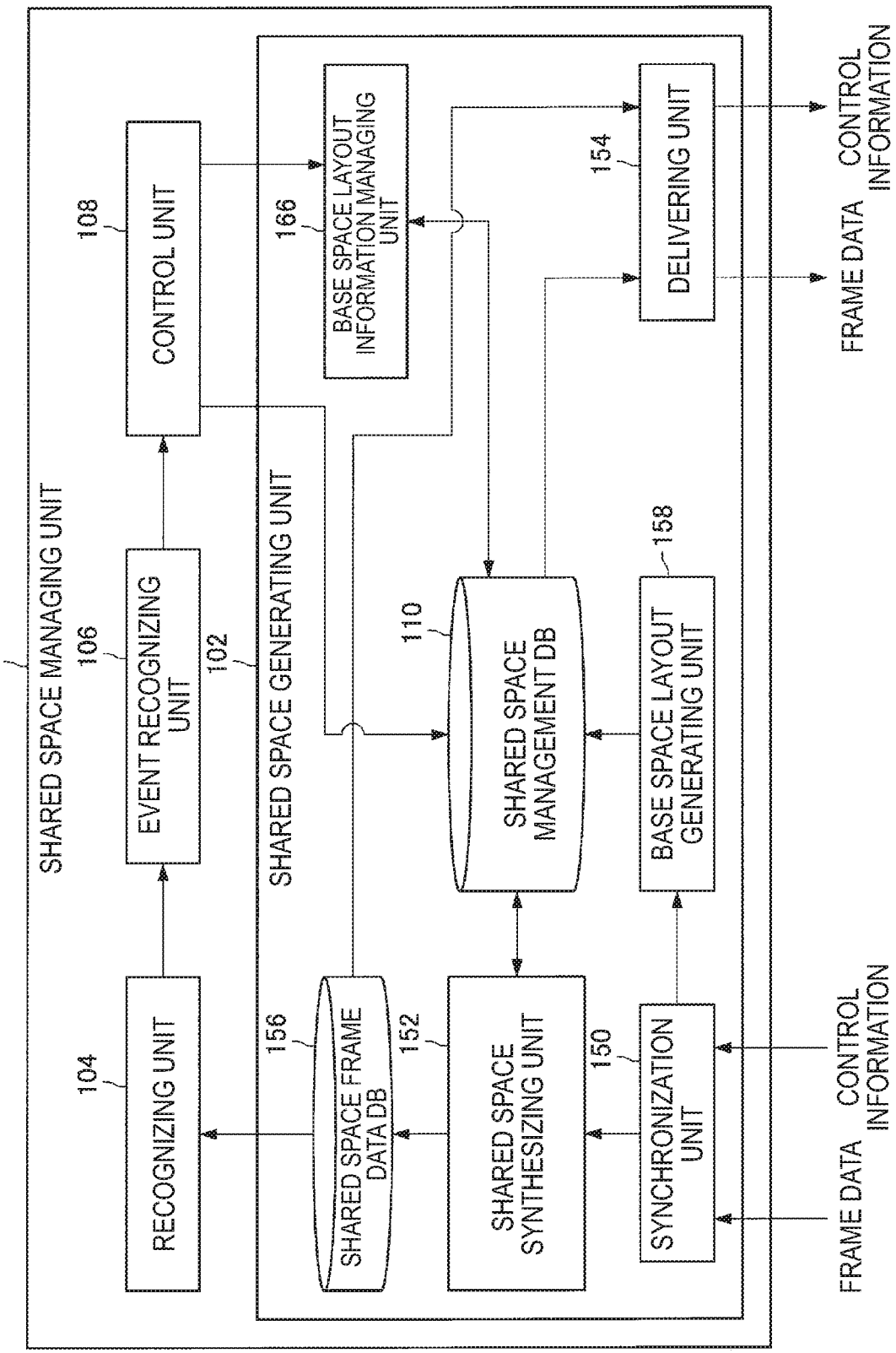
FIG. 61 is a functional block diagram illustrating a configuration example of a shared space managing unit 100-4 according to the fourth embodiment.

The configuration of the information processing system according to the fourth embodiment has been described above. Next, a configuration of the server 10-4 according to the fourth embodiment will be described in detail. FIG. 61 is a functional block diagram illustrating a configuration example of a shared space managing unit 100-4 according to the fourth embodiment. As illustrated in FIG. 61, the shared space managing unit 100-4 further includes a base space layout information managing unit 166 (as compared with the shared space managing unit 100-2 according to the second embodiment).

4-3-1. Control Unit 108

The control unit 108 according to the fourth embodiment generates control information for switching a layout in the bas space on the basis of a recognition result obtained by the event recognizing unit 106. In a case in which an instruction for changing the layout through a gesture, utterance (such as a sound command), an operation performed on a predetermined UI, or the like of a user who is participating in the shared space is recognized, for example, the control unit 108 generate third control information for switching the layout in the base space to a layout of the designated type. Then, the control unit 108 delivers the generated control information to the base space layout information managing unit 166.

4-3-2. Base Space Layout Information Managing Unit 166

The base space layout information managing unit 166 acquires base space layout information as candidates from the base space layout server 54 on the basis of the third control information delivered from the control unit 108.

In addition, the base space layout information managing unit 166 can store the layout information received from the base space layout server 54 in the base space layout information 160. For example, the base space layout information managing unit 166 replaces information currently stored in the base space layout information 160 with the received layout information.

4-4-3. Shared Space Synthesizing Unit 152

4-3-3-1. Arrangement of Objects

The shared space synthesizing unit 152 according to the fourth embodiment acquires layout information from the base space layout information 160 and then generate a shared space on the basis of the acquired layout information. In a case in which 3D video image objects of the free viewpoint or 2D video image objects are stored in the acquired base space layout information, for example, the shared space synthesizing unit 152 decides the objects as objects as targets of display with higher priority (than that for other objects).

Also, in a case in which vacant region information is included in the acquired base space layout information and arrangement recommendation information is included in the vacant region information, the shared space synthesizing unit 152 arranges recommended objects indicated by the arrangement recommendation information (among the selected objects as the targets of display) at positions indicated by the arrangement recommendation information. Then, the shared space synthesizing unit 152 ends the layout of the objects in the shared space at a timing at which there becomes no vacancy in the region in which arrangement of objects is recommended (that is, at the timing when the arranged objects become sufficient).

Also, in a case in which the acquired base space layout information is for providing an instruction for arranging video image objects of the free viewpoint or 2D video image objects, the shared space synthesizing unit 152 acquires the objects (or frame data) from the free viewpoint video image content server 50, the free viewpoint live content server 52, or another external server (not illustrated). Then, the shared space synthesizing unit 152 generates shared space frame data by synthesizing the acquired objects (or the frame data) with frame data received from the input units 22 in the respective original spaces for the respective frames.

4-3-3-2. Switching Timing of Base Space

Note that the shared space synthesizing unit 152 can switch the base space in the shared space on the basis of acquisition of the base space layout information performed by the base space layout information managing unit 166. When the base space layout information is acquired, for example, the shared space synthesizing unit 152 automatically switches the layout in the base space in the shared space to a layout indicated by the acquired base space layout information.

4-4. Advantages

As described above, the server 10-4 arranges the objects as the targets of display in accordance with the base space layout selected by users from among the plurality of base space layouts registered in advance, thereby generating the shared space according to the fourth embodiment. In this manner, it is possible to arrange the respective objects in a desirable layout for the users in the shared space.

For example, (two) friends who are located in mutually different real spaces can get feelings as if they were in any of the real spaces together, by selecting the real space in which any of them is located as a base space. Alternatively, it is possible to enjoy an atmosphere of a resort or a live concert hall together by selecting the resort or the liver concert hall as a base space.

Also, the server 10-4 can cause a display or the like in the selected base space to display various kinds of content such as a 2D video image object. In this manner, it is possible for friends to view and enjoy various kinds of content in a shared space. In addition, it is possible for friends to check face expressions of counterparts while viewing content and thereby to feel that they have and enjoy the same expression in the shared space.

4-5. Modification Example

Note that although the example in which the users select any of a plurality of pieces of layout information registered in advance has been described above, the present disclosure is not limited to such an example. For example, an arrangement allowable object condition (for example, the maximum number of persons who can be arranged is limited to three) may be assigned to each of the plurality of pieces of layout information registered in advance. Then, the server 10-4 can also automatically select an optimal layout on the basis of the arrangement allowable object condition assigned to each piece of the layout information and information regarding original spaces (for example, the number of original spaces (in which the respective users who participate in the shared space is located), objects in the original space, the number of users, and the like).

5. Fifth Embodiment

The fourth embodiment has been described above. As described above, it is assumed that the layout information of the base space has been registered in advance in the fourth embodiment.

Next, a fifth embodiment will be described. As will be described later, a server 10-5 according to the fifth embodiment can edit layout information of a base space on the basis of a user's instruction when a base space layout editor is activated. In this manner, the user can edit the layout information of the base space as desired.

5-1. Configuration

Components included in the server 10-5 according to the fifth embodiment are similar to those in the fourth embodiment (illustrated in FIG. 61, for example). Only details that are different from those in the fourth embodiment will be described below.

5-1-1. Base Space Layout Information Managing Unit 166

The base space layout information managing unit 166 according to the fifth embodiment generates or modifies layout information of a base space on the basis of a result of recognizing a user's instruction (for example, a gesture or utterance (such as a sound command)) when the base space layout editor is activated. In addition, the base space layout information managing unit 166 can transmit the generated or updated layout information to the base space layout server 54.

5-1-1-1. Base Space Layout Editor

The base space layout editor is a mode for editing the layout information of the base space. For example, only objects stored in the base space layout information 160 are displayed in the shared space, and users can edit the layout information of the base space while viewing the displayed objects, using the base space layout editor.

Activation and end of the base space layout editor are executed on the basis of a result of recognizing a user's gesture or sound command or the like in the shared space, for example. Also, the layout information may be edited on the basis of a result of recognizing the user's instruction (for example, the gesture, the sound command, or the like) using the base space layout editor. For example, deletion and positional change of objects stored in the base space layout information 160, setting of arrangement allowable regions of the objects in the layout, designation of objects as targets of display, designation of types of objects that can be arranged in vacant regions, and the like may be executed on the basis of the result of recognizing the user's instruction.

Also, the base space layout information managing unit 166 recreate the layout information of the base space every time an editing operation is performed once using the base space layout editor, and the shared space synthesizing unit 152 uses the layout information of the base space after the recreation to generate the shared space in the following frames. That is, a result of the editing operation may be immediately reflected to the shared space, and the video image after the reflection may be displayed on the display unit 246.

Also, if an operation of saving the base space layout information when the base space layout editor is activated, the base space layout information managing unit 166 transmits the layout information at the present time to the base space layout server 54. In this manner, the edited layout information is saved in the base space layout information DB 542. Therefore, it is possible to use the edited layout information any time after then.

Utilization Example of Base Space Layout Editor

Figure 62C:
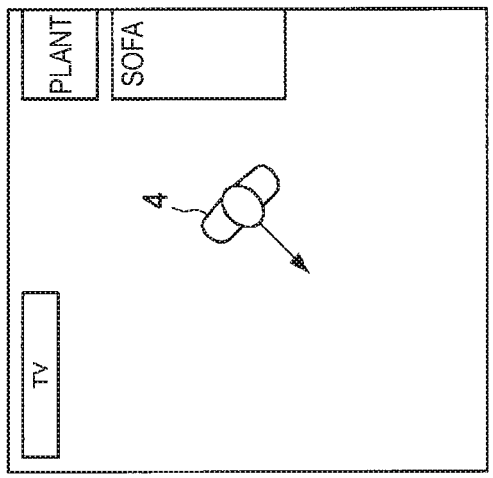
FIGS. 62A, 62B, and 62C are explanatory diagrams illustrating an example in which a base space layout editor is used according to a fifth embodiment.

Here, a utilization example of the base space layout editor will be described with reference to FIGS. 62A, 62B, 62C, 63A, 63B, and 63C. First, if issuance of a sound command for activating the base space layout editor by a user 4 in the shared space, for example, is recognized, the server 10-5 activates the base space layout editor. Then, a video image in which the user 4 is located in a shared space including only objects stored in the base space layout information 160 is displayed on the display unit 246 (that the user 4 views) as illustrated in FIG. 62A.

Figure 62B:
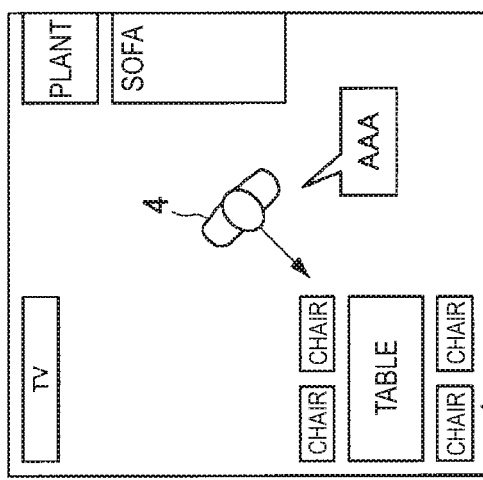
Figure 62A:
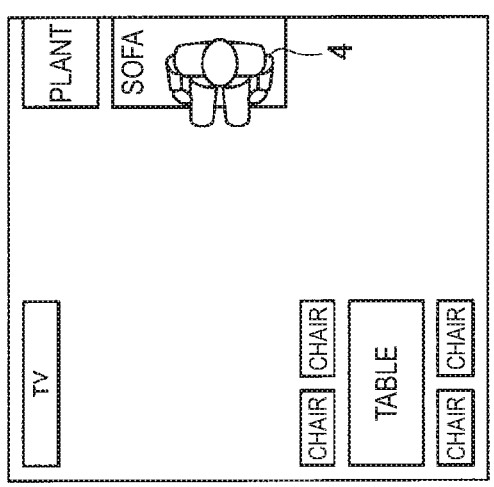

It is assumed that the user 4 desires to delete a table and a plurality of chairs 620, for example, and issues a sound command for deleting the objects from the base space as illustrated in FIG. 62B thereafter. In this case, the server 10-5 deletes the table and the plurality of chairs 620 from the base space layout information 160 as illustrated in FIG. 62C.

Figure 63C:
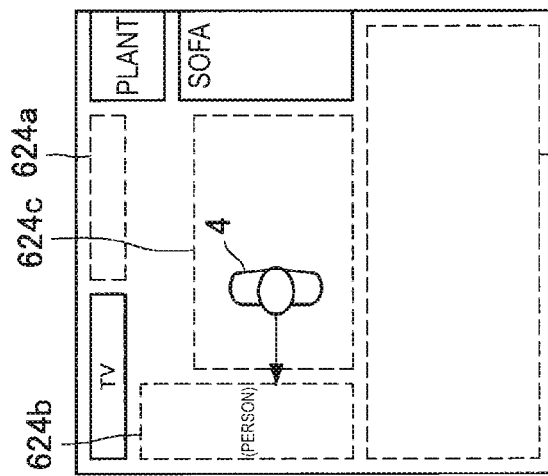
FIGS. 63A, 63B, and 63C are explanatory diagrams illustrating an example in which a base space layout editor is used according to a fifth embodiment.
Figure 63B:
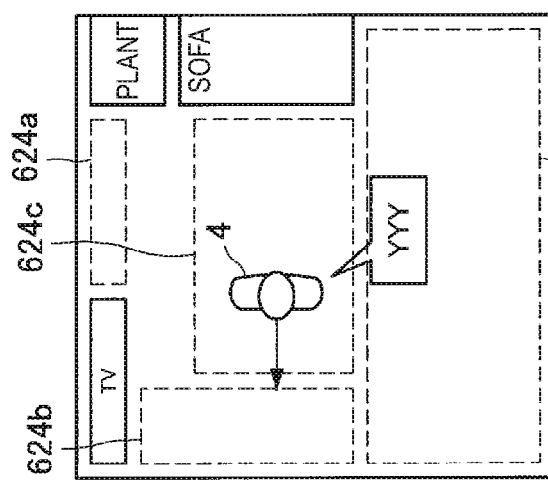
Figure 63A:
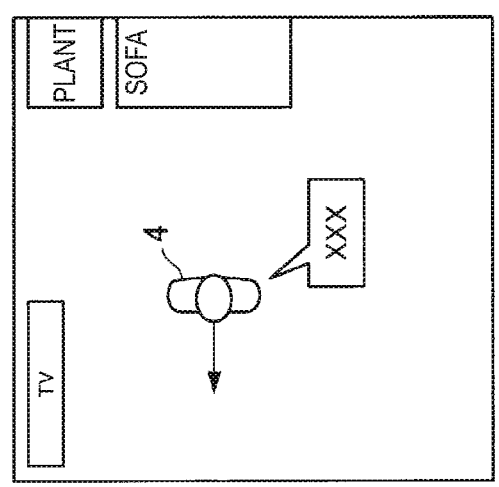

It is assumed that the user 4 desires to edit arrangement allowable regions (vacant regions) registered in the base space layout information 160 and issues a sound command for causing the arrangement allowable regions, for example, to be displayed as illustrated in FIG. 63A thereafter. In this case, the plurality of arrangement allowable regions 624 registered in the base space layout information 160 are further displayed on the display unit 246 as illustrated in of FIG. 63B. It is assumed that the user 4 desires to set recommendation of arrangement of "persons" in an arrangement allowable region 624b and issues a sound command for setting the arrangement allowable region 624b to be an arrangement recommendation region of "persons" as illustrated in of FIG. 63B, for example, thereafter. In this case, the server 10-5 sets the arrangement allowable region 624b as the arrangement recommendation region of "persons" as illustrated in FIG. 63C.

Thereafter, if the user 4 issues a sound command for saving layout information and a sound command for ending the base space layout editor, the server 10-5 (base space layout information managing unit 166) transmits the layout information at the present time to the base space layout server 54.

5-2. Advantages

As described above, the server 10-5 can activate the base space layout editor on the basis of a user's instruction and edit the layout information of the base space on the basis of the user's instruction when the base space layout editor is activated according to the fifth embodiment. In this manner, the user can edit the layout information of the base space as desired.

Further, according to the fifth embodiment, the edited layout information may be transmitted (as it is) to and saved in the base space layout server 54. In this manner, it is possible to use the edited base space layout information any time after then. Further, it is also possible to distribute the base space layout information as content.

6. Sixth Embodiment

The fifth embodiment has been described above. Incidentally, a case in which a user 4a does not desire to show a specific object (or a person) in an original space 2a in which the user 4a is located to another user 4b (in another original space 2b) during space sharing is also conceivable. In such a case, it is desirable that the user 4a can designate whether or not sharing of objects in the original space 2a is possible.

Next, a six embodiment will be described. As will be described later, users can designate whether or not sharing of objects in original spaces in which the users are located is possible according to the sixth embodiment.

6-1. Configuration

6-1-1. Input Unit 22

Figure 64:
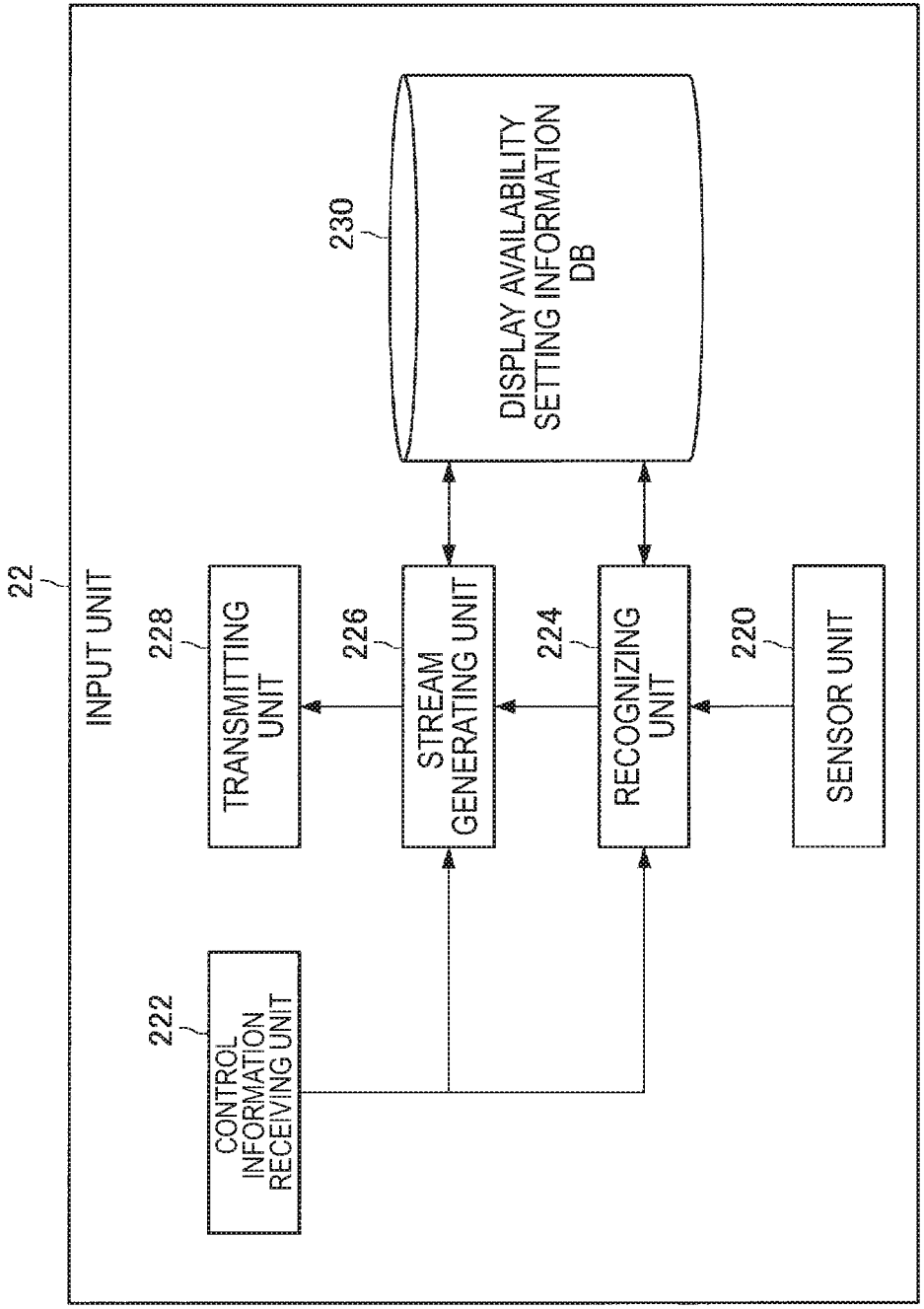
FIG. 64 is a functional block diagram illustrating a configuration example of an input unit 22 according to a sixth embodiment.

First, a configuration according to the six embodiment will be described. FIG. 64 is a functional block diagram illustrating a configuration example of an input unit 22 according to the sixth embodiment. As illustrated in FIG. 64, the input unit 22 according to the sixth embodiment further includes a display availability setting information DB 230 as compared with the first embodiment (illustrated in FIG. 2).

6-1-1-1. Display Availability Setting Information DB 230

The display availability setting information DB 230 is a database that stores setting information regarding availability of display related to the respective objects in a real space in which the input unit 22 is located. The availability of display of the respective objects is set and changed on the basis of first control information received from a server 10-6, for example, in the display availability setting information DB 230. For example, the server 10-6 decides availability of display of the respective objects on the basis of a result of recognizing a user's instruction (such as a gesture or a sound command) when the display availability setting editor, which will be described later, is activated and transmits the decided information as the first control information to the input unit 22. In this manner, the input unit 22 may change registered content in the display availability setting information DB 230 on the basis of the received first control information.

6-1-1-1. Display Availability Setting Editor

Here, further details of the aforementioned display availability setting editor will be described. The display availability setting editor is a mode for setting availability of display of the respective objects in a real space in which a user is located. For example, the respective objects in the real space in which a user is located may be displayed on a virtual space (for example, a shared space) corresponding to the real space, for example, according to the display availability setting editor. Then, the user can set availability of display of the respective objects while viewing video images of the displayed objects. Note that marks indicating the availability of display set for the objects may be displayed at the positions of the respective objects displayed on the display unit 246. Alternatively, the objects, display of which is not allowed through setting, may not be displayed.

For example, activation and end of the display availability setting editor are executed on the basis of a result of recognizing a user's gesture, sound command, or the like in the shared space, for example. Also, availability of display of the respective objects is set on the basis of a result of recognizing a user's instruction (for example, a gesture, a sound command, or the like) using the display availability setting editor. Note that the user can also individually designate the availability of display of the respective objects or may collectively designate the availability of display of a plurality of objects through an utterance of "All the following objects are not allowed to be displayed!", for example.

Also, the server 10-6 changes setting information related to availability of sharing of a corresponding object in the object management information DB 164 every time an instruction regarding the availability of display is recognized once by the display availability setting editor. Note that in this case, the server 10-6 causes a display mode of the corresponding object in the following frames to be changed and generates shared space frame data. For example, the server 10-6 raises transmittance of the object, changes a display color, or causes the object in the following frames to blink.

In addition, if an operation of ending setting is performed when the display availability setting editor is activated, the server 10-6 (control information transmitting unit 122) transmits information regarding objects, display of which is not allowed through setting, as first control information to the input unit 22 (in the original space of the objects). In this manner, the input unit 22 may change registered content in the display availability setting information DB 230 on the basis of the received first control information.

Utilization Example of Display Available Setting Editor

Figure 65C:
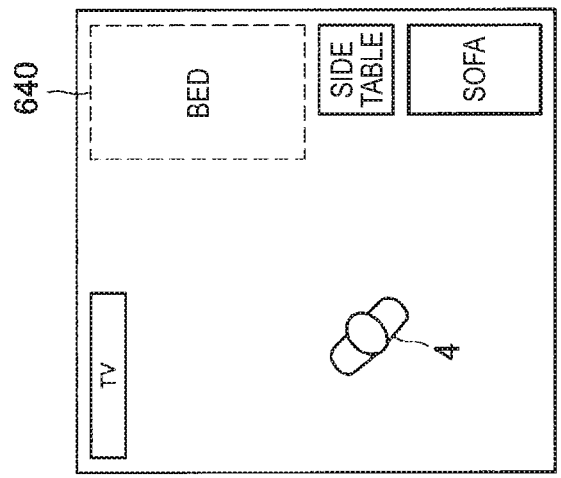
FIGS. 65A, 65B, and 65C are explanatory diagrams illustrating an example in which a display availability setting editor is used according to the sixth embodiment.

Here, a utilization example of the display availability setting editor will be described with reference to FIGS. 65A, 65B, and 65C. First, if issuance of a sound command for activating the display availability setting editor by a user 4 in the shared space, for example, is recognized, the server 10-6 activates the display availability setting editor. Then, a video image in which objects in a real space in which a user 4 is located are arranged in a shared space is displayed on the display unit 246 (that the user 4 views) as illustrated in FIG. 65A.

Figure 65B:
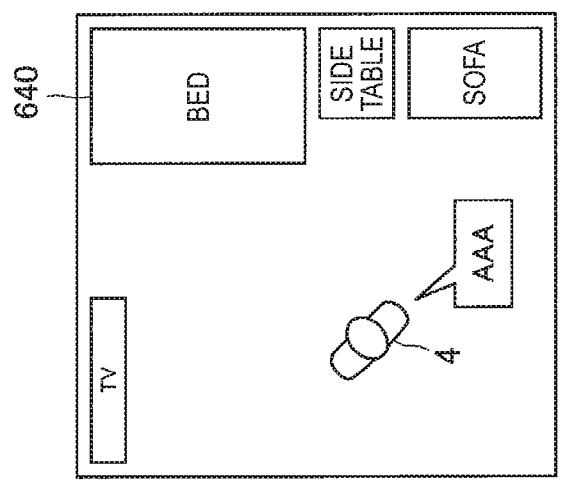
Figure 65A:
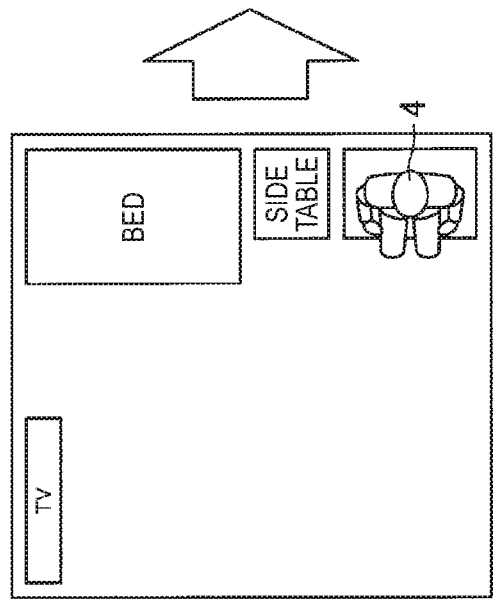

It is assumed that the user 4 desires setting not to allow a bed 640 to be displayed and issues a sound command for setting not to display the bed 640 as illustrated in of FIG. 65B, for example, thereafter. In this case, the server 10-6 decides not to display the bed 640 as illustrated in FIG. 65C. Note that at this time, the server 10-6 may change a display mode of the bed 640, and for example, the bed 640 may not be displayed in the following frames.

Thereafter, if the user 4 issues a sound command for ending the display availability setting editor, the server 10-6 transmits information regarding all the objects, display of which is not allowed through setting until the present time, as first control to the input unit 22 (in the original space in which the user 4 is located.

Modification Example

Note that in a modification example, availability of display of the respective objects may be able to be set for the respective counterpart users. For example, in relation to a certain object, it may be possible to perform setting such that the object can be displayed for family members and cannot be displayed for friends.

Also, in another modification example, the input unit 22 or the server 10-6 may automatically set availability of display of the respective objects on the basis of a predetermined condition. For example, types of objects that cannot be displayed may be registered in a table in advance. In this case, the input unit 22 or the server 10-6 may collectively set objects of a corresponding type such that the objects cannot be displayed. According to the modification example, it is possible to automatically perform setting such that objects of types that multiple users do not desire to show other users, for example, cannot be displayed. Thus, it is not necessary for the respective users to perform setting operations, and usability is improved.

6-1-1-3. Recognizing Unit 224

The recognizing unit 224 according to the sixth embodiment executes recognition processing in relation to the respective objects on the basis of registered content in the display availability setting information DB 230. For example, in relation to only objects that are allowed to be displayed through setting in the display availability setting information DB 230, the recognizing unit 224 performs a process of recognizing the objects. In this manner, it is possible to delete a processing load.

6-1-1-4. Stream Generating Unit 226

The stream generating unit 226 according to the sixth embodiment further generates a stream on the basis of the registered content in the display availability setting information DB 230. For example, the stream generating unit 226 generates a stream by excluding 3D data of all the objects, display of which is not allowed through setting in the display availability setting information DB 230, from the stream to be generated. In this manner, the 3D data of all the objects, display of which is not allowed through setting, is not transmitted to the server 10-6. Therefore, it is possible to reduce the communication amount.

6-2. Advantages

As described above, it is possible for the user to set availability of display in content of the free viewpoint (corresponding to the shared space) in relation to the respective objects in the original space in which the user is located according to the sixth embodiment. In this manner, it is possible to apply restriction such that specific objects (including persons) in the original space 2a of the user are not shown to another user in another original space 2b while allowing space sharing.

6-3. Modification Example

6-3-1. First Modification Example

Note that in a modification example, the server 10-6 may dynamically change setting for restricting display of objects, which has been set in relation to a certain real space, depending on whether or not the real space has been set as a base space. In a case in which a certain real space has been set as a base space, for example, the server 10-6 may dynamically loosen the setting for restricting display of objects, which has been set in relation to the real space.

6-3-2. Second Modification Example

Also, in another modification example, users in the respective real spaces who are participating a shared space may request permission of display in relation to objects, display of which in other real spaces that are participating in the shared space has been restricted, from users in other real spaces (using a UI or the like, for example). Also, in a case in which a user in a real space 2b that is a transmission destination of the display request provides a reply indicating acceptance of the display request (via a UI or the like displayed by the output unit 24, for example), the server 10-6 may loosen or release the setting for restricting display of the objects in the real space 2b in response to the display request.

7. Seventh Embodiment

The sixth embodiment has been described above. Incidentally, in a situation in which a shared space is generated by synthesizing a plurality of real spaces, desirable positional relationships of the plurality of real spaces may change depending on situations of users who are located in the plurality of respective real spaces. In a situation in which users in two real spaces have a conversation while sitting on chairs and facing each other in a shared space, for example, it is desirable that heights of visual lines of the users in the two real spaces are similar to each other. Also, in a situation in which a notebook placed on a table is viewed with a user in another real space, it is desirable that the heights of tables in the two real spaces are similar to each other.

However, user's setting of the positional relationships among a plurality of spaces every time in accordance with a situation requires a large load imparted on the user.

Next, a seventh embodiment will be described. As will be described later, a server 10-7 according to the seventh embodiment decides the respective objects that are recognized as being similar (to each other) that are located at each of a plurality of real spaces as reference objects and synthesizes the plurality of real spaces on the basis of reference points or reference planes associated with the reference objects, thereby generating a shared space. In this manner, it is possible to synthesize two real spaces with a positional relationship suitable for situations of the respective users.

Note that in the seventh embodiment, it is basically assumed that the plurality of real spaces are synthesized as they are, thereby generating a shared space. Also, it is assumed that the display unit 246 is an AR device. In addition, a base space in the seventh embodiment may be a space that is used only for positioning the respective objects in the shared space. That is, the base space is basically not displayed on the display unit 246.

7-1. Configuration

First, a configuration of the server 10-7 according to the seventh embodiment will be described. Note that components included in the server 10-7 are similar to those in the second embodiment (illustrated in FIG. 21). Hereinafter, only components with functions that are different from those in the second embodiment will be described.

7-1-1. Shared Space Synthesizing Unit 152

7-1-1-1. Synthesis of Spaces

According to the seventh embodiment, general similarity (or relevance) between objects of a plurality of types may be registered in a table in advance. Then, the shared space synthesizing unit 152 decides a method of synthesizing the plurality of real spaces on the basis of similarity of the objects located in different real spaces and positional relationships between the objects and users in the respective real spaces.

In a case in which a real space 2a and a real space 2b are synthesized, for example, the shared space synthesizing unit 152 decides one object in the real space 2a and one object in the real space 2b as reference objects, respectively, on the basis of similarity between the respective objects located near the user in the real space 2a and the respective objects located near the user in the real space 2b first. Then, the shared space synthesizing unit 152 synthesizes the real space 2a and the real space 2b by matching the reference points (or the reference planes) corresponding to the two reference objects on the basis of how to match the reference points (or the reference planes) respectively associated with the two decided reference objects.

More specifically, the shared space synthesizing unit 152 specifies the similarity between the respective objects located near the user in the real space 2a and the respective objects located near the user in the real space 2b with reference to the table first. Then, the shared space synthesizing unit 152 extracts a combination between an object in the real space 2a and an object in the real space 2b with the highest similarity specified and then respectively decides the extracted one object in the real space 2a and the one object in the real space 2b as the reference objects. Next, the shared space synthesizing unit 152 specifies how to match the reference points (or the reference planes) registered in the table in an associated manner with the decided reference objects. Then, the shared space synthesizing unit 152 synthesizes the real space 2a and the real space 2b by matching the reference points (or the reference planes) respectively associated with the two reference objects in accordance with how to match the reference points (or the reference planes) as specified.

7-1-1-2. Decision of Positional Relationships

Also, the shared space synthesizing unit 152 can decide the positional relationships for synthesizing the plurality of real spaces on the basis of recognition results of the recognizing unit 224 of the input unit 22 or the recognizing unit 104 of the server 10-7. Here, examples of the recognition results include results of recognizing types of objects (for example, a floor, a desk, a chair, a guitar, a piano, and the like) and recognition results in relation to persons (for example, joint information, a face position, a gesture, and the like). Alternatively, geometric information such as a horizontal plane and a vertical plane in combination with gyro data may be used as the recognition results.

Here, further details of the above description will be given with reference to FIGS. 66 and 67. Also, FIGS. 66 and 67 illustrate an example in which a shared space is generated by frame data based on sensing of the real space 2a and frame data based on sensing of the real space 2b being synthesized as they are.

Figure 66:
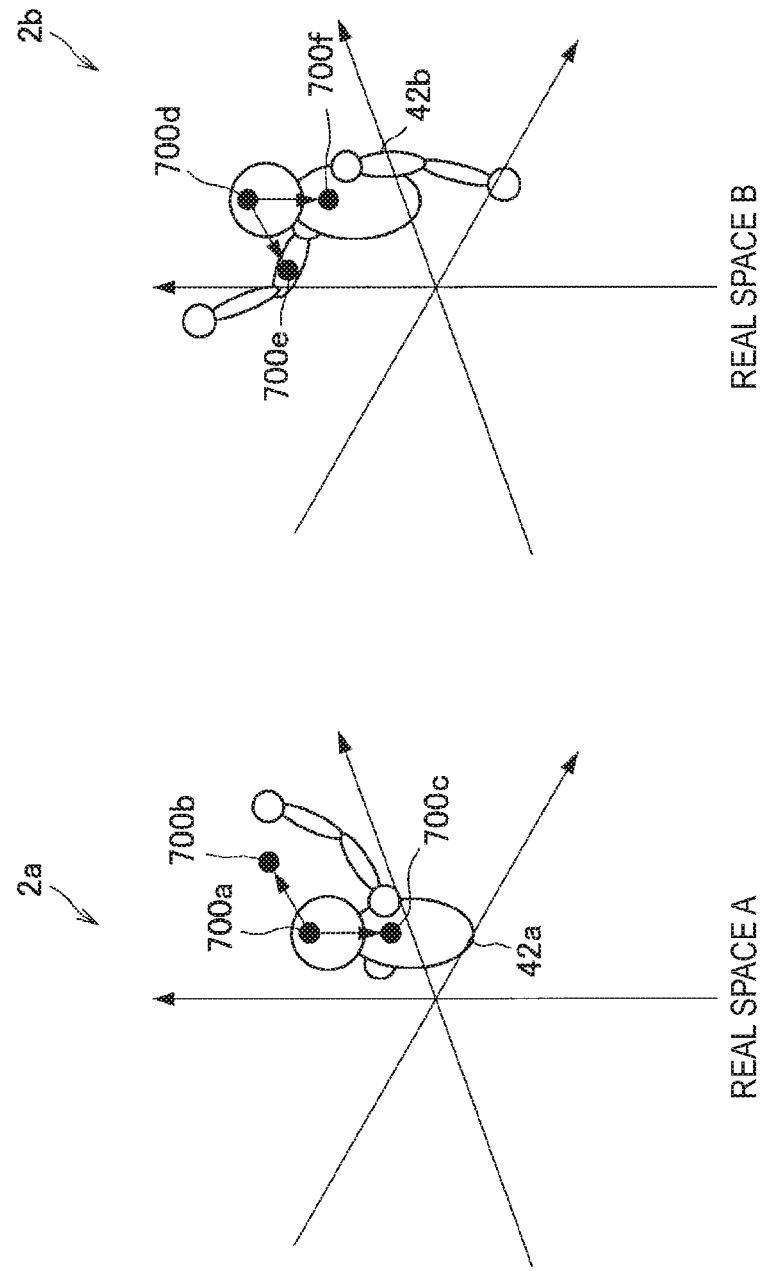
FIG. 66 is an explanatory diagram illustrating a synthesis example of two spaces according to a seventh embodiment.

As illustrated in FIG. 66, for example, the shared space synthesizing unit 152 extracts three reference points from each of the frame data in the real space 2a and the frame data in the real space 2b first. For example, the shared space synthesizing unit 152 respectively extracts, as the reference points, a point 700a of a head of an object 42a (user) in the real space 2a, a point 700b obtained by moving the point 700a in a front direction of the object 42a by a unit length, and a point 700c obtained by moving the point 700a in a gravity direction by a unit length. Also, the shared space synthesizing unit 152 respectively extracts, as the reference points, a point 700d of a head of an object 42b (user) in the real space 2b, a point 700e obtained by moving the point 700d in a front direction of the object 42b by a unit length, and a point 700f obtained by moving the point 700d in the gravity direction by a unit length.

Then, the shared space synthesizing unit 152 arranges the three reference points extracted from the frame data in the real space 2a and the three reference points extracted from the frame data in the real space 2b in the shared space with a positional relationship in which the face of the object 42a and the face of the object 42b face each other as illustrated in FIG. 67, for example.

Then, the shared space synthesizing unit 152 calculates a conversion matrix for converting a coordinate system (local coordinate system) of the space 2a into a shared space coordinate system (global coordinate system) and a conversion matrix for converting a coordinate system (local coordinate system) of the space 2b into the shared space coordinate system, on the basis of the set positional relationship. Then, the shared space synthesizing unit 152 synthesizes the frame data in the real space 2a and the frame data in the real space 2b as illustrated in FIG. 67. In this manner, it is possible to automatically decide a positional relationship suitable for the respective users by using the results of recognizing the original spaces of the respective users.

Result of Recognizing Objects

Hereinafter, an example of a method of deciding a positional relationship for synthesizing a plurality of real spaces will be specifically described. For example, the shared space synthesizing unit 152 can decide the positional relationship for synthesizing a plurality of real spaces on the basis of a result of recognizing objects in any of the plurality of real spaces. When a user 4a in a real space 2a is sitting on a sofa, and the real space 2a is synthesized with a space 2b, for example, the shared space synthesizing unit 152 decide to arrange the sofa and the user 4a in the real space 2a (together) in a vacant region in a living in the real space 2b. Also, when the real space 2a and the real space 2b are synthesized, the shared space synthesizing unit 152 may decide to synthesize the real space 2a and the real space 2b such that floors coincide with each other.

Alternatively, the shared space synthesizing unit 152 can also decide the positional relationship for synthesizing the plurality of real spaces on the basis of a result of recognizing the objects in the plurality of real spaces. For example, the shared space synthesizing unit 152 decides to align synthesize the two real spaces such that centers of television receivers respectively located in the two real spaces are overlaid with each other. Alternatively, the shared space synthesizing unit 152 decides to synthesize the two real spaces by matching the heights of desks respectively located in the real space 2a and the real space 2b. Further, the shared space synthesizing unit 152 decides to synthesize the two real spaces such that the user in the real space 2a and the user in the real space 2b face with the desk interposed therebetween or sit side-by-side. Alternatively, the shared space synthesizing unit 152 decides to synthesize the two real spaces such that seat surfaces of sofas respectively located in the real space 2a and the real space 2b are matched and the sofa in the real space 2a and the sofa in the real space 2b are adjacent to each other. In this manner, a shared space as if the user in the real space 2a and the user in the real space 2b sat on the sofa side-by-side may be generated. Alternatively, the shared space synthesizing unit 152 decides to synthesize the two real spaces such that keyboards of pianos respectively located in the real space 2a and the real space 2b are overlaid with each other. Alternatively, the shared space synthesizing unit 152 decides to synthesize the two real spaces such that fingerboards of guitars respectively located in the real space 2a and the real space 2b are overlaid with each other.

Result of Recognizing Persons

Alternatively, the shared space synthesizing unit 152 can also decide the positional relationship for synthesizing the plurality of real spaces on the basis of a result of recognizing persons who are located in the plurality of real spaces. For example, the shared space synthesizing unit 152 decides to synthesize the two real spaces with a positional relationship in which the user in the real space 2b is located in front of the user in the real space 2a.

Alternatively, the shared space synthesizing unit 152 decides to synthesize the two real spaces with a positional relationship in which the user in the real space 2a and the user in the real space 4b face each other in a face-to-face manner.

Result of Recognizing Gesture: Designation by One Person

Alternatively, the shared space synthesizing unit 152 can also decide the positional relationship for synthesizing the plurality of real spaces on the basis of a result of recognizing a gesture of one user located in any of the plurality of real spaces. In a case in which pointing of a floor (in the real space 2a) with a finger of the user in the real space 2a is recognized, for example, the shared space synthesizing unit 152 decides to synthesize the real space 2a and the real space 2b with a positional relationship in which a user (or another object) in the space 2b is located at a position on the floor pointed with the finger.

Figure 68B:
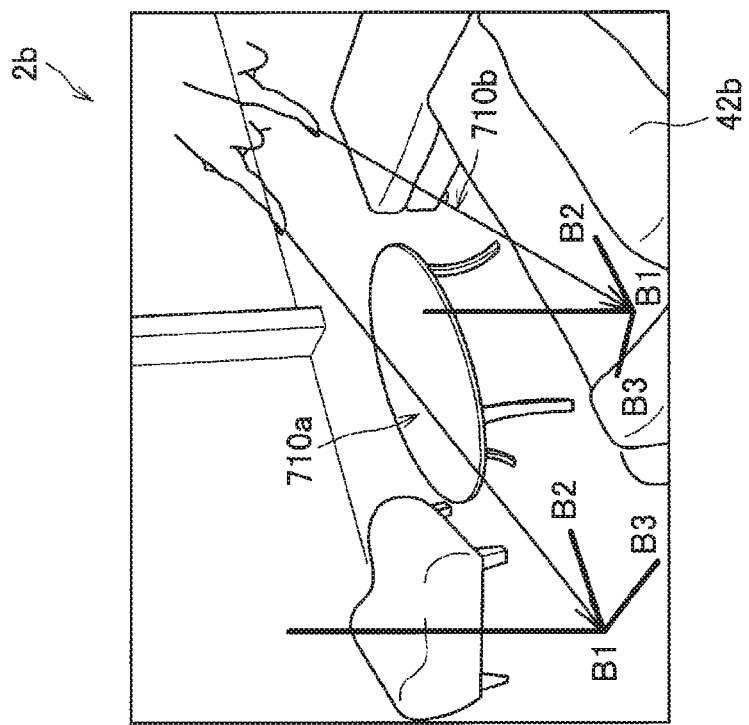
FIGS. 68A and 68B are explanatory diagrams illustrating an example of designation of a positional relationship at the time of space synthesis using a finger pointing gesture.
Figure 68A:
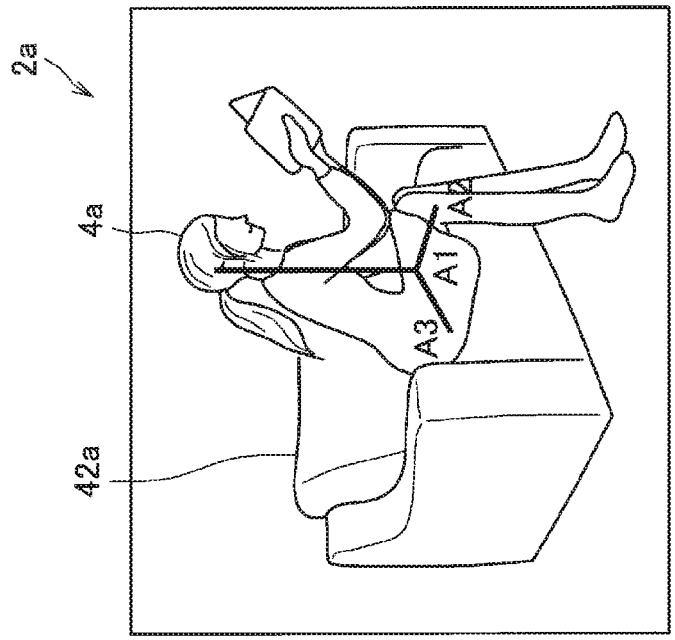

FIGS. 68A and 68B are explanatory diagrams illustrating an example in which an arrangement position of a user 4a in a real space 2a is designated during space synthesis through pointing with a finger of a user in the real space 2b. In a case in which pointing of a floor (in the real space 2b) with a finger of the user is recognized as illustrated in of FIG. 68B, for example, the shared space synthesizing unit 152 respectively decides three points based on the pointing with the finger as reference points related to the real space 2b. More specifically, the shared space synthesizing unit 152 respectively decides, as reference points, three points, namely an intersecting point (point B1) between a straight line of the pointing with the finger and the floor (or the seat surface of the sofa), a point (point B2) obtained by moving the intersecting point along the floor (or the seat surface of the sofa) in a direction toward the pointing finger by a unit length, and a point (point B3) on a straight line along the floor surface (or the seat surface of the sofa) that intersects a straight line connecting the point B1 to the point B2.

Also, as illustrated in FIG. 68A, the shared space synthesizing unit 152 respectively decides the three points based on the user 4a in the real space 2a as reference points related to the real space 2a. More specifically, the shared space synthesizing unit 152 respectively decides, as reference points, three points, namely an intersecting point (point A1) between a vertical line from the head of the user 4a to the floor (or the seat surface of the sofa) and the floor (or the seat surface of the sofa) in the real space 2a, a point (point A2) obtained by moving the intersecting point in a front direction of the user 4a by a unit length, and a point (point A3) on a straight line along the floor surface (or the seat surface of the sofa) that is orthogonal to a straight line connecting the point A1 to the point A2. Then, the shared space synthesizing unit 152 decides to synthesize the real space 2a and the real space 2b with a positional relationship in which the reference points A1, A2, and A3 in relation to the real space 2a coincide with the reference points B1, B2, and B3 in relation to the real space 2b, respectively, for example.

Note that the shared space synthesizing unit 152 may change the method of synthesizing the real space 2a and the real space 2b in accordance with the location pointed with the finger of the user in the real space 2b. In a case in which the location pointed with the finger is the floor as represented by the arrow 710a illustrated in FIGS. 68A and 68B, for example, the shared space synthesizing unit 152 may synthesize the real space 2a and the real space 2b such that the sofa 42a and the user 4a in the real space 2a are arranged at the location pointed with the finger. Also, in a case in which the location pointed with the finger is the sofa 42b as represented by the arrow 710b illustrated in FIGS. 68A and 68B, the shared space synthesizing unit 152 may synthesize the real space 2a and the real space 2b such that only the user 4a in the real space 2a is arranged at the location pointed with the finger. According to the aforementioned decision example, the user can intuitively designate the arrangement position of a user or an object in another space through an operation such as pointing with a finger.

Result of Recognizing Gesture: Designation by Plurality of Persons

Alternatively, in a case in which simultaneous gestures performed by users in a plurality of real spaces are recognized, the shared space synthesizing unit 152 can also decide to synthesize the plurality of real spaces on the basis of the recognized gestures. In a case in which simultaneous gestures of shaking hands performed by a user in a real space 2a and a user in a real space 2b are recognized, for example, the shared space synthesizing unit 152 decides to synthesize the real space 2a and the real space 2b such that the stretching hands of the two respective users are overlaid with each other. Also, in a case in which simultaneous gestures of high five performed by the user in the real space 2a and the user in the real space 2b are recognized, the shared space synthesizing unit 152 decides to synthesize the real space 2a and the real space 2b such that raising hands (palms or the like) of the two users are overlaid with each other. Also, in a case in which simultaneous gestures of paper-scissors-rock performed by the user in the real space 2a and the user in the real space 2b are recognized, the shared space synthesizing unit 152 decides to synthesize the real space 2a and the real space 2b with a positional relationship in which a specific gap is located between the stretched hands of the two users.

FIGS. 69A, 69B, 69C, and 69D are explanatory diagrams illustrating an example of synthesis between two real spaces (an example in which a shared space is generated) in a case in which simultaneous gestures of shaking hands performed by a user 4a in the real space 2a and a user 4b in the real space 2b is recognized. As illustrated in FIG. 69A, for example, the shared space synthesizing unit 152 decides three points based on the stretched hand of the user 4a as reference points related to the real space 2a. More specifically, the shared space synthesizing unit 152 decides, as reference points, three points, namely a point (point C1) corresponding to the position of the stretched hand of the user 4a, a point (point C2) obtained by moving the point C1 in the front direction of the user 4a by a unit length, and a point (point C3) obtained by moving the point C1 in the gravity direction by a unit length. Similarly, the shared space synthesizing unit 152 respectively decides, as reference points related to the real space 2b, three points (a point D1, a point D2, and a point D3) based on the stretched hand of the user 4b as illustrated in FIG. 69B. Then, the shared space synthesizing unit 152 decides to synthesize the real space 2a and the real space 2b with a positional relationship in which the point C1 and the point D1 are overlaid with each other, a vector C1 C3 and a vector D1 D3 are overlaid with each other and a vector C1C2 and a vector D1 D2 face each other. In this manner, the user in another real space may be displayed in front of the stretched hand of the user as illustrated in FIGS. 69C and 69D in content of the free viewpoint corresponding to the shared space.

According to the decision example, it is possible to efficiently set an optimal positional relationship in the shared space using simultaneity of the gestures. For example, it is possible to significantly reduce the number of user's operations for searching for the optimal positional relationship in the shared space.

Combinations

Alternatively, the shared space synthesizing unit 152 may decide to synthesize a plurality of real spaces on the basis of a combination of two or more of the aforementioned result of recognizing objects, the result of recognizing persons, and the result of recognizing gestures. In a case in which simultaneous tapping of desks performed by the user in the real space 2a and the user in the real space 2b are recognized, for example, the shared space synthesizing unit 152 decides to synthesize the real space 2a and the real space 2b with a positional relationship in which the heights of the desks in the respective real spaces coincide with each other.

7-1-1-3. Change in Positional Relationship

Action Recognition

In addition, the shared space synthesizing unit 152 can change the positional relationship on the basis of a predetermined condition after a plurality of real spaces is synthesized (after the shared space is generated). For example, in a case in which an origami lecture is given between a user (student) in the real space 2a and a user (instructor) in the real space 2b, for example, the shared space synthesizing unit 152 may synthesize the real space 2a and the real space 2b with a positional relationship such that the instructor's hands are arranged at a position of 30 cm in front of the hands of the student in an initial state. Also, in a case in which moving of the student with an origami is recognized after start of the lecture, the shared space synthesizing unit 152 may change the positional relationship between the two real spaces as needed (may regenerate the shared space as needed) such that the position of the hands of the instructor in the shared space follows and moves to the origami.

Also, in a case in which gripping and moving of an object (including a user) in the real space 2b performed by the user in the real space 2a is recognized when a position relation changing mode is activated, the shared space synthesizing unit 152 may change the positional relationship between the real space 2a and the real space 2b as needed in accordance with the recognition result. Note that activation and end of the positional relationship changing mode are executed on the basis of recognition of a gesture or a sound command, for example, an operation performed on an UI, or the like.

Designation Using Marker Position

In addition, after the plurality of real spaces are synthesized, the shared space synthesizing unit 152 can change the positional relationship on the basis of a change in the position of a predetermined marker (an object for positioning or the like). In a case in which a specific chair is registered in advance as a predetermined marker, for example, the shared space synthesizing unit 152 may change the positional relationship in the respective real spaces in the shared space as needed in accordance with a change in the position of the chair in any of original spaces. According to the modification example, the user can intuitively change the positional relationship with another real space by moving the predetermined marker. Further, since the user actually touches an object, the user can obtain an operation feeling (a sense of touch or the like) as compared with an operation in a virtual space, for example.

7-1-1-4. Selection of Objects as Targets of Display

Also, the shared space synthesizing unit 152 can simultaneously perform selection of objects as targets of display and decision of display positions of the objects on the basis of a result of recognizing a gesture of a user who is located at least any of a plurality of real spaces. In a case in which sitting of a user in the real space 2a on a chair and pointing of a floor with a finger of a user in another real space 2b are recognized, for example, the shared space synthesizing unit 152 decides to arrange the chair on which the user is sitting and the user in the real space 2a in the shared space (together). Also, in a case in which pointing of the chair with a finger of the user in the real space 2a is recognized, the shared space synthesizing unit 152 decides to arrange only the user in the real space 2b (without changing the posture of sitting on the chair) in the shared space.

Also, the shared space synthesizing unit 152 can also (roughly) decide objects as targets of display and (roughly) decide arrangement positions of the objects as the targets of display on the basis of the recognition of the gesture of the user in the real space 2a and a situation of the objects (such as users) in another real space 2b. In a case in which pointing of the chair (in the real space 2a) with the finger of the user in the real space 2a and standing of the user in the real space 2b are recognized, for example, the shared space synthesizing unit 152 decides to arrange the user in the real space 2b (without changing the standing posture) on the floor near the chair at the location pointed with the finger. According to the decision example, it is possible to select and arrange objects substantially as intended by the user even in a case in which prevision of the sensor unit 220 is low, for example.

7-1-1-5. Switching Mode

Alternatively, how to combine a plurality of positional relationships for synthesizing the plurality of real spaces may be respectively registered as modes in advance. Also, the modes may be manually switched by the user (for example, through a gesture, a sound command, or the like).

Also, the modes can be automatically switched on the basis of a result of recognizing a user's action, for example. For example, the server 10-7 may automatically detect a scene and automatically switch a mode corresponding to the detected scene. In one example in which participating in a shared space of a user 4a in a real space 2a and a user 4b in a real space 2b and sitting of the two users on the tables in the original spaces are recognized, the server 10-7 automatically switches a mode such that the heights of the tables are matched. According to the control example, it is not necessary for the users to switch the setting mode.

Also, in a case in which opening an actual notebook (in a real space 2a) on a virtual notebook displayed on the display unit 246 by the user in the real space 2a and causing the actual notebook to approach the virtual notebook by a distance that is equal to or less than a predetermined threshold value are recognized, the server 10-7 may automatically switch the mode to a "mode for matching the notebooks". In this manner, it is possible to reduce time and efforts required for fine adjustment and to dynamically change the display position.

Also, histories of result of recognizing objects and how to match the recognized objects are recognized. Then, the server 10-7 may automatically switch the positional relationship setting mode on the basis of the histories. In a case in which overlaying two Japanese traditional papers by a user who is performing calligraphy is recognized, for example, the operation may be recorded as a history. Then, in a case in which causing two Japanese traditional papers to approach each other is recognized next, the server 10-7 can automatically set the "mode of overlaying two Japanese traditional papers" on the basis of the history. Also, in a case in which a piano lesson time arrives, the server 10-7 can automatically set "a mode of matching keyboards" on the basis of a history. According to these control examples, it is possible to omit time and efforts of the user to designate the positional relationship setting mode every time. Also, optimal modes may automatically be selected by a large amount of histories being accumulated.

7-2. Flow of Process

The configuration according to the seventh embodiment has been described above.

Figure 70:
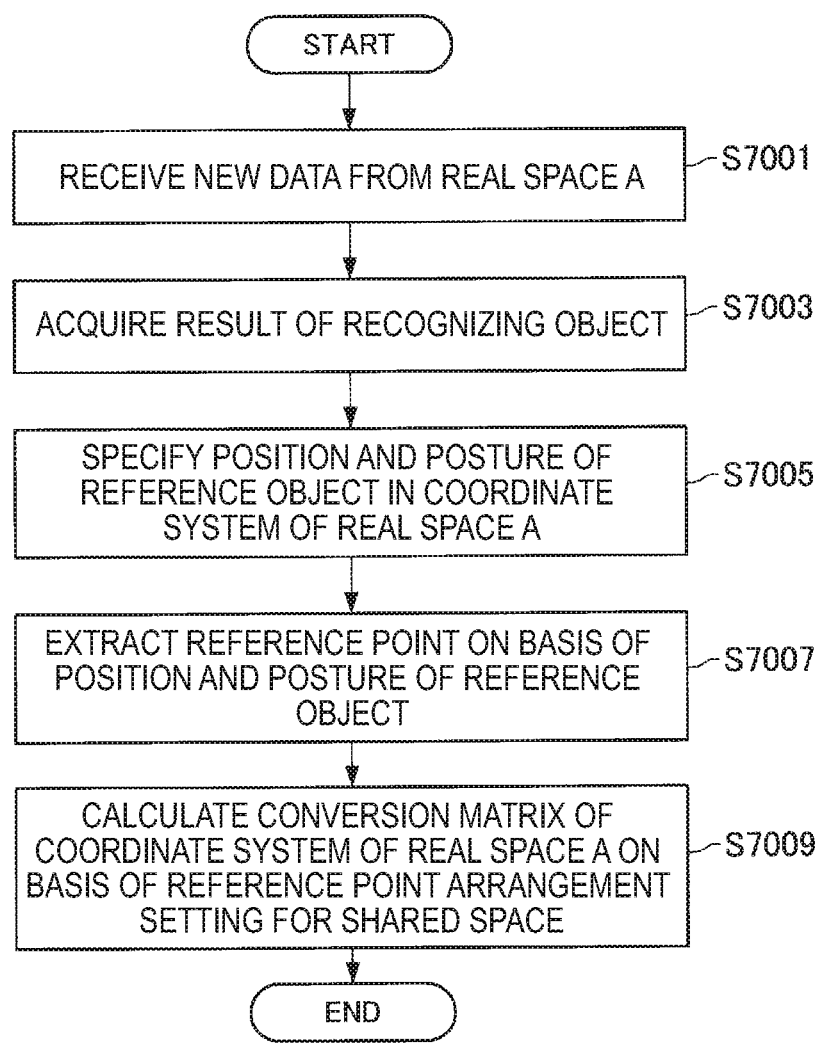
FIG. 70 is a flowchart illustrating a flow of a process according to a seventh embodiment.

Next, a flow of a process according to the seventh embodiment will be described with reference to FIG. 70. FIG. 70 is a flowchart illustrating a flow of a process of calculating a conversion matrix from local coordinate systems of the respective real spaces to a shared space coordinate system according to the seventh embodiment. Hereinafter, an example in which a conversion matrix from a local coordinate system of a real space A to a shared space coordinate system is calculated in relation to the real space A will be described. Note that the flow of the processing may similarly be applied to an arbitrary real space.

As illustrated in FIG. 70, the server 10-7 first receives new frame data from the real space A (S7001).

Then, the shared space synthesizing unit 152 acquires a recognition result (corresponding to the frame data) obtained by the recognizing unit 224 of the input unit 22 or the recognizing unit 104 of the server 10-7 (S7003).

Then, the shared space synthesizing unit 152 decides a reference object (from among objects in the real space A) on the basis of the frame data received in S7001 and the recognition result acquired in S7003. Then, the shared space synthesizing unit 152 specifies the position and the posture of the reference object in the coordinate system of the real space A (S7005).

Then, the shared space synthesizing unit 152 extracts a reference point on the basis of the position and the posture of the reference object specified in S7005 (S7007).

Thereafter, the shared space synthesizing unit 152 calculates a conversion matrix for converting the coordinate system (local coordinate system) of the real space A into the shared space coordinate system (global coordinate system) on the basis of positional relationships of reference points of a plurality of real spaces, which have already been set in the shared space, and the reference point extracted in S7007.

7-3. Advantages

As described above, the server 10-7 respectively decides objects that are located in the plurality of respective real spaces and are recognized to be similar as reference objects and synthesizes sensing data related to the plurality of real spaces on the basis of the reference points or the reference planes associated with the reference objects, thereby generating a shared space according to the seventh embodiment. In this manner, it is possible to synthesize the two real spaces with a positional relationship suitable for situations of the respective users.

8. Hardware Configuration

Figure 71:
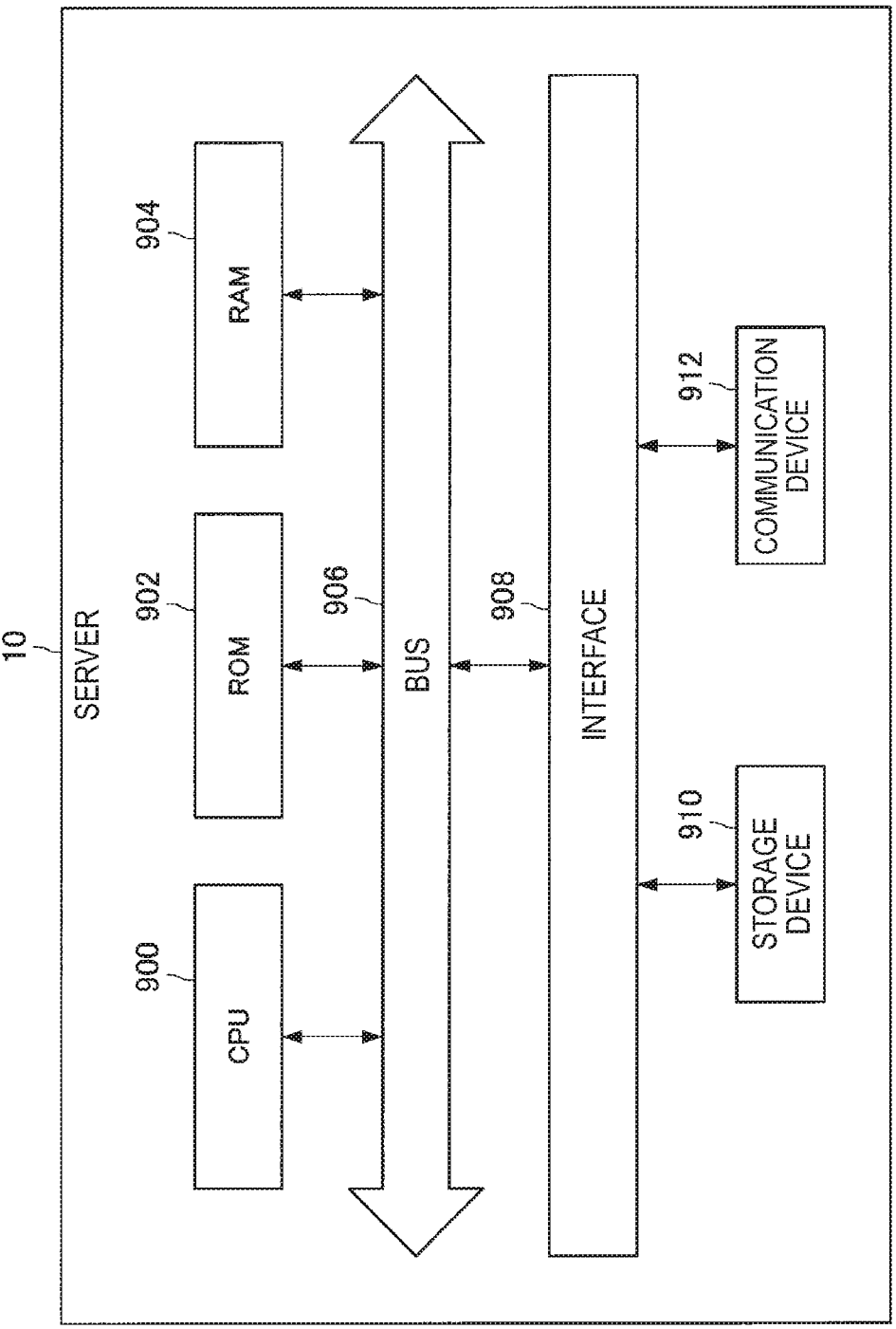
FIG. 71 is an explanatory diagram illustrating a hardware configuration of a server 10 that is common in the respective embodiments.

Next, a hardware configuration of the server 10 common in each of the present embodiments will be described with reference to FIG. 71. As illustrated in FIG. 71, the server 10 includes a CPU 900, a read only memory (ROM) 902, a RAM 904, a bus 906, an interface 908, a storage device 910 and a communication device 912.

The CPU 900, which functions as an arithmetic processing unit and a control device, controls the whole operation within the server 10 in accordance with various kinds of programs. Further, the CPU 900 includes a processor such as a microprocessor.

The ROM 902 stores programs, control data such as an operation parameter, or the like, to be used by the CPU 900.

The RAM 904 temporarily stores, for example, programs to be executed by the CPU 900.

The bus 906 includes a CPU bus, or the like. The bus 906 interconnects the CPU 900, the ROM 902 and the RAM 904.

The interface 908 connects the storage device 910 and the communication device 912 to the internal bus 906.

The storage device 910 is a device for data storage. The storage device 910 includes, for example, a storage medium, a recording device which records data in the storage medium, a readout device which reads out data from the storage medium, a deletion device which deletes data recorded in the storage medium, or the like.

The communication device 912 is a communication interface including a communication device, or the like, for connecting to, for example, the communication network 26, or the like. Further, the communication device 912 may be a communication device supporting a wireless LAN, a communication device supporting long term evolution (LTE) or a wired communication device which performs communication in a wired manner.

9. Modified Examples

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

9-1. First Modification Example

For example, although the example in which the server 10 generates only one shared space (for each frame) has mainly been described in the aforementioned embodiments, the present disclosure is not limited to such an example, and the server 10 (shared space synthesizing unit 152) may generate a plurality of different shared spaces for each frame. For example, the shared space synthesizing unit 152 may generate a shared space A on the basis of a stream received from an input unit 22a in a real space 2a and a stream received from an input unit 22b in a real space 2b and generate a shared space B on the basis of a stream received from an input unit 22c in a real space 2c and a stream received from an input unit 22d in a real space 2d.

Also, the shared space synthesizing unit 152 may generate respectively different shared spaces for the respective users who are participating in the shared spaces in relation to the respective frames. For example, the shared space synthesizing unit 152 may separately decide objects as targets of display for the respective users in relation to the respective frames and then respectively generate shared spaces on the basis of the decided objects. Note that at this time, the server 10 (base space layout generating unit 158) may generate respectively different base spaces of the respective users.

In one example, weights for calculating priority may be separately registered in a table for the respective users. Then, in relation to the respective objects in the respective real spaces, the server 10 (priority calculation unit 400) calculates priority of the objects on the basis of registered content in the table for the respective users. According to the modification example, objects that the user 4a can view can be differentiated from objects that the user 4b can view, for example.

9-2. Second Modification Example

Also, in another modification example, filters for which types of objects that are not allowed to be displayed are set in advance for the respective users may be prepared. In this case, the server 10 may apply filters associated with the users to generated shared space frame data for the respective users who are participating in the shared space. According to the modification example, objects that can be viewed can be differentiated for the respective users.

9-3. Third Modification Example

Further, the steps of the flow of the process according to each of the above-described embodiments do not necessarily have to be executed in the described order. For example, the order in which the steps are executed may be changed as appropriate. Further, the steps may be partially executed in parallel or individually instead of being executed in chronological order. Further, some of steps described may be omitted, or other steps may be added.

Further, in accordance with each of the above-described embodiments, it is also possible to provide a computer program causing hardware such as the CPU 900, the ROM 902, and the RAM 904 to execute the same functions as those of the components of the server 10 according to each of the above-described embodiments. Further, a recording medium having the computer program recorded therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a decision unit that decides, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

(2)

The information processing device according to (1), in which the decision unit selects at least one of a first virtual object corresponding to the first actual object or a second virtual object corresponding to the second actual object as the shared object on the basis of the predetermined reference.

(3)

The information processing device according to (2), further including:

a priority calculation unit that calculates priority of the first actual object and priority of the second actual object on the basis of a predetermined criterion, in which the predetermined criterion includes the priority of the first actual object and the priority of the second actual object calculated by the priority calculation unit.

(4)

The information processing device according to (3), in which the priority calculation unit calculates the priority of the first actual object and the priority of the second actual object on the basis of attribute information of the first actual object and attribute information of the second actual object.

(5)

The information processing device according to (4), in which the attribute information of the first actual object includes a size of the first actual object, a type of the first actual object, or identification information of the first real space, and the attribute information of the second actual object includes a size of the second actual object, a type of the second actual object, or identification information of the second real space.

(6)

The information processing device according to any one of (3) to (5), in which the priority calculation unit calculates the priority of the first actual object on the basis of a positional relationship between the first actual object and the first user in the first real space and calculates the priority of the second actual object on the basis of a positional relationship between the second actual object and the second user in the second real space.

(7)

The information processing device according to any one of (3) to (6), in which the priority calculation unit calculates the priority of the first actual object and the priority of the second actual object on the basis of whether or not the first virtual object or the second virtual object has been arranged in the virtual space in a display frame immediately before the virtual space displayed by a display unit.

(8)

The information processing device according to any one of (3) to (7), in which the priority calculation unit calculates the priority of the first actual object and the priority of the second actual object on the basis of context information in the virtual space.

(9)

The information processing device according to (8), in which the priority calculation unit calculates priority of an actual object of the first actual object and the second actual object, which relates to the context information, to be higher.

(10)

The information processing device according to any one of (2) to (9), further including: a space generating unit that generates the virtual space by synthesizing first three-dimensional information acquired on the basis of a sensing result of the first real space with second three-dimensional information acquired on the basis of a sensing result of the second real space.

The information processing device according to (10), in which the space generating unit arranges all shared objects decided to be arranged in the virtual space by the decision unit in the virtual space on the basis of layout information.

(12)

The information processing device according to (11), in which either the first real space or the second real space is decided as a base space, and the information processing device further includes a layout information generating unit that generates the layout information on the basis of three-dimensional information of the base space.

(13)

The information processing device according to (11), in which the layout information is information selected by the first user or the second user among a plurality of pieces of layout information registered in advance.

(14)

The information processing device according to (11), in which the layout information is edited on the basis of a result of recognizing an instruction provided by the first user or the second user for editing the layout information.

(15)

The information processing device according to any one of (2) to (14), in which the predetermined reference includes setting information related to availability of display of the first virtual object and setting information related to availability of display of the second virtual object.

(16)

The information processing device according to any one of (2) to (15), in which the predetermined reference includes a relationship of an amount of data related to the first actual object, an amount of data related to the second actual object, and a network band between the first real space and the information processing device and a network band between the second real space and the information processing device.

(17)

The information processing device according to any one of (1) to (16), in which the second actual object has predetermined similarity to the first actual object, the decision unit decides the first actual object and the second actual object as reference objects, and the information processing device further includes a space generating unit that generates the virtual space by synthesizing first three-dimensional information acquired on the basis of a sensing result of the first real space and second three-dimensional information acquired on the basis of a sensing result of the second real space on the basis of reference points or reference planes in accordance with the reference objects.

(18)

The information processing device according to (17), in which the decision unit specifies at least one of a plurality of the first actual objects as the reference object on the basis of positional relationships between the plurality of first actual objects and the first user, positional relationships between a plurality of the second actual objects and the second user, and similarity of each of the plurality of second actual objects to the plurality of first actual objects and specifies at least one of the plurality of second actual objects as the reference object.

(19)

An information processing method including:

deciding, by a processor, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

(20)

A program that causes a computer to function as:

a decision unit that decides, on the basis of a predetermined reference, a shared object arranged in a virtual space that is generated for communication between a first user and a second user on the basis of a sensing result of a first real space including at least one first actual object in relation to the first user and a sensing result of a second real space including at least one second actual object in relation to the second user.

REFERENCE SIGNS LIST

10-1 to 10-7 server
20 client
22 input unit
24 output unit
26 communication network
50 free viewpoint video image content server
52 free viewpoint live content server
54 base space layout server
100-1, 100-2, 100-4 shared space managing unit
102 shared space generating unit
104, 224, 250, 524 recognizing unit
106 event recognizing unit
108 control unit
120 client connecting unit
122, 252 control information transmitting unit
124, 242 stream separating unit
126, 240 receiving unit
128, 222, 500, 522 control information receiving unit
130, 226, 502, 526 stream generating unit
132, 228, 504, 528 transmitting unit
150 synchronizing unit
152 shared space synthesizing unit
154 delivering unit
156 shared space frame data DB
158 base space layout generating unit
166 base space layout information managing unit
220, 248, 520 sensor unit
244 synthesizing unit
246 display unit
400 priority calculation unit
402 decision unit
540 base space layout information DB managing unit

The invention claimed is:

1. An information processing device, comprising:
at least one processor configured to:
calculate a first priority of a first actual object, in a first real space of a first user, based on a priority associated with attribute information of the first actual object;
calculate a second priority of a second actual object, in a second real space of a second user, based on a priority associated with attribute information of the second actual object;
calculate a final priority of each of the first actual object and the second actual object, based on a weighted sum of the first priority and the second priority; and
determine, based on the final priority of each of the first actual object and the second actual object, a shared object in a virtual space, wherein
the virtual space is for communication between the first user and the second user,
the shared object is one of a first virtual object corresponding to the first actual object or a second virtual object corresponding to the second actual object, and
the virtual space is based on a sensing result of the first real space and a sensing result of the second real space.

2. The information processing device according to claim 1, wherein
the attribute information of the first actual object includes one of
a size of the first actual object,
a type of the first actual object, or
identification information of the first real space, and
the attribute information of the second actual object includes one of
a size of the second actual object,
a type of the second actual object, or
identification information of the second real space.

3. The information processing device according to claim 1, wherein
the at least one processor is further configured to generate the virtual space based on first three-dimensional information and second three-dimensional information,
the first three-dimensional information is based on the sensing result of the first real space, and
the second three-dimensional information is based on the sensing result of the second real space.

4. An information processing device, comprising:
at least one processor configured to:
calculate a first priority of a first actual object in a first real space of a first user and a second priority of a second actual object in a second real space of a second user, based on context information in a virtual space, wherein
the context information in the virtual space corresponds to a subject of communication between the first user and the second user,
the virtual space is for communication between the first user and the second user,
the virtual space is based on the first real space and the second real space, and
the subject of communication is a third object different from each of the first actual object and the second actual object;
calculate a final priority of each of the first actual object and the second actual object, based on a weighted sum of the first priority and the second priority; and
determine a shared object in the virtual space, based on the final priority of each of the first actual object and the second actual object, and a third priority of the third object, wherein
the shared object is at least one of a first virtual object corresponding to the first actual object, a second virtual object corresponding to the second actual object, or a third virtual object corresponding to the third object.

5. The information processing device according to claim 4, wherein the at least one processor is further configured to calculate the third priority of the third object which is higher than the first priority and the second priority.

6. An information processing method, comprising:
in an information processing device comprising at least one processor:
calculating, by the at least one processor, a first priority of a first actual object, in a first real space of a first user, based on a priority associated with attribute information of the first actual object;
calculating, by the at least one processor, a second priority of a second actual object, in a second real space of a second user, based on a priority associated with attribute information of the second actual object;
calculating, by the at least one processor, a final priority of each of the first actual object and the second actual object, based on a weighted sum of the first priority and the second priority; and
determining, by the at least one processor, based on the final priority of each of the first actual object and the second actual object, a shared object in a virtual space, wherein
the virtual space is for communication between the first user and the second user,
the shared object is one of a first virtual object corresponding to the first actual object or a second virtual object corresponding to the second actual object, and
the virtual space is based on a sensing result of the first real space and a sensing result of the second real space.

7. A non-transitory computer-readable medium having stored thereon computer-executable instructions which, when executed by a computer cause the computer to execute operations, the operations comprising:
calculating a first priority of a first actual object, in a first real space of a first user, based on a priority associated with attribute information of the first actual object;
calculating a second priority of a second actual object, in a second real space of a second user, based on a priority associated with attribute information of the second actual object;
calculating a final priority of each of the first actual object and the second actual object, based on a weighted sum of the first priority and the second priority; and
determining, based on the final priority of each of the first actual object and the second actual object, a shared object in a virtual space, wherein
the virtual space is for communication between the first user and the second user,
the shared object is one of a first virtual object corresponding to the first actual object or a second virtual object corresponding to the second actual object, and
the virtual space is based on a sensing result of the first real space and a sensing result of the second real space.

* * * * *